Nov. 29, 1955 J. I. BELLAMY ET AL 2,725,428

MULTI-GROUP PRIMARY-SECONDARY-SPREAD CROSSBAR TELEPHONE SYSTEM

Filed Jan. 6, 1953 59 Sheets-Sheet 1

INVENTORS:
JOHN I. BELLAMY
THERON L. BOWERS
BY John I. Bellamy
ATTORNEY

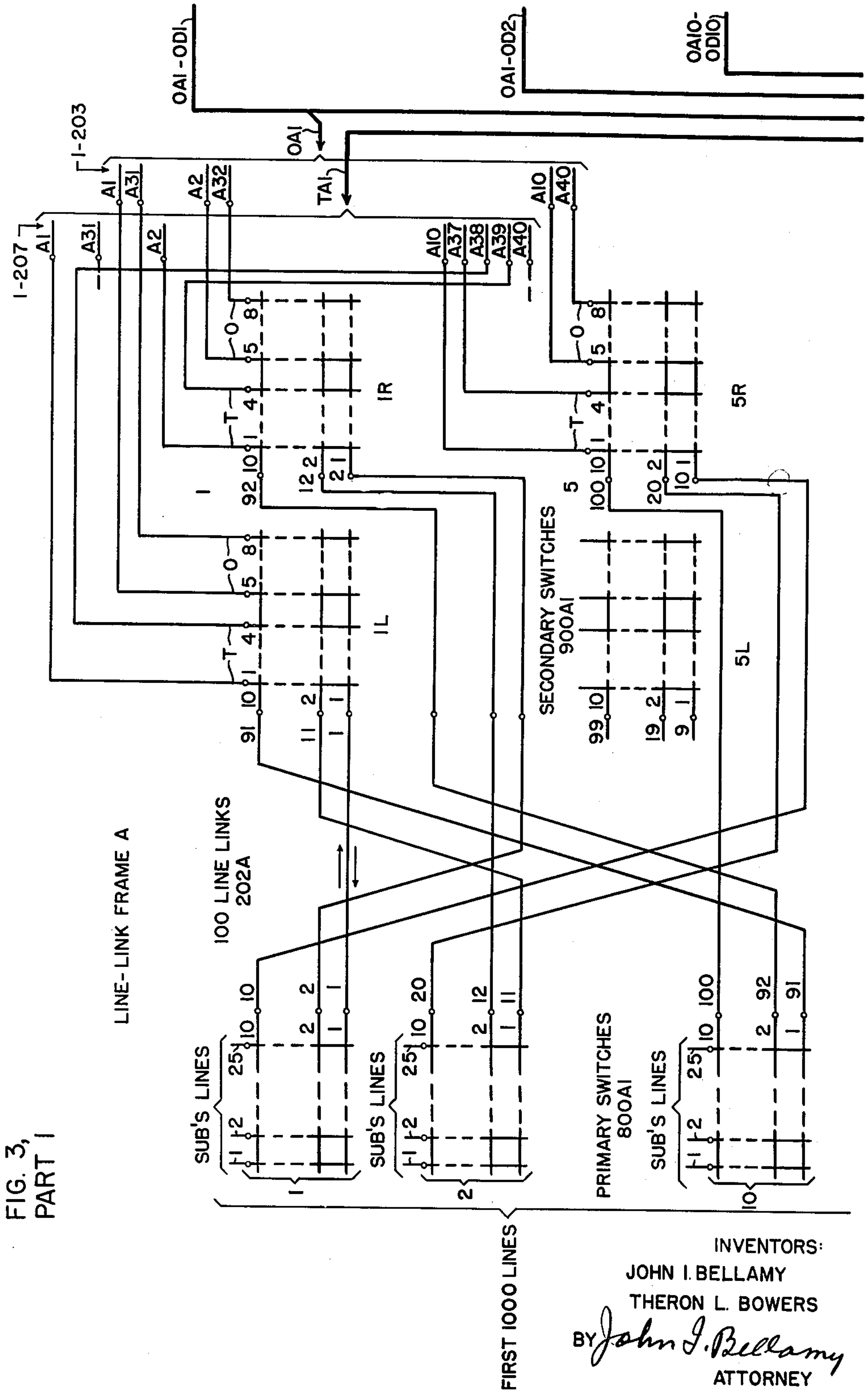
FIG. 3, PART I
INVENTORS:
JOHN I. BELLAMY
THERON L. BOWERS
BY John I. Bellamy
ATTORNEY

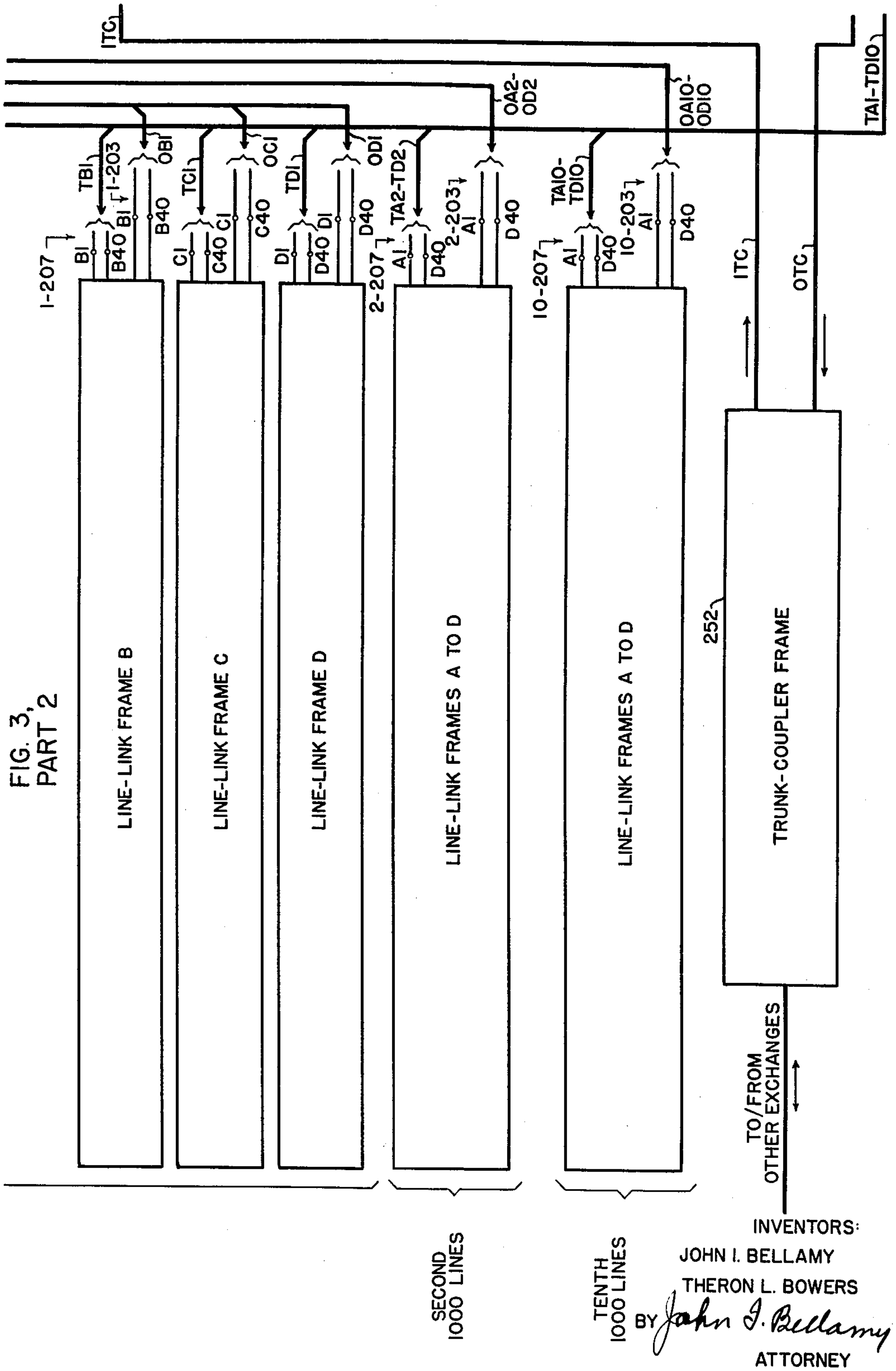
FIG. 3, PART 2
INVENTORS:
JOHN I. BELLAMY
THERON L. BOWERS
BY John I. Bellamy
ATTORNEY MULTI-GROUP PRIMARY-SECONDARY-SPREAD
CROSSBAR TELEPHONE SYSTEM
Filed Jan. 6, 1953 59 Sheets-Sheet 4
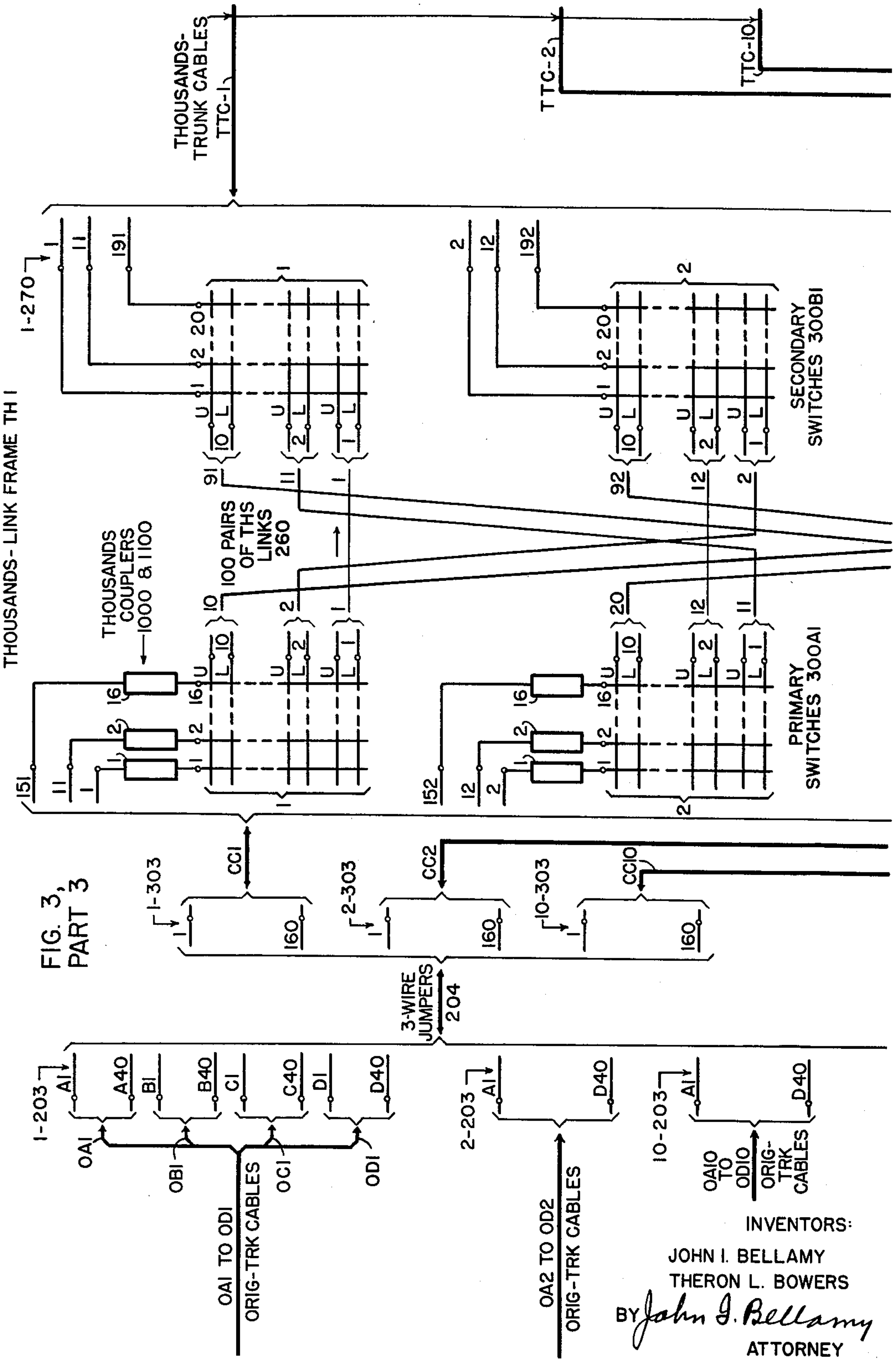
FIG. 3, PART 3
INVENTORS:
JOHN I. BELLAMY
THERON L. BOWERS
BY John I. Bellamy
ATTORNEY Nov. 29, 1955 J. I. BELLAMY ET AL 2,725,428
MULTI-GROUP PRIMARY-SECONDARY-SPREAD CROSSBAR TELEPHONE SYSTEM
Filed Jan. 6, 1953 59 Sheets-Sheet 5
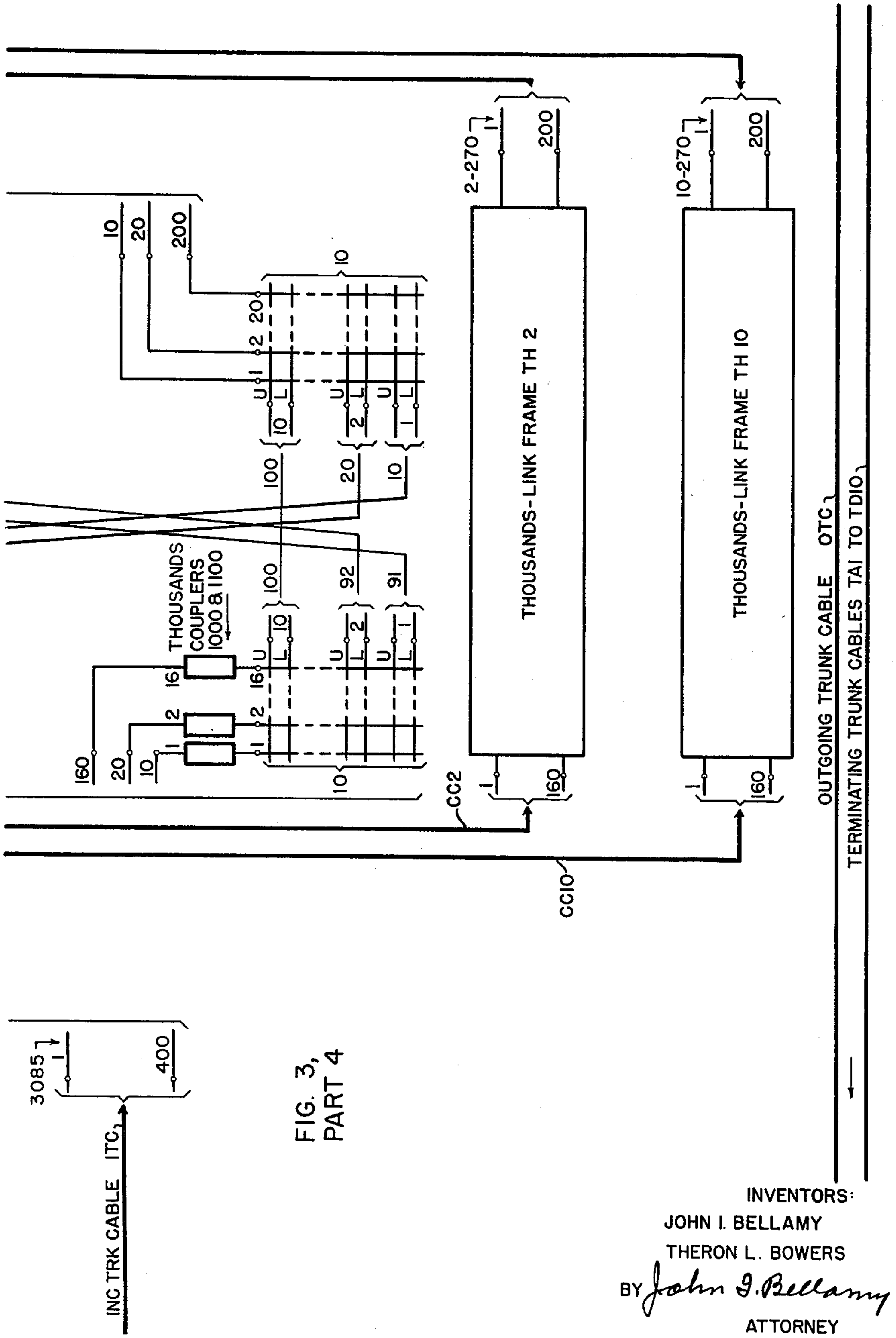
FIG. 3, PART 4
INVENTORS:
JOHN I. BELLAMY
THERON L. BOWERS
BY John I. Bellamy
ATTORNEY

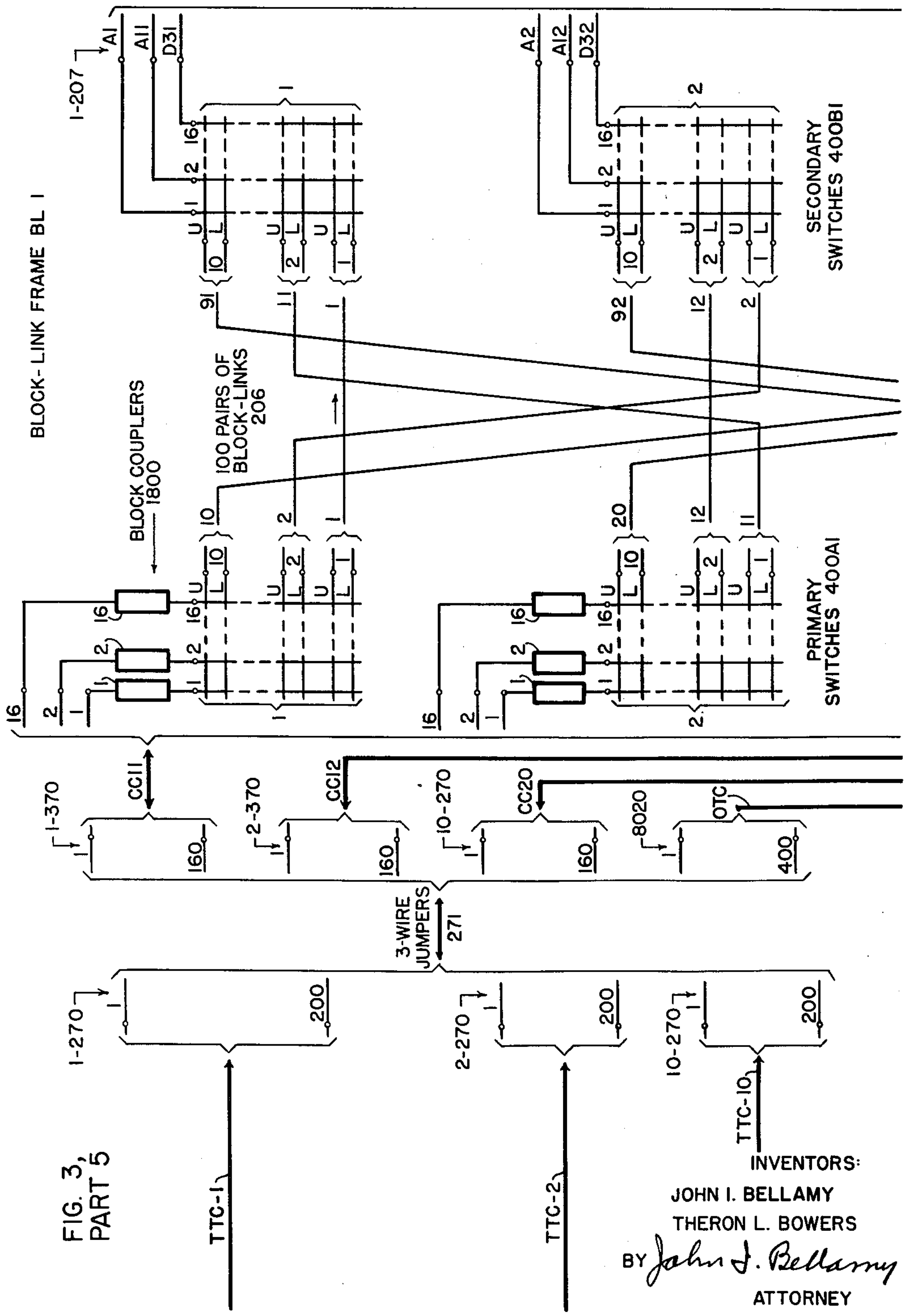
FIG. 3, PART 5
INVENTORS:
JOHN I. BELLAMY
THERON L. BOWERS
BY John I. Bellamy
ATTORNEY Nov. 29, 1955
J. I. BELLAMY ET AL
2,725,428
MULTI-GROUP PRIMARY-SECONDARY-SPREAD
CROSSBAR TELEPHONE SYSTEM
Filed Jan. 6, 1953
59 Sheets-Sheet 7
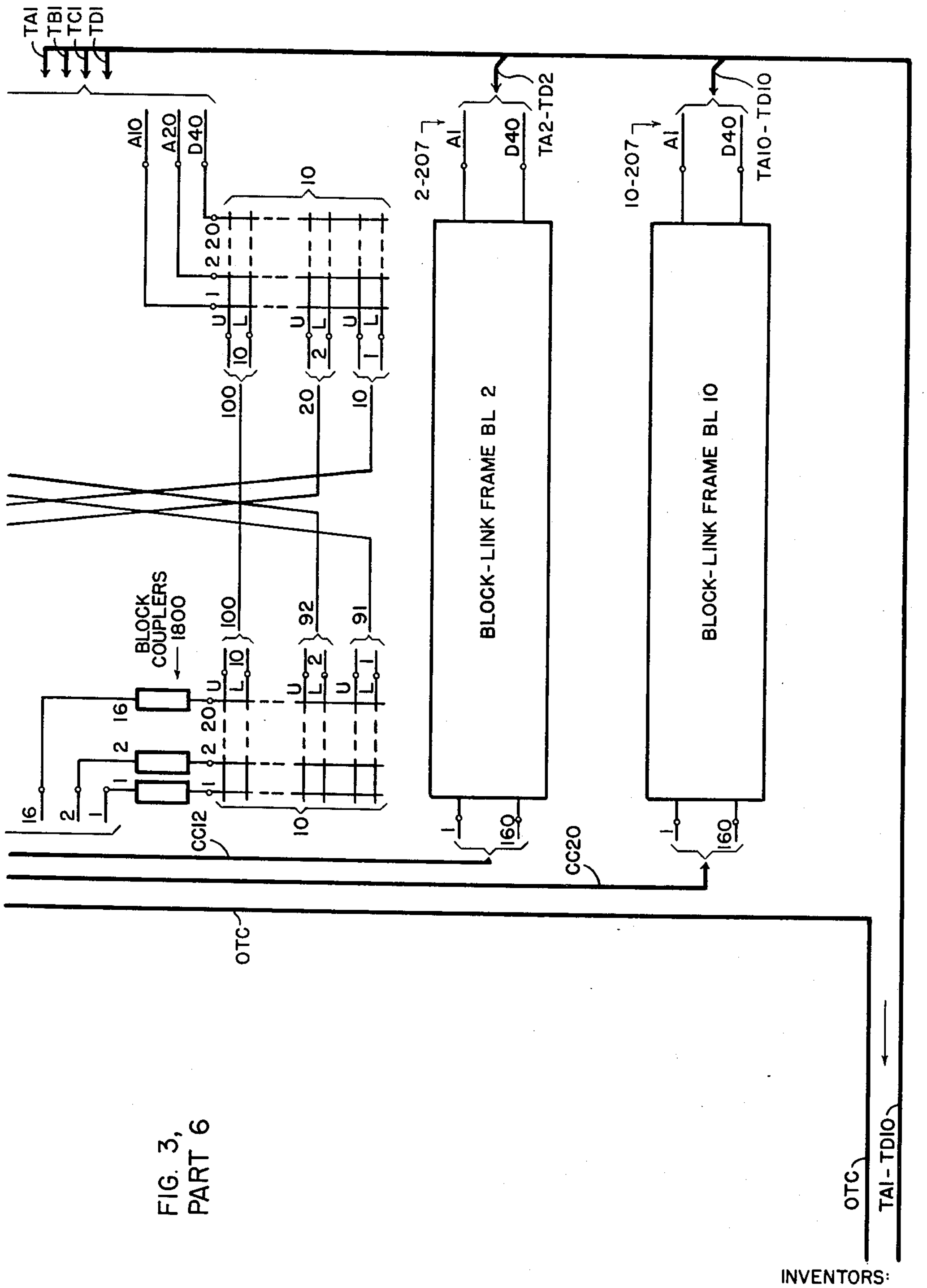
FIG. 3, PART 6
INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY

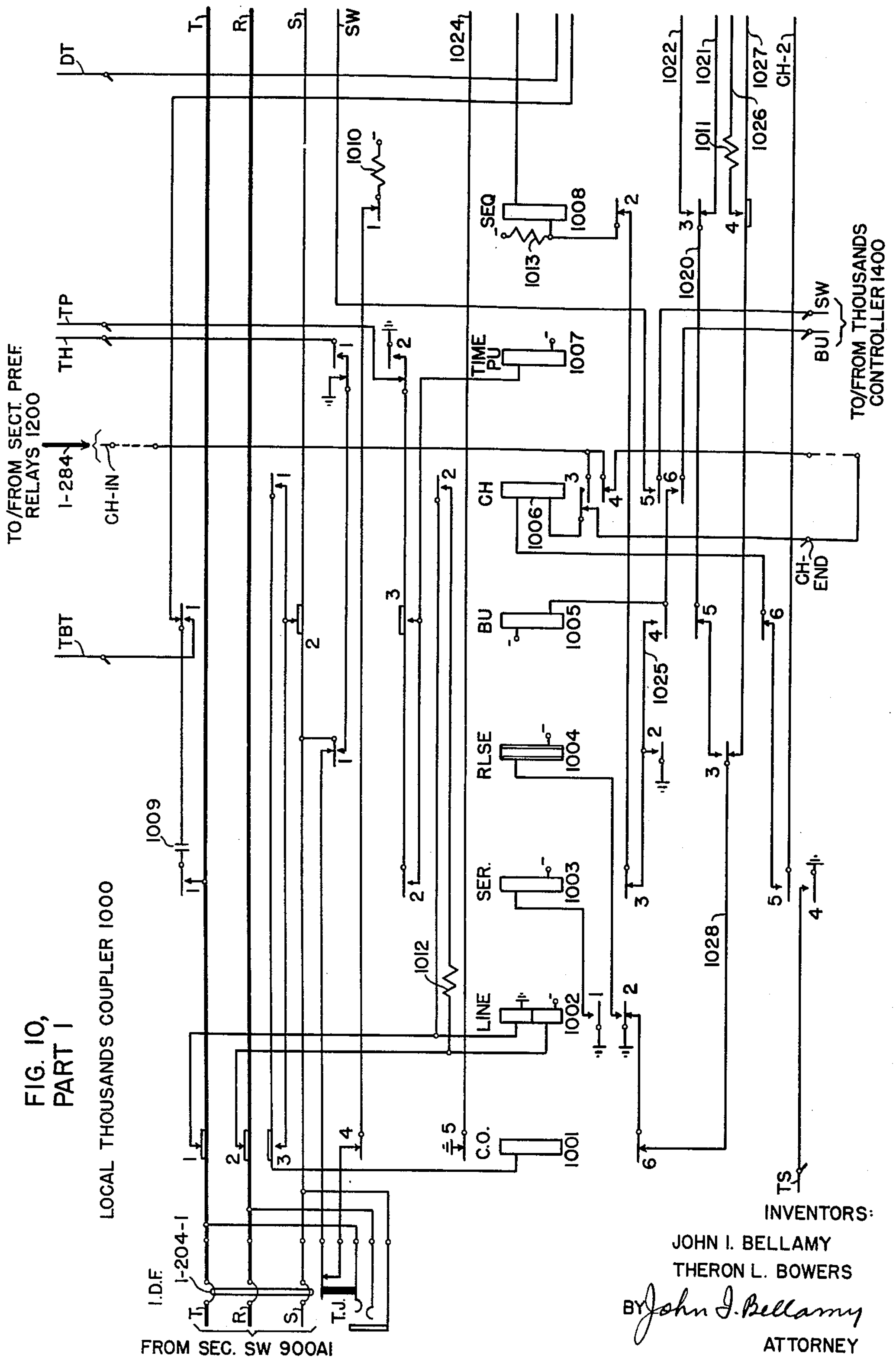
FIG. 10, PART I
INVENTORS:
JOHN I. BELLAMY
THERON L. BOWERS
BY John I. Bellamy
ATTORNEY FIG. 10, PART 2
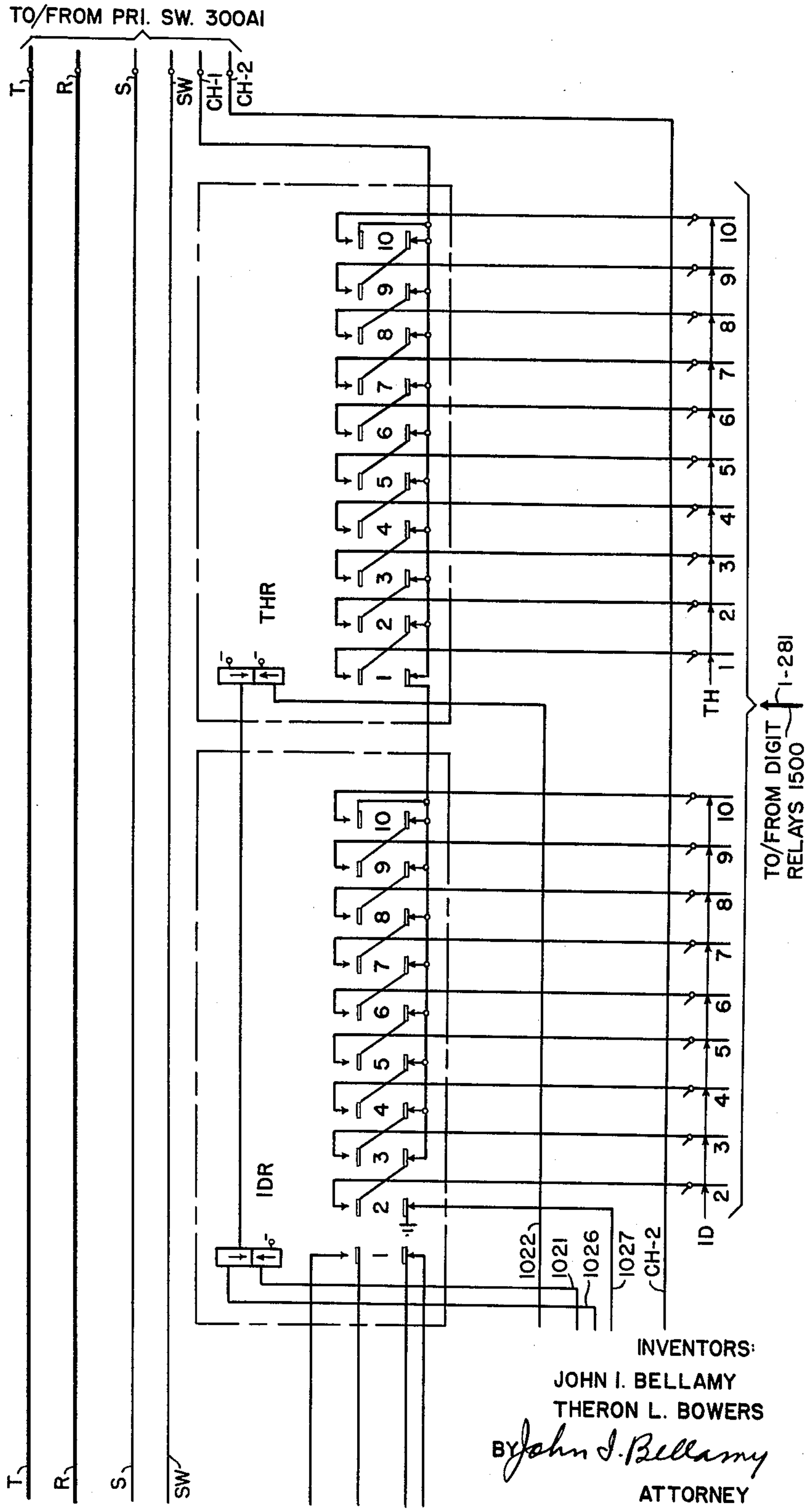
INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY Nov. 29, 1955 J. I. BELLAMY ET AL 2,725,428

MULTI-GROUP PRIMARY-SECONDARY-SPREAD CROSSBAR TELEPHONE SYSTEM

Filed Jan. 6, 1953 59 Sheets-Sheet 17

INVENTORS:
JOHN I. BELLAMY
THERON L. BOWERS
BY John I. Bellamy
ATTORNEY

Nov. 29, 1955 J. I. BELLAMY ET AL 2,725,428

MULTI-GROUP PRIMARY-SECONDARY-SPREAD CROSSBAR TELEPHONE SYSTEM

Filed Jan. 6, 1953 59 Sheets-Sheet 18

INVENTORS:
JOHN I. BELLAMY
THERON L. BOWERS
BY John I. Bellamy
ATTORNEY

Nov. 29, 1955 J. I. BELLAMY ET AL 2,725,428
MULTI-GROUP PRIMARY-SECONDARY-SPREAD CROSSBAR TELEPHONE SYSTEM
Filed Jan. 6, 1953 59 Sheets-Sheet 19
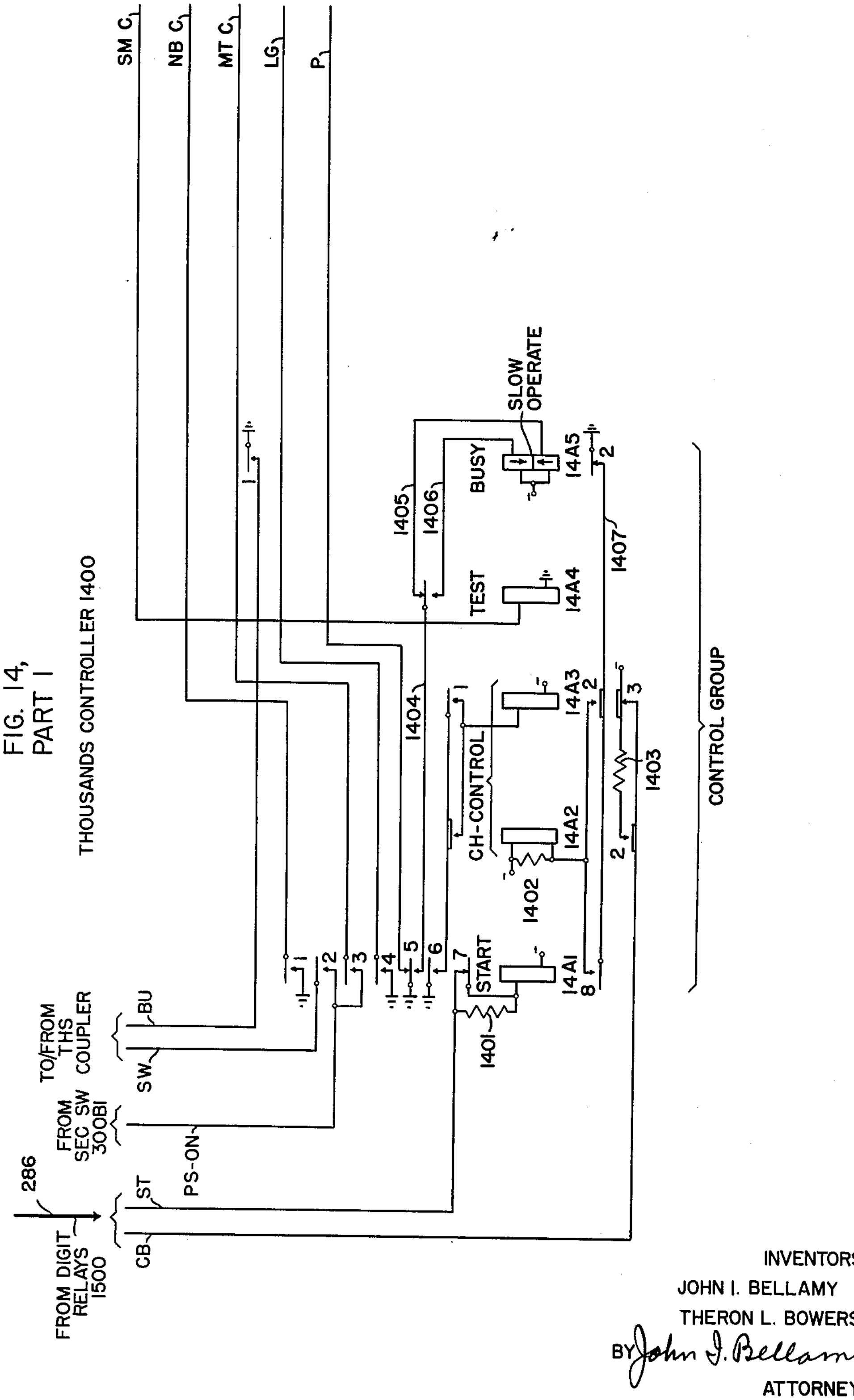
FIG. 14, PART 1
INVENTORS:
JOHN I. BELLAMY
THERON L. BOWERS
BY John I. Bellamy
ATTORNEY

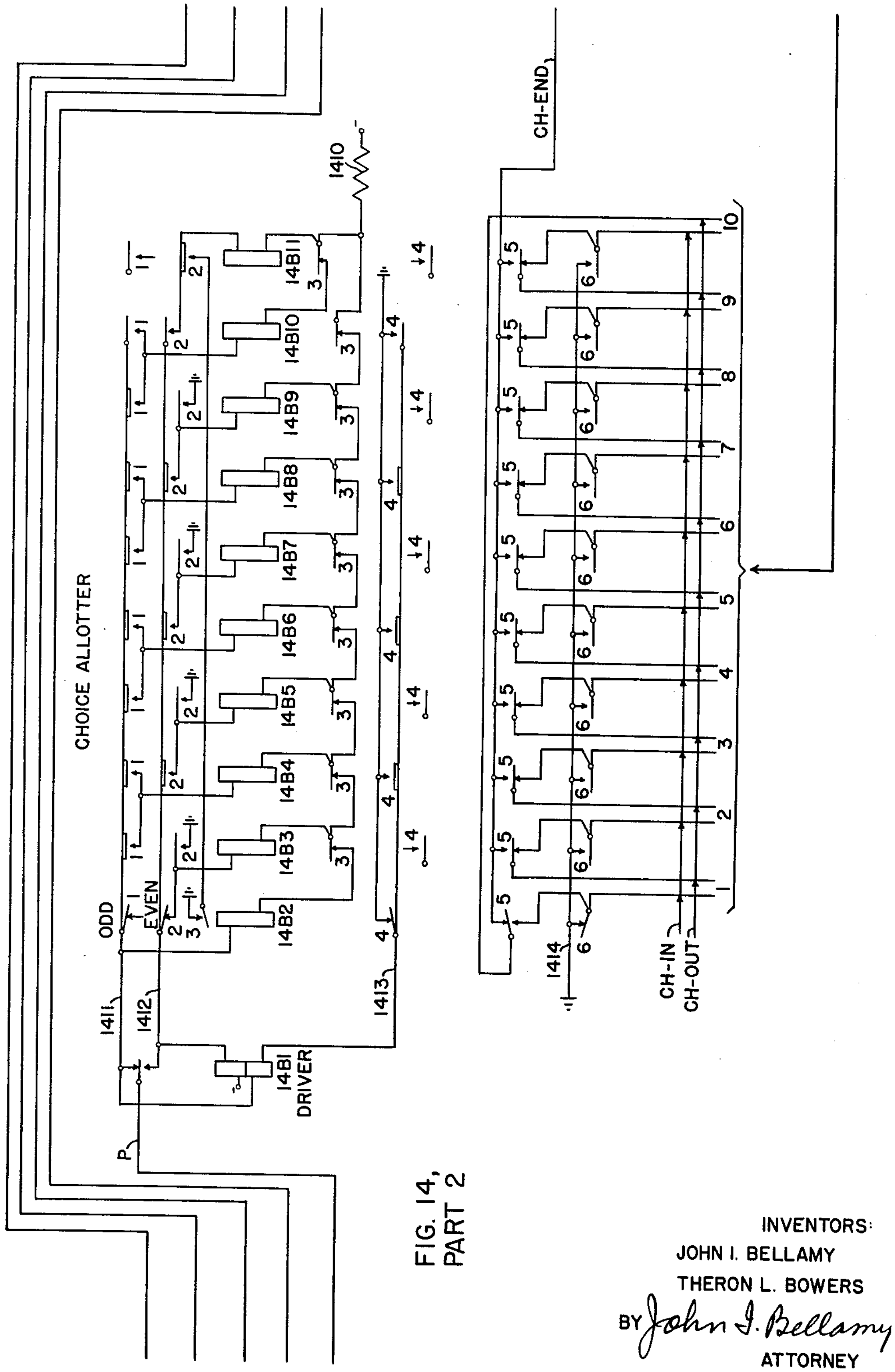
FIG. 14, PART 2
INVENTORS:
JOHN I. BELLAMY
THERON L. BOWERS
BY John I. Bellamy
ATTORNEY Nov. 29, 1955 J. I. BELLAMY ET AL 2,725,428
MULTI-GROUP PRIMARY-SECONDARY-SPREAD CROSSBAR TELEPHONE SYSTEM
Filed Jan. 6, 1953 59 Sheets-Sheet 21
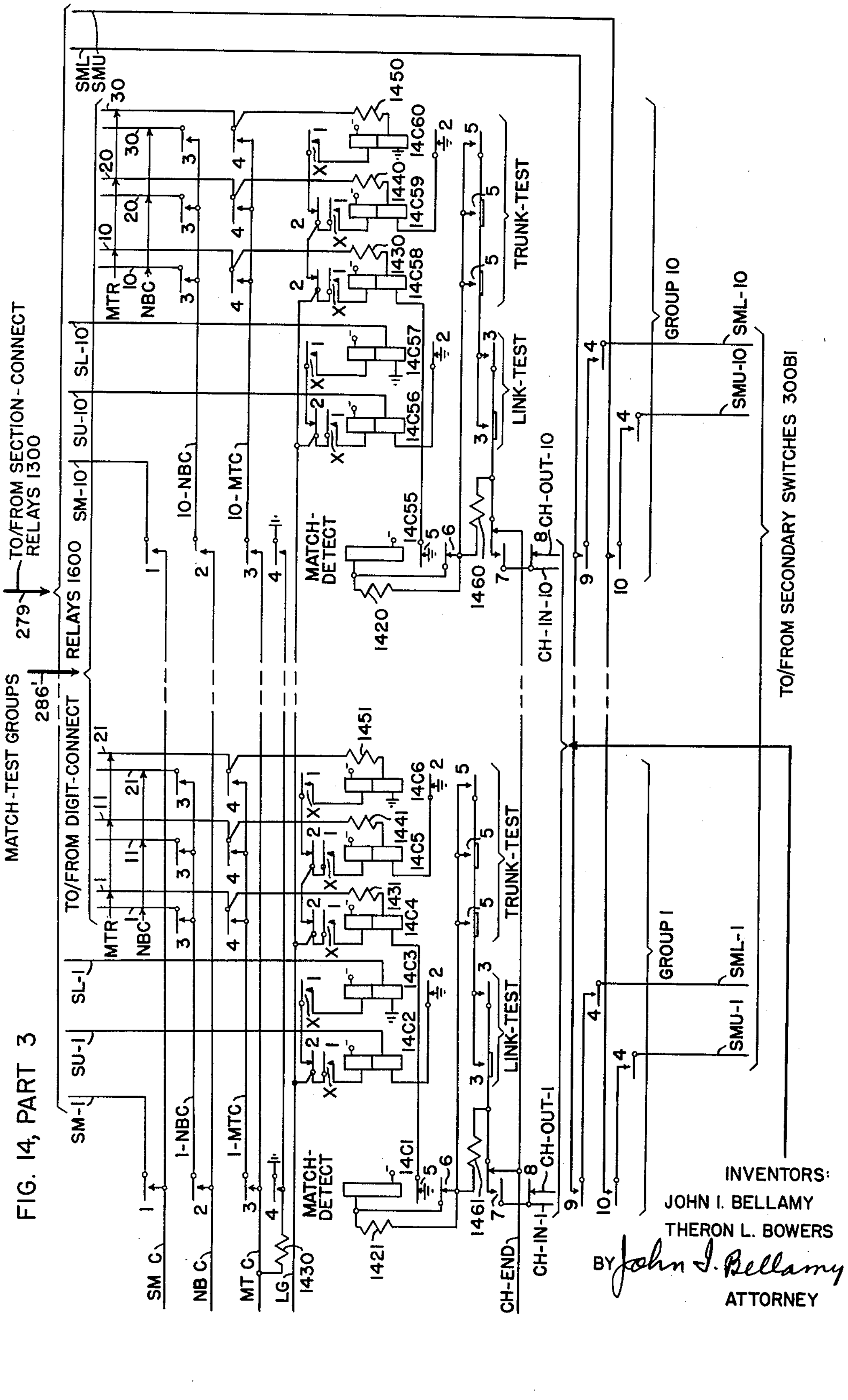
FIG. 14, PART 3
INVENTORS:
JOHN I. BELLAMY
THERON L. BOWERS
BY John I. Bellamy
ATTORNEY Nov. 29, 1955 J. I. BELLAMY ET AL 2,725,428
MULTI-GROUP PRIMARY-SECONDARY-SPREAD
CROSSBAR TELEPHONE SYSTEM
Filed Jan. 6, 1953 59 Sheets-Sheet 22
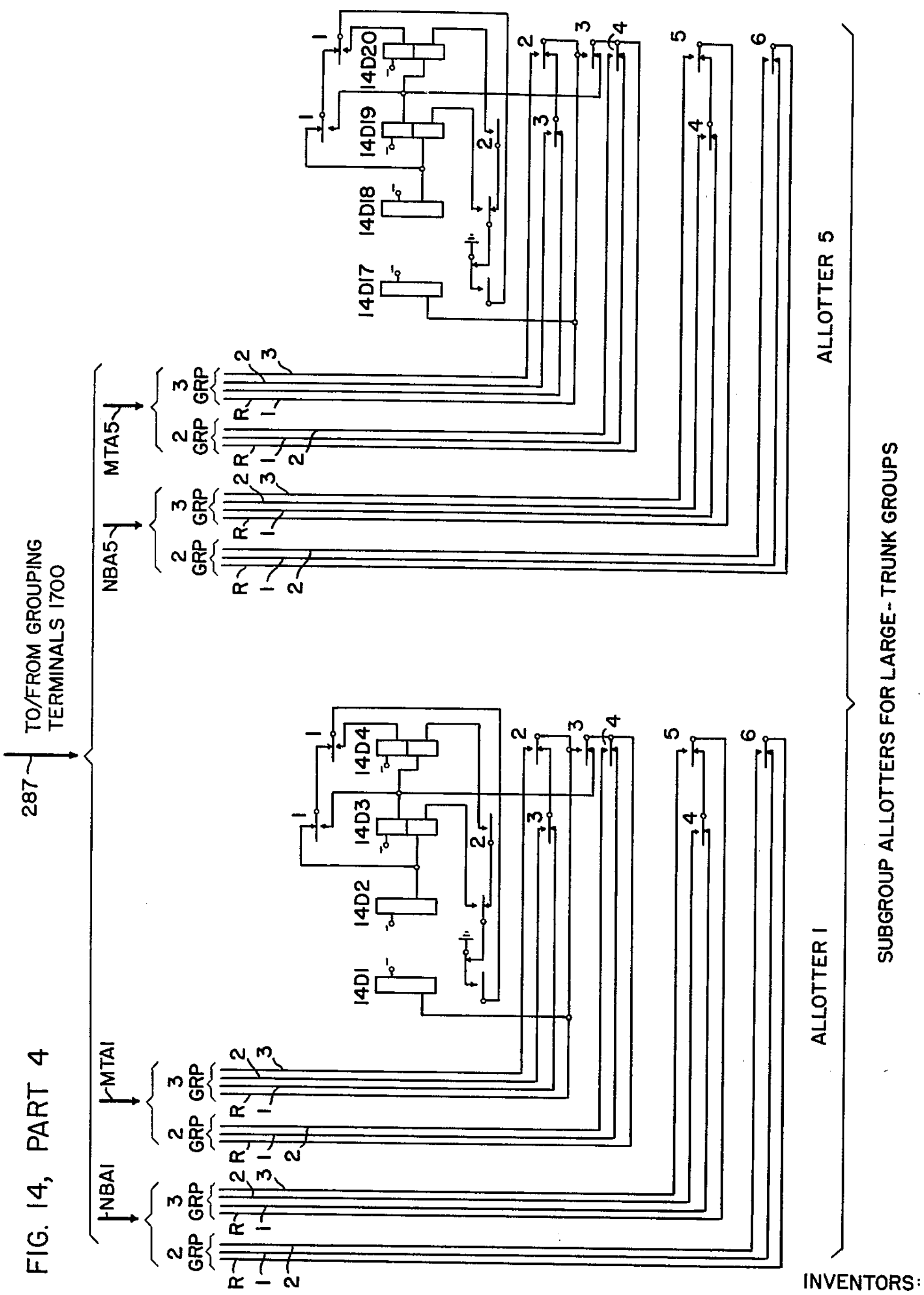
FIG. 14, PART 4
INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY INVENTORS:
JOHN I. BELLAMY
THERON L. BOWERS
BY John I. Bellamy
ATTORNEY

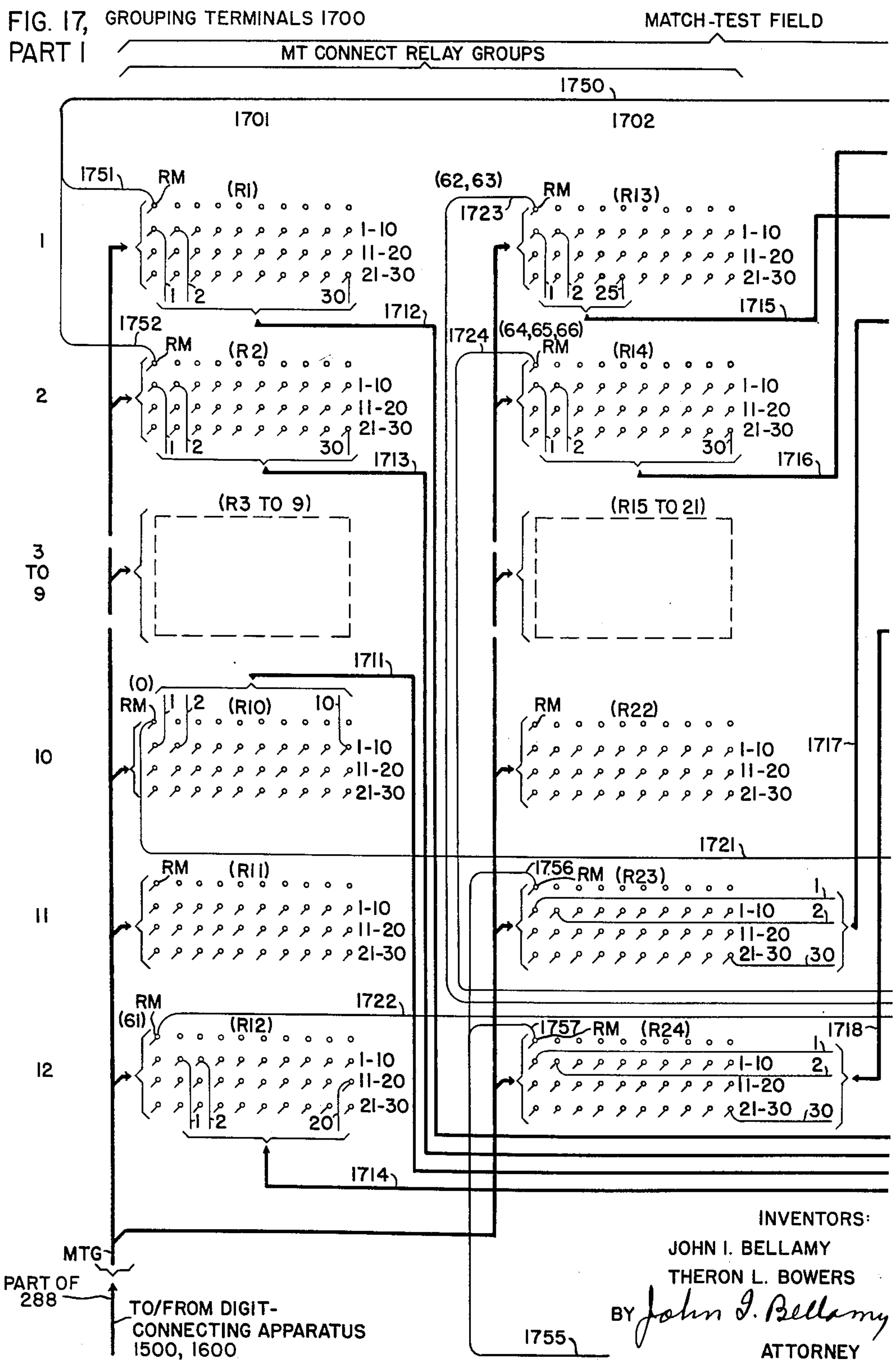
FIG. 17, PART I
INVENTORS:
JOHN I. BELLAMY
THERON L. BOWERS
BY John I. Bellamy
ATTORNEY

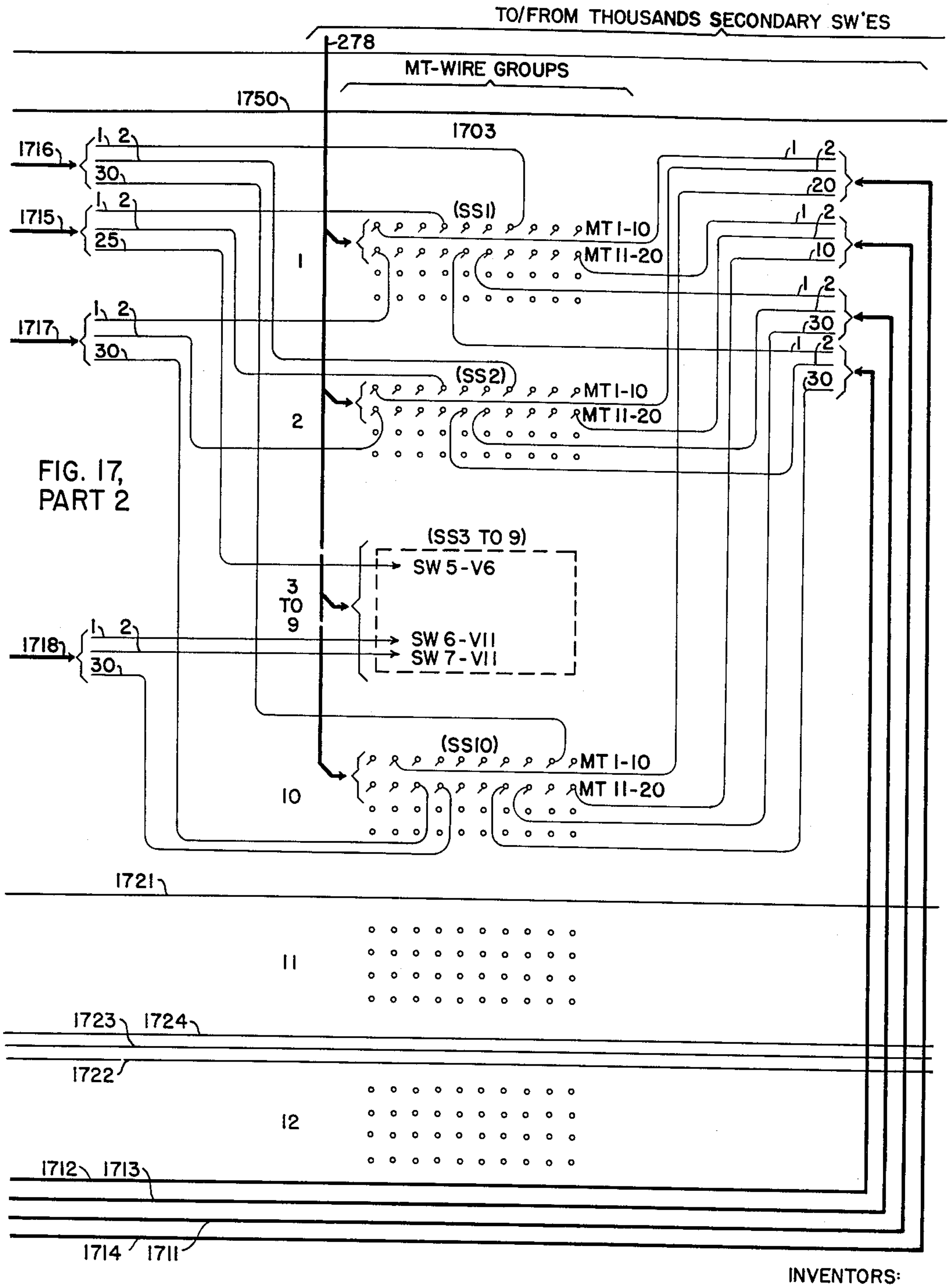
FIG. 17, PART 2
INVENTORS:
JOHN I. BELLAMY
THERON L. BOWERS
BY John I. Bellamy
ATTORNEY
1755

FIG. 17, PART 3
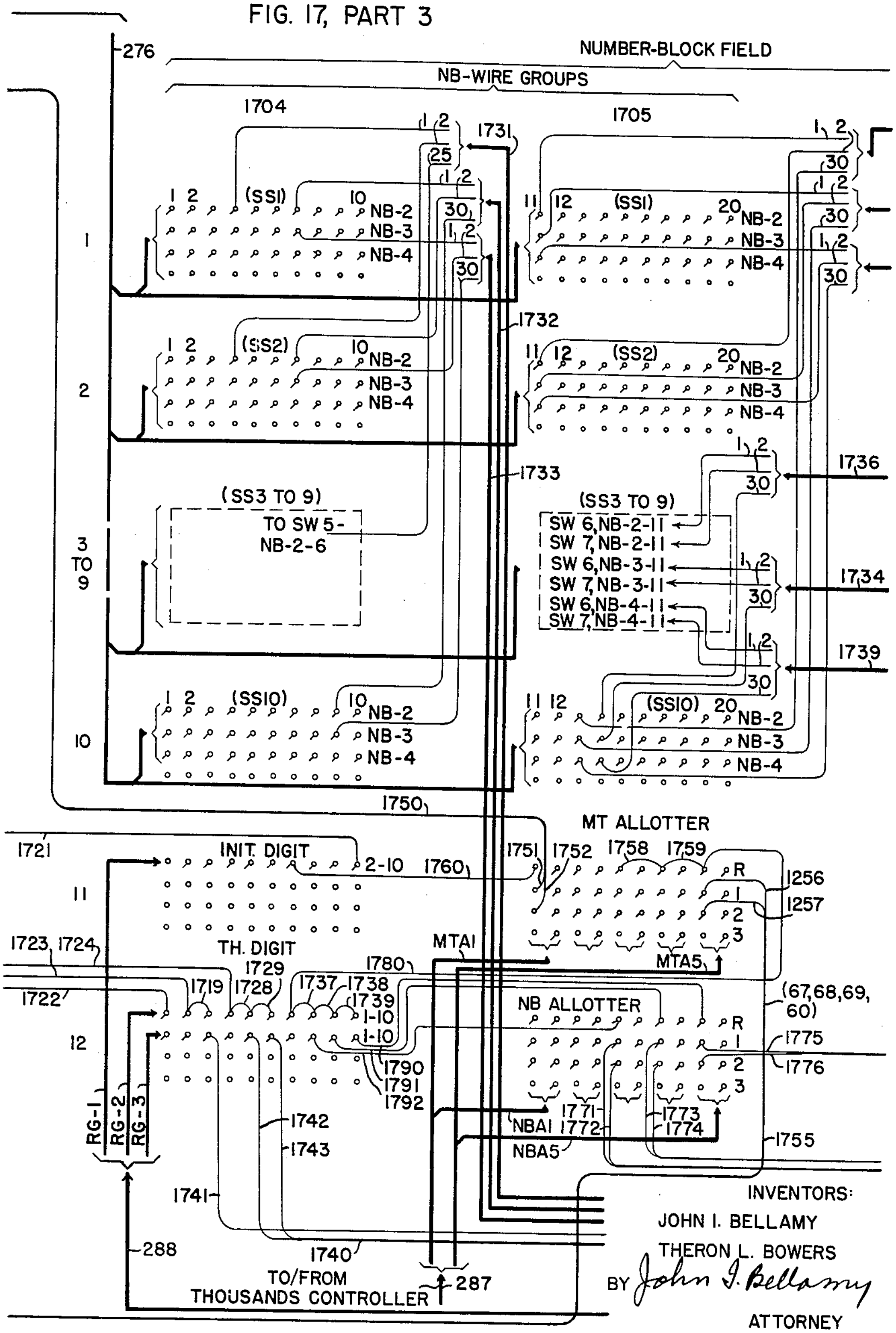
INVENTORS:
JOHN I. BELLAMY
THERON L. BOWERS
BY John I. Bellamy
ATTORNEY FIG. 17, PART 4
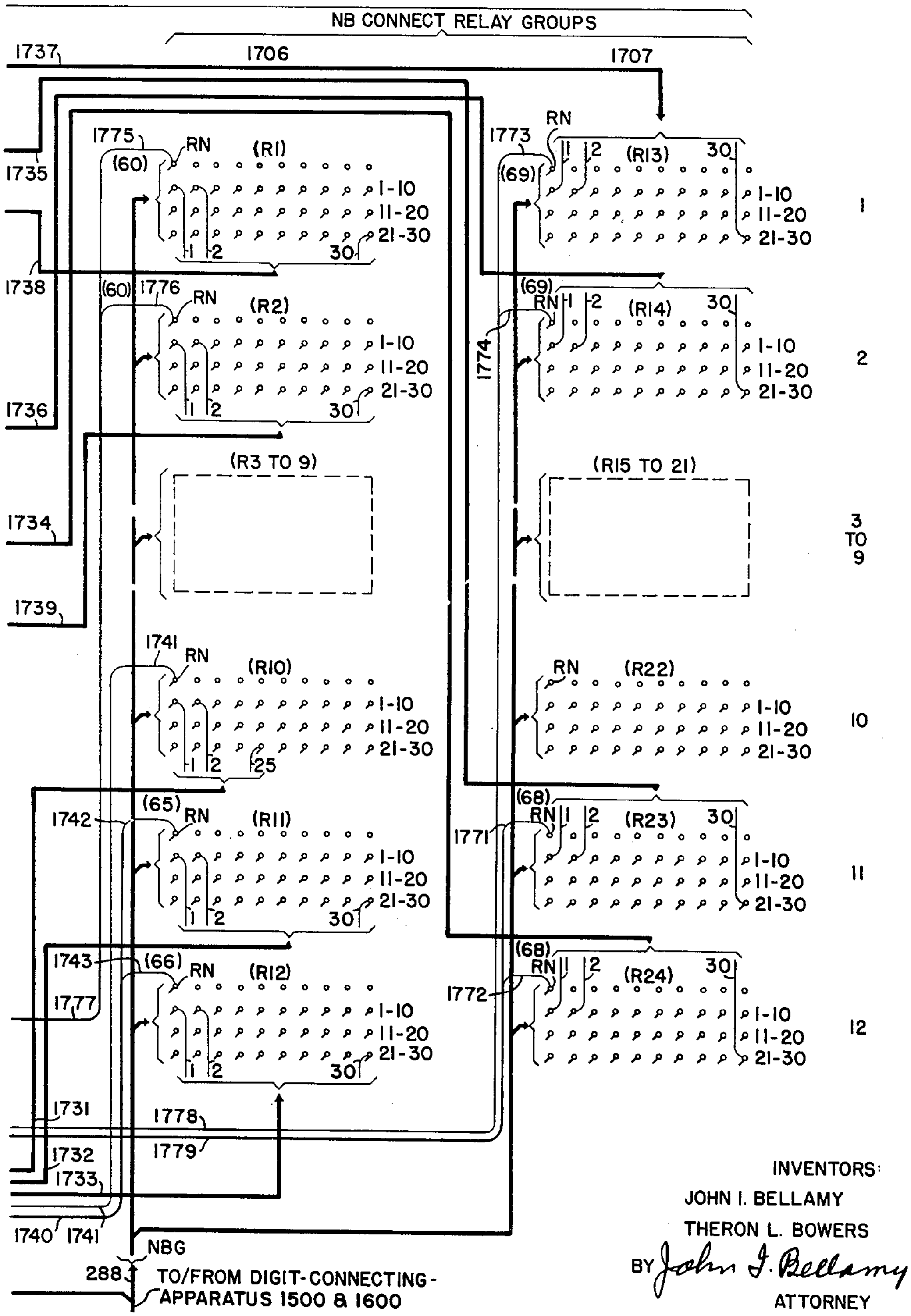
INVENTORS:
JOHN I. BELLAMY
THERON L. BOWERS
BY John I. Bellamy
ATTORNEY

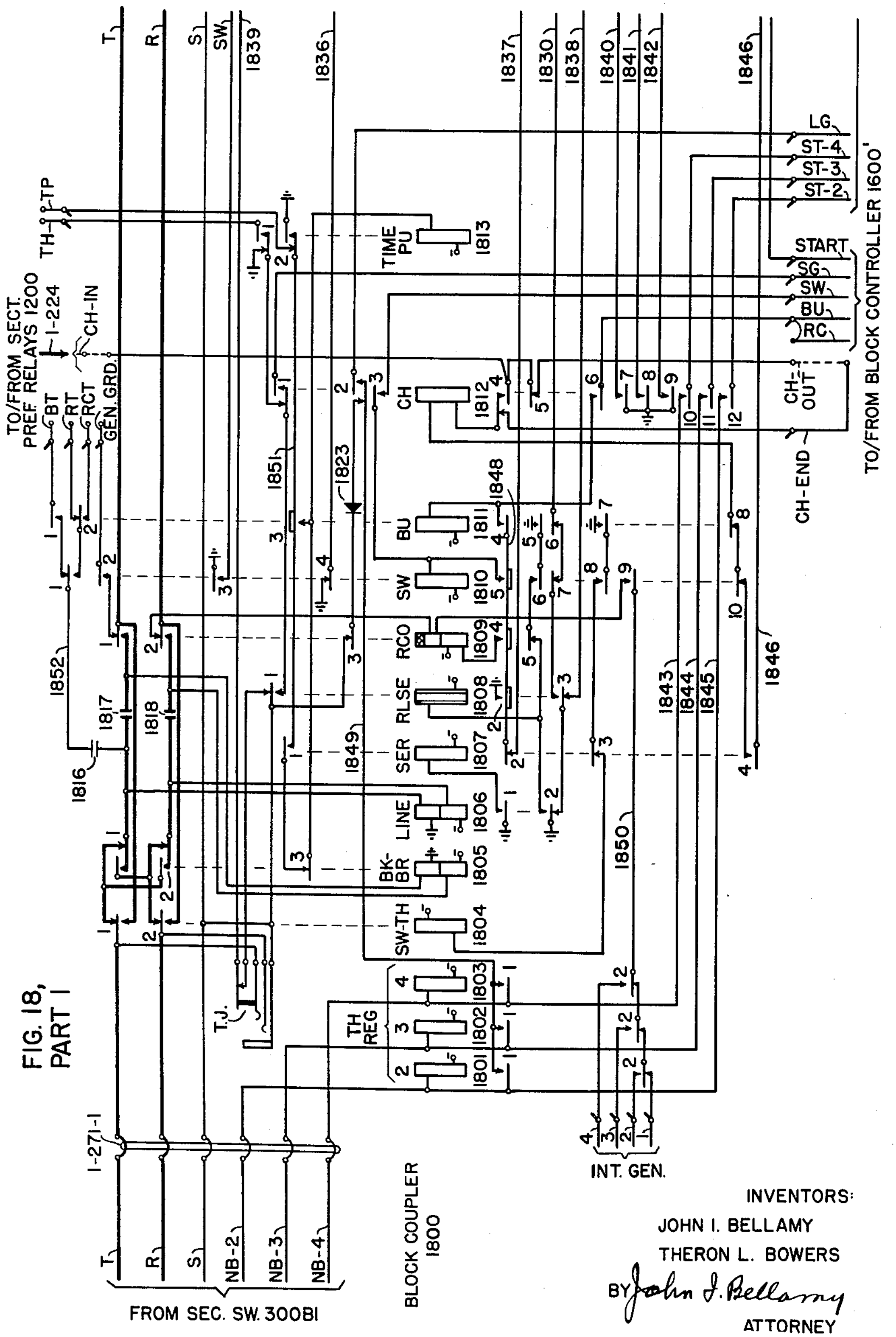
FIG. 18, PART I
INVENTORS:
JOHN I. BELLAMY
THERON L. BOWERS
BY John I. Bellamy
ATTORNEY FIG. 18, PART 2
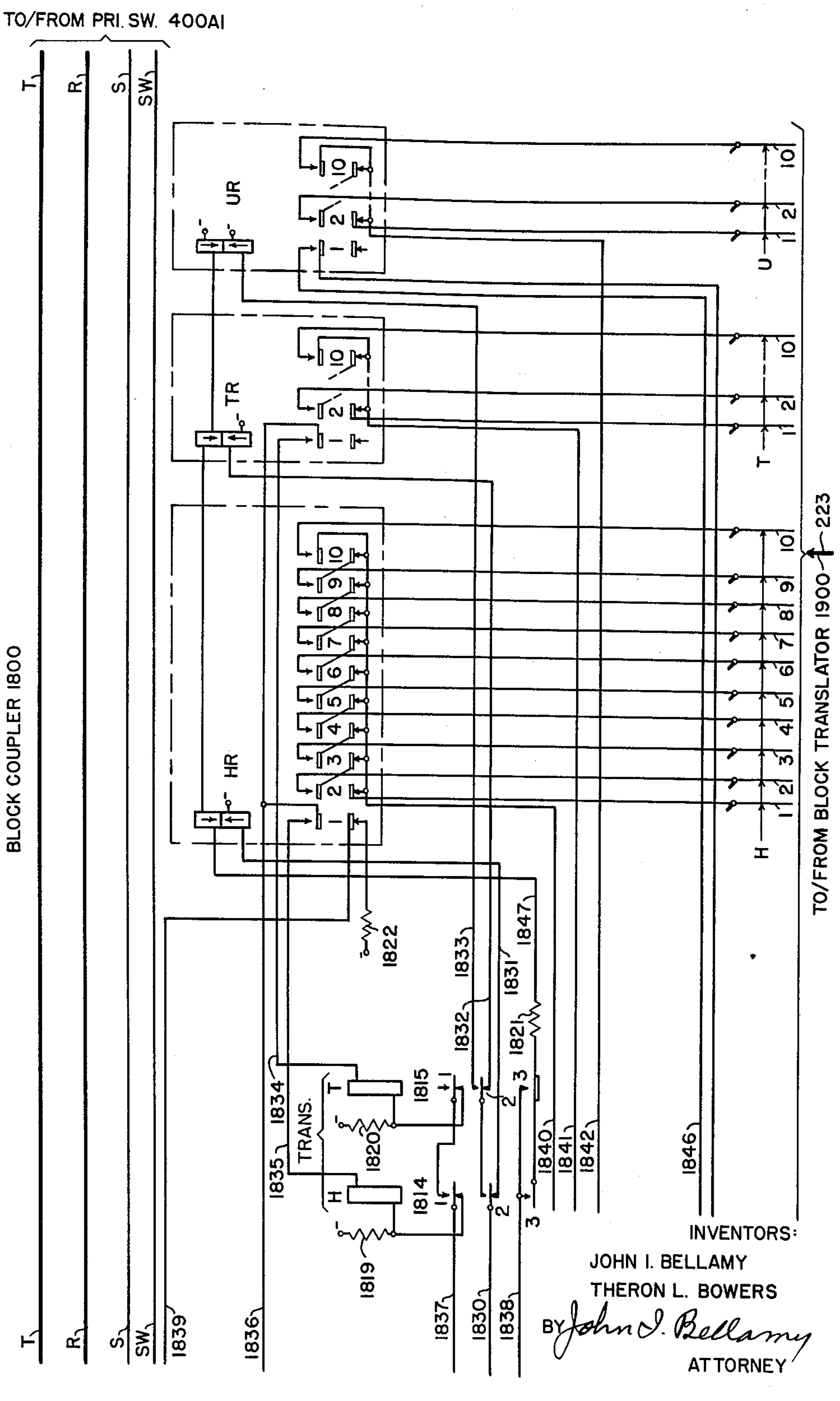
INVENTORS:
JOHN I. BELLAMY
THERON L. BOWERS
BY John I. Bellamy
ATTORNEY

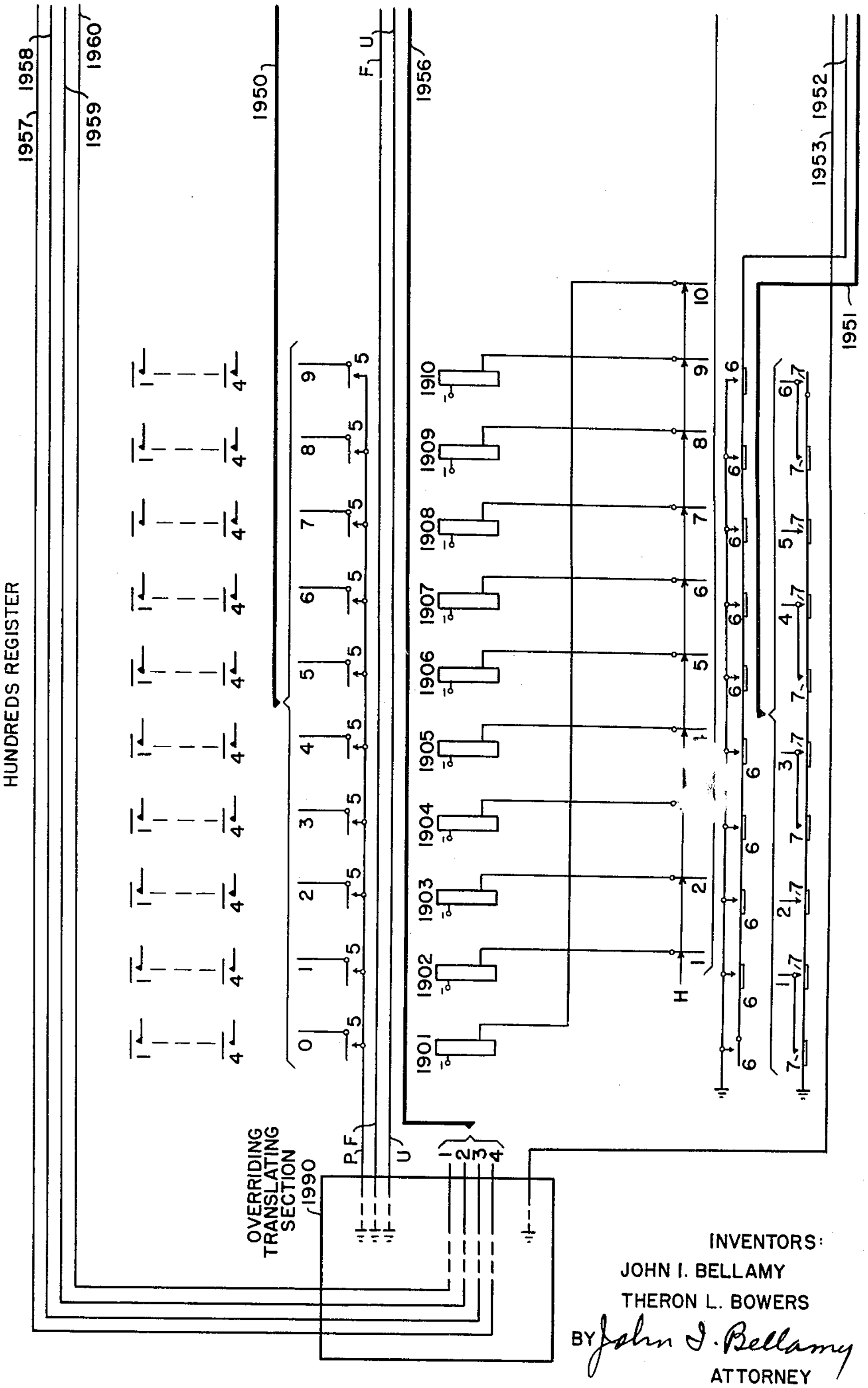
FIG. 19, PART I
INVENTORS:
JOHN I. BELLAMY
THERON L. BOWERS
BY John I. Bellamy
ATTORNEY

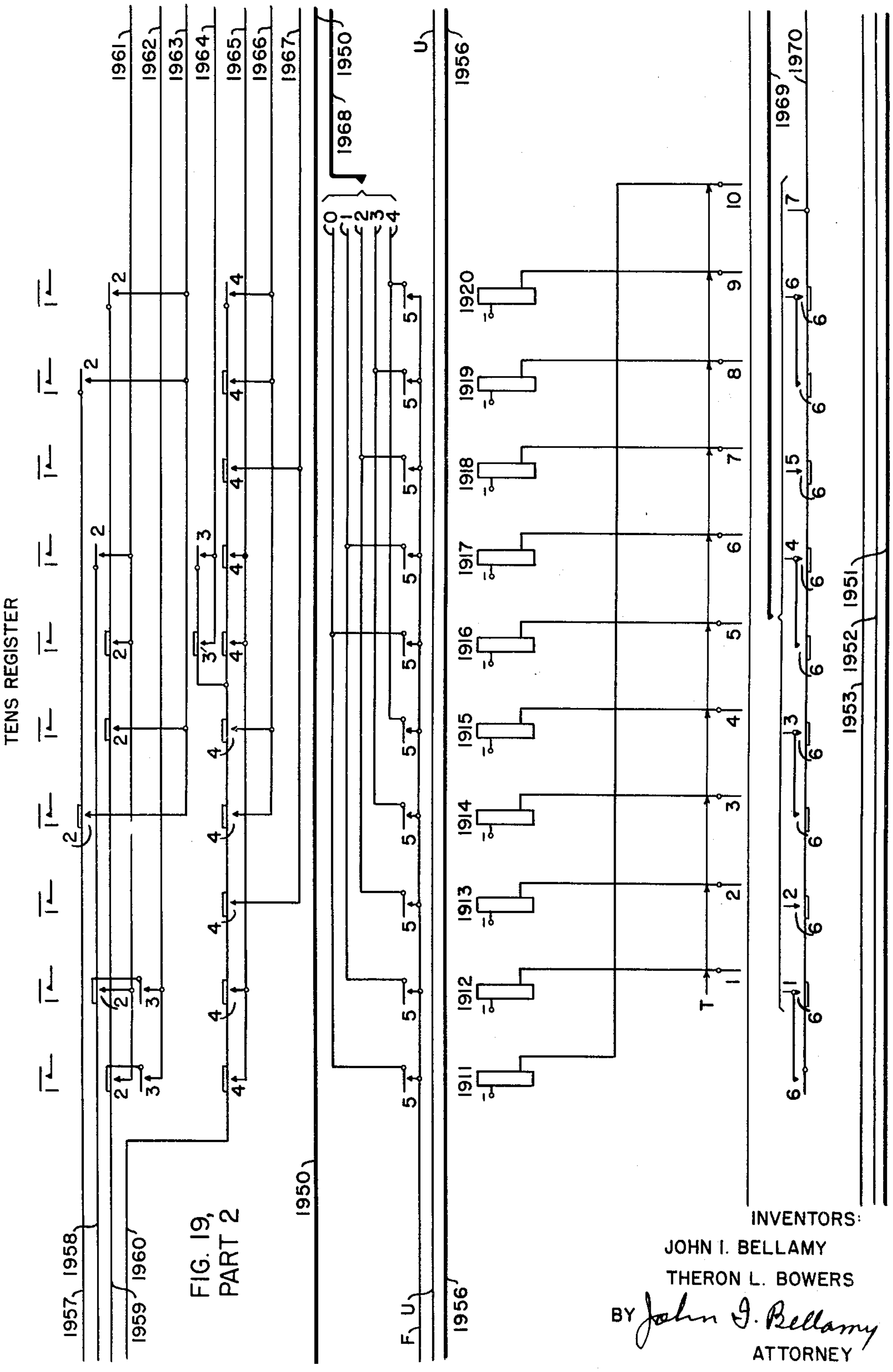
FIG. 19, PART 2
INVENTORS:
JOHN I. BELLAMY
THERON L. BOWERS
BY John I. Bellamy
ATTORNEY

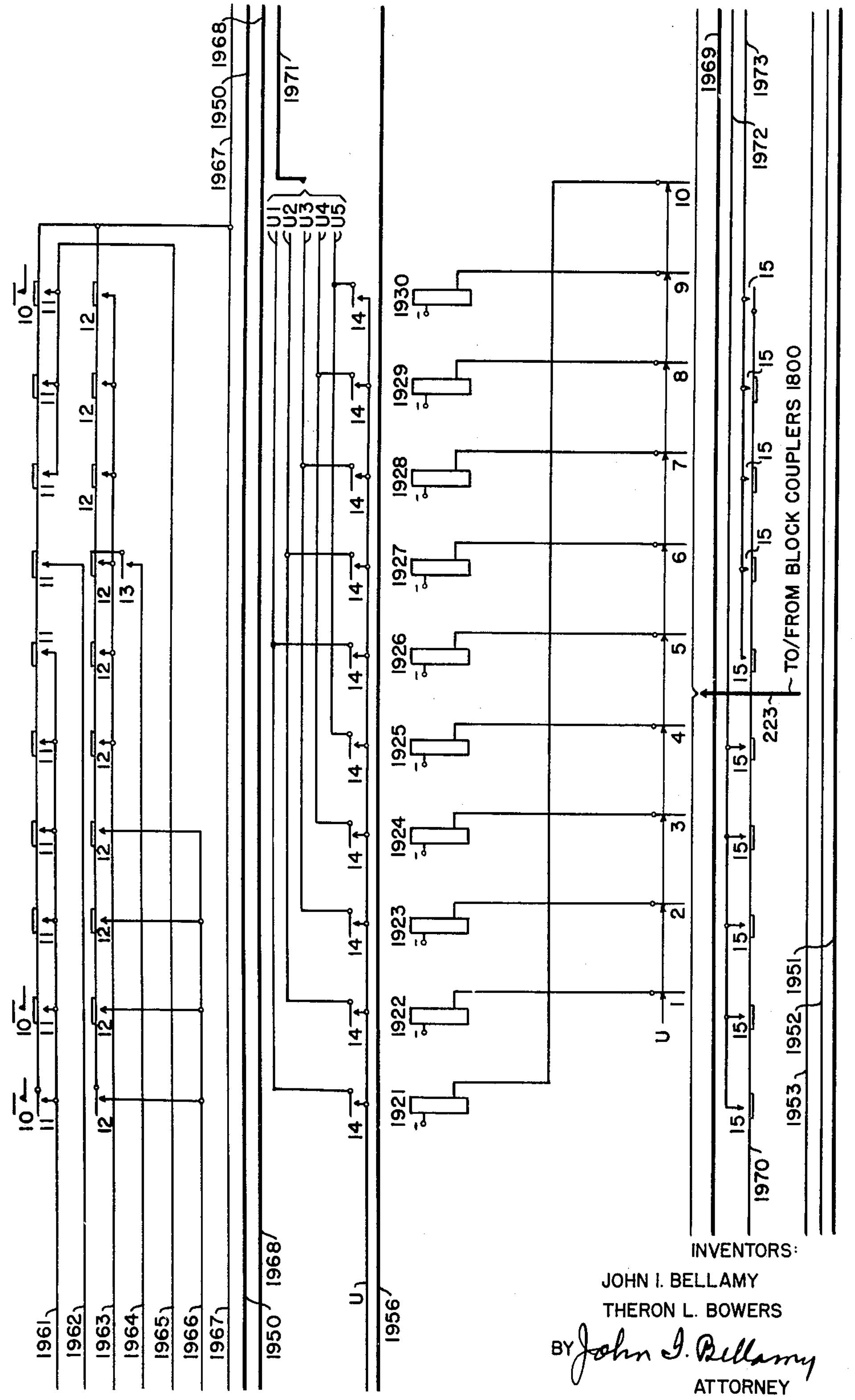
FIG. 19, PART 3
INVENTORS:
JOHN I. BELLAMY
THERON L. BOWERS
BY John I. Bellamy
ATTORNEY Nov. 29, 1955 J. I. BELLAMY ET AL 2,725,428
MULTI-GROUP PRIMARY-SECONDARY-SPREAD CROSSBAR TELEPHONE SYSTEM
Filed Jan. 6, 1953 59 Sheets-Sheet 34
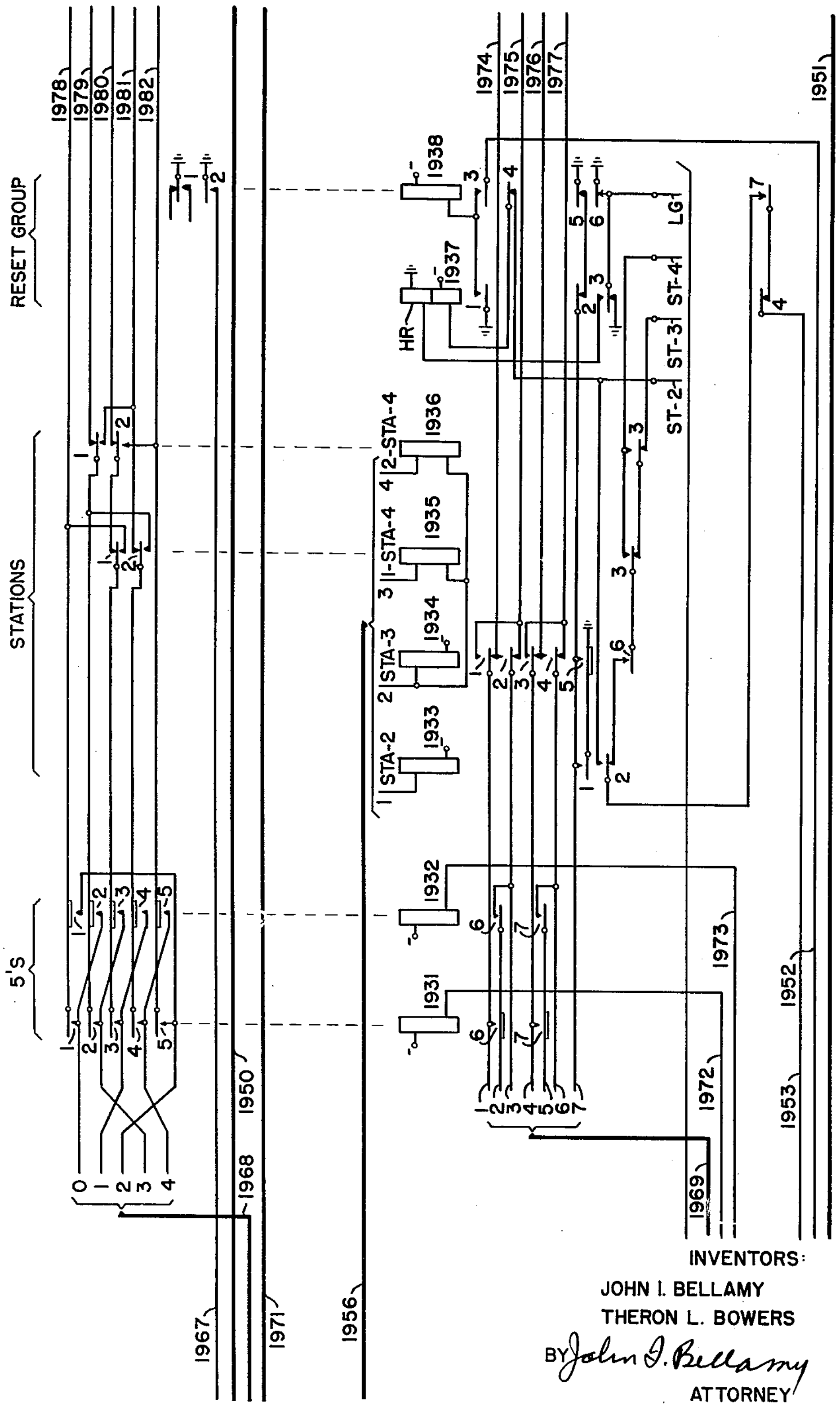
FIG. 19, PART 4
INVENTORS:
JOHN I. BELLAMY
THERON L. BOWERS
BY John I. Bellamy
ATTORNEY

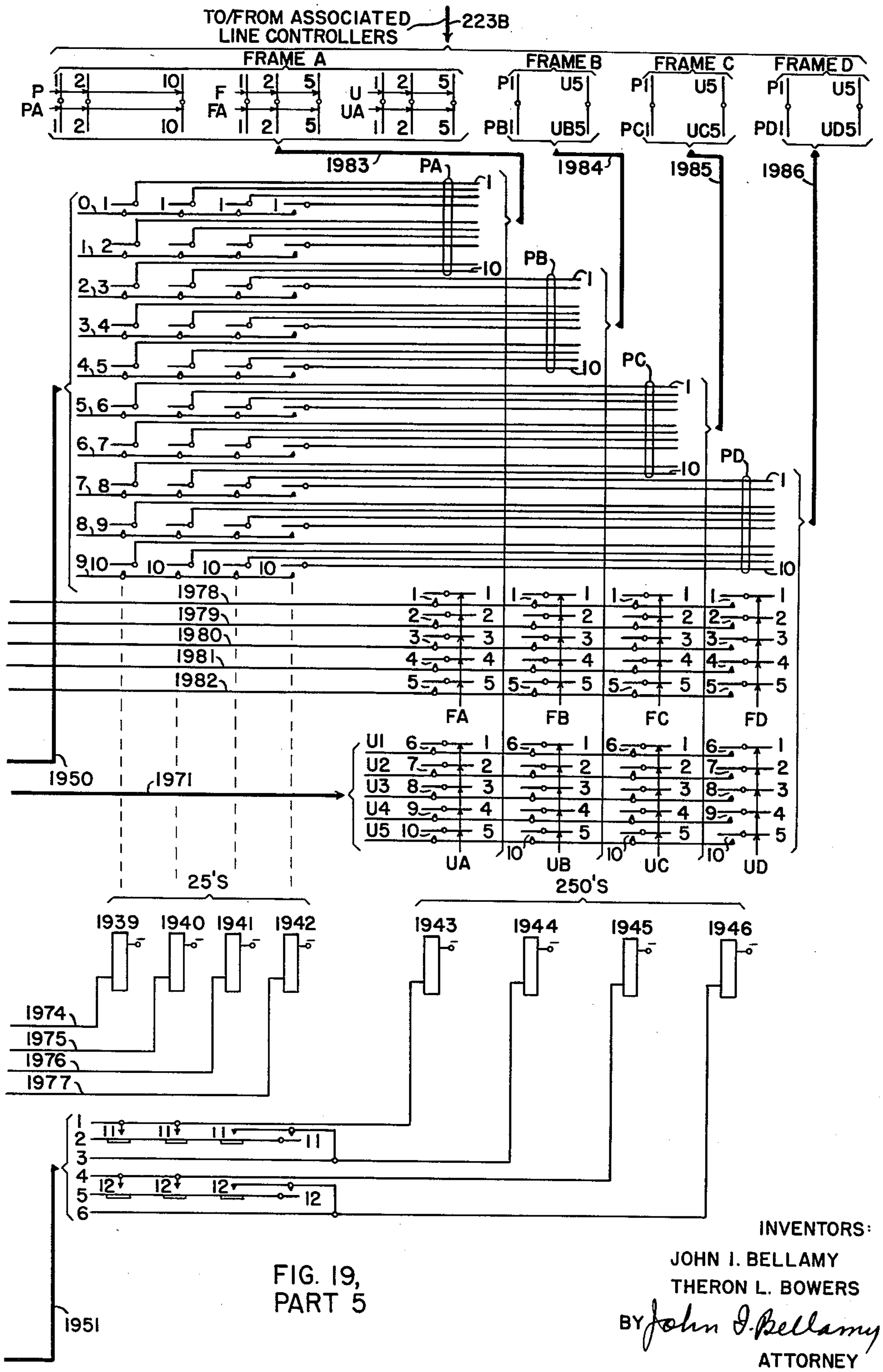
FIG. 19, PART 5
INVENTORS:
JOHN I. BELLAMY
THERON L. BOWERS
BY John I. Bellamy
ATTORNEY

2000-NUMBER TRANSLATION AND STATION-NUMBERING PLAN FOR 1000 LINES

| LINE-LINK FRAME A | STA | TH | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | | | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 1 | | | 111 | 112 | 113 | 114 | 115 | 121 | 122 | 123 | 124 | 125 | 131 | 132 | 133 | 134 | 135 | 141 | 142 | 143 | 144 | 145 | 151 | 152 | 153 | 154 | 155 |
| | 1 | 1 | 000 | 001 | 002 | 003 | 004 | 005 | 006 | 007 | 008 | 009 | 010 | 011 | 012 | 013 | 014 | 015 | 016 | 017 | 018 | 019 | 020 | 021 | 022 | 023 | 024 |
| | 2 | 2 | | | | | | | | 007 | 008 | 009 | | | | | | | | 017 | 018 | 019 | 020 | 021 | 022 | 023 | 024 |
| | 3 | 2 | | | | | | | | | | | | | | | | | | | | 044 | 045 | 046 | 047 | 048 | 049 |
| | 4 | 2 | | | | | | | | | | | | | | | | | | | | 034 | 035 | 036 | 037 | 038 | 039 |
| 2 | | | 211 | 212 | 213 | 214 | 215 | 221 | 222 | 223 | 224 | 225 | 231 | 232 | 233 | 234 | 235 | 241 | 242 | 243 | 244 | 245 | 251 | 252 | 253 | 254 | 255 |
| | 1 | 1 | 025 | 026 | 027 | 028 | 029 | 030 | 031 | 032 | 033 | 034 | 035 | 036 | 037 | 038 | 039 | 040 | 041 | 042 | 043 | 044 | 045 | 046 | 047 | 048 | 049 |
| | 2 | 2 | 025 | 026 | 027 | 028 | 029 | 030 | 031 | 032 | 033 | | | | | | | 040 | 041 | 042 | 043 | | | | | | |
| | 3 | 2 | 000 | 001 | 002 | 003 | 004 | 005 | 006 | | | | | | | | | | | | | | | | | | |
| | 4 | 2 | 010 | 011 | 012 | 013 | 014 | 015 | 016 | | | | | | | | | | | | | | | | | | |
| 3 | | | 311 | 312 | 313 | 314 | 315 | 321 | 322 | 323 | 324 | 325 | 331 | 332 | 333 | 334 | 335 | 341 | 342 | 343 | 344 | 345 | 351 | 352 | 353 | 354 | 355 |
| | 1 | 1 | 050 | 051 | 052 | 053 | 054 | 055 | 056 | 057 | 058 | 059 | 060 | 061 | 062 | 063 | 064 | 065 | 066 | 067 | 068 | 069 | 070 | 071 | 072 | 073 | 074 |
| | 2 | 2 | | | | | | | 056 | 057 | 058 | 059 | | | | | | | 066 | 067 | 068 | 069 | 070 | 071 | 072 | 073 | 074 |
| | 3 | 2 | | | | | | | | | | | | | | | | | | | | 094 | 095 | 096 | 097 | 098 | 099 |
| | 4 | 2 | | | | | | | | | | | | | | | | | | | | 084 | 085 | 086 | 087 | 088 | 089 |
| 4 | | | 411 | 412 | 413 | 414 | 415 | 421 | 422 | 423 | 424 | 425 | 431 | 432 | 433 | 434 | 435 | 441 | 442 | 443 | 444 | 445 | 451 | 452 | 453 | 454 | 455 |
| | 1 | 1 | 075 | 076 | 077 | 078 | 079 | 080 | 081 | 082 | 083 | 084 | 085 | 086 | 087 | 088 | 089 | 090 | 091 | 092 | 093 | 094 | 095 | 096 | 097 | 098 | 099 |
| | 2 | 2 | 075 | 076 | 077 | 078 | 079 | 080 | 081 | 082 | 083 | | | | | | | 090 | 091 | 092 | 093 | | | | | | |
| | 3 | 2 | 050 | 051 | 052 | 053 | 054 | 055 | | | | | | | | | | | | | | | | | | | |
| | 4 | 2 | 060 | 061 | 062 | 063 | 064 | 065 | | | | | | | | | | | | | | | | | | | |
| 5 | | | 511 | 512 | 513 | 514 | 515 | 521 | 522 | 523 | 524 | 525 | 531 | 532 | 533 | 534 | 535 | 541 | 542 | 543 | 544 | 545 | 551 | 552 | 553 | 554 | 555 |
| | 1 | 1 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 |
| | 2 | 2 | | | | | | | | 107 | 108 | 109 | | | | | | | | 117 | 118 | 119 | 120 | 121 | 122 | 123 | 124 |
| | 3 | 2 | | | | | | | | | | | | | | | | | | | | 144 | 145 | 146 | 147 | 148 | 149 |
| | 4 | 2 | | | | | | | | | | | | | | | | | | | | 134 | 135 | 136 | 137 | 138 | 139 |

FIG. 20, PART I

INVENTORS:
JOHN I. BELLAMY
THERON L. BOWERS
BY John I. Bellamy
ATTORNEY

| | STA | TH | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | | | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 | 149 |
| | 2 | 2 | 125 | 126 | 127 | 128 | 129 | 130 | 131 | 132 | 133 | | | | | | | 140 | 141 | 142 | 143 | | | | | | |
| | 3 | 2 | 100 | 101 | 102 | 103 | 104 | 105 | 106 | | | | | | | | | | | | | | | | | | |
| | 4 | 2 | 110 | 111 | 112 | 113 | 114 | 115 | 116 | | | | | | | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 150 | 151 | 152 | 153 | 154 | 155 | 156 | 157 | 158 | 159 | 160 | 161 | 162 | 163 | 164 | 165 | 166 | 167 | 168 | 169 | 170 | 171 | 172 | 173 | 174 |
| | 2 | 2 | | | | | | | 156 | 157 | 158 | 159 | | | | | | | 166 | 167 | 168 | 169 | 170 | 171 | 172 | 173 | 174 |
| | 3 | 2 | | | | | | | | | | | | | | | | | | | | 194 | 195 | 196 | 197 | 198 | 199 |
| | 4 | 2 | | | | | | | | | | | | | | | | | | | | 184 | 185 | 186 | 187 | 188 | 189 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 175 | 176 | 177 | 178 | 179 | 180 | 181 | 182 | 183 | 184 | 185 | 186 | 187 | 188 | 189 | 190 | 191 | 192 | 193 | 194 | 195 | 196 | 197 | 198 | 199 |
| | 2 | 2 | 175 | 176 | 177 | 178 | 179 | 180 | 181 | 182 | 183 | | | | | | | 190 | 191 | 192 | 193 | | | | | | |
| | 3 | 2 | 150 | 151 | 152 | 153 | 154 | 155 | | | | | | | | | | | | | | | | | | | |
| | 4 | 2 | 160 | 161 | 162 | 163 | 164 | 165 | | | | | | | | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 200 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 | 224 |
| | 2 | 2 | | | | | | | | 207 | 208 | 209 | | | | | | | | 217 | 218 | 219 | 220 | 221 | 222 | 223 | 224 |
| | 3 | 2 | | | | | | | | | | | | | | | | | | | | 244 | 245 | 246 | 247 | 248 | 249 |
| | 4 | 2 | | | | | | | | | | | | | | | | | | | | 234 | 235 | 236 | 237 | 238 | 239 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 051 | 052 | 053 | 054 | 055 |
| | 1 | 1 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 | 249 |
| | 2 | 2 | 225 | 226 | 227 | 228 | 229 | 230 | 231 | 232 | 233 | | | | | | | 240 | 241 | 242 | 243 | | | | | | |
| | 3 | 2 | 200 | 201 | 202 | 203 | 204 | 205 | 206 | | | | | | | | | | | | | | | | | | |
| | 4 | 2 | 210 | 211 | 212 | 213 | 214 | 215 | 216 | | | | | | | | | | | | | | | | | | |

FIG. 20, PART 2

INVENTORS:
JOHN I. BELLAMY
THERON L. BOWERS
BY John I. Bellamy
ATTORNEY

| LINE-LINK FRAME B | STA | TH | 1ST FIVE V1 | V2 | V3 | V4 | V5 | 2ND FIVE V6 | V7 | V8 | V9 | V10 | 3RD FIVE V11 | V12 | V13 | V14 | V15 | 4TH FIVE V16 | V17 | V18 | V19 | V20 | 5TH FIVE V21 | V22 | V23 | V24 | V25 |
|---|---|---|---|---|---|---|---|---|---|---|---|---|---|---|---|---|---|---|---|---|---|---|---|---|---|---|---|
| 1 | | | 111 | 112 | 113 | 114 | 115 | 121 | 122 | 123 | 124 | 125 | 131 | 132 | 133 | 134 | 135 | 141 | 142 | 143 | 144 | 145 | 151 | 152 | 153 | 154 | 155 |
| | 1 | 1 | 250 | 251 | 252 | 253 | 254 | 255 | 256 | 257 | 258 | 259 | 260 | 261 | 262 | 263 | 264 | 265 | 266 | 267 | 268 | 269 | 270 | 271 | 272 | 273 | 274 |
| | 2 | 2 | | | | | | | 256 | 257 | 258 | 259 | | | | | | | 266 | 267 | 268 | 269 | 270 | 271 | 272 | 273 | 274 |
| | 3 | 2 | | | | | | | | | | | | | | | | | | | | 294 | 295 | 296 | 297 | 298 | 299 |
| | 4 | 2 | | | | | | | | | | | | | | | | | | | | 284 | 285 | 286 | 287 | 288 | 289 |
| 2 | | | 211 | 212 | 213 | 214 | 215 | 221 | 222 | 223 | 224 | 225 | 231 | 232 | 233 | 234 | 235 | 241 | 242 | 243 | 244 | 245 | 251 | 252 | 253 | 254 | 255 |
| | 1 | 1 | 275 | 276 | 277 | 278 | 279 | 280 | 281 | 282 | 283 | 284 | 285 | 286 | 287 | 288 | 289 | 290 | 291 | 292 | 293 | 294 | 295 | 296 | 297 | 298 | 299 |
| | 2 | 2 | 275 | 276 | 277 | 278 | 279 | 280 | 281 | 282 | 283 | | | | | | | 290 | 291 | 292 | 293 | | | | | | |
| | 3 | 2 | 250 | 251 | 252 | 253 | 254 | 255 | | | | | | | | | | | | | | | | | | | |
| | 4 | 2 | 260 | 261 | 262 | 263 | 264 | 265 | | | | | | | | | | | | | | | | | | | |
| 3 | | | 311 | 312 | 313 | 314 | 315 | 321 | 322 | 323 | 324 | 325 | 331 | 332 | 333 | 334 | 335 | 341 | 342 | 343 | 344 | 345 | 351 | 352 | 353 | 354 | 355 |
| | 1 | 1 | 300 | 301 | 302 | 303 | 304 | 305 | 306 | 307 | 308 | 309 | 310 | 311 | 312 | 313 | 314 | 315 | 316 | 317 | 318 | 319 | 320 | 321 | 322 | 323 | 324 |
| | 2 | 2 | | | | | | | | 307 | 308 | 309 | | | | | | | | 317 | 318 | 319 | 320 | 321 | 322 | 223 | 324 |
| | 3 | 2 | | | | | | | | | | | | | | | | | | | | 344 | 345 | 346 | 347 | 348 | 349 |
| | 4 | 2 | | | | | | | | | | | | | | | | | | | | 334 | 335 | 336 | 337 | 338 | 339 |
| 4 | | | 411 | 412 | 413 | 414 | 415 | 421 | 422 | 423 | 424 | 425 | 431 | 432 | 433 | 434 | 435 | 441 | 442 | 443 | 444 | 445 | 451 | 452 | 453 | 454 | 455 |
| | 1 | 1 | 325 | 326 | 327 | 328 | 329 | 330 | 331 | 332 | 333 | 334 | 335 | 336 | 337 | 338 | 339 | 340 | 341 | 342 | 343 | 344 | 345 | 346 | 347 | 348 | 349 |
| | 2 | 2 | 325 | 326 | 327 | 328 | 329 | 330 | 331 | 332 | 333 | | | | | | | 340 | 341 | 342 | 343 | | | | | | |
| | 3 | 2 | 300 | 301 | 302 | 303 | 304 | 305 | 306 | | | | | | | | | | | | | | | | | | |
| | 4 | 2 | 310 | 311 | 312 | 313 | 314 | 315 | 316 | | | | | | | | | | | | | | | | | | |
| 5 | | | 511 | 512 | 513 | 514 | 515 | 521 | 522 | 523 | 524 | 525 | 531 | 532 | 533 | 534 | 535 | 541 | 542 | 543 | 544 | 545 | 551 | 552 | 553 | 554 | 555 |
| | 1 | 1 | 350 | 351 | 352 | 353 | 354 | 355 | 356 | 357 | 358 | 359 | 360 | 361 | 362 | 363 | 364 | 365 | 366 | 367 | 368 | 369 | 370 | 371 | 372 | 373 | 374 |
| | 2 | 2 | | | | | | | 356 | 357 | 358 | 359 | | | | | | | 366 | 367 | 368 | 369 | 370 | 371 | 372 | 373 | 374 |
| | 3 | 2 | | | | | | | | | | | | | | | | | | | | 394 | 395 | 396 | 397 | 398 | 399 |
| | 4 | 2 | | | | | | | | | | | | | | | | | | | | 384 | 385 | 386 | 387 | 388 | 389 |

FIG. 20, PART 3

INVENTORS:
JOHN I. BELLAMY
THERON L. BOWERS
BY John I. Bellamy
ATTORNEY

| | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 375 | 376 | 377 | 378 | 379 | 380 | 381 | 382 | 383 | 384 | 385 | 386 | 387 | 388 | 389 | 390 | 391 | 392 | 393 | 394 | 395 | 396 | 397 | 398 | 399 |
| | 2 | 2 | 375 | 376 | 377 | 378 | 379 | 380 | 381 | 382 | 383 | | | | | | | 390 | 391 | 392 | 393 | | | | | | |
| | 3 | 2 | 350 | 351 | 352 | 353 | 354 | 355 | | | | | | | | | | | | | | | | | | | |
| | 4 | 2 | 360 | 361 | 362 | 363 | 364 | 365 | | | | | | | | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 400 | 401 | 402 | 403 | 404 | 405 | 406 | 407 | 408 | 409 | 410 | 411 | 412 | 413 | 414 | 415 | 416 | 417 | 418 | 419 | 420 | 421 | 422 | 423 | 424 |
| | 2 | 2 | | | | | | | | 407 | 408 | 409 | | | | | | | | 417 | 418 | 419 | 420 | 421 | 422 | 423 | 424 |
| | 3 | 2 | | | | | | | | | | | | | | | | | | | | 444 | 445 | 446 | 447 | 448 | 449 |
| | 4 | 2 | | | | | | | | | | | | | | | | | | | | 434 | 435 | 436 | 437 | 438 | 439 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 425 | 426 | 427 | 428 | 429 | 430 | 431 | 432 | 433 | 434 | 435 | 436 | 437 | 438 | 439 | 440 | 441 | 442 | 443 | 444 | 445 | 446 | 447 | 448 | 449 |
| | 2 | 2 | 425 | 426 | 427 | 428 | 429 | 430 | 431 | 432 | 433 | | | | | | | 440 | 441 | 442 | 443 | | | | | | |
| | 3 | 2 | 400 | 401 | 402 | 403 | 404 | 405 | 406 | | | | | | | | | | | | | | | | | | |
| | 4 | 2 | 410 | 411 | 412 | 413 | 414 | 415 | 416 | | | | | | | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 450 | 451 | 452 | 453 | 454 | 455 | 456 | 457 | 458 | 459 | 460 | 461 | 462 | 463 | 464 | 465 | 466 | 467 | 468 | 469 | 470 | 471 | 472 | 473 | 474 |
| | 2 | 2 | | | | | | | 456 | 457 | 458 | 459 | | | | | | | 466 | 467 | 468 | 469 | 470 | 471 | 472 | 473 | 474 |
| | 3 | 2 | | | | | | | | | | | | | | | | | | | | 494 | 495 | 496 | 497 | 498 | 499 |
| | 4 | 2 | | | | | | | | | | | | | | | | | | | | 484 | 485 | 486 | 487 | 488 | 489 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 051 | 052 | 053 | 054 | 055 |
| | 1 | 1 | 475 | 476 | 477 | 478 | 479 | 480 | 481 | 482 | 483 | 484 | 485 | 486 | 487 | 488 | 489 | 490 | 491 | 492 | 493 | 494 | 495 | 496 | 497 | 498 | 499 |
| | 2 | 2 | 475 | 476 | 477 | 478 | 479 | 480 | 481 | 482 | 483 | | | | | | | 490 | 491 | 492 | 493 | | | | | | |
| | 3 | 2 | 450 | 451 | 452 | 453 | 454 | 455 | | | | | | | | | | | | | | | | | | | |
| | 4 | 2 | 460 | 461 | 462 | 463 | 464 | 465 | | | | | | | | | | | | | | | | | | | |

FIG. 20, PART 4

INVENTORS:
JOHN I. BELLAMY
THERON L. BOWERS
BY John I. Bellamy
ATTORNEY

LINE-LINK FRAME C

| Frame | STA | TH | 1ST FIVE V1 | V2 | V3 | V4 | V5 |
|---|---|---|---|---|---|---|---|
| 1 | | | 111 | 112 | 113 | 114 | 115 |
| | 1 | 1 | 500 | 501 | 502 | 503 | 504 |
| | 2 | 2 | | | | | |
| | 3 | 2 | | | | | |
| | 4 | 2 | | | | | |
| 2 | | | 211 | 212 | 213 | 214 | 215 |
| | 1 | 1 | 525 | 526 | 527 | 528 | 529 |
| | 2 | 2 | 525 | 526 | 527 | 528 | 529 |
| | 3 | 2 | 500 | 501 | 502 | 503 | 504 |
| | 4 | 2 | 510 | 511 | 512 | 513 | 514 |
| 3 | | | 311 | 312 | 313 | 314 | 315 |
| | 1 | 1 | 550 | 551 | 552 | 553 | 554 |
| | 2 | 2 | | | | | |
| | 3 | 2 | | | | | |
| | 4 | 2 | | | | | |
| 4 | | | 411 | 412 | 413 | 414 | 415 |
| | 1 | 1 | 575 | 576 | 577 | 578 | 579 |
| | 2 | 2 | 575 | 576 | 577 | 578 | 579 |
| | 3 | 2 | 550 | 551 | 552 | 553 | 554 |
| | 4 | 2 | 560 | 561 | 562 | 563 | 564 |
| 5 | | | 511 | 512 | 513 | 514 | 515 |
| | 1 | 1 | 600 | 601 | 602 | 603 | 604 |
| | 2 | 2 | | | | | |
| | 3 | 2 | | | | | |
| | 4 | 2 | | | | | |

| Frame | STA | TH | 2ND FIVE V6 | V7 | V8 | V9 | V10 |
|---|---|---|---|---|---|---|---|
| 1 | | | 121 | 122 | 123 | 124 | 125 |
| | 1 | 1 | 505 | 506 | 507 | 508 | 509 |
| | 2 | 2 | | | 507 | 508 | 509 |
| | 3 | 2 | | | | | |
| | 4 | 2 | | | | | |
| 2 | | | 221 | 222 | 223 | 224 | 225 |
| | 1 | 1 | 530 | 531 | 532 | 533 | 534 |
| | 2 | 2 | 530 | 531 | 532 | 533 | |
| | 3 | 2 | 505 | 506 | | | |
| | 4 | 2 | 515 | 516 | | | |
| 3 | | | 321 | 322 | 323 | 324 | 325 |
| | 1 | 1 | 555 | 556 | 557 | 558 | 559 |
| | 2 | 2 | | 556 | 557 | 558 | 559 |
| | 3 | 2 | | | | | |
| | 4 | 2 | | | | | |
| 4 | | | 421 | 422 | 423 | 424 | 425 |
| | 1 | 1 | 580 | 581 | 582 | 583 | 584 |
| | 2 | 2 | 580 | 581 | 582 | 583 | |
| | 3 | 2 | 555 | | | | |
| | 4 | 2 | 565 | | | | |
| 5 | | | 521 | 522 | 523 | 524 | 525 |
| | 1 | 1 | 605 | 606 | 607 | 608 | 609 |
| | 2 | 2 | | | 607 | 608 | 609 |
| | 3 | 2 | | | | | |
| | 4 | 2 | | | | | |

| Frame | STA | TH | 3RD FIVE V11 | V12 | V13 | V14 | V15 |
|---|---|---|---|---|---|---|---|
| 1 | | | 131 | 132 | 133 | 134 | 135 |
| | 1 | 1 | 510 | 511 | 512 | 513 | 514 |
| | 2 | 2 | | | | | |
| | 3 | 2 | | | | | |
| | 4 | 2 | | | | | |
| 2 | | | 231 | 232 | 233 | 234 | 235 |
| | 1 | 1 | 535 | 536 | 537 | 538 | 539 |
| | 2 | 2 | | | | | |
| | 3 | 2 | | | | | |
| | 4 | 2 | | | | | |
| 3 | | | 331 | 332 | 333 | 334 | 335 |
| | 1 | 1 | 560 | 561 | 562 | 563 | 564 |
| | 2 | 2 | | | | | |
| | 3 | 2 | | | | | |
| | 4 | 2 | | | | | |
| 4 | | | 430 | 431 | 432 | 433 | 434 |
| | 1 | 1 | 585 | 586 | 587 | 588 | 589 |
| | 2 | 2 | | | | | |
| | 3 | 2 | | | | | |
| | 4 | 2 | | | | | |
| 5 | | | 531 | 532 | 533 | 534 | 535 |
| | 1 | 1 | 610 | 611 | 612 | 613 | 614 |
| | 2 | 2 | | | | | |
| | 3 | 2 | | | | | |
| | 4 | 2 | | | | | |

| Frame | STA | TH | 4TH FIVE V16 | V17 | V18 | V19 | V20 |
|---|---|---|---|---|---|---|---|
| 1 | | | 141 | 142 | 143 | 144 | 145 |
| | 1 | 1 | 515 | 516 | 517 | 518 | 519 |
| | 2 | 2 | | | 517 | 518 | 519 |
| | 3 | 2 | | | | | 544 |
| | 4 | 2 | | | | | 534 |
| 2 | | | 241 | 242 | 243 | 244 | 245 |
| | 1 | 1 | 540 | 541 | 542 | 543 | 544 |
| | 2 | 2 | 540 | 541 | 542 | 543 | |
| | 3 | 2 | | | | | |
| | 4 | 2 | | | | | |
| 3 | | | 341 | 342 | 343 | 344 | 345 |
| | 1 | 1 | 565 | 566 | 567 | 568 | 569 |
| | 2 | 2 | | 566 | 567 | 568 | 569 |
| | 3 | 2 | | | | | 594 |
| | 4 | 2 | | | | | 584 |
| 4 | | | 441 | 442 | 443 | 444 | 445 |
| | 1 | 1 | 590 | 591 | 592 | 593 | 594 |
| | 2 | 2 | 590 | 591 | 592 | 593 | |
| | 3 | 2 | | | | | |
| | 4 | 2 | | | | | |
| 5 | | | 541 | 542 | 543 | 544 | 545 |
| | 1 | 1 | 615 | 616 | 617 | 618 | 619 |
| | 2 | 2 | | | 617 | 618 | 619 |
| | 3 | 2 | | | | | 644 |
| | 4 | 2 | | | | | 634 |

| Frame | STA | TH | 5TH FIVE V21 | V22 | V23 | V24 | V25 |
|---|---|---|---|---|---|---|---|
| 1 | | | 151 | 152 | 153 | 154 | 155 |
| | 1 | 1 | 520 | 521 | 522 | 523 | 524 |
| | 2 | 2 | 520 | 521 | 522 | 523 | 524 |
| | 3 | 2 | 545 | 546 | 547 | 548 | 549 |
| | 4 | 2 | 535 | 536 | 537 | 538 | 539 |
| 2 | | | 251 | 252 | 253 | 254 | 255 |
| | 1 | 1 | 545 | 546 | 547 | 548 | 549 |
| | 2 | 2 | | | | | |
| | 3 | 2 | | | | | |
| | 4 | 2 | | | | | |
| 3 | | | 351 | 352 | 353 | 354 | 355 |
| | 1 | 1 | 570 | 571 | 572 | 573 | 574 |
| | 2 | 2 | 570 | 571 | 572 | 573 | 574 |
| | 3 | 2 | 595 | 596 | 597 | 598 | 599 |
| | 4 | 2 | 585 | 586 | 587 | 588 | 589 |
| 4 | | | 451 | 452 | 453 | 454 | 455 |
| | 1 | 1 | 595 | 596 | 597 | 598 | 599 |
| | 2 | 2 | | | | | |
| | 3 | 2 | | | | | |
| | 4 | 2 | | | | | |
| 5 | | | 551 | 552 | 553 | 554 | 555 |
| | 1 | 1 | 620 | 621 | 622 | 623 | 624 |
| | 2 | 2 | 620 | 621 | 622 | 623 | 624 |
| | 3 | 2 | 645 | 646 | 647 | 648 | 649 |
| | 4 | 2 | 635 | 636 | 637 | 638 | 639 |

FIG. 20, PART 5

INVENTORS:
JOHN I. BELLAMY
THERON L. BOWERS
BY John I. Bellamy
ATTORNEY

| | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 625 | 626 | 627 | 628 | 629 | 630 | 631 | 632 | 633 | 634 | 635 | 636 | 637 | 638 | 639 | 640 | 641 | 642 | 643 | 644 | 645 | 646 | 647 | 648 | 649 |
| | 2 | 2 | 625 | 626 | 627 | 628 | 629 | 630 | 631 | 632 | 633 | | | | | | | 640 | 641 | 642 | 643 | | | | | | |
| | 3 | 2 | 600 | 601 | 602 | 603 | 604 | 605 | 606 | | | | | | | | | | | | | | | | | | |
| | 4 | 2 | 610 | 611 | 612 | 613 | 614 | 615 | 616 | | | | | | | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 650 | 651 | 652 | 653 | 654 | 655 | 656 | 657 | 658 | 659 | 660 | 661 | 662 | 663 | 664 | 665 | 666 | 667 | 668 | 669 | 670 | 671 | 672 | 673 | 674 |
| | 2 | 2 | | | | | | | 656 | 657 | 658 | 659 | | | | | | | 666 | 667 | 668 | 669 | 670 | 671 | 672 | 673 | 674 |
| | 3 | 2 | | | | | | | | | | | | | | | | | | | | 694 | 695 | 696 | 697 | 698 | 699 |
| | 4 | 2 | | | | | | | | | | | | | | | | | | | | 684 | 685 | 686 | 687 | 688 | 689 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 675 | 676 | 677 | 678 | 679 | 680 | 681 | 682 | 683 | 684 | 685 | 686 | 687 | 688 | 689 | 690 | 691 | 692 | 693 | 694 | 695 | 696 | 697 | 698 | 699 |
| | 2 | 2 | 675 | 676 | 677 | 678 | 679 | 680 | 681 | 682 | 683 | | | | | | | 690 | 691 | 692 | 693 | | | | | | |
| | 3 | 2 | 650 | 651 | 652 | 653 | 654 | 655 | | | | | | | | | | | | | | | | | | | |
| | 4 | 2 | 660 | 661 | 662 | 663 | 664 | 665 | | | | | | | | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 700 | 701 | 702 | 703 | 704 | 705 | 706 | 707 | 708 | 709 | 710 | 711 | 712 | 713 | 714 | 715 | 716 | 717 | 718 | 719 | 720 | 721 | 722 | 723 | 724 |
| | 2 | 2 | | | | | | | | 707 | 708 | 709 | | | | | | | | 717 | 718 | 719 | 720 | 721 | 722 | 723 | 724 |
| | 3 | 2 | | | | | | | | | | | | | | | | | | | | 744 | 745 | 746 | 747 | 748 | 749 |
| | 4 | 2 | | | | | | | | | | | | | | | | | | | | 734 | 735 | 736 | 737 | 738 | 739 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 051 | 052 | 053 | 054 | 055 |
| | 1 | 1 | 725 | 726 | 727 | 728 | 729 | 730 | 731 | 732 | 733 | 734 | 735 | 736 | 737 | 738 | 739 | 740 | 741 | 742 | 743 | 744 | 745 | 746 | 747 | 748 | 749 |
| | 2 | 2 | 725 | 726 | 727 | 728 | 729 | 730 | 731 | 732 | 733 | | | | | | | 740 | 741 | 742 | 743 | | | | | | |
| | 3 | 2 | 700 | 701 | 702 | 703 | 704 | 705 | 706 | | | | | | | | | | | | | | | | | | |
| | 4 | 2 | 710 | 711 | 712 | 713 | 714 | 715 | 716 | | | | | | | | | | | | | | | | | | |

FIG. 20, PART 6

INVENTORS:
JOHN I. BELLAMY
THERON L. BOWERS
BY John I. Bellamy
ATTORNEY

| LINE-LINK FRAME D | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
|---|---|---|---|---|---|---|---|---|---|---|---|---|---|---|---|---|---|---|---|---|---|---|---|---|---|---|---|
| | | | 1ST FIVE | | | | | 2ND FIVE | | | | | 3RD FIVE | | | | | 4TH FIVE | | | | | 5TH FIVE | | | | |
| 1 | | | 111 | 112 | 113 | 114 | 115 | 121 | 122 | 123 | 124 | 125 | 131 | 132 | 133 | 134 | 135 | 141 | 142 | 143 | 144 | 145 | 151 | 152 | 153 | 154 | 155 |
| | 1 | 1 | 750 | 751 | 752 | 753 | 754 | 755 | 756 | 757 | 758 | 759 | 760 | 761 | 762 | 763 | 764 | 765 | 766 | 767 | 768 | 769 | 770 | 771 | 772 | 773 | 774 |
| | 2 | 2 | | | | | | | 756 | 757 | 758 | 759 | | | | | | | 766 | 767 | 768 | 769 | 770 | 771 | 772 | 773 | 774 |
| | 3 | 2 | | | | | | | | | | | | | | | | | | | | 794 | 795 | 796 | 797 | 798 | 799 |
| | 4 | 2 | | | | | | | | | | | | | | | | | | | | 784 | 785 | 786 | 787 | 788 | 789 |
| 2 | | | 211 | 212 | 213 | 214 | 215 | 221 | 222 | 223 | 224 | 225 | 231 | 232 | 233 | 234 | 235 | 241 | 242 | 243 | 244 | 245 | 251 | 252 | 253 | 254 | 255 |
| | 1 | 1 | 775 | 776 | 777 | 778 | 779 | 780 | 781 | 782 | 783 | 784 | 785 | 786 | 787 | 788 | 789 | 790 | 791 | 792 | 793 | 794 | 795 | 796 | 797 | 798 | 799 |
| | 2 | 2 | 775 | 776 | 777 | 778 | 779 | 780 | 781 | 782 | 783 | | | | | | | 790 | 791 | 792 | 793 | | | | | | |
| | 3 | 2 | 750 | 751 | 752 | 753 | 754 | 755 | | | | | | | | | | | | | | | | | | | |
| | 4 | 2 | 760 | 761 | 762 | 763 | 764 | 765 | | | | | | | | | | | | | | | | | | | |
| 3 | | | 311 | 312 | 313 | 314 | 315 | 321 | 322 | 323 | 324 | 325 | 331 | 332 | 333 | 334 | 335 | 341 | 342 | 343 | 344 | 345 | 351 | 352 | 353 | 354 | 355 |
| | 1 | 1 | 800 | 801 | 802 | 803 | 804 | 805 | 806 | 807 | 808 | 809 | 810 | 811 | 812 | 813 | 814 | 815 | 816 | 817 | 818 | 819 | 820 | 821 | 822 | 823 | 824 |
| | 2 | 2 | | | | | | | | 807 | 808 | 809 | | | | | | | | 817 | 818 | 819 | 820 | 821 | 822 | 823 | 824 |
| | 3 | 2 | | | | | | | | | | | | | | | | | | | | 844 | 845 | 846 | 847 | 848 | 849 |
| | 4 | 2 | | | | | | | | | | | | | | | | | | | | 834 | 835 | 836 | 837 | 838 | 839 |
| 4 | | | 411 | 412 | 413 | 414 | 415 | 421 | 422 | 423 | 424 | 425 | 431 | 432 | 433 | 434 | 435 | 441 | 442 | 443 | 444 | 445 | 451 | 452 | 453 | 454 | 455 |
| | 1 | 1 | 825 | 826 | 827 | 828 | 829 | 830 | 831 | 832 | 833 | 834 | 835 | 836 | 837 | 838 | 839 | 840 | 841 | 842 | 843 | 844 | 845 | 846 | 847 | 848 | 849 |
| | 2 | 2 | 825 | 826 | 827 | 828 | 829 | 830 | 831 | 832 | 833 | | | | | | | 840 | 841 | 842 | 843 | | | | | | |
| | 3 | 2 | 800 | 801 | 802 | 803 | 804 | 805 | 806 | | | | | | | | | | | | | | | | | | |
| | 4 | 2 | 810 | 811 | 812 | 813 | 814 | 815 | 816 | | | | | | | | | | | | | | | | | | |
| 5 | | | 511 | 512 | 513 | 514 | 515 | 521 | 522 | 523 | 524 | 525 | 531 | 532 | 533 | 534 | 535 | 541 | 542 | 543 | 544 | 545 | 551 | 552 | 553 | 554 | 555 |
| | 1 | 1 | 850 | 851 | 852 | 853 | 854 | 855 | 856 | 857 | 858 | 859 | 860 | 861 | 862 | 863 | 864 | 865 | 866 | 866 | 868 | 869 | 870 | 871 | 872 | 873 | 874 |
| | 2 | 2 | | | | | | | 856 | 857 | 858 | 859 | | | | | | | 866 | 867 | 868 | 869 | 870 | 871 | 872 | 873 | 874 |
| | 3 | 2 | | | | | | | | | | | | | | | | | | | | 894 | 895 | 896 | 897 | 898 | 899 |
| | 4 | 2 | | | | | | | | | | | | | | | | | | | | 884 | 885 | 886 | 887 | 888 | 889 |

FIG. 20, PART 7

INVENTORS:
JOHN I. BELLAMY
THERON L. BOWERS
BY John I. Bellamy
ATTORNEY

| | STA | TH | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | | | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 875 | 876 | 877 | 878 | 879 | 880 | 881 | 882 | 883 | 884 | 885 | 886 | 887 | 888 | 889 | 890 | 891 | 892 | 893 | 894 | 895 | 896 | 897 | 898 | 899 |
| | 2 | 2 | 875 | 876 | 877 | 878 | 879 | 880 | 881 | 882 | 883 | | | | | | | 890 | 891 | 892 | 893 | | | | | | |
| | 3 | 2 | 850 | 851 | 852 | 853 | 854 | 855 | | | | | | | | | | | | | | | | | | | |
| | 4 | 2 | 860 | 861 | 862 | 863 | 864 | 865 | | | | | | | | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 900 | 901 | 902 | 903 | 904 | 905 | 906 | 907 | 908 | 909 | 910 | 911 | 912 | 913 | 914 | 915 | 916 | 917 | 918 | 919 | 920 | 921 | 922 | 923 | 924 |
| | 2 | 2 | | | | | | | | 907 | 908 | 909 | | | | | | | | 917 | 918 | 919 | 920 | 921 | 922 | 923 | 924 |
| | 3 | 2 | | | | | | | | | | | | | | | | | | | | 944 | 945 | 946 | 947 | 948 | 949 |
| | 4 | 2 | | | | | | | | | | | | | | | | | | | | 934 | 935 | 936 | 937 | 938 | 939 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 925 | 926 | 927 | 928 | 929 | 930 | 931 | 932 | 933 | 934 | 935 | 936 | 937 | 938 | 939 | 940 | 941 | 942 | 943 | 944 | 945 | 946 | 947 | 948 | 949 |
| | 2 | 2 | 925 | 926 | 927 | 928 | 929 | 930 | 931 | 932 | 933 | | | | | | | 940 | 941 | 942 | 943 | | | | | | |
| | 3 | 2 | 900 | 901 | 902 | 903 | 904 | 905 | 906 | | | | | | | | | | | | | | | | | | |
| | 4 | 2 | 910 | 911 | 912 | 913 | 914 | 915 | 916 | | | | | | | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 950 | 951 | 952 | 953 | 954 | 955 | 956 | 957 | 958 | 959 | 960 | 961 | 962 | 963 | 964 | 965 | 966 | 967 | 968 | 969 | 970 | 971 | 972 | 973 | 974 |
| | 2 | 2 | | | | | | | 956 | 957 | 958 | 959 | | | | | | | 966 | 967 | 968 | 969 | 970 | 971 | 972 | 973 | 974 |
| | 3 | 2 | | | | | | | | | | | | | | | | | | | | 994 | 995 | 996 | 997 | 998 | 999 |
| | 4 | 2 | | | | | | | | | | | | | | | | | | | | 984 | 985 | 986 | 987 | 988 | 989 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 051 | 052 | 053 | 054 | 055 |
| | 1 | 1 | 975 | 976 | 977 | 978 | 979 | 980 | 981 | 982 | 983 | 984 | 985 | 986 | 987 | 988 | 989 | 990 | 991 | 992 | 993 | 994 | 995 | 996 | 997 | 998 | 999 |
| | 2 | 2 | 975 | 976 | 977 | 978 | 979 | 980 | 981 | 982 | 983 | | | | | | | 990 | 991 | 992 | 993 | | | | | | |
| | 3 | 2 | 950 | 951 | 952 | 953 | 954 | 955 | | | | | | | | | | | | | | | | | | | |
| | 4 | 2 | 960 | 961 | 962 | 963 | 964 | 965 | | | | | | | | | | | | | | | | | | | |

FIG. 20, PART 8

INVENTORS:
JOHN I. BELLAMY
THERON L. BOWERS
BY John I. Bellamy
ATTORNEY

3000-NUMBER BLOCK TRANSLATOR 2100
HUNDREDS REGISTER
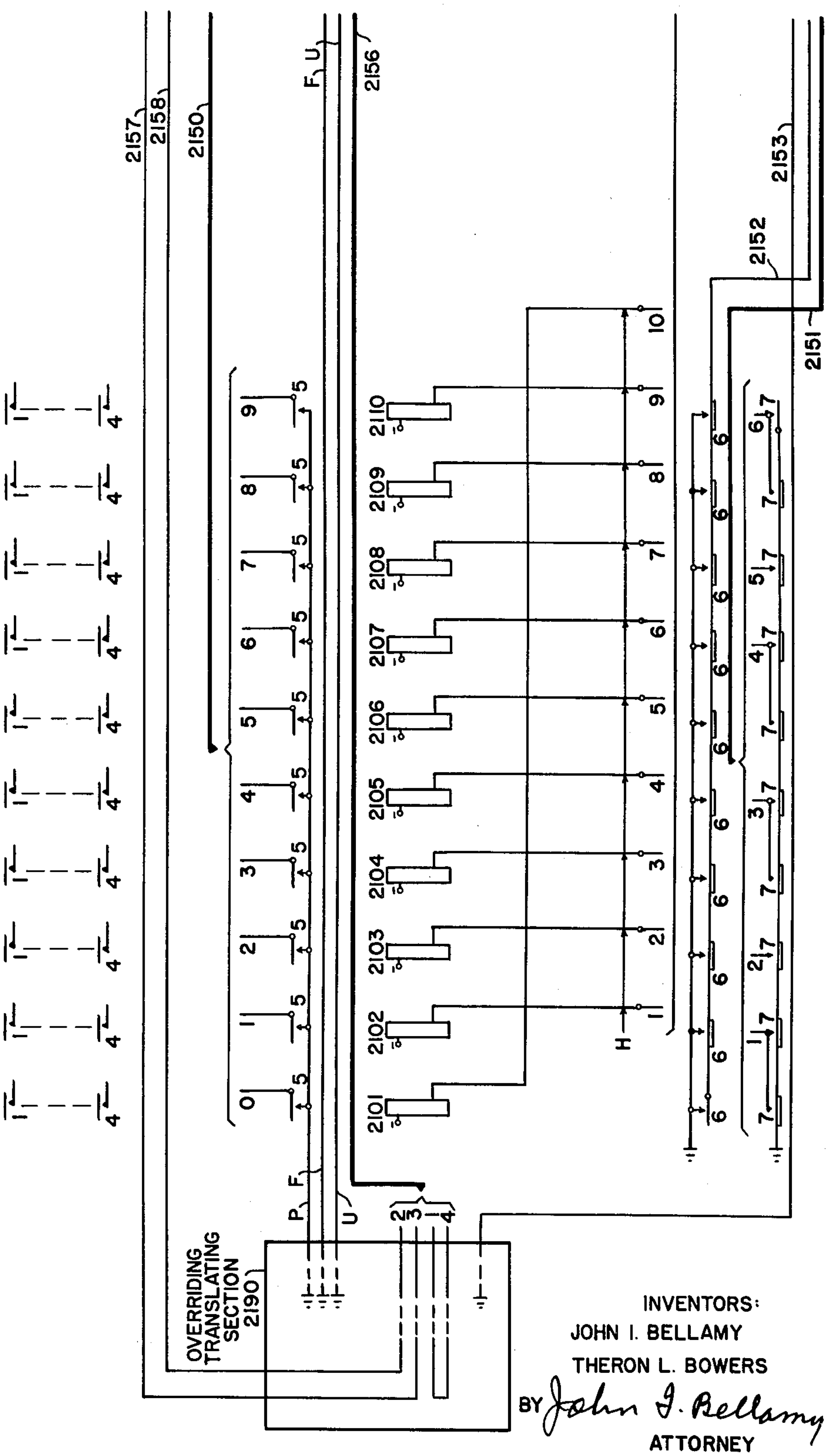
FIG. 21, PART I
INVENTORS:
JOHN I. BELLAMY
THERON L. BOWERS
BY John I. Bellamy
ATTORNEY

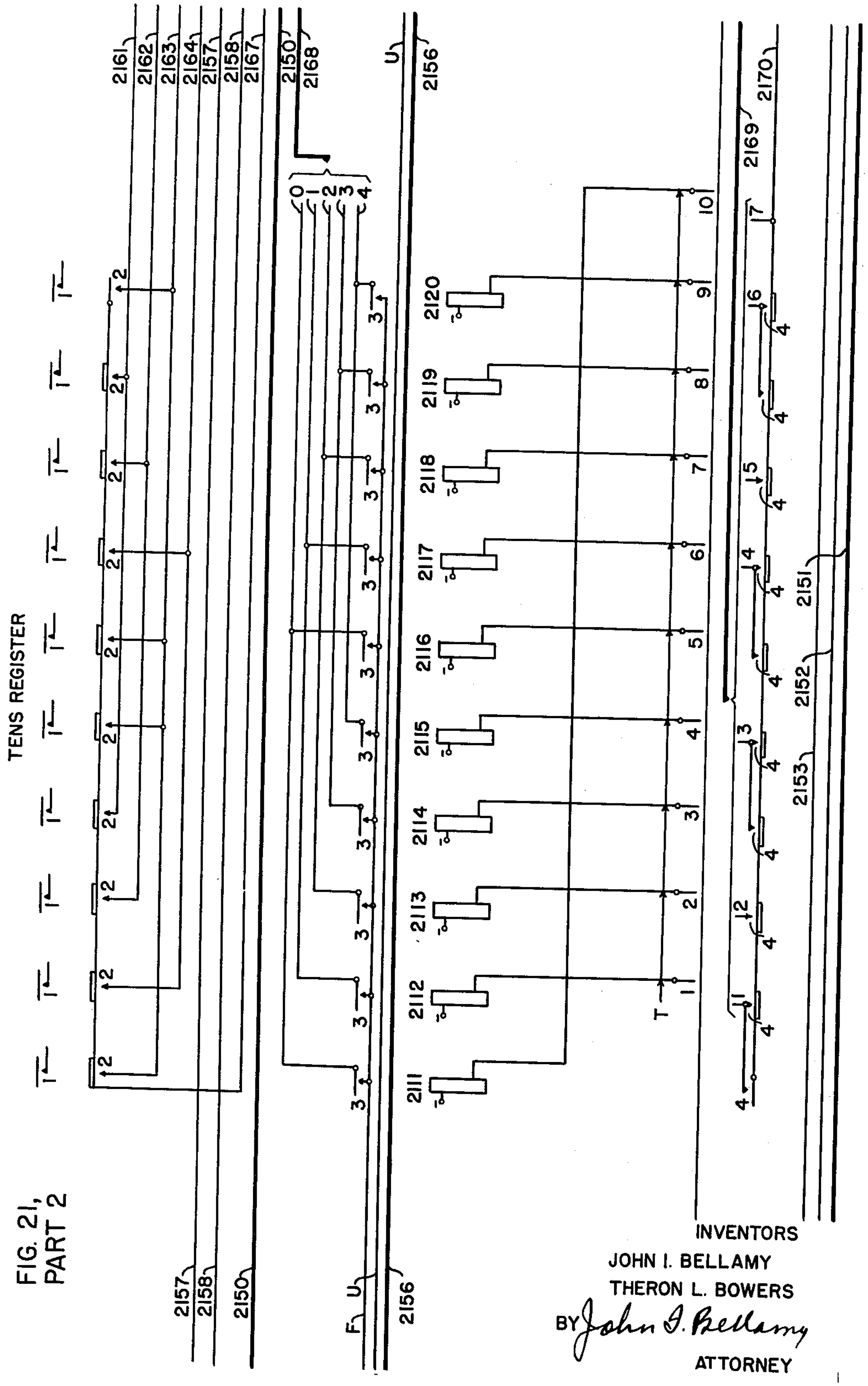
FIG. 21, PART 2
INVENTORS
JOHN I. BELLAMY
THERON L. BOWERS
BY John I. Bellamy
ATTORNEY Nov. 29, 1955 J. I. BELLAMY ET AL 2,725,428
MULTI-GROUP PRIMARY-SECONDARY-SPREAD CROSSBAR TELEPHONE SYSTEM
Filed Jan. 6, 1953 59 Sheets-Sheet 46
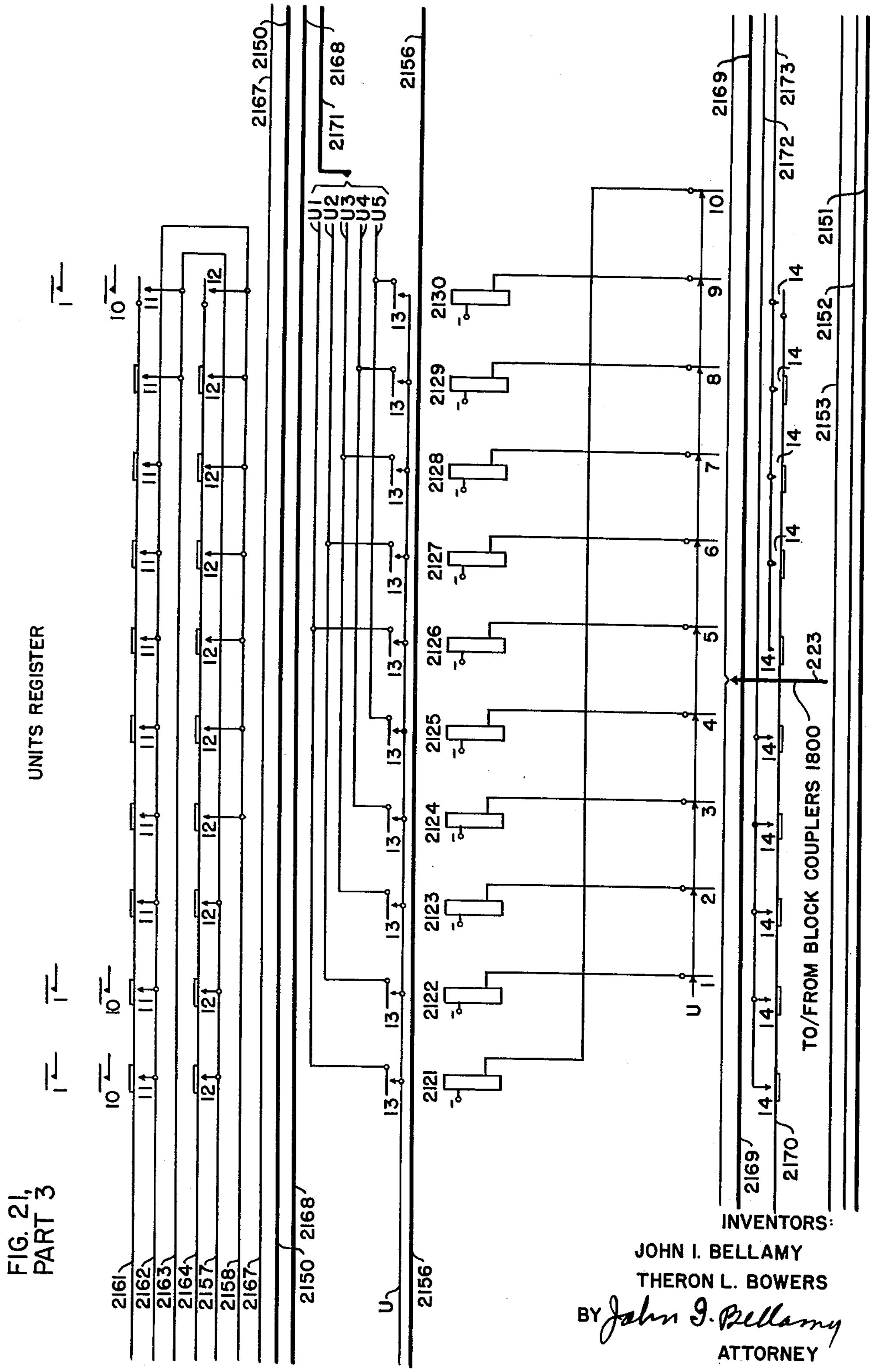
FIG. 21, PART 3
INVENTORS:
JOHN I. BELLAMY
THERON L. BOWERS
BY John I. Bellamy
ATTORNEY

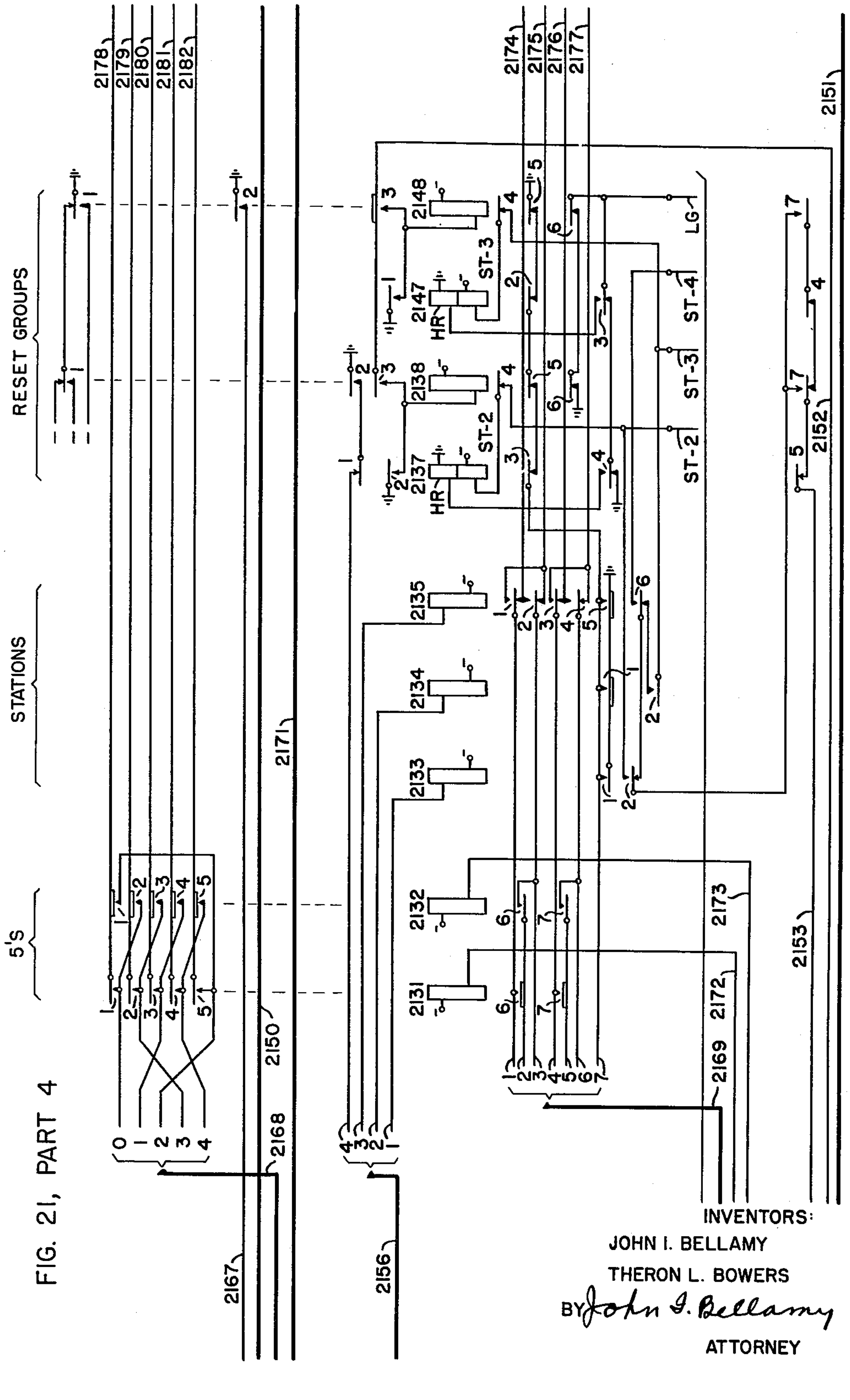
FIG. 21, PART 4
INVENTORS:
JOHN I. BELLAMY
THERON L. BOWERS
BY John I. Bellamy
ATTORNEY

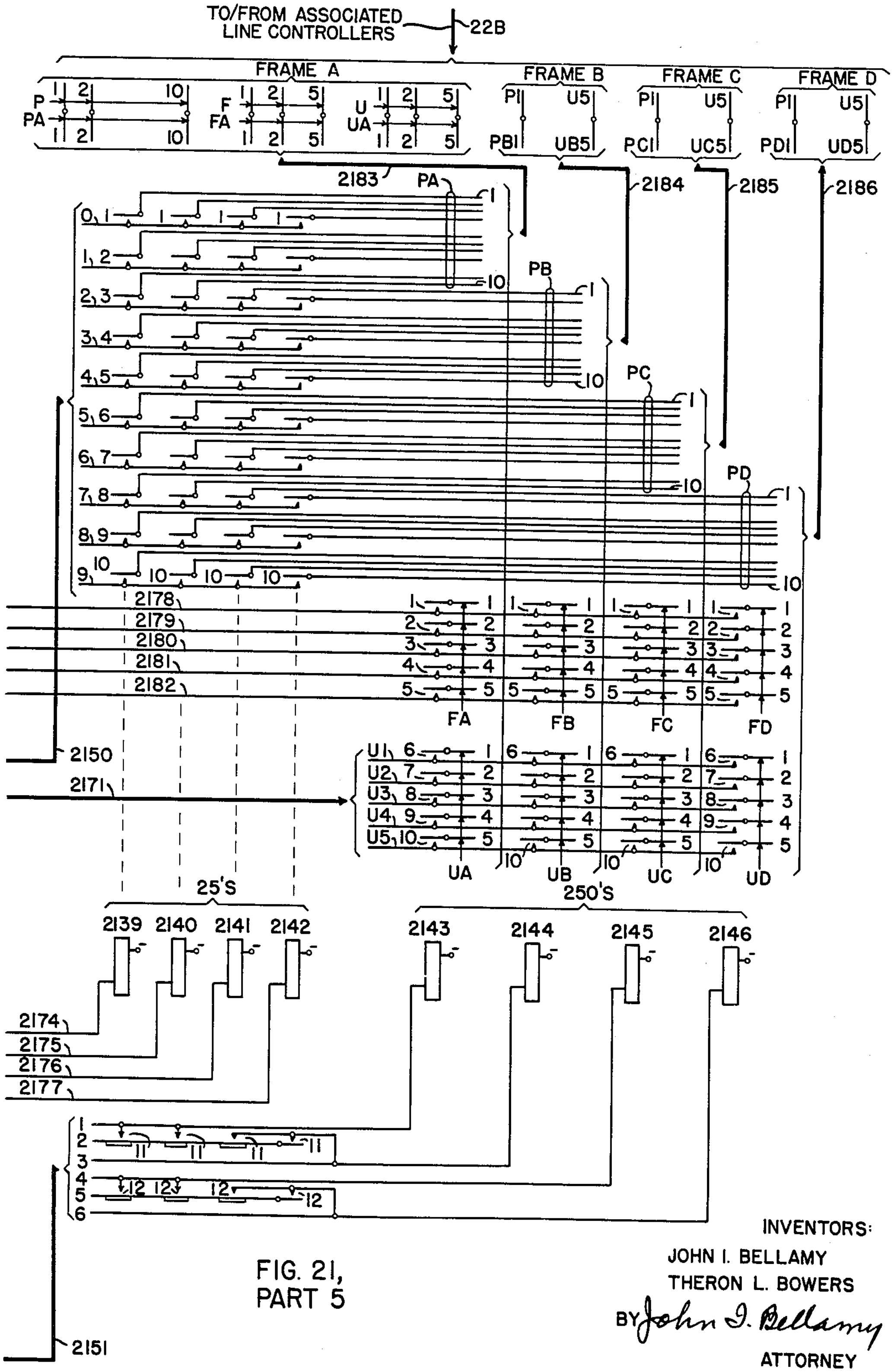
FIG. 21,
PART 5
INVENTORS:
JOHN I. BELLAMY
THERON L. BOWERS
BY John I. Bellamy
ATTORNEY

3000-NUMBER TRANSLATION AND STATION-NUMBERING PLAN FOR 1000 LINES

| | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| LINE-LINK FRAME A | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 1 | | | 111 | 112 | 113 | 114 | 115 | 121 | 122 | 123 | 124 | 125 | 131 | 132 | 133 | 134 | 135 | 141 | 142 | 143 | 144 | 145 | 151 | 152 | 153 | 154 | 155 |
| | 1 | 1 | 000 | 001 | 002 | 003 | 004 | 005 | 006 | 007 | 008 | 009 | 010 | 011 | 012 | 013 | 014 | 015 | 016 | 017 | 018 | 019 | 020 | 021 | 022 | 023 | 024 |
| | 2 | 2 | 000 | 001 | 002 | 003 | 004 | 005 | 006 | 007 | 008 | 009 | 010 | 011 | 012 | 013 | 014 | 015 | 016 | 017 | 018 | 019 | 020 | 021 | 022 | 023 | 024 |
| | 3 | 3 | | | | | | | | | | | | | | 013 | 014 | 015 | 016 | 017 | 018 | 019 | 020 | 021 | 022 | 023 | 024 |
| | 4 | 3 | | | | | | | | | | | | | | 038 | 039 | 040 | 041 | 042 | 043 | 044 | 045 | 046 | 047 | 048 | 049 |
| 2 | | | 211 | 212 | 213 | 214 | 215 | 221 | 222 | 223 | 224 | 225 | 231 | 232 | 233 | 234 | 235 | 241 | 242 | 243 | 244 | 245 | 251 | 252 | 253 | 254 | 255 |
| | 1 | 1 | 025 | 026 | 027 | 028 | 029 | 030 | 031 | 032 | 033 | 034 | 035 | 036 | 037 | 038 | 039 | 040 | 041 | 042 | 043 | 044 | 045 | 046 | 047 | 048 | 049 |
| | 2 | 2 | 025 | 026 | 027 | 028 | 029 | 030 | 031 | 032 | 033 | 034 | 035 | 036 | 037 | 038 | 039 | 040 | 041 | 042 | 043 | 044 | 045 | 046 | 047 | 048 | 049 |
| | 3 | 3 | 025 | 026 | 027 | 028 | 029 | 030 | 031 | 032 | 033 | 034 | 035 | 036 | 037 | | | | | | | | | | | | |
| | 4 | 3 | 000 | 001 | 002 | 003 | 004 | 005 | 006 | 007 | 008 | 009 | 010 | 011 | 012 | | | | | | | | | | | | |
| 3 | | | 311 | 312 | 313 | 314 | 315 | 321 | 322 | 323 | 324 | 325 | 331 | 332 | 333 | 334 | 335 | 341 | 342 | 343 | 344 | 345 | 351 | 352 | 353 | 354 | 355 |
| | 1 | 1 | 050 | 051 | 052 | 053 | 054 | 055 | 056 | 057 | 058 | 059 | 060 | 061 | 062 | 063 | 064 | 065 | 066 | 067 | 068 | 069 | 070 | 071 | 072 | 073 | 074 |
| | 2 | 2 | 050 | 051 | 052 | 053 | 054 | 055 | 056 | 057 | 058 | 059 | 060 | 061 | 062 | 063 | 064 | 065 | 066 | 067 | 068 | 069 | 070 | 071 | 072 | 073 | 074 |
| | 3 | 3 | | | | | | | | | | | | | | 063 | 064 | 065 | 066 | 067 | 068 | 069 | 070 | 071 | 072 | 073 | 074 |
| | 4 | 3 | | | | | | | | | | | | | | 088 | 089 | 090 | 091 | 092 | 093 | 094 | 095 | 096 | 097 | 098 | 099 |
| 4 | | | 411 | 412 | 413 | 414 | 415 | 421 | 422 | 423 | 424 | 425 | 431 | 432 | 433 | 434 | 435 | 441 | 442 | 443 | 444 | 445 | 451 | 452 | 453 | 454 | 455 |
| | 1 | 1 | 075 | 076 | 077 | 078 | 079 | 080 | 081 | 082 | 083 | 084 | 085 | 086 | 087 | 088 | 089 | 090 | 091 | 092 | 093 | 094 | 095 | 096 | 097 | 098 | 099 |
| | 2 | 2 | 075 | 076 | 077 | 078 | 079 | 080 | 081 | 082 | 083 | 084 | 085 | 086 | 087 | 088 | 089 | 090 | 091 | 092 | 093 | 094 | 095 | 096 | 098 | 098 | 099 |
| | 3 | 3 | 075 | 076 | 077 | 078 | 079 | 080 | 081 | 082 | 083 | 084 | 085 | 086 | 087 | | | | | | | | | | | | |
| | 4 | 3 | 050 | 051 | 052 | 053 | 054 | 055 | 056 | 057 | 058 | 059 | 060 | 061 | 062 | | | | | | | | | | | | |
| 5 | | | 511 | 512 | 513 | 514 | 515 | 521 | 522 | 523 | 524 | 525 | 531 | 532 | 533 | 534 | 535 | 541 | 542 | 543 | 544 | 545 | 551 | 552 | 553 | 554 | 555 |
| | 1 | 1 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 |
| | 2 | 2 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 |
| | 3 | 3 | | | | | | | | | | | | | | 113 | 114 | 115 | 116 | 117 | 118 | 119 | 120 | 121 | 122 | 123 | 124 |
| | 4 | 3 | | | | | | | | | | | | | | 138 | 139 | 140 | 141 | 142 | 143 | 144 | 145 | 146 | 147 | 148 | 149 |

FIG. 22,
PART I

INVENTORS:
JOHN I. BELLAMY
THERON L. BOWERS
BY John I. Bellamy
ATTORNEY

Nov. 29, 1955

J. I. BELLAMY ET AL

MULTI-GROUP PRIMARY-SECONDARY-SPREAD CROSSBAR TELEPHONE SYSTEM 2,725,428

Filed Jan. 6, 1953

59 Sheets-Sheet 50

| | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 | 149 |
| | 2 | 2 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 | 149 |
| | 3 | 3 | 125 | 126 | 127 | 128 | 129 | 130 | 131 | 132 | 133 | 134 | 135 | 136 | 137 | | | | | | | | | | | | |
| | 4 | 3 | 100 | 101 | 102 | 103 | 104 | 105 | 106 | 107 | 108 | 109 | 110 | 111 | 112 | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 150 | 151 | 152 | 153 | 154 | 155 | 156 | 157 | 158 | 159 | 160 | 161 | 162 | 163 | 164 | 165 | 166 | 167 | 168 | 169 | 170 | 171 | 172 | 173 | 174 |
| | 2 | 2 | 150 | 151 | 152 | 153 | 154 | 155 | 156 | 157 | 158 | 159 | 160 | 161 | 162 | 163 | 164 | 165 | 166 | 167 | 168 | 169 | 170 | 171 | 172 | 173 | 174 |
| | 3 | 3 | | | | | | | | | | | | | | 163 | 164 | 165 | 166 | 167 | 168 | 169 | 170 | 171 | 172 | 173 | 174 |
| | 4 | 3 | | | | | | | | | | | | | | 188 | 189 | 190 | 191 | 192 | 193 | 194 | 195 | 196 | 197 | 198 | 199 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 175 | 176 | 177 | 178 | 179 | 180 | 181 | 182 | 183 | 184 | 185 | 186 | 187 | 188 | 189 | 190 | 191 | 192 | 193 | 194 | 195 | 196 | 197 | 198 | 199 |
| | 2 | 2 | 175 | 176 | 177 | 178 | 179 | 180 | 181 | 182 | 183 | 184 | 185 | 186 | 187 | 188 | 189 | 190 | 191 | 192 | 193 | 194 | 195 | 196 | 197 | 198 | 199 |
| | 3 | 3 | 175 | 176 | 177 | 178 | 179 | 180 | 181 | 182 | 183 | 184 | 185 | 186 | 187 | | | | | | | | | | | | |
| | 4 | 3 | 150 | 151 | 152 | 153 | 154 | 155 | 156 | 157 | 158 | 159 | 160 | 161 | 162 | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 200 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 | 224 |
| | 2 | 2 | 200 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 | 224 |
| | 3 | 3 | | | | | | | | | | | | | | 213 | 214 | 215 | 216 | 217 | 218 | 219 | 220 | 221 | 222 | 223 | 224 |
| | 4 | 3 | | | | | | | | | | | | | | 238 | 239 | 240 | 241 | 242 | 243 | 244 | 245 | 246 | 247 | 248 | 249 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 05! | 052 | 053 | 054 | 055 |
| | 1 | 1 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 | 249 |
| | 2 | 2 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 | 249 |
| | 3 | 3 | 225 | 226 | 227 | 228 | 229 | 230 | 231 | 232 | 233 | 234 | 235 | 236 | 237 | | | | | | | | | | | | |
| | 4 | 3 | 200 | 201 | 202 | 203 | 204 | 205 | 206 | 207 | 208 | 209 | 210 | 211 | 212 | | | | | | | | | | | | |

FIG. 22, PART 2

INVENTORS:
JOHN I. BELLAMY
THERON L. BOWERS
BY John I. Bellamy
ATTORNEY

| LINE-LINK FRAME B | STA | TH | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | | | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 1 | | | 111 | 112 | 113 | 114 | 115 | 121 | 122 | 123 | 124 | 125 | 131 | 132 | 133 | 134 | 135 | 141 | 142 | 143 | 144 | 145 | 151 | 152 | 153 | 154 | 155 |
| | 1 | 1 | 250 | 251 | 252 | 253 | 254 | 255 | 256 | 257 | 258 | 259 | 260 | 261 | 262 | 263 | 264 | 265 | 266 | 267 | 268 | 269 | 270 | 271 | 272 | 273 | 274 |
| | 2 | 2 | 250 | 251 | 252 | 253 | 254 | 255 | 256 | 257 | 258 | 259 | 260 | 261 | 262 | 263 | 264 | 265 | 266 | 267 | 268 | 269 | 270 | 271 | 272 | 273 | 274 |
| | 3 | 3 | | | | | | | | | | | | | | 263 | 264 | 265 | 266 | 267 | 268 | 269 | 270 | 271 | 272 | 273 | 274 |
| | 4 | 3 | | | | | | | | | | | | | | 288 | 289 | 290 | 291 | 292 | 293 | 294 | 295 | 296 | 297 | 298 | 299 |
| 2 | | | 211 | 212 | 213 | 214 | 215 | 221 | 222 | 223 | 224 | 225 | 231 | 232 | 233 | 234 | 235 | 241 | 242 | 243 | 244 | 245 | 251 | 252 | 253 | 254 | 255 |
| | 1 | 1 | 275 | 276 | 277 | 278 | 279 | 280 | 281 | 282 | 283 | 284 | 285 | 286 | 287 | 288 | 289 | 290 | 291 | 292 | 293 | 294 | 295 | 296 | 297 | 298 | 299 |
| | 2 | 2 | 275 | 276 | 277 | 278 | 279 | 280 | 281 | 282 | 283 | 284 | 285 | 286 | 287 | 288 | 289 | 290 | 291 | 292 | 293 | 294 | 295 | 296 | 297 | 298 | 299 |
| | 3 | 3 | 275 | 276 | 277 | 278 | 279 | 280 | 281 | 282 | 283 | 284 | 285 | 286 | 287 | | | | | | | | | | | | |
| | 4 | 3 | 250 | 251 | 252 | 253 | 254 | 255 | 256 | 257 | 258 | 259 | 260 | 261 | 262 | | | | | | | | | | | | |
| 3 | | | 311 | 312 | 313 | 314 | 315 | 321 | 322 | 323 | 324 | 325 | 331 | 332 | 333 | 334 | 335 | 341 | 342 | 343 | 344 | 345 | 351 | 352 | 353 | 354 | 355 |
| | 1 | 1 | 300 | 301 | 302 | 303 | 304 | 305 | 306 | 307 | 308 | 309 | 310 | 311 | 312 | 313 | 314 | 315 | 316 | 317 | 318 | 319 | 320 | 321 | 322 | 323 | 324 |
| | 2 | 2 | 300 | 301 | 302 | 303 | 304 | 305 | 306 | 307 | 308 | 309 | 310 | 311 | 312 | 313 | 314 | 315 | 316 | 317 | 318 | 319 | 320 | 321 | 322 | 323 | 324 |
| | 3 | 3 | | | | | | | | | | | | | | 313 | 314 | 315 | 316 | 317 | 318 | 319 | 320 | 321 | 322 | 323 | 324 |
| | 4 | 3 | | | | | | | | | | | | | | 338 | 339 | 340 | 341 | 342 | 343 | 344 | 345 | 346 | 347 | 348 | 349 |
| 4 | | | 411 | 412 | 413 | 414 | 415 | 421 | 422 | 423 | 424 | 425 | 431 | 432 | 433 | 434 | 435 | 441 | 442 | 443 | 444 | 445 | 451 | 452 | 453 | 454 | 455 |
| | 1 | 1 | 325 | 326 | 327 | 328 | 329 | 330 | 331 | 332 | 333 | 334 | 335 | 336 | 337 | 338 | 339 | 340 | 341 | 342 | 343 | 344 | 345 | 346 | 347 | 348 | 349 |
| | 2 | 2 | 325 | 326 | 327 | 328 | 329 | 330 | 331 | 332 | 333 | 334 | 335 | 336 | 337 | 338 | 339 | 340 | 341 | 342 | 343 | 344 | 345 | 346 | 347 | 348 | 349 |
| | 3 | 3 | 325 | 326 | 327 | 328 | 329 | 330 | 331 | 332 | 333 | 334 | 335 | 336 | 337 | | | | | | | | | | | | |
| | 4 | 3 | 300 | 301 | 302 | 303 | 304 | 305 | 306 | 307 | 308 | 309 | 310 | 311 | 312 | | | | | | | | | | | | |
| 5 | | | 511 | 512 | 513 | 514 | 515 | 521 | 522 | 523 | 524 | 525 | 531 | 532 | 533 | 534 | 535 | 541 | 542 | 543 | 544 | 545 | 551 | 552 | 553 | 554 | 555 |
| | 1 | 1 | 350 | 351 | 352 | 353 | 354 | 355 | 356 | 357 | 358 | 359 | 360 | 361 | 362 | 363 | 364 | 365 | 366 | 367 | 368 | 369 | 370 | 371 | 372 | 373 | 374 |
| | 2 | 2 | 350 | 351 | 352 | 353 | 354 | 355 | 356 | 357 | 358 | 359 | 360 | 361 | 362 | 363 | 364 | 365 | 366 | 367 | 368 | 369 | 370 | 371 | 372 | 373 | 374 |
| | 3 | 3 | | | | | | | | | | | | | | 363 | 364 | 365 | 366 | 367 | 368 | 369 | 370 | 371 | 372 | 373 | 374 |
| | 4 | 3 | | | | | | | | | | | | | | 388 | 389 | 390 | 391 | 392 | 393 | 394 | 395 | 396 | 397 | 398 | 399 |

FIG. 22, PART 3

INVENTORS:
JOHN I. BELLAMY
THERON L. BOWERS
BY John I. Bellamy
ATTORNEY

| | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 375 | 376 | 377 | 378 | 379 | 380 | 381 | 382 | 383 | 384 | 385 | 386 | 387 | 388 | 389 | 390 | 391 | 392 | 393 | 394 | 395 | 396 | 397 | 398 | 399 |
| | 2 | 2 | 375 | 376 | 377 | 378 | 379 | 380 | 381 | 382 | 383 | 384 | 385 | 386 | 387 | 388 | 389 | 390 | 391 | 392 | 393 | 394 | 395 | 396 | 397 | 398 | 399 |
| | 3 | 3 | 375 | 376 | 377 | 378 | 379 | 380 | 381 | 382 | 383 | 384 | 385 | 386 | 387 | | | | | | | | | | | | |
| | 4 | 3 | 350 | 351 | 352 | 353 | 354 | 355 | 356 | 357 | 358 | 359 | 360 | 361 | 362 | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 400 | 401 | 402 | 403 | 404 | 405 | 406 | 407 | 408 | 409 | 410 | 411 | 412 | 413 | 414 | 415 | 416 | 417 | 418 | 419 | 420 | 421 | 422 | 423 | 424 |
| | 2 | 2 | 400 | 401 | 402 | 403 | 404 | 405 | 406 | 407 | 408 | 409 | 410 | 411 | 412 | 413 | 414 | 415 | 416 | 417 | 418 | 419 | 420 | 421 | 422 | 423 | 424 |
| | 3 | 3 | | | | | | | | | | | | | | 413 | 414 | 415 | 416 | 417 | 418 | 419 | 420 | 421 | 422 | 423 | 424 |
| | 4 | 3 | | | | | | | | | | | | | | 438 | 439 | 440 | 441 | 442 | 443 | 444 | 445 | 446 | 447 | 448 | 449 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 425 | 426 | 427 | 428 | 429 | 430 | 431 | 432 | 433 | 434 | 435 | 436 | 437 | 438 | 439 | 440 | 441 | 442 | 443 | 444 | 445 | 446 | 447 | 448 | 449 |
| | 2 | 2 | 425 | 426 | 427 | 428 | 429 | 430 | 431 | 432 | 433 | 434 | 435 | 436 | 437 | 438 | 439 | 440 | 441 | 442 | 443 | 444 | 445 | 446 | 447 | 448 | 449 |
| | 3 | 3 | 425 | 426 | 427 | 428 | 429 | 430 | 431 | 432 | 433 | 434 | 435 | 436 | 437 | | | | | | | | | | | | |
| | 4 | 3 | 400 | 401 | 402 | 403 | 404 | 405 | 406 | 407 | 408 | 409 | 410 | 411 | 412 | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 450 | 451 | 452 | 453 | 454 | 455 | 456 | 457 | 458 | 459 | 460 | 461 | 462 | 463 | 464 | 465 | 466 | 467 | 468 | 469 | 470 | 471 | 472 | 473 | 474 |
| | 2 | 2 | 450 | 451 | 452 | 453 | 454 | 455 | 456 | 457 | 458 | 459 | 460 | 461 | 462 | 463 | 464 | 465 | 466 | 467 | 468 | 469 | 470 | 471 | 472 | 473 | 474 |
| | 3 | 3 | | | | | | | | | | | | | | 463 | 464 | 465 | 466 | 467 | 468 | 469 | 470 | 471 | 472 | 473 | 474 |
| | 4 | 3 | | | | | | | | | | | | | | 488 | 489 | 490 | 491 | 492 | 493 | 494 | 495 | 496 | 497 | 498 | 499 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 051 | 052 | 053 | 054 | 055 |
| | 1 | 1 | 475 | 476 | 477 | 478 | 479 | 480 | 481 | 482 | 483 | 484 | 485 | 486 | 487 | 488 | 489 | 490 | 491 | 492 | 493 | 494 | 495 | 496 | 497 | 498 | 499 |
| | 2 | 2 | 475 | 476 | 477 | 478 | 479 | 480 | 481 | 482 | 483 | 484 | 485 | 486 | 487 | 488 | 489 | 490 | 491 | 492 | 493 | 494 | 495 | 496 | 497 | 498 | 499 |
| | 3 | 3 | 475 | 476 | 477 | 478 | 479 | 480 | 481 | 482 | 483 | 484 | 485 | 486 | 487 | | | | | | | | | | | | |
| | 4 | 3 | 450 | 451 | 452 | 453 | 454 | 455 | 456 | 457 | 458 | 459 | 460 | 461 | 462 | | | | | | | | | | | | |

FIG. 22,
PART 4

INVENTORS:
JOHN I. BELLAMY
THERON L. BOWERS
BY John I. Bellamy
ATTORNEY

| LINE-LINK FRAME C | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 1 | | | 111 | 112 | 113 | 114 | 115 | 121 | 122 | 123 | 124 | 125 | 131 | 132 | 133 | 134 | 135 | 141 | 142 | 143 | 144 | 145 | 151 | 152 | 153 | 154 | 155 |
| | 1 | 1 | 500 | 501 | 502 | 503 | 504 | 505 | 506 | 507 | 508 | 509 | 510 | 511 | 512 | 513 | 514 | 515 | 516 | 517 | 518 | 519 | 520 | 521 | 522 | 523 | 524 |
| | 2 | 2 | 500 | 501 | 502 | 503 | 504 | 505 | 506 | 507 | 508 | 509 | 510 | 511 | 512 | 513 | 514 | 515 | 516 | 517 | 518 | 519 | 520 | 521 | 522 | 523 | 524 |
| | 3 | 3 | | | | | | | | | | | | | | 513 | 514 | 515 | 516 | 517 | 518 | 519 | 520 | 521 | 522 | 523 | 524 |
| | 4 | 3 | | | | | | | | | | | | | | 538 | 539 | 540 | 541 | 542 | 543 | 544 | 545 | 546 | 547 | 548 | 549 |
| 2 | | | 211 | 212 | 213 | 214 | 215 | 221 | 222 | 223 | 224 | 225 | 231 | 232 | 233 | 234 | 235 | 241 | 242 | 243 | 244 | 245 | 251 | 252 | 253 | 254 | 255 |
| | 1 | 1 | 525 | 526 | 527 | 528 | 529 | 530 | 531 | 532 | 533 | 534 | 535 | 536 | 537 | 538 | 539 | 540 | 541 | 542 | 543 | 544 | 545 | 546 | 547 | 548 | 549 |
| | 2 | 2 | 525 | 526 | 527 | 528 | 529 | 530 | 531 | 532 | 533 | 534 | 535 | 536 | 537 | 538 | 539 | 540 | 541 | 542 | 543 | 544 | 545 | 546 | 547 | 548 | 549 |
| | 3 | 3 | 525 | 526 | 527 | 528 | 529 | 530 | 531 | 532 | 533 | 534 | 535 | 536 | 537 | | | | | | | | | | | | |
| | 4 | 3 | 500 | 501 | 502 | 503 | 504 | 505 | 506 | 507 | 508 | 509 | 510 | 511 | 512 | | | | | | | | | | | | |
| 3 | | | 311 | 312 | 313 | 314 | 315 | 321 | 322 | 323 | 324 | 325 | 331 | 332 | 333 | 334 | 335 | 341 | 342 | 343 | 344 | 345 | 351 | 352 | 353 | 354 | 355 |
| | 1 | 1 | 550 | 551 | 552 | 553 | 554 | 555 | 556 | 557 | 558 | 559 | 560 | 561 | 562 | 563 | 564 | 565 | 566 | 567 | 568 | 569 | 570 | 571 | 572 | 573 | 574 |
| | 2 | 2 | 550 | 551 | 552 | 553 | 554 | 555 | 556 | 557 | 558 | 559 | 560 | 561 | 562 | 563 | 564 | 565 | 566 | 567 | 568 | 569 | 570 | 571 | 572 | 573 | 574 |
| | 3 | 3 | | | | | | | | | | | | | | 563 | 564 | 565 | 566 | 567 | 568 | 569 | 570 | 571 | 572 | 573 | 574 |
| | 4 | 3 | | | | | | | | | | | | | | 588 | 589 | 590 | 591 | 592 | 593 | 594 | 595 | 596 | 597 | 598 | 599 |
| 4 | | | 411 | 412 | 413 | 414 | 415 | 421 | 422 | 423 | 424 | 425 | 431 | 432 | 433 | 434 | 435 | 441 | 442 | 443 | 444 | 445 | 451 | 452 | 453 | 454 | 455 |
| | 1 | 1 | 575 | 576 | 577 | 578 | 579 | 580 | 581 | 582 | 583 | 584 | 585 | 586 | 587 | 588 | 589 | 590 | 591 | 592 | 593 | 594 | 595 | 596 | 597 | 598 | 599 |
| | 2 | 2 | 575 | 576 | 577 | 578 | 579 | 580 | 581 | 582 | 583 | 584 | 585 | 586 | 587 | 588 | 589 | 590 | 591 | 592 | 593 | 594 | 595 | 596 | 597 | 598 | 599 |
| | 3 | 3 | 575 | 576 | 577 | 578 | 579 | 580 | 581 | 582 | 583 | 584 | 585 | 586 | 587 | | | | | | | | | | | | |
| | 4 | 3 | 550 | 551 | 552 | 553 | 554 | 555 | 556 | 557 | 558 | 559 | 560 | 561 | 562 | | | | | | | | | | | | |
| 5 | | | 511 | 512 | 513 | 514 | 515 | 521 | 522 | 523 | 524 | 525 | 531 | 532 | 533 | 534 | 535 | 541 | 542 | 543 | 544 | 545 | 551 | 552 | 553 | 554 | 555 |
| | 1 | 1 | 600 | 601 | 602 | 603 | 604 | 605 | 606 | 607 | 608 | 609 | 610 | 611 | 612 | 613 | 614 | 615 | 616 | 617 | 618 | 619 | 620 | 621 | 622 | 623 | 624 |
| | 2 | 2 | 600 | 601 | 602 | 603 | 604 | 605 | 606 | 607 | 608 | 609 | 610 | 611 | 612 | 613 | 614 | 615 | 616 | 617 | 618 | 619 | 620 | 621 | 622 | 623 | 624 |
| | 3 | 3 | | | | | | | | | | | | | | 613 | 614 | 615 | 616 | 617 | 618 | 619 | 620 | 621 | 622 | 623 | 624 |
| | 4 | 3 | | | | | | | | | | | | | | 638 | 639 | 640 | 641 | 642 | 642 | 644 | 645 | 646 | 647 | 648 | 649 |

FIG. 22,
PART 5

INVENTORS:
JOHN I. BELLAMY
THERON L. BOWERS
BY John I. Bellamy
ATTORNEY

| | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 625 | 626 | 627 | 628 | 629 | 630 | 631 | 632 | 633 | 634 | 635 | 636 | 637 | 638 | 639 | 640 | 641 | 642 | 643 | 644 | 645 | 646 | 647 | 648 | 649 |
| | 2 | 2 | 625 | 626 | 627 | 628 | 629 | 630 | 631 | 632 | 633 | 634 | 635 | 636 | 637 | 638 | 639 | 640 | 641 | 642 | 643 | 644 | 645 | 646 | 647 | 648 | 649 |
| | 3 | 3 | 625 | 626 | 627 | 628 | 629 | 630 | 631 | 632 | 633 | 634 | 635 | 636 | 637 | | | | | | | | | | | | |
| | 4 | 3 | 600 | 601 | 602 | 603 | 604 | 605 | 606 | 607 | 608 | 609 | 610 | 611 | 612 | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 650 | 651 | 652 | 653 | 654 | 655 | 656 | 657 | 658 | 659 | 660 | 661 | 662 | 663 | 664 | 665 | 666 | 667 | 668 | 669 | 670 | 671 | 672 | 673 | 674 |
| | 2 | 2 | 650 | 651 | 652 | 653 | 654 | 655 | 656 | 657 | 658 | 659 | 660 | 661 | 662 | 663 | 664 | 665 | 666 | 667 | 668 | 669 | 670 | 671 | 672 | 673 | 674 |
| | 3 | 3 | | | | | | | | | | | | | | 663 | 664 | 665 | 666 | 667 | 668 | 669 | 670 | 671 | 672 | 673 | 674 |
| | 4 | 3 | | | | | | | | | | | | | | 688 | 689 | 690 | 691 | 692 | 693 | 694 | 695 | 696 | 697 | 698 | 699 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 675 | 676 | 677 | 678 | 679 | 680 | 681 | 682 | 683 | 684 | 685 | 686 | 687 | 688 | 689 | 690 | 691 | 692 | 693 | 694 | 695 | 696 | 697 | 698 | 699 |
| | 2 | 2 | 675 | 676 | 677 | 678 | 679 | 680 | 681 | 682 | 683 | 684 | 685 | 686 | 687 | 688 | 689 | 690 | 691 | 692 | 693 | 694 | 695 | 696 | 697 | 698 | 699 |
| | 3 | 3 | 675 | 676 | 677 | 678 | 679 | 680 | 681 | 682 | 683 | 684 | 685 | 686 | 687 | | | | | | | | | | | | |
| | 4 | 3 | 650 | 651 | 652 | 653 | 654 | 655 | 656 | 657 | 658 | 659 | 660 | 661 | 662 | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 700 | 701 | 702 | 703 | 704 | 705 | 706 | 707 | 708 | 709 | 710 | 711 | 712 | 713 | 714 | 715 | 716 | 717 | 718 | 719 | 720 | 721 | 722 | 723 | 724 |
| | 2 | 2 | 700 | 701 | 702 | 703 | 704 | 705 | 706 | 707 | 708 | 709 | 710 | 711 | 712 | 713 | 714 | 715 | 716 | 717 | 718 | 719 | 720 | 721 | 722 | 723 | 724 |
| | 3 | 3 | | | | | | | | | | | | | | 713 | 714 | 715 | 716 | 717 | 718 | 719 | 720 | 721 | 722 | 723 | 724 |
| | 4 | 3 | | | | | | | | | | | | | | 738 | 739 | 740 | 741 | 742 | 743 | 744 | 745 | 746 | 747 | 748 | 749 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 051 | 052 | 053 | 054 | 056 |
| | 1 | 1 | 725 | 726 | 727 | 728 | 729 | 730 | 731 | 732 | 733 | 734 | 735 | 736 | 737 | 738 | 739 | 740 | 741 | 742 | 743 | 744 | 745 | 746 | 747 | 748 | 749 |
| | 2 | 2 | 725 | 726 | 727 | 728 | 729 | 730 | 731 | 732 | 733 | 734 | 735 | 736 | 737 | 738 | 739 | 740 | 741 | 742 | 743 | 744 | 745 | 746 | 747 | 748 | 749 |
| | 3 | 3 | 725 | 726 | 727 | 728 | 729 | 730 | 731 | 732 | 733 | 734 | 735 | 736 | 737 | | | | | | | | | | | | |
| | 4 | 3 | 700 | 701 | 702 | 703 | 704 | 705 | 706 | 707 | 708 | 709 | 710 | 711 | 712 | | | | | | | | | | | | |

FIG. 22,
PART 6

INVENTORS:
JOHN I. BELLAMY
THERON L. BOWERS
BY John I. Bellamy
ATTORNEY

| LINE-LINK FRAME D | STA | TH | 1ST FIVE V1 | V2 | V3 | V4 | V5 | 2ND FIVE V6 | V7 | V8 | V9 | V10 | 3RD FIVE V11 | V12 | V13 | V14 | V15 | 4TH FIVE V16 | V17 | V18 | V19 | V20 | 5TH FIVE V21 | V22 | V23 | V24 | V25 |
|---|---|---|---|---|---|---|---|---|---|---|---|---|---|---|---|---|---|---|---|---|---|---|---|---|---|---|---|
| 1 | | | 111 | 112 | 113 | 114 | 115 | 121 | 122 | 123 | 124 | 125 | 131 | 132 | 133 | 134 | 135 | 141 | 142 | 143 | 144 | 145 | 151 | 152 | 153 | 154 | 155 |
| | 1 | 1 | 750 | 751 | 752 | 753 | 754 | 755 | 756 | 757 | 758 | 759 | 760 | 761 | 762 | 763 | 764 | 765 | 766 | 767 | 768 | 769 | 770 | 771 | 772 | 773 | 774 |
| | 2 | 2 | 750 | 751 | 752 | 753 | 754 | 755 | 756 | 757 | 758 | 759 | 760 | 761 | 762 | 763 | 764 | 765 | 766 | 767 | 768 | 769 | 770 | 771 | 772 | 773 | 774 |
| | 3 | 3 | | | | | | | | | | | | | | 763 | 764 | 765 | 766 | 767 | 768 | 769 | 770 | 771 | 772 | 773 | 774 |
| | 4 | 3 | | | | | | | | | | | | | | 788 | 789 | 790 | 791 | 792 | 793 | 794 | 795 | 796 | 797 | 798 | 799 |
| 2 | | | 211 | 212 | 213 | 214 | 215 | 221 | 222 | 223 | 224 | 225 | 231 | 232 | 233 | 234 | 235 | 241 | 242 | 243 | 244 | 245 | 251 | 252 | 253 | 254 | 255 |
| | 1 | 1 | 775 | 776 | 777 | 778 | 779 | 780 | 781 | 782 | 783 | 784 | 785 | 786 | 787 | 788 | 789 | 790 | 791 | 792 | 793 | 794 | 795 | 796 | 797 | 798 | 799 |
| | 2 | 2 | 775 | 776 | 777 | 778 | 779 | 780 | 781 | 782 | 783 | 784 | 785 | 786 | 787 | 788 | 789 | 790 | 791 | 792 | 793 | 794 | 795 | 796 | 797 | 798 | 799 |
| | 3 | 3 | 775 | 776 | 777 | 778 | 779 | 780 | 781 | 782 | 783 | 784 | 785 | 786 | 787 | | | | | | | | | | | | |
| | 4 | 3 | 750 | 751 | 752 | 753 | 754 | 755 | 756 | 757 | 758 | 759 | 760 | 761 | 762 | | | | | | | | | | | | |
| 3 | | | 311 | 312 | 313 | 314 | 315 | 321 | 322 | 323 | 324 | 325 | 331 | 332 | 333 | 334 | 335 | 341 | 342 | 343 | 344 | 345 | 351 | 352 | 353 | 354 | 355 |
| | 1 | 1 | 800 | 801 | 802 | 803 | 804 | 805 | 806 | 807 | 808 | 809 | 810 | 811 | 812 | 813 | 814 | 815 | 816 | 817 | 818 | 819 | 820 | 821 | 822 | 823 | 824 |
| | 2 | 2 | 800 | 801 | 802 | 803 | 804 | 805 | 806 | 807 | 808 | 809 | 810 | 811 | 812 | 813 | 814 | 815 | 816 | 817 | 818 | 819 | 820 | 821 | 822 | 823 | 824 |
| | 3 | 3 | | | | | | | | | | | | | | 813 | 814 | 815 | 816 | 817 | 818 | 819 | 820 | 821 | 822 | 823 | 824 |
| | 4 | 3 | | | | | | | | | | | | | | 838 | 839 | 840 | 841 | 842 | 843 | 844 | 845 | 846 | 847 | 848 | 849 |
| 4 | | | 411 | 412 | 413 | 414 | 415 | 421 | 422 | 423 | 424 | 425 | 431 | 432 | 433 | 434 | 435 | 441 | 442 | 443 | 444 | 445 | 451 | 452 | 453 | 454 | 455 |
| | 1 | 1 | 825 | 826 | 827 | 828 | 829 | 830 | 831 | 832 | 833 | 834 | 835 | 836 | 837 | 838 | 839 | 840 | 841 | 842 | 843 | 844 | 845 | 846 | 847 | 848 | 849 |
| | 2 | 2 | 825 | 826 | 827 | 828 | 829 | 830 | 831 | 832 | 833 | 834 | 835 | 836 | 837 | 838 | 839 | 840 | 841 | 842 | 843 | 844 | 845 | 846 | 847 | 848 | 849 |
| | 3 | 3 | 825 | 826 | 827 | 828 | 828 | 830 | 831 | 832 | 833 | 834 | 835 | 836 | 837 | | | | | | | | | | | | |
| | 4 | 3 | 800 | 801 | 802 | 803 | 804 | 805 | 806 | 807 | 808 | 809 | 810 | 811 | 812 | | | | | | | | | | | | |
| 5 | | | 511 | 512 | 513 | 514 | 515 | 521 | 522 | 523 | 524 | 525 | 531 | 532 | 533 | 534 | 535 | 541 | 542 | 543 | 544 | 545 | 551 | 552 | 553 | 554 | 555 |
| | 1 | 1 | 850 | 851 | 852 | 853 | 854 | 855 | 856 | 857 | 858 | 859 | 860 | 861 | 862 | 863 | 864 | 865 | 866 | 867 | 868 | 869 | 870 | 871 | 872 | 873 | 874 |
| | 2 | 2 | 850 | 851 | 852 | 853 | 854 | 855 | 856 | 857 | 858 | 859 | 860 | 861 | 862 | 863 | 864 | 865 | 866 | 867 | 868 | 869 | 870 | 871 | 872 | 873 | 874 |
| | 3 | 3 | | | | | | | | | | | | | | 863 | 864 | 865 | 866 | 867 | 868 | 869 | 870 | 871 | 872 | 873 | 874 |
| | 4 | 3 | | | | | | | | | | | | | | 888 | 889 | 890 | 891 | 892 | 893 | 894 | 895 | 896 | 897 | 898 | 899 |

FIG. 22, PART 7

INVENTORS:
JOHN I. BELLAMY
THERON L. BOWERS
BY John I. Bellamy
ATTORNEY

| | | | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|---|---|
| | STA | TH | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 6 | | | 611 | 612 | 613 | 614 | 615 | 621 | 622 | 623 | 624 | 625 | 631 | 632 | 633 | 634 | 635 | 641 | 642 | 643 | 644 | 645 | 651 | 652 | 653 | 654 | 655 |
| | 1 | 1 | 875 | 876 | 877 | 878 | 879 | 880 | 881 | 882 | 883 | 884 | 885 | 886 | 887 | 888 | 889 | 890 | 891 | 892 | 893 | 894 | 895 | 896 | 897 | 898 | 899 |
| | 2 | 2 | 875 | 876 | 877 | 878 | 879 | 880 | 881 | 882 | 883 | 884 | 885 | 886 | 887 | 888 | 889 | 890 | 891 | 892 | 893 | 894 | 895 | 896 | 897 | 898 | 899 |
| | 3 | 3 | 875 | 876 | 877 | 878 | 879 | 880 | 881 | 882 | 883 | 884 | 885 | 886 | 887 | | | | | | | | | | | | |
| | 4 | 3 | 850 | 851 | 852 | 853 | 854 | 855 | 856 | 857 | 858 | 859 | 860 | 861 | 862 | | | | | | | | | | | | |
| 7 | | | 711 | 712 | 713 | 714 | 715 | 721 | 722 | 723 | 724 | 725 | 731 | 732 | 733 | 734 | 735 | 741 | 742 | 743 | 744 | 745 | 751 | 752 | 753 | 754 | 755 |
| | 1 | 1 | 900 | 901 | 902 | 903 | 904 | 905 | 906 | 907 | 908 | 909 | 910 | 911 | 912 | 913 | 914 | 915 | 916 | 917 | 918 | 919 | 920 | 921 | 922 | 923 | 924 |
| | 2 | 2 | 900 | 901 | 902 | 903 | 904 | 905 | 906 | 907 | 908 | 909 | 910 | 911 | 912 | 913 | 914 | 915 | 916 | 917 | 918 | 919 | 920 | 921 | 922 | 923 | 924 |
| | 3 | 3 | | | | | | | | | | | | | | 913 | 914 | 915 | 916 | 917 | 918 | 919 | 920 | 921 | 922 | 923 | 924 |
| | 4 | 3 | | | | | | | | | | | | | | 938 | 939 | 940 | 941 | 942 | 943 | 944 | 945 | 946 | 947 | 948 | 949 |
| 8 | | | 811 | 812 | 813 | 814 | 815 | 821 | 822 | 823 | 824 | 825 | 831 | 832 | 833 | 834 | 835 | 841 | 842 | 843 | 844 | 845 | 851 | 852 | 853 | 854 | 855 |
| | 1 | 1 | 925 | 926 | 927 | 928 | 929 | 930 | 931 | 932 | 933 | 934 | 935 | 936 | 937 | 938 | 939 | 940 | 941 | 942 | 943 | 944 | 945 | 946 | 947 | 948 | 949 |
| | 2 | 2 | 925 | 926 | 927 | 928 | 929 | 930 | 931 | 932 | 933 | 934 | 935 | 936 | 937 | 938 | 939 | 940 | 941 | 942 | 943 | 944 | 945 | 946 | 947 | 948 | 949 |
| | 3 | 3 | 925 | 926 | 927 | 928 | 929 | 930 | 931 | 932 | 933 | 934 | 935 | 936 | 937 | | | | | | | | | | | | |
| | 4 | 3 | 900 | 901 | 902 | 903 | 904 | 905 | 906 | 907 | 908 | 909 | 910 | 911 | 912 | | | | | | | | | | | | |
| 9 | | | 911 | 912 | 913 | 914 | 915 | 921 | 922 | 923 | 924 | 925 | 931 | 932 | 933 | 934 | 935 | 941 | 942 | 943 | 944 | 945 | 951 | 952 | 953 | 954 | 955 |
| | 1 | 1 | 950 | 951 | 952 | 953 | 954 | 955 | 956 | 957 | 958 | 959 | 960 | 961 | 962 | 963 | 964 | 965 | 966 | 967 | 968 | 969 | 970 | 971 | 972 | 973 | 974 |
| | 2 | 2 | 950 | 951 | 952 | 953 | 954 | 955 | 956 | 957 | 958 | 959 | 960 | 961 | 962 | 963 | 964 | 965 | 966 | 967 | 968 | 969 | 970 | 971 | 972 | 973 | 974 |
| | 3 | 3 | | | | | | | | | | | | | | 963 | 964 | 965 | 966 | 967 | 968 | 969 | 970 | 971 | 972 | 973 | 974 |
| | 4 | 3 | | | | | | | | | | | | | | 988 | 989 | 990 | 991 | 992 | 993 | 994 | 995 | 996 | 997 | 998 | 999 |
| 10 | | | 011 | 012 | 013 | 014 | 015 | 021 | 022 | 023 | 024 | 025 | 031 | 032 | 033 | 034 | 035 | 041 | 042 | 043 | 044 | 045 | 051 | 052 | 053 | 054 | 055 |
| | 1 | 1 | 975 | 976 | 977 | 978 | 979 | 980 | 981 | 982 | 983 | 984 | 985 | 986 | 987 | 988 | 989 | 990 | 991 | 992 | 993 | 994 | 995 | 996 | 997 | 998 | 999 |
| | 2 | 2 | 975 | 976 | 977 | 978 | 979 | 980 | 981 | 982 | 983 | 984 | 985 | 986 | 987 | 988 | 989 | 990 | 991 | 992 | 993 | 994 | 995 | 996 | 997 | 998 | 999 |
| | 3 | 3 | 975 | 976 | 977 | 978 | 979 | 980 | 981 | 982 | 983 | 984 | 985 | 986 | 987 | | | | | | | | | | | | |
| | 4 | 3 | 950 | 951 | 952 | 953 | 954 | 955 | 956 | 957 | 958 | 959 | 960 | 961 | 962 | | | | | | | | | | | | |

FIG. 22, PART 8

INVENTORS
JOHN I. BELLAMY
THERON L. BOWERS
BY John I. Bellamy
ATTORNEY

Nov. 29, 1955 J. I. BELLAMY ET AL 2,725,428

MULTI-GROUP PRIMARY-SECONDARY-SPREAD CROSSBAR TELEPHONE SYSTEM

Filed Jan. 6, 1953 59 Sheets-Sheet 57

INVENTORS:
JOHN I. BELLAMY
THERON L. BOWERS
BY John I. Bellamy
ATTORNEY

PARTY-LINE TRUNKING PLAN

INVENTORS:
JOHN I. BELLAMY
THERON L. BOWERS
BY John I. Bellamy
ATTORNEY

INVENTORS:
JOHN I. BELLAMY
THERON L. BOWERS
BY John I. Bellamy
ATTORNEY 2,725,428
Patented Nov. 29, 1955

2,725,428

MULTI-GROUP PRIMARY-SECONDARY-SPREAD CROSSBAR TELEPHONE SYSTEM

John I. Bellamy, Wheaton, Ill., and Theron L. Bowers, Winnipeg, Manitoba, Canada, assignors to International Telephone and Telegraph Corporation, a corporation of Maryland Application January 6, 1953, Serial No. 329,802

32 Claims. (Cl. 179—18)

This invention relates to a multi-group primary secondary-spread crossbar telephone system. Its principal object is to provide an economical switching arrangement for a telephone system serving a number of 1000-line groups of subscriber lines.

I. GENERAL DESCRIPTION

It has been chosen to disclose this invention as embodied in a telephone system including selecting apparatus having access to a number of 1000-line switching blocks of the general type disclosed in our prior application for a primary-secondary-spread crossbar telephone system, Serial Number 85,292, filed April 4, 1949.

One object of the invention is to provide a satisfactory and reliable multi-group selector frame economically employing primary-secondary switching apparatus and capable of handling a large amount of traffic by performing its selecting and switching-through operations during the interdigit dialing interval on a rapid one-call-at-a-time basis.

A further object is to provide a switching frame of the stated character capable of serving as a combined initial-digit and thousands-digit selector frame.

A related feature resides in an arrangement whereby the several initial-digit and thousands-digit values may be assigned as desired to the outgoing trunk groups and thousands trunk groups, and whereby the secondary trunk terminations on the thousands link frame may be assigned to, and apportioned among, the noted trunk groups, by placing corresponding jumpers on terminal blocks provided for that purpose. This feature enables a standard switchboard arrangement to serve a wide variety of different requirements as to the number and size of groups of outgoing and thousands trunks.

Another object is to arrange the foregoing multi-thousand-line switching system for accommodating party lines, with all directory numbers of individual lines, together with all directory numbers of the stations on party lines, falling within the same 10,000-number block, such numbers being distinguished according to their thousands, hundreds, tens, and units digits.

A feature concerned with carrying out the last noted object is that one or more additional thousands digits may be assigned to any block of one thousand lines to thereby provide the additional directory numbers required for distinguishing the added stations which may be served by using some, or even all, of the lines. As will hereinafter appear, the following four situations are specifically provided for:

1. A single thousand digit assigned to a block of one thousand lines provides one thousand line numbers, for individual line service.

2. A second thousands digit assigned to any desired block of one thousand lines provides one thousand additional numbers, used to identify the second station on 250 2-party lines, and to identify the second, third, and fourth stations on 250 4-party lines of the 1000-line block;

3. Second and third thousands digits assigned to a 1000-line block, provide two thousand additional numbers, used to identify the additional stations involved when 500 lines are 2-party lines, and an equal number are 4-party lines; and 4. Second, third, and fourth thousands digits assigned to a 1000-mile block provide the three thousand additional numbers involved when all lines of the block are 4-party lines.

Related special features concern a reliable and economical arrangement for notifying a seized trunk extending to a 1000-line block, to which more than one thousands digit is assigned, of the specific thousands digit effecting its seizure and for storing that information and subsequently utilizing it.

A further related feature concerns an economical translator arrangement for so assigning the noted additional directory numbers of any concerned 1000-line block, that the individual, 2-party and 4-party lines served by that block of switching apparatus are apportioned on substantially the same basis among the four line-link frame of the block, as well as among the several primary switches of any such line-link frames.

IA. *General arrangement*

In the illustrated embodiment, the 1000-line switching blocks of our noted prior application are so arranged and so inter-connected with the thousands selector that a separate 1000-line switching block is used for each one thousand lines. The dialing of an initial digit in the thousands selector will direct the call to a predetermined group of trunks outgoing to other exchanges or will index the call as one to the local 1000-line switching block. If the initial digit indexes the local exchange, the second digit, the thousands-digit, will select a predetermined group of trunks extending to the 1000-line switching block associated with the thousands digit dialed. The hundreds, tens, and units digits will then be dialed and recorded in the selected 1000-line switching block pursuant to extending a connection to the desired called line.

As disclosed in the said prior application, a 1000-line switching block includes four line-links frames and one block-link frame, the line-link frames mounting the switches and related control apparatus of the subscriber's lines and the block-link frame mounting the switches and their related apparatus common to the switches of the subscriber's lines.

A frame, termed the thousands-link frame, mounts the selector switches and related control apparatus. The selector switches are accessible from the switches of the subscriber lines over originating trunks and have access to the switches of the block-link frame over thousands trunks.

In this embodiment, the multi-thousand line telephone system includes a number of line-link frames and one block-link frame for each four line-link frames, there being one thousands-link frame for each block-link frame.

IB. *The crossbar switches*

In the illustrated embodiment, the crossbar switches are assumed to be of the type disclosed in our noted prior application. These switches provide for ten horizontal connections therethrough and a varying number of vertical connections therethrough.

IC. *The line-link frames*

The line-link frames of this invention are assumed to be similar to the line-link frames of our noted prior application. However, the originating trunks outgoing from the line-link frames are now extended to the thousands-link frames. The arrangement for interconnecting the trunks of the line-link frames with the thousands-link frames is shown in Fig. 3 and will be described hereinafter.

ID. *The block-link frame*

The block-link frame of the 1000-line switching block of the noted prior application may be adapted for use in the disclosed multi-thousand line switching system by making several variations in the control apparatus of the block-link frames. These variations result from the following arrangements and features of the multi-thousand line system.

1. With the provision of a thousands-selector, outgoing calls to other exchanges are handled by the selector instead of being handled by the block controller, thereby rendering the outgoing call apparatus of the block controller of the block-link frame unnecessary.

2. With the dialing of an initial digit in the selector to index the exchange containing the called line, the initial-digit register of the block-coupler of the block-link frame is rendered unnecessary.

3. With the noted arrangement for providing party-line number assignment, the station registers of the block couplers of the block-link frames are rendered unnecessary as the station-location information is determined by the thousands digit dialed. However, this information is relayed to the block translator which in turn controls the block couplers to signal the desired station on the called line, thereby requiring variations in the block translators and the block couplers.

4. Since no calls outgoing to other exchanges reach the block-link frames, the consequently reduced traffic therethrough permits a reduction in the number of verticals (for trunk connections) on the block-link primary and block-link secondary switches, to sixteen verticals.

The ten double-path horizontals, each accommodating a separate pair of block links, and the two hundred block links per frame remain the same, as the number of block-link primary switches and block-link secondary switches per frame remain the same. The two hundred block links, with a reduced number of verticals are more than ample to handle the busy-hour traffic in excess of the maximum probable requirements.

ID1. *The block couplers*

The block couplers of this invention are generally similar to the block couplers of our prior application. However, with the noted variations resulting from the provision of a thousands selector stage, the block couplers of the multi-thousand line system are somewhat modified.

Each trunk extending to the block-link frame has a block coupler inserted between it and its assigned vertical on the block-link primary switch. Each block coupler includes sufficient apparatus to couple the associated thousands trunk (outgoing from the thousands-link frame) to the switchboard apparatus on the block-link frame incidental to controlling the switching apparatus in the extension of connections responsive to the dialing of called numbers; to supply talking current to the calling line; to supply ringing current and talking current to the called line; and to perform the related circuit functions required of trunk equipment in an exchange of the character under discussion.

Each block coupler includes a number of control relays and a hundreds, a tens, and a units digit register for recording the respective dialed digits, pursuant to selecting the called line in the concerned switching block. The block couplers also include a thousands register, comprising three relays, which is controlled from the thousands-link frame for recording the thousands digit dialed and controlled by the block translator in order to control the supplying of ringing current to the called line.

Features of the invention residing in or involving the block couplers include the following:

1. The thousands-register relays record the thousands digit dialed in the thousands-link frame and transmit this information to the block translator. The thousands-register relays are then reset, if necessary, according to the translated digit information and perform the functions of station relays to control the ringing current in order that the selected station is signalled;

2. The combined thousands register and station relays of the block coupler are so arranged that by I. D. F. jumpers, any block coupler may be used with any of the block translators providing the various party-line combinations;

3. The thousands register of any block coupler is energized only momentarily by control from the thousands-link frame and is thereafter maintained energized by a local circuit. An arrangement is provided whereby the thousands register is deenergized by the opening of the local circuit provided that the concerned coupler is not used in the extension of a connection; and 4. An arrangement is provided whereby the positive release of all operated digit registers is ensured, responsive to the abandoning of a connection.

Additional features of the block coupler will become apparent as the description progresses.

ID2. *Common control equipment*

Another object of the invention is to provide the block-link frame with efficient common control equipment to take digit information from the block couplers and to extend connections across the block-link frame according to this information, and to cooperate with the line controllers in extending calls to the line-link frame containing the called line. This common control equipment includes the following:

1. A block controller switch, similar to the block controller switch of our noted prior application, for making the required connection with the block-link primary switch serving the block coupler which has called-in the common apparatus;

2. A block controller, which is called-in on all calls to supervise the extension of connections across the block-link frame. This block controller is generally similar to the block controller of our noted prior application. However, since the thousands-link frame handles all outgoing calls, the block controller disclosed herein does not have any outgoing call apparatus, as noted. The block controller cooperates with the line controller on the concerned line-link frame to match a path to a called line by way of the concerned block-link primary switch, an idle block link, an idle terminating trunk leading to the concerned line-link frame, and an idle line-link accessible therefrom and leading to the line-link primary switch serving the called line; and 3. A block translator, which translates the hundreds, tens, and units digits information of the called number into primary, fives, and units information, as disclosed in our noted prior application. The block translator is also arranged to translate the thousands digit information received from the thousands register of the block coupler and exercise control thereover to cause the block coupler to signal the desired station on the called line according to the thousands digit dialed.

The block translator and the block controller each consist largely of a group of relays interconnected to perform their respective functions, including the general ones indicated above.

IE. *The thousand-link frame*

A further object of the invention is to render economies in switching apparatus possible and to render the service more flexible, by assigning several thousands digits to any desired 1000-line switching block, as noted, whereby the dialing of any one of these thousands-digits causes the concerned block to select the station location on the called line according to the digit dialed. With the thousands-digit determining the 1000-line switching block containing the called line and controlling the apparatus on the selected switching block to select the station on the called line, the following features and arrangements arise:

1. With a maximum of four stations on any one line, four separate indications must be transmitted to the selected switching block to mark the desired station. Three separate station wires extending from the thousands-link frame to the selected block-link frame are sufficient to carry this station-location information as the absence of a marking indication marks the first station on the called line. Consequently, if the 1000 lines of any switching block are all single-party lines, none of the three station wires extending to the concerned switching block are energized;

2. With the common control apparatus of the 1000-link frame being individual to the calling thousands-coupler for a very short period of time, the station-location information must be transmitted to the selected switching after an idle path has been found extending thereto and before the common control apparatus of thousands-line frame is cleared out;

3. With three station wires per trunk outgoing from the thousands-link frame, an arrangement is provided whereby these wires need not pass through any switching apparatus, thereby greatly reducing the cost of the switching apparatus normally required when using the thousands digit for a stations digit; and 4. An arrangement is provided whereby the station-location wires are part of the standard switchboard wiring and may be jumpered at the intermediate distributing frame, as required.

In the illustrated embodiment, the initial digit dialed is employed to select between the various exchanges. The initial digit 1, likely to be inadvertently simulated, is arranged to be absorbed, leaving nine initial digit values (2 to 9 and 0) for assignment as exchange digits. Of these nine initial digit values, one is used to index the local exchange, leaving eight initial digits available for assignment to other exchanges reached directly from the local exchange.

The dialing of the initial digit assigned to the local exchange causes no immediate switching operation to occur on the thousands-link frame (such operation being delayed until the thousands digit has been dialed) but the dialing of an initial digit assigned to any other exchange, causes an immediate switching operation to occur on the thousands-link frame to extend a connection over an idle trunk line to the called exchange.

In the illustrated embodiment, the full equipment of any thousands-link frame includes 10 thousands-link primary switches and 10 thousands-link secondary switches interconnected horizontal to horizontal by one hundred pairs of thousands links, ten pairs to each switch. The 200 thousands-links thus obtained are ample to handle the busy hour traffic in excess of the maximum probable requirements.

Each primary switch on the thousands-link frame has 16 verticals for 16 incoming trunk connections and each secondary switch has 20 verticals for 20 trunk connections outgoing from the frame.

The originating trunks, incoming from the line-link frames are terminated on an intermediate distributing frame from whence they may be jumpered to verticals on the thousands-link switches, as desired. Additionally, the incoming tie trunks (or the incoming branches of two-way trunks) are also terminated on an intermediate distributing frame and jumpered to the other verticals on the thousands-link primary switches, as desired.

The 160 primary-switch verticals provided on one fully-equipped thousands-link frame (16 verticals per primary switch) can accommodate various combinations of originating trunks and incoming trunks, and are assigned depending upon the traffic requirements and balancing arrangements.

The two hundred secondary-switch verticals on any fully-equipped thousands-link frame (20 per secondary switch) are terminated on an intermediate distributing frame from whence they may be jumpered to verticals on the block-link primary switches according to their digit-value assignment, or they may be jumpered to trunks outgoing to other exchanges.

IE1. *The thousands-coupler*

Each trunk (originating or incoming) extending to the thousands-link frame has a thousands-coupler inserted between it and its assigned vertical on a thousands-link primary switch. Each thousands coupler includes sufficient apparatus to couple the associated originating or incoming trunks to the switchboard apparatus on the thousands-link frame incidental to controlling the switching apparatus in the extension of connections responsive to the dialing of the called number.

Each thousands-coupler includes a number of control relays and registers for recording the initial digits and the thousands-digits dialed.

IE2. *Common control equipment*

It is a further object of the invention to provide the thousands-link frame with efficient common control equipment to take the registered initial-digit and thousands-digit information from the thousands couplers and extend the connection across the thousands-link frame accordingly. This common control equipment includes the following:

1. A thousands controller 1400, which is called in on all calls whether outgoing or local, for supervising the extension of connections across the thousands-link frame. On all calls, it matches an idle path across the thousands-link frame from the primary switch associated with the calling thousands coupler over an idle thousands-link to a trunk in the called group.

2. Section-connecting apparatus comprising section-preference relays 1200 and section-connect relays 1300, for individualizing the calling thousands coupler with the thousands controller and for associating the primary switch of the concerned coupler with the thousands controller.

3. Digit-connecting apparatus comprising digit relays 1500, digit-connect relay 1600, and grouping terminals 1700 for associating the thousands controller with the thousands-link secondary switches having access to the trunks selected by the digits dialed, pursuant to the extension of a connection from the concerned primary switch to a selected secondary switch over an idle thousands link.

The thousands controller, the section-connecting apparatus, and the digit-connecting apparatus consist largely of a group of relays interconnected to perform their respective functions, including the general ones indicated above.

The thousands controller calls-in for test the trunks of the group leading to the exchange indexed by the digits dialed. An arrangement is provided whereby if the trunks in any one group are greater than the number of trunks that can be tested at one time, a subgroup allotter breaks the trunks groups into several sub-groups and calls in the subgroups in succession on successive controller call-ins.

A special feature of the common control apparatus on the thousands-link frame is that it is provided with grouping terminals and associated relay apparatus enabling any thousands trunk to be assigned to any trunk group as desired.

Additional features of the control apparatus on the thousands-link frame will appear as the description progresses.

IF. *The drawings*

The accompanying drawings, comprising Figs. 1 to 40, disclose a preferred embodiment of the invention as follows:

Fig. 3 (parts 1 to 6) is a complete single-line trunking diagram showing the relationship existing between the crossbar switches employed to extend connections to and from lines and the trunks of exchange B of Figs. 1 and 2;

Figures 1, 2:
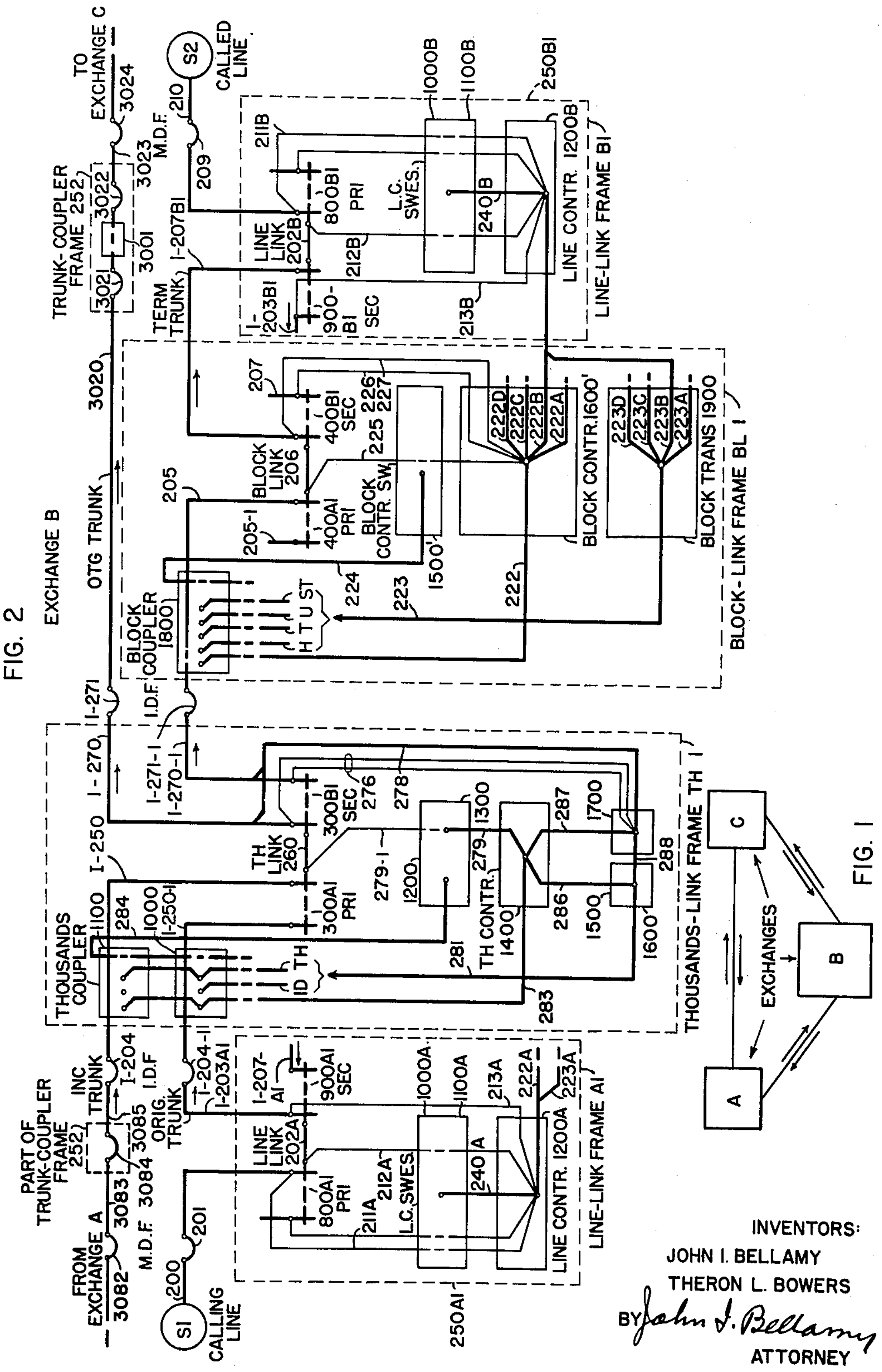
Fig. 1 shows three interconnected telephone exchanges A, B, and C, of which exchange B contains telephone switchboard apparatus embodying the features of the invention.
Fig. 2 is a single-line block diagram of the apparatus in exchange B which is employed in extending connections to and from lines of exchange B and in extending connections to and from trunks interconnecting exchange B with exchanges A and C.
Figure 4:
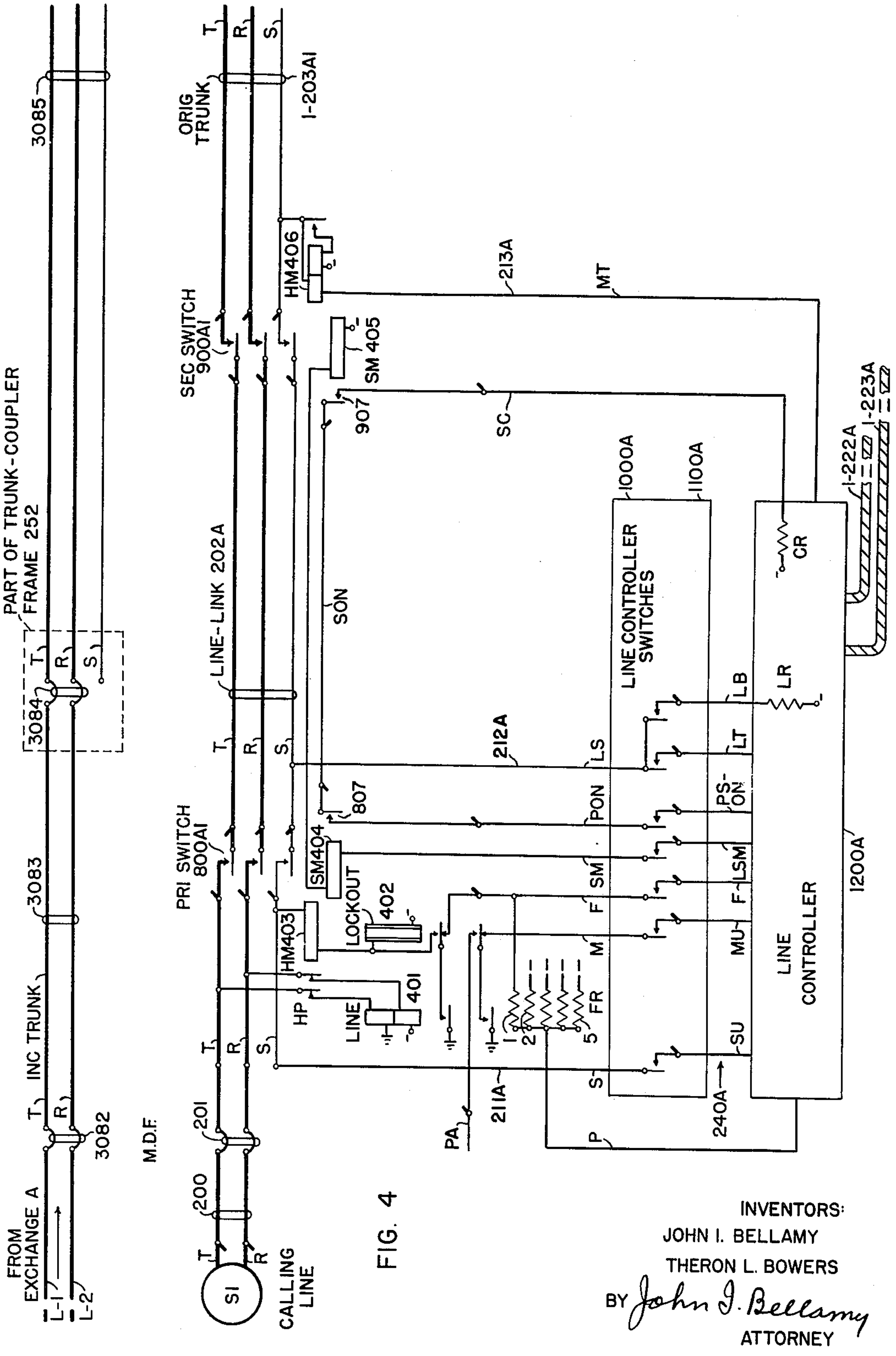
Figure 5:
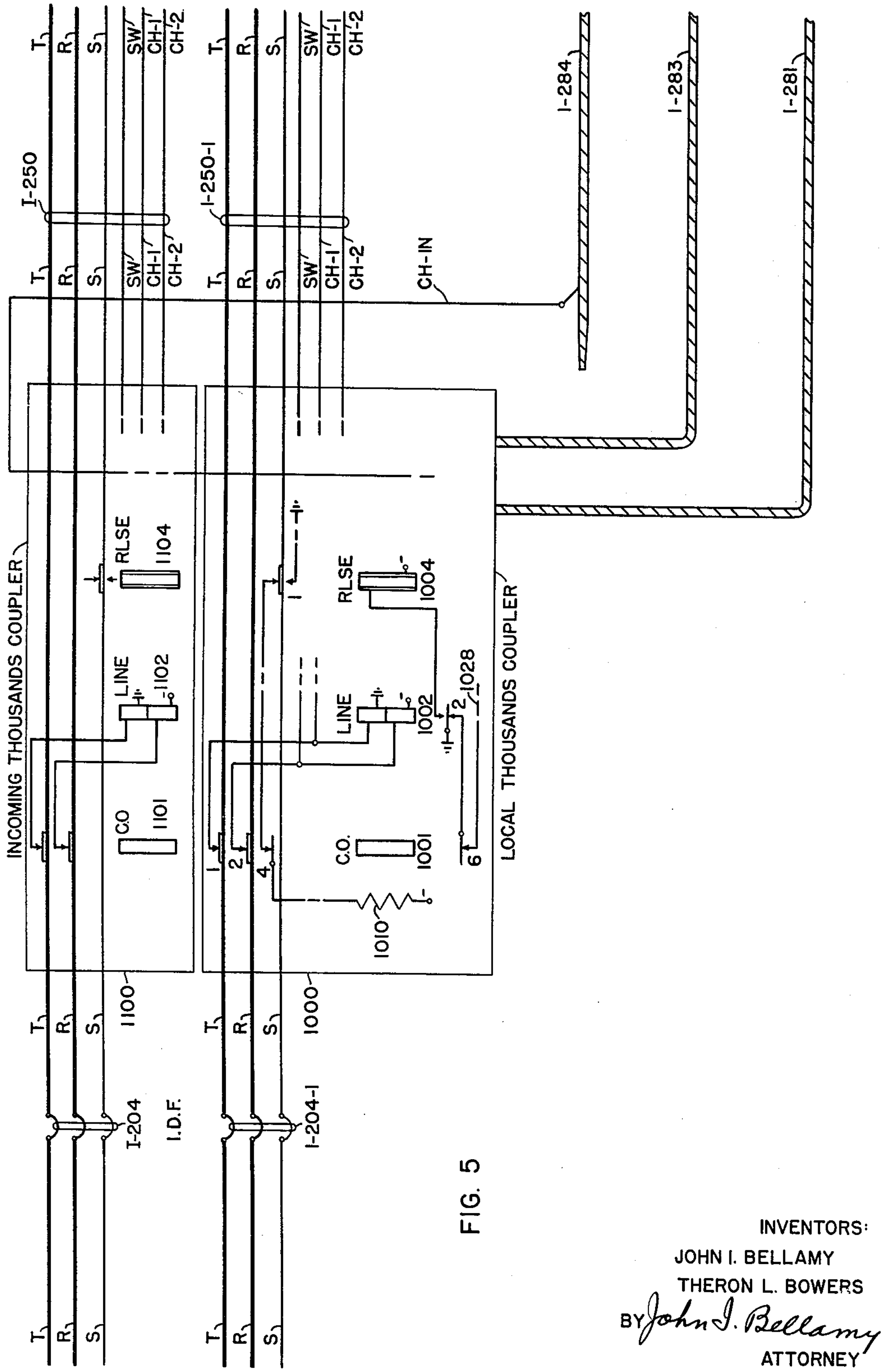
Figure 6:
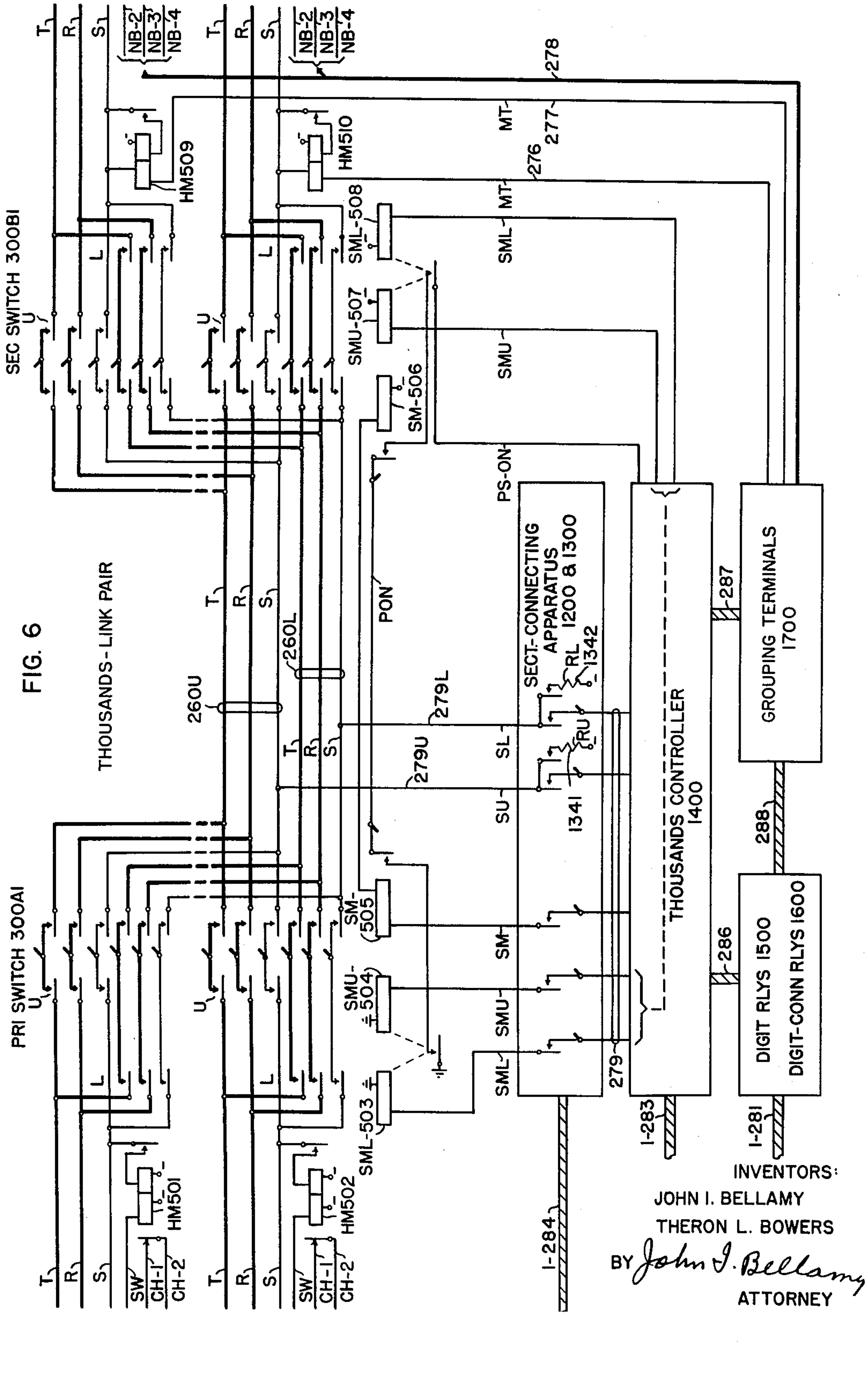
Figure 7:
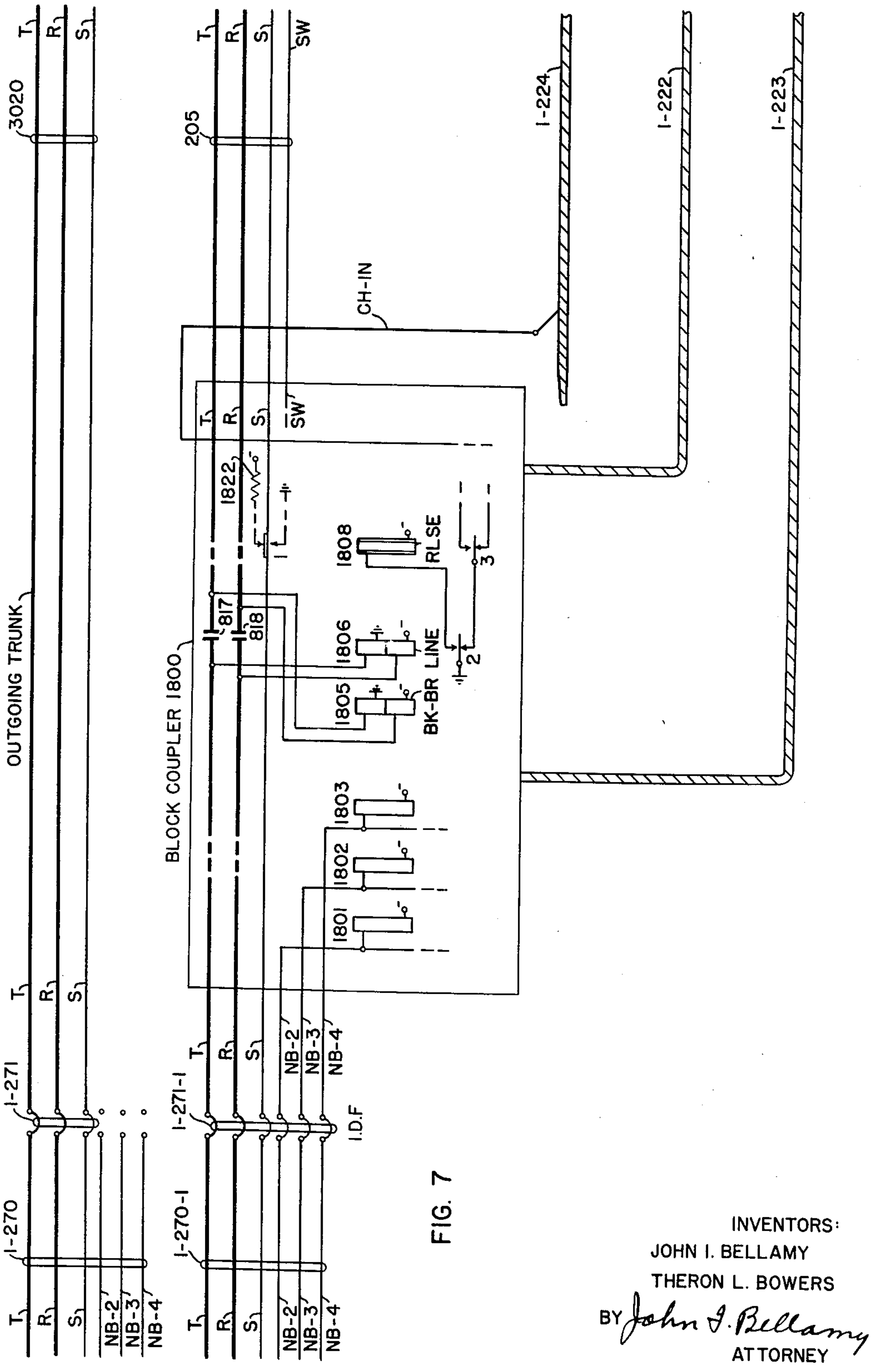
Figure 8:
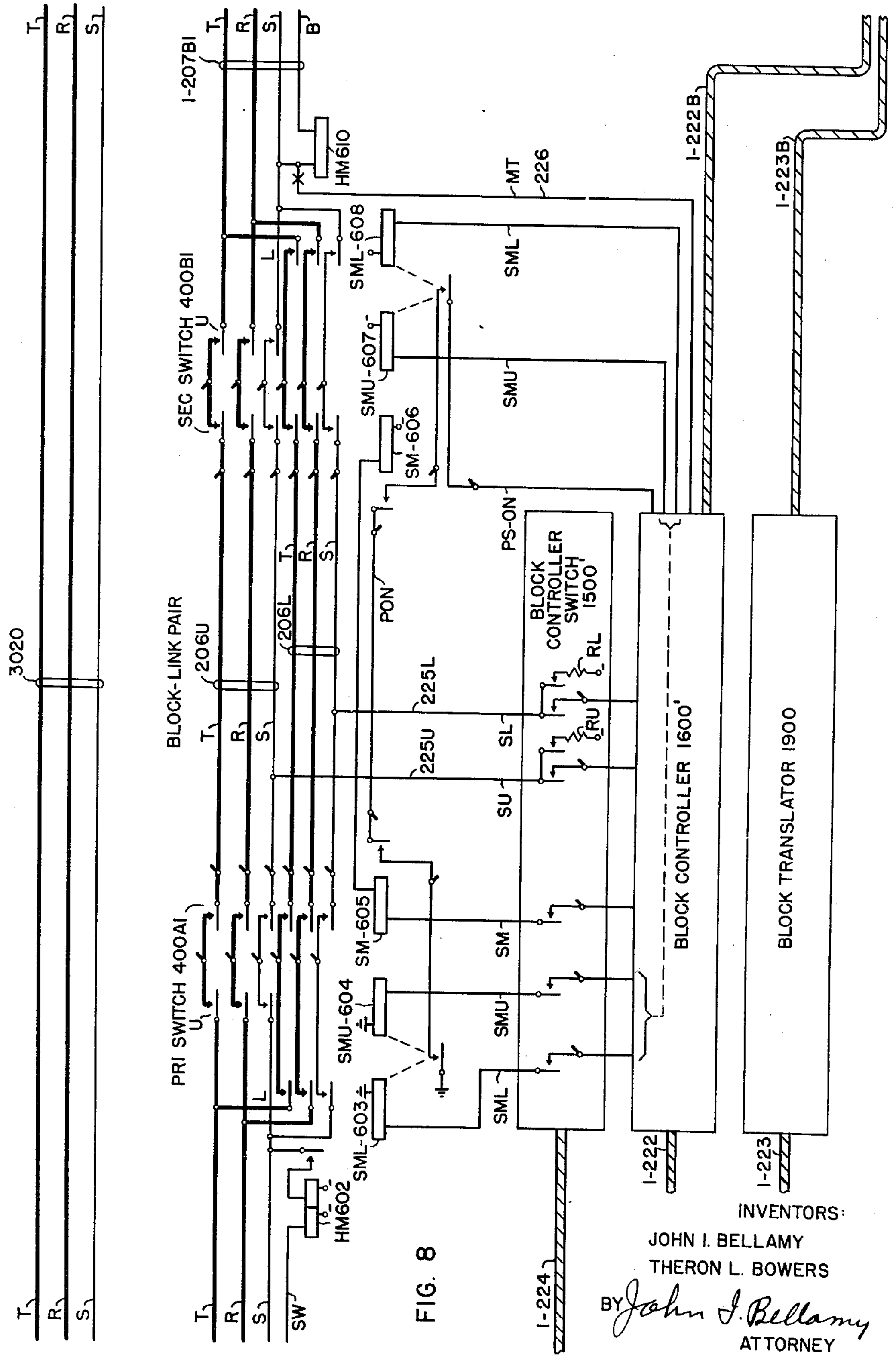
Figure 9:
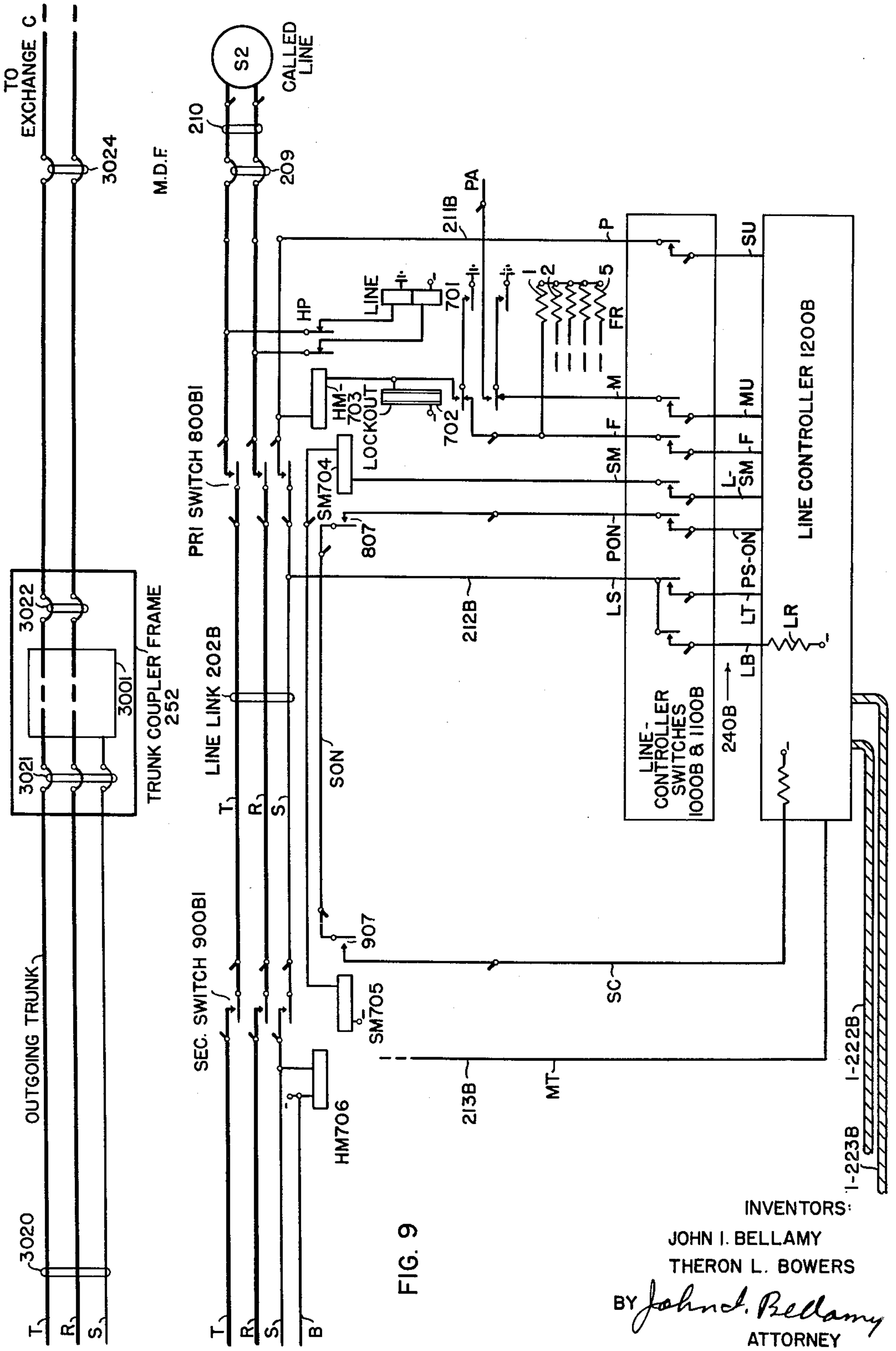
Figure 11:
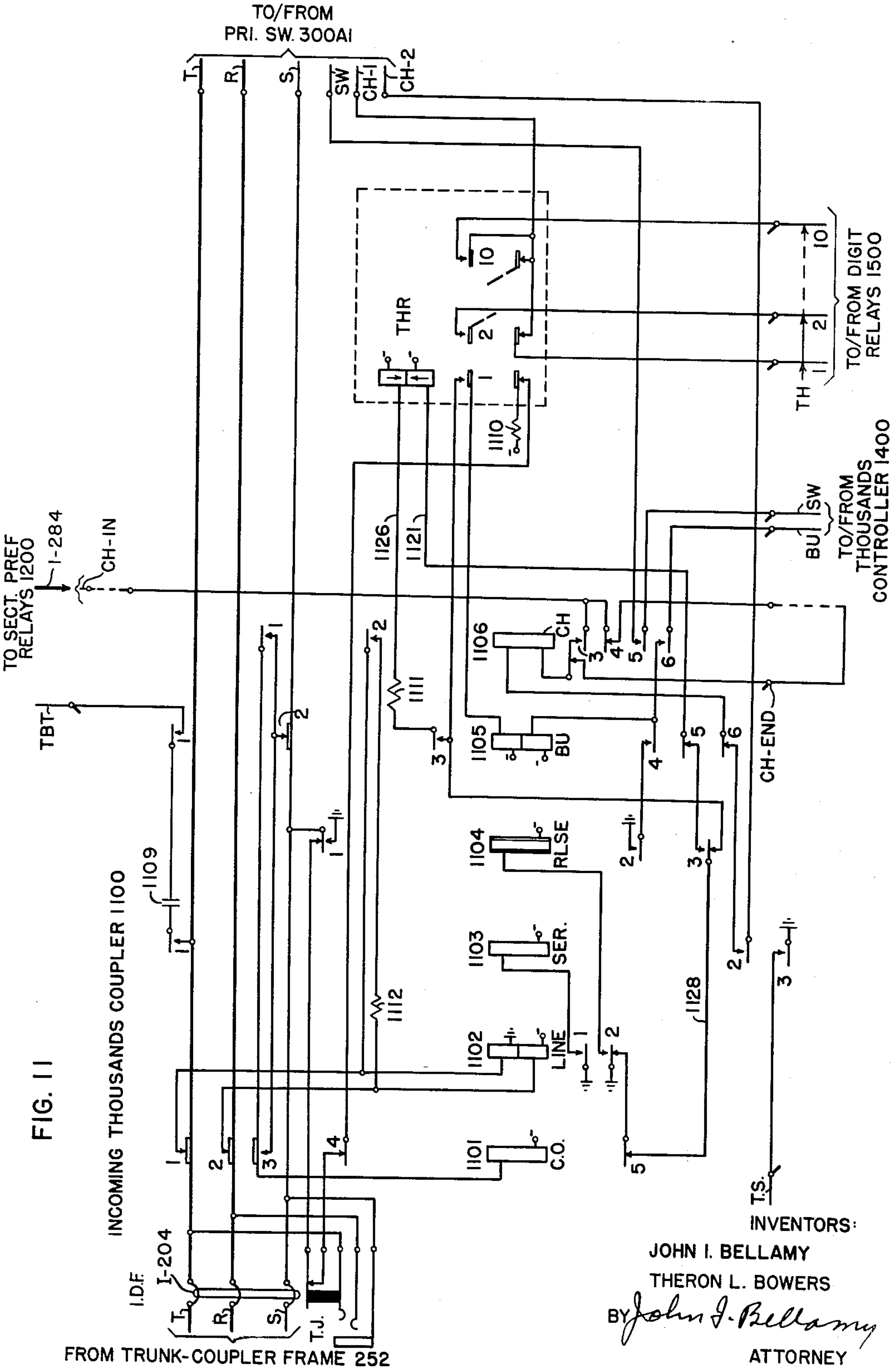
Figures 12, 25, 26, 27, 28, 29, 30, 31, 32, 33:
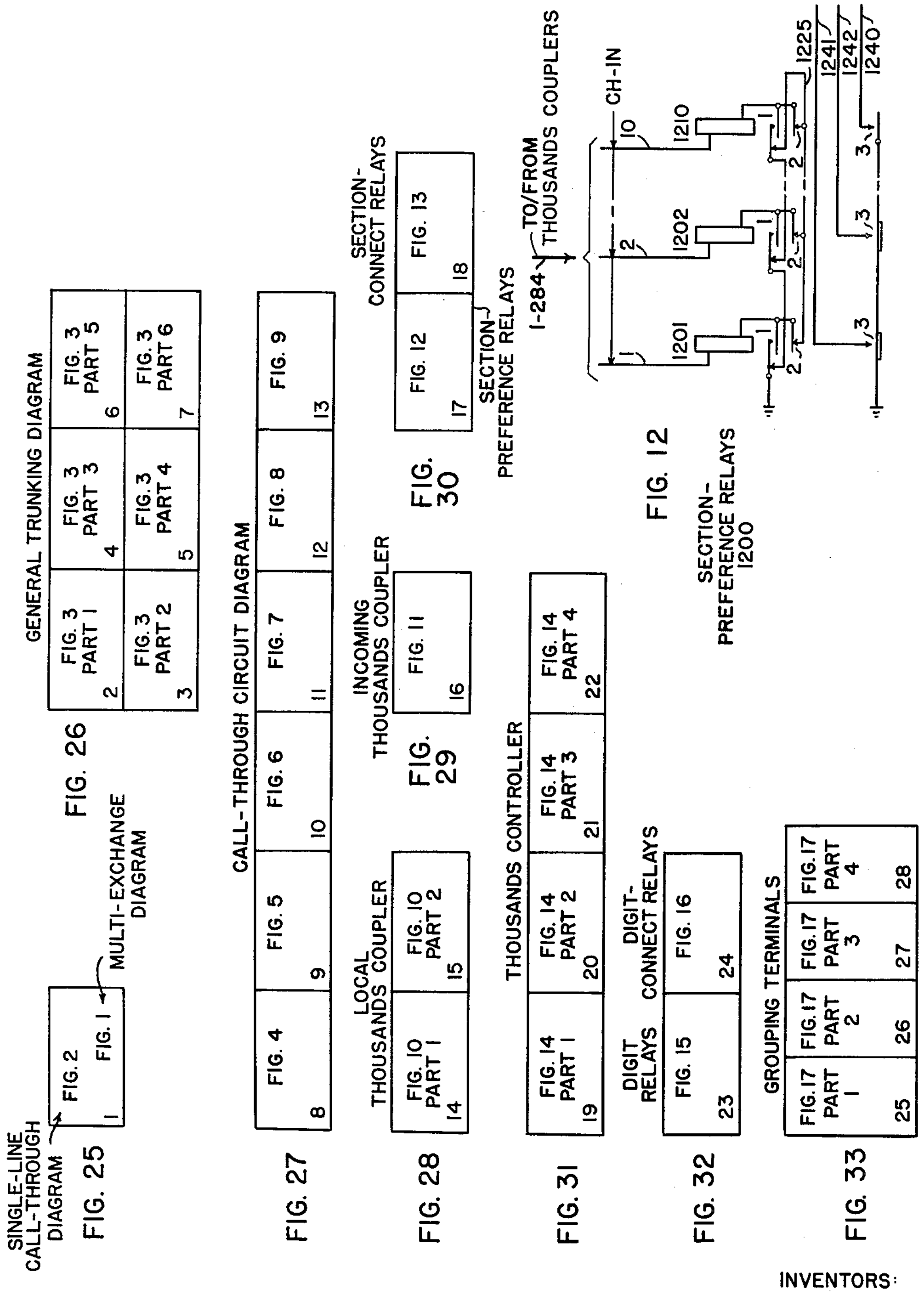
Figure 13:
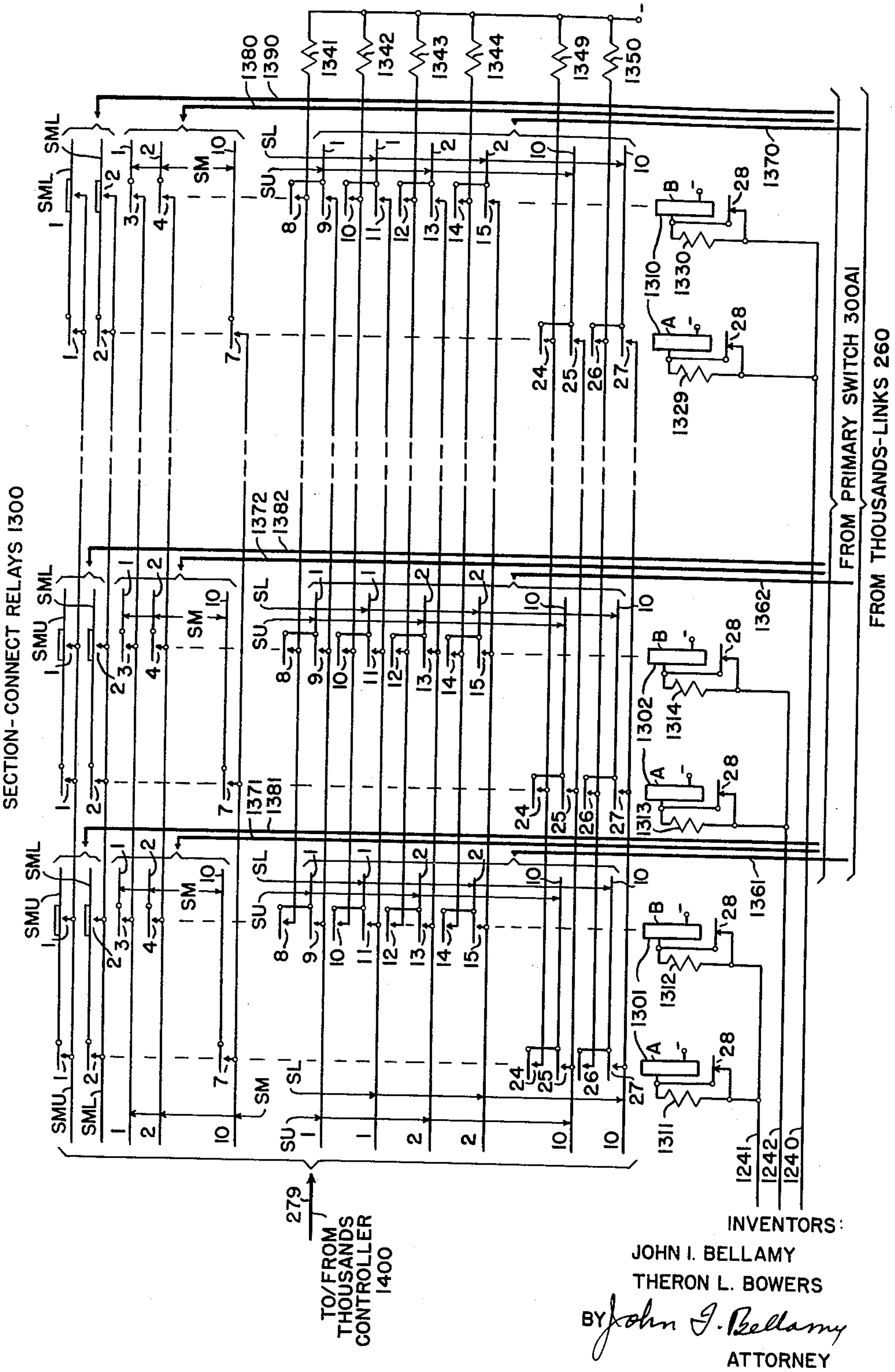
Figure 15:
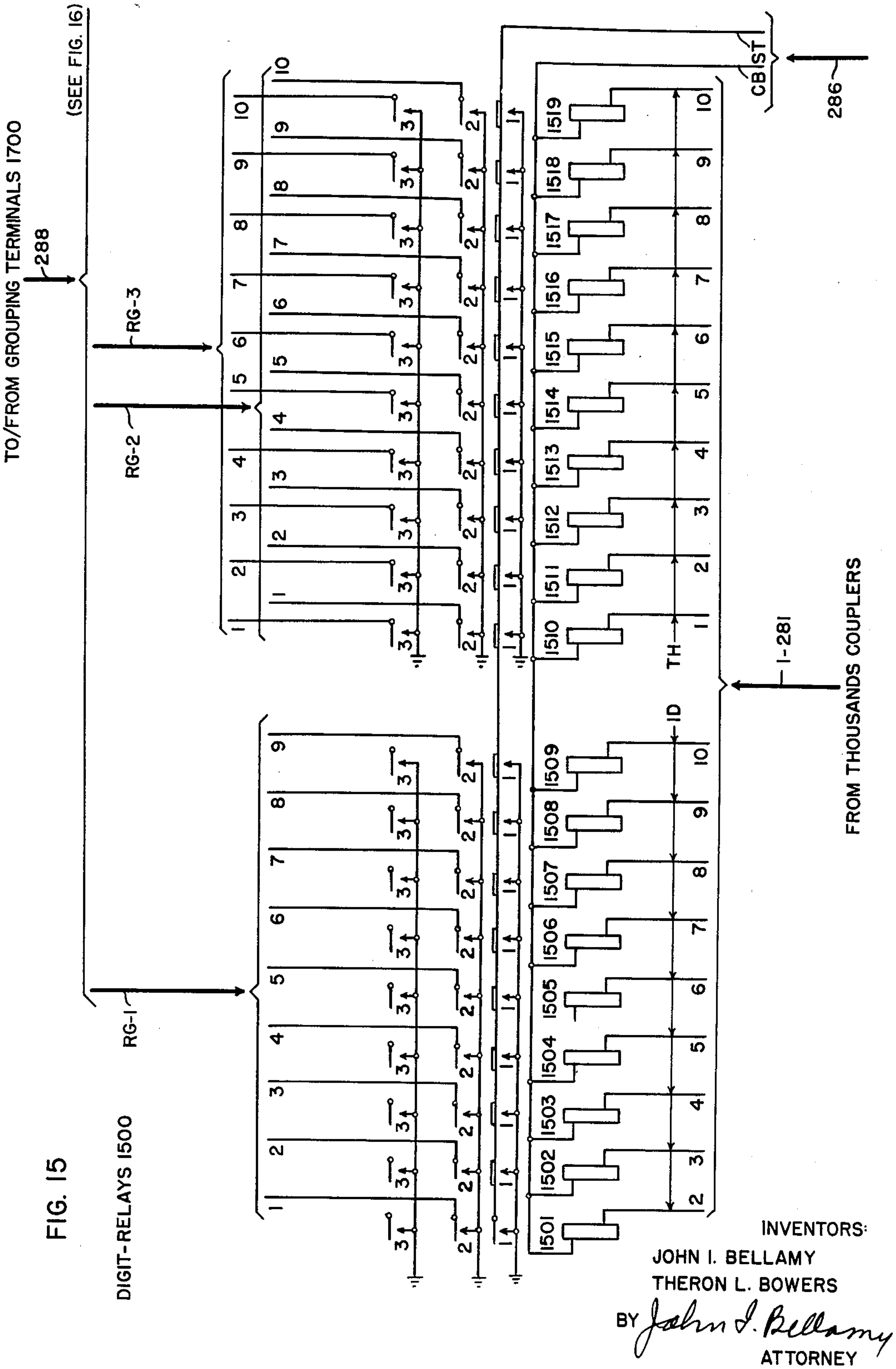
Figure 16:
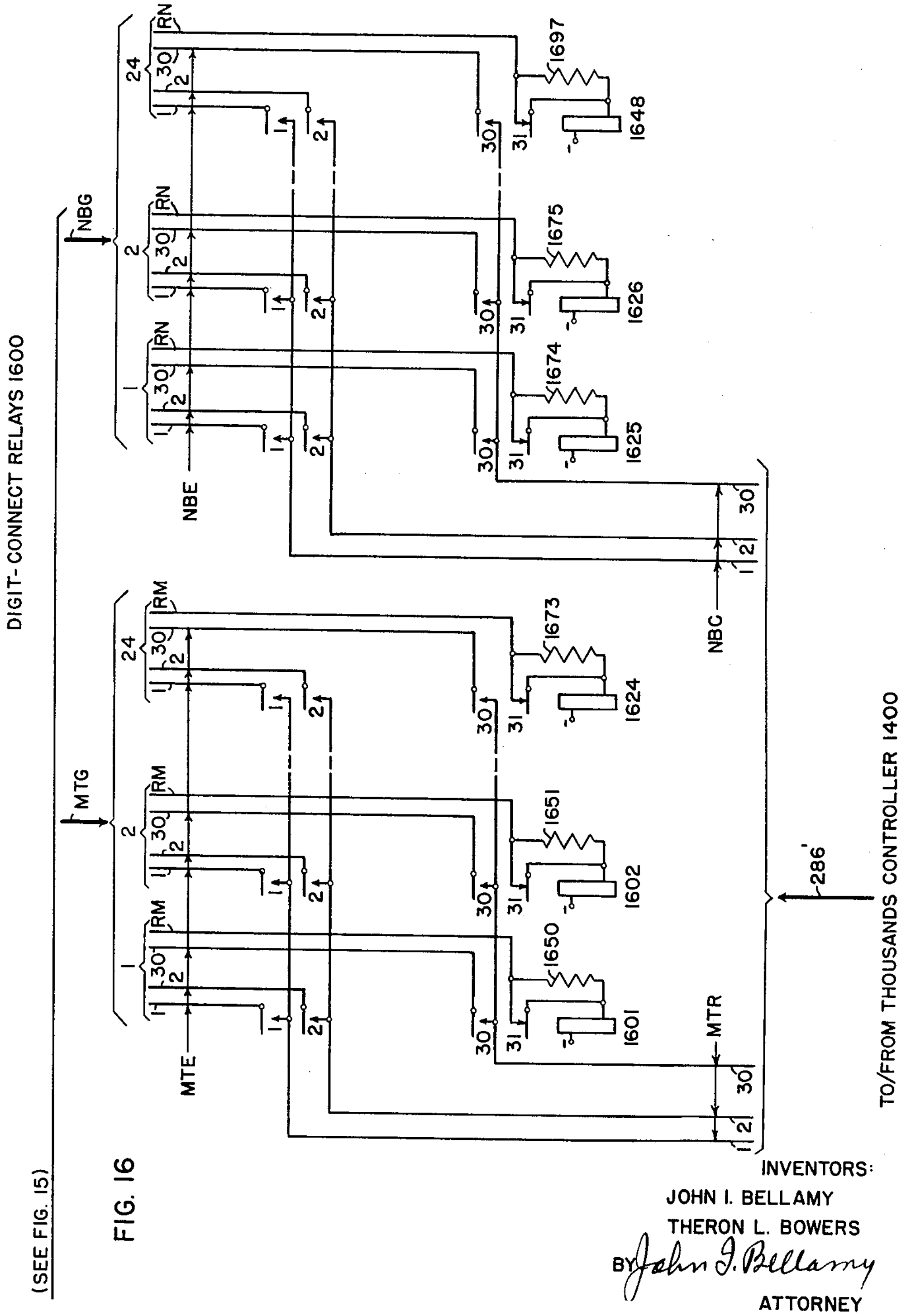
Figure 23:
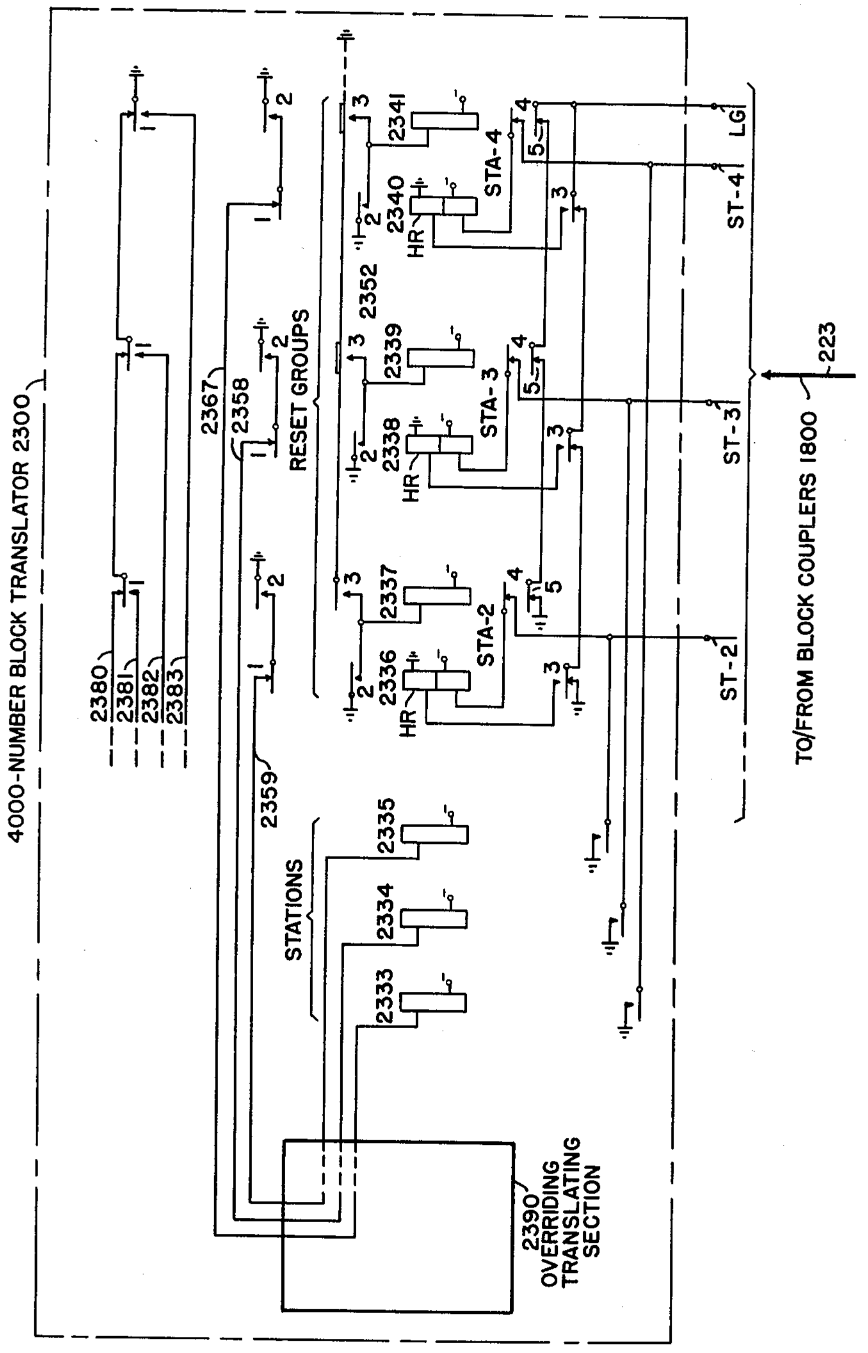
Figure 24:
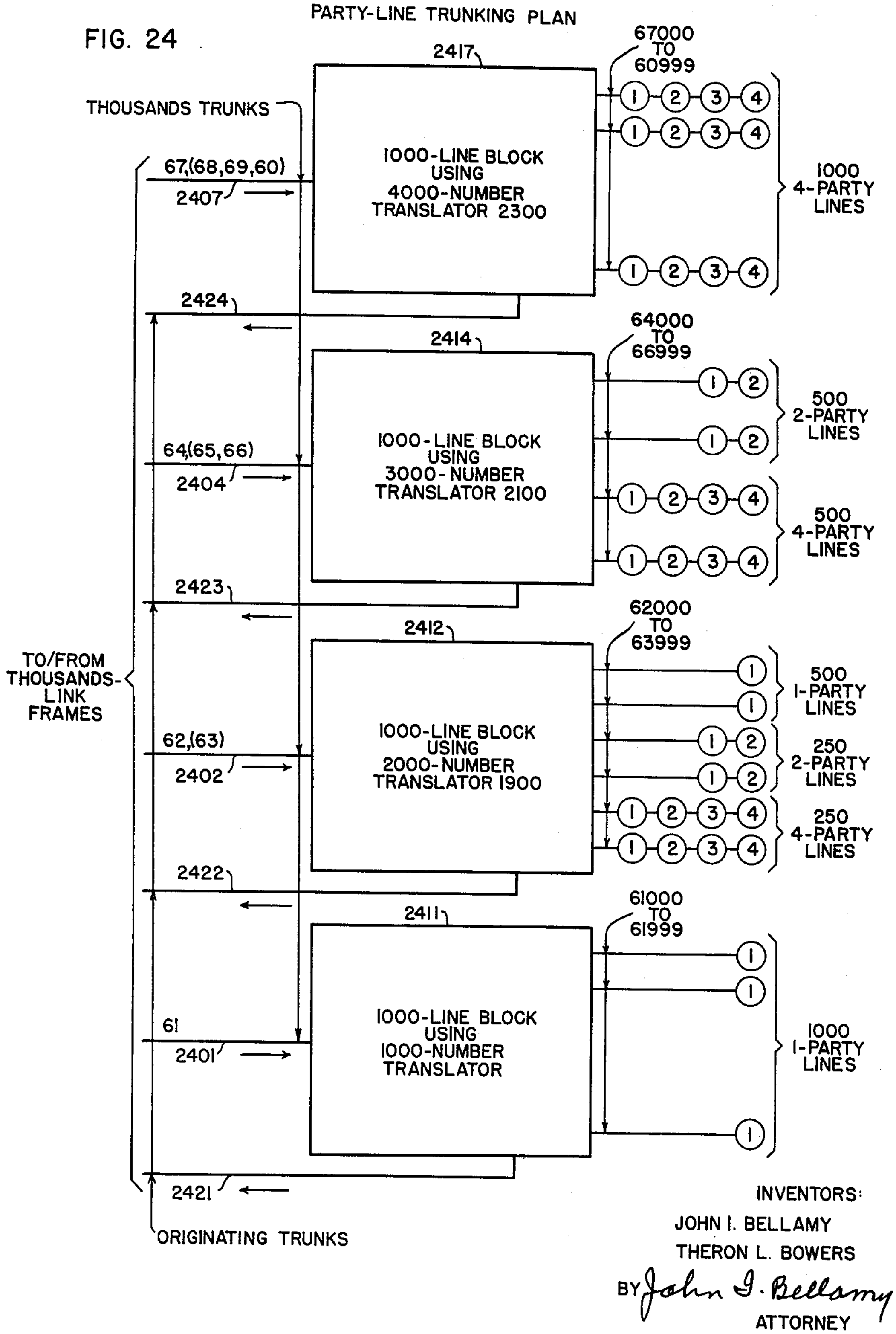
Figures 34, 35, 36, 37, 38, 39, 40:
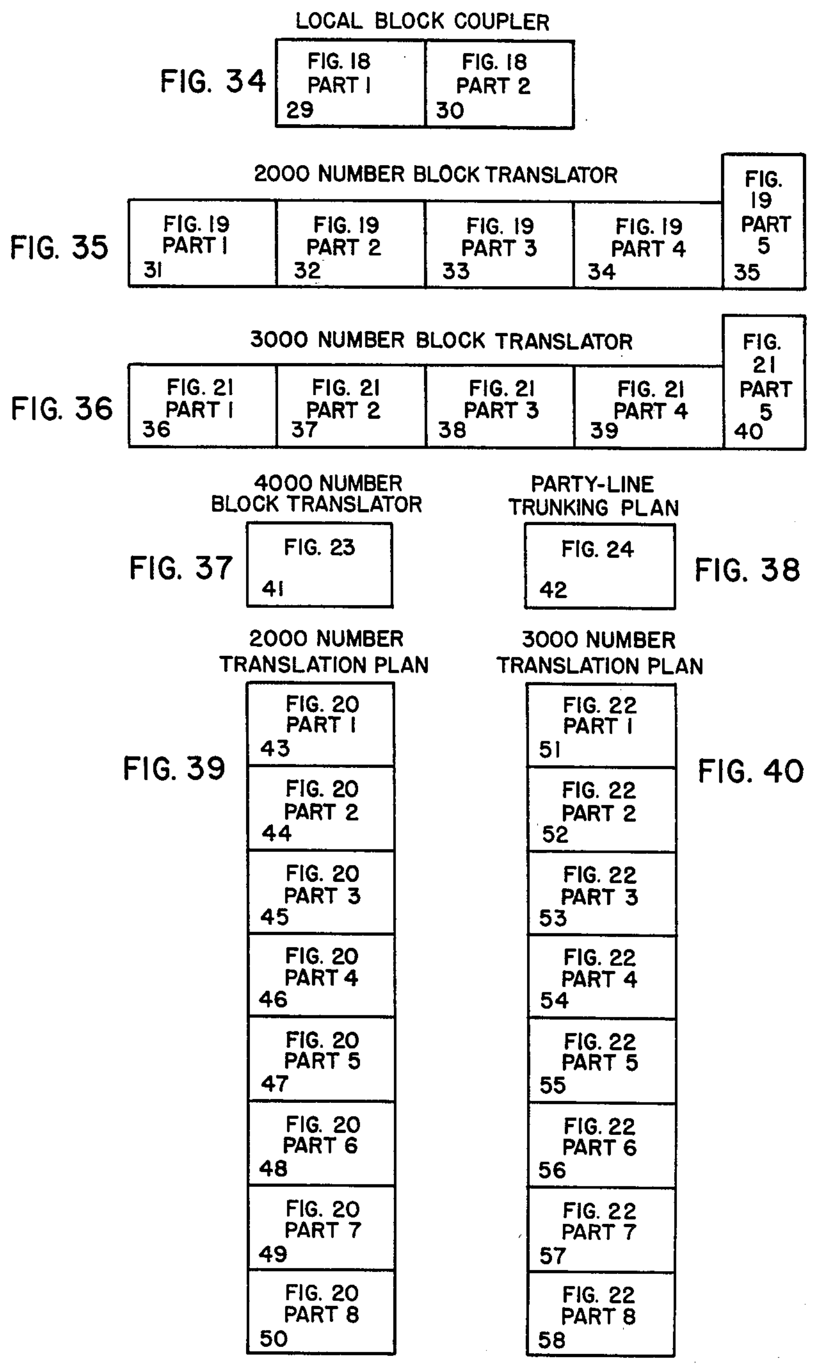

Figs. 4 to 9, taken together, comprise generally a re-drawing of Fig. 2 to show in more detail the circuit paths and intimately associated electrical equipment employed in extending the talking connections indicated in Fig. 2; Fig. 4 shows apparatus on line-link frame A of Fig. 2; Figs. 5 and 6, show with some amplification, the apparatus on the thousands-link frame of Fig. 2; Figs. 7 and 8, show with some amplification, the apparatus on the block-link frame of Fig. 2; and Fig. 9 shows the apparatus on line-link frame B of Fig. 2;

Fig. 10 (parts 1 and 2) shows the circuit details of the thousands-couplers on the thousands-link frame of Fig. 2;

Fig. 11 shows the circuit details of the incoming thousands-coupler of the thousands-link frame of Fig. 2;

Figs. 12 and 13 show circuit diagrams of the apparatus on the thousands-link frame for interconnecting the thousands-link primary switches with the thousands controller;

Fig. 14 (parts 1 to 4) shows in circuit diagram the thousands controller on any thousands-link frame;

Figs. 15 and 16 show in circuit detail the apparatus on the thousands-link frame for interconnecting the thousands-link secondary switches with the thousands controller;

Fig. 17 (parts 1 to 4) is a circuit and wiring diagram of the grouping terminals of the thousands controller;

Fig. 18 (parts 1 and 2) shows in circuit diagram the block coupler of any block-link frame of Fig. 2;

Fig. 19 (parts 1 to 5) is a circuit diagram of a block translator arranged to provide translation of 2000 numbers assigned to the one-thousand lines of any block-link frame;

Fig. 20 (parts 1 to 8) shows the line numbering and translation plan for the 2000-number translator of Fig. 19;

Fig. 21 (parts 1 to 5) is a circuit diagram of the block translator of Fig. 19 modified to provide translation of 3000 numbers assigned to the one-thousand lines of any block-link frame;

Fig. 22 (parts 1 to 8), is a line numbering and translation plan for the 3000-number block translator of Fig. 21;

Fig. 23 shows in circuit detail, a portion of the block translator of our noted prior application modified to provide 4000-number translation;

Fig. 24 is a party-line trunking plan which shows the party-line combinations possible with the 1000-line switching blocks using various translators;

Figs. 25 to 33 (on the same sheet of drawings with Fig. 12), show the way in which the sheets of drawings on which Figs. 1 to 17 are drawn, should be arranged in order to be understood best;

Figs. 34 to 40 show the way in which the sheets of drawings on which Figs. 18 to 24 are drawn, should be arranged in order to be understood best.

The devices shown at IDR, THR, HR, TR, and UR (Figs. 10, 11, and 18) are magnetic impulse counters similar to those described in our noted prior application.

IG. *General operation* (*Figs. 1 and 2*)

Fig. 1 shows three exchanges A, B, and C. As indicated, exchanges A and C are each connected to exchange B by trunk lines over which connections in each direction can be established. The apparatus indicated in Fig. 2 is all located in exchange B of Fig. 1.

In Fig. 2, the apparatus of exchange B includes the main distributing frame M. D. F., through which the subscriber lines and trunks are interconnected to the switchboard apparatus; an intermediate distributing frame I. D. F., through which the incoming and originating trunks are interconnected with the thousands-link frame and through which the thousands trunks are interconnected with the block-link frame and the trunk coupler frame; a number of block-link frames such as block-link frame BL–1; a number of thousands-link frames such as thousands-link frame TH–1; four line-link frames A, B, C, and D for each block-link frame; and a trunk-coupler frame 252.

The general purpose of the apparatus of exchange B is to interconnect the subscriber lines of the exchange with each other and with the inter-exchange trunk lines as desired.

As noted, the line-link frames of this invention are similar to the line-link frames of our prior application. Each of the four line-link frames associated with any one block-link frame terminates 250 lines, thereby providing a capacity of 1000 lines for each block-link frame. In this embodiment any block-link frame and its associated line-link frames is termed a 1000-line switching block.

Line-link frame A1 (shown at 250A1) for example, connects any one of the 250 subscriber lines which it serves, with an idle one of the group of originating trunks, such as originating trunk 1–203A1 and connects any of its terminating trunks, such as terminating trunk 1–207A1, with any called idle subscriber line connected in the exchange.

As noted, line-link frame A1 is provided with a number of line-link primary switches 800A1 and a number of secondary switches 900A1. The subscriber lines are extended to the primary switches in the manner shown for calling line 200, which is brought in through jumper 201 on the M. D. F. to its own individual vertical location on line-link primary switch 800A1. The originating trunks extend from respective vertical locations on the line-link secondary switches, such as shown for originating trunk 1–203A1. The terminating trunks are located on their own respective vertical locations on the line-link secondary switches, such as shown for terminating trunk 1–207A1. The line-link primary and secondary switches are interconnected by a number of line links, one of which is shown at 202A.

The line-link primary and the line-link secondary switches are shown in complete circuit diagram in Fig. 9 of our noted prior application. However, the specific interrelation between the line-link primary and line-link secondary switches by way of the line links is shown in Fig. 3, part 1, of the drawings.

The apparatus on the line-link frame further includes a line controller 1200, and line controller switches 1000A and 1100A which are shown in complete circuit diagram in Figs. 10, 11, and 12 of our prior application. The control wires in group 240A interconnect line controller 1200A with the line controller switches 1000A and 1100A.

The general purpose of the line controller apparatus is to control the interconnection of lines with trunks through switches 800A1 and 900A1 over the two-way line links 202A and this general control resides primarily in line controller 1200A. The purpose of the line-controller switches is to interconnect line controller 1200A with any concerned line-link primary switch, such as 800A1, over conductors such as 211A and 212A.

Line-link frame B1 (shown at 250) contains apparatus similar to that of line-link frame A1, the correspondence between the apparatus of the line-link frames of any 1000-line switching block being shown by employing the letter A as a suffix for each reference character applied at line-link frame A and the letter B as a suffix for each reference character applied at line-link frame B. Since this disclosure deals with a number of the 1000-line switching blocks, the suffixes A, B, C, and D, are followed by a numeral to identify the concerned switching block. Likewise, the block-link frames have a numerical suffix corresponding to the 1000-line switching block which they are associated. For example, block-link frame BL–1 is associated with the line-link frames A1, B1, C1, and D1 and block-link frame BL–10 is associated with line-link frames A10, B10, C10, and D10. Additionally, the thousands-link frames are identified by a numerical suffix in a manner similar to the block-link frame designations. However, there is no specific interrelation between the thousands-link frame and the other frames, as there is between the block-link frames and the line-link frames. For example, a call from line-link frame A1 may be directed to thousands-link frame TH–2 and then extended to block-link frame BL–3. In all cases, however, the call outgoing from block-link BL–3 is directed to the concerned one of the four line-link frames A3, B3, C3, or D3.

The purpose of the thousands-link frame is to extend connections received over an incoming trunk 3085 and over an originating trunk 1–203A1 to an idle outgoing trunk such as 3020 in a called group or over an idle thousands trunk, such as thousands trunk 1–270–1 to the block-link frame associated therewith. For this purpose, the thousands-link frame is provided with a number of thousands-link primary switches such as 300A1 and with a number of thousands-link secondary switches such as 300B1, interconnected by thousands links 260. The circuit diagram of switches 300A1 and 300B1 are similar to the block-link primary and secondary switches as shown in the Figs. 13 and 14 respectively of our noted prior application.

The incoming and originating trunks such as 3085 and 1–203A1 are required to be suitably coupled to the switchboard apparatus at the thousands-link frame in order that the necessary digit information as to call destination be recorded and acted upon. This general function is assigned to the thousands couplers 1000 and 1100, which are individual to the originating and incoming trunks, respectively. Incoming coupler 1100 is connected individually with incoming trunk 3085 by I. D. F. jumper I–204 while the local thousands coupler 1000 is connected individually with originating trunk 1–203A1 through jumper 1–204–1. Respective conductor sets I–250 and 1–250–1 extend the concerned incoming and originating trunks beyond the thousands coupler to vertical locations on the thousands-link primary switch 300A1.

The outgoing trunks and thousands trunks, such as 3020 and 1–270–1, extend from respective vertical locations on thousands-link secondary switches 300B1. The specific interrelation between the thousands-link primary and secondary switches by way of the thousands links is shown in the general trunking diagram of Fig. 3 of the drawings, parts 3 and 4.

General control over the primary and secondary switches on the thousands-link frame is exercised by thousands controller 1400, shown in complete circuit diagram in Fig. 14. When any connection which has reached a thousands coupler is ready to be extended, section-connecting apparatus 1200 and 1300 (shown in complete circuit diagram in Figs. 12 and 13) operate to connect the thousands controller 1400 to the concerned thousands-link primary switch over conductors in group 279 and to individualize the calling coupler with the thousands controller over conductors in group 283.

When the connection being handled by the thousands coupler is for a line of the local exchange, the initial-digit and thousands-digit information is stored in the thousands coupler and is forwarded to digit-connecting apparatus 1500 and 1600 (shown in complete circuit diagram in Figs. 15 and 16) over conductors in group 281. The digit-connecting apparatus exercises control over thousands controller 1400 over conductors in group 286.

Grouping terminals 1700, associated with thousands controller 1400 over conductors in group 287 and associated with digit-connecting apparatus 1500 and 1600 over conductors in group 288, are jumpered to assign initial digit or thousands digit values to the thousands and outgoing trunks as desired, and to associate the thousands trunks with the proper number-block wires NB–2 to NB–4 for transmitting thousands digit information to the concerned block-link frame.

The thousands controller 1400 acts accordingly to the information received from the digit-connecting apparatus to extend the connection to outgoing trunk 3020 or to thousands trunk 1–270–1 depending on the digit information recorded in the thousands coupler. The connection is thereby extended from an originating trunk 1–203A1 through the concerned thousands coupler 1000, over the respective primary switch vertical to the thousands or outgoing trunk associated with the verticals of the thousands-link frame secondary switches via thousands link 260.

The purpose of the block-link frame is to extend connections received over a thousands trunk, such as 1–270–1, to an idle terminating trunk, such as 1–270B1, extending to the line-link frame terminating the called line.

For this purpose, the block-link frame is provided with a number of block-link primary switches such as 400A1 and a number of secondary switches such as 400B1 interconnected by block links 206. The circuit diagram of switches 400A1 and 400B1 is generally similar to the circuit diagram of switches 1300 and 1400 shown in Figs. 13 and 14 of our noted prior application. However, switches 400A1 and 400B1 include 16 verticals instead of the 20 verticals shown in the above noted application.

The thousands trunks, such as 1–270–1, are required to be suitably coupled to the switchboard apparatus of the block-link frame in order that the necessary digit information as to call destination be recorded and acted upon. This general function is assigned to block couplers 1800 which are individual to the respective thousands trunks. Block coupler 1800 is connected individually with the thousands trunk 1–270–1 through jumper 1–271–1 on the I. D. F. Conductor group 205 extends the thousands trunks beyond the block coupler to its vertical location on the block-link primary switch 400A1. Terminating trunks such as 1–207B1 extend from vertical locations on block-link secondary switch 400B1 to I. D. F. terminals. The specific interrelation between the block-link primary and block-link secondary switches via the block links is shown in the general trunking diagram of Fig. 3, parts 5 and 6.

General control over the primary and secondary switches on the block-link frame is exercised by block controller 1600′ which is similar to the block controller 1600 of our noted prior application, except that the outgoing call apparatus has been removed.

When any connection which has reached a block coupler is to be extended, block controller switch 1500′ (similar to the block controller switch 1500 of our noted prior application) operates to connect block controller 1600′ to the concerned block-link primary switch 400A1. The calling block coupler is thereupon connected directly to block controller 1600′ over respective conductors in group 222.

Since the connection being handled by the block coupler associated with the block controller is for a called line in the local exchange, the hundreds, tens, units and stations digit information which has been recorded in the block coupler is forwarded to block translator 1900 over conductors in groups H, T, U, and ST.

Block translator 1900 is shown in circuit diagram in Fig. 19 of the drawings, which shows the relay section thereof. The block translator has associated with it a pin-terminal section (not shown) which is similar to the pin-terminal section 1900 of Fig. 19 of our noted prior application.

Block translator 1900 is a 2000-number block translator for translating the two thousand numbers assigned to a 1000-line switching block to provide the noted varying combinations of party lines. The general purpose of the block translator is to determine from the dialed digit information which one of the four line-links frames A to D associated with the called block-link frame terminates the called line, as well as to determine the specific location of the called line on such frame, and to transmit appropriate translated information to the line controller apparatus on the called line-link frame according to the location of the called line thereof. This information is transmitted to the concerned line-link frame over conductors in one of the groups 223A to 223D.

The line controller apparatus on the called line-link frames acts according to the information received from the block translator to prepare for the extension of the connection to the specific called line. Among other things, this line controller apparatus identifies the line-link frame at block controller 1600′, following which the block controller and the line controller apparatus cooperate in extending a connection to the called line over an idle path. The cooperation between the block controller and line controller apparatus on the concerned line-link frame is controlled over respective conductor groups 222A to 222D.

IG1. *Station S1 calls station S2*

The subscriber at calling station S1 on line 200, to call a subscriber at station S2 on line 210, removes his receiver, waits for dial tone from a local thousands coupler and then dials the directory number of station S2, comprising five digits, termed the initial, thousands, hundreds, tens, and units digits.

When the receiver is removed from calling station S1, a connection is extended from line 200 through the primary and secondary switches 800A1 and 900A1, over an associated idle line-link such as 202A, and over an idle originating trunk such as 1–203A1 to the local thousands coupler 1000, in the manner described in our noted prior application.

Upon receiving a dial tone signal over the established connection, from the thousands coupler 1000, the subscriber at calling station S1 operates his usual calling device to transmit impulses representing the five digits of the directory number. These digits comprise an initial digit indexing exchange B, a thousands digit indexing the block-link frame containing the called line, and hundreds, tens, and units digits indexing the called line in the concerned line-link frame. The initial digit and the thousands digits are recorded on respective registers in the thousands coupler 1000 before any external switchboard action occurs. After the thousands digit has been dialed, the section-connecting apparatus comprising section-preference relays 1200 and section-connect relays 1300 associates thousands controller 1400 with the primary switch 300A1 which serves thousands coupler 1000. At the same time, thousands coupler 1000 is associated with thousands controller 1400 over the conductors in group 283. Also, at the same time, the dialed initial digit and thousands digit information is transmitted to digit-connecting apparatus 1500 and 1600 over the respective conductors ID and TH of group 281.

The digit-connecting apparatus 1500 and 1600, together with the grouping terminals 1700, thereupon determine the trunk group extending to the block-link frame which serve the called line and controls the thousands controller to cause it to test the thousands trunks of the dialed trunk group in order that an idle one may be matched with an idle thousands link to determine an idle path extending to the concerned block-link frame. The thousands links are tested over conductors in group 279 and the thousands trunks are tested over conductors in group 276 and 276′. From these tests the thousands controller matches an idle path for extending the called line to an idle block coupler on the called block-link frame. At the same time, the recorded thousands digit information is transmitted to the seized block coupler and registered on the thousands register therein as will be described hereinafter. When this occurs, the thousands controller causes its primary and secondary switches 300A1 and 300B1 to effect the mechanical selection of the matched line link 260, and energizes conductors in group 276 and 283 to cause the appropriate stackups of contact elements in the primary and secondary switches to extend the calling line over the above noted path to an idle block coupler. The section-connecting apparatus 1200 and 1300, the thousands controller 1400, and the digit-connecting apparatus 1500 and 1600 are now returned to common use, leaving the calling line 200 connected to local block coupler 1800 by way of line-link 202A, originating trunk 1–203A1, thousands link 260, and thousands trunk 1–270–1.

This described switching operation is completed in the inter-digit interval and the block coupler 1800 registers the hundreds, tens, and units digit on respective registers therein.

After the units digit has been dialed, block controller switch 1500′ associates the concerned block primary switch with block controller 1600′. At the same time, block coupler 1800 is associated with block controller 1600′ over the conductors in group 222. Also, at the same time, the dialed hundreds, tens, and units digit information is transmitted to block translator 1900, together with the thousands digit information recorded in the thousands coupler, over respective conductors in groups H, T, U, and ST.

The block translator 1900 thereupon determines the line-link frame which serves the called line (line-link frame B1 of line-link frame 250B1) and transmits thereto (over conductors in group 223B) translated digit information indicating the primary switch which serves the called line and indicating the specific vertical appearance of the called line on that switch. When this occurs, line controller 1200B identifies itself at block controller 1600′ and exercises control over conductors in group 240B to cause the line-controller switches to position themselves according to the switchboard location of the called line. The line links serving the primary switch on the called line-link frame are now tested over respective conductors 212B and this testing information is imparted to block controller 1600′ over respective conductors in group 222B. The line controller of the called line-link frame and the block translator and the block controller of the concerned block-link frame extend a connection to called line 210 and match an idle path thereto, in the manner described in our noted prior application. If the called line is idle, block coupler 1800 applies ringing current to the calling line according to the setting of the station register relays of the block coupler. When these operations have been completed, the block controller switches, the block translator, the block controller and the line controller apparatus of the called line-link frame are returned to common use leaving the connection intact between the calling and called lines.

When the call has been answered, the subscribers at station S1 and S2 may converse. When both subscribers have replaced their receivers, block coupler 1800 and thousands couplers 1000 release whereupon the existing connection is broken at each of the switches 800A1, 900A1, 300A1, 300B1, 400A1, 400B1, 900B1 and 800B1.

IG2. *Station S1 calls exchange C*

When the subscriber at station S1 on line 200 desires to call a subscriber at exchange C, he removes his receiver, waits for dial tone, and then dials the directory number of the subscriber in exchange C. This directory number includes an initial digit having a value assigned specifically to lines of exchange C. When the receiver is removed at calling station S1, the previously described operations occur on line-link frame A1 to extend a connection to an idle thousands coupler 1000. It may be assumed again that the calling line is extended to block coupler 1800 over line-link 202A and over originating trunk 1–203A1.

When the initial digit assigned specifically to exchange C is dialed and recorded in thousands coupler 1800, the thousands controller 1400 is immediately called in and sets the thousands-link secondary switch 300B1 with specific regard to the trunks in the group leading to the called exchange C. This occurs coincidentally with the association of thousands coupler 1800 with block controller 1400 over conductors 283, and with the operation of the section apparatus 1200 and 1300 to associate thousands controller 1400 with primary switch 300A1. The block controller 1400 extends the connection to an idle trunk in the called outgoing group in a manner similar to that previously described for extending a connection to an idle thousands trunk. With the connection being extended to the desired outgoing trunk associated with the called exchange, the switches 300A1 and 300B1 extend the calling line to trunk coupler 3001 of trunk coupler frame 252 and thence through trunk extension jumper 3023 and main-frame jumper 3024 to exchange C. When this occurs the thousands coupler 1000 "switches through" as will be hereinafter explained, and the connection from the calling line to the outgoing trunk is thereafter held by trunk coupler 3001. The circuit arrangements are such that the operations necessary to cause the extension to be made, occur with sufficient rapidity that the calling subscriber is not required to introduce an additional delay before proceeding to dial the remaining digits in the desired telephone number. The trunk coupler includes apparatus for repeating the succeeding digit impulses over the trunk line to apparatus of exchange C, which may be similar to the switchboard apparatus of exchange B. Coincidental with the "switching-through" operation, the items of common equipment on the thousands-link frame are disassociated from the established connection and are returned to common use.

The connection established from the calling line to the outgoing trunk is released responsive to operations occurring in trunk coupler 3001 when the receiver is subsequently replaced at the calling station S1.

IG3. *Calls from exchange A*

When exchange B is called from exchange A, the call reaches exchange B over an incoming trunk such as that illustrated. This trunk is extended to trunk coupler frame 252 over jumper I–204 to incoming thousands trunk coupler frame 252 and over jumper I–204 to incoming thousands coupler 1100, which is similar to the local thousands coupler 1000 except that it preferably does not apply dial tone upon being taken for use. Also since the initial digit indexing the exchange has been dialed in the calling exchange A, the thousands coupler 1100 does not include apparatus for registering the initial digit, as does the local coupler.

Following seizure of the incoming thousands coupler 1100, the call may be extended to any desired line in exchange B by dialing the appropriate thousands digit, followed by the hundreds, tens, and units digits of the directory number of the desired line and station thereon. The connection may be extended from thousands coupler 1100 to line 210 over conductor group I–250, the associated vertical location on thousands-link primary switch 300A1, and thence as hereinbefore described for a call originated at station S1.

II. GENERAL TRUNKING DIAGRAM (Fig. 3)

The general trunking diagram shown in Fig. 3, parts 1 to 6 will now be explained. In Fig. 3, the switching and trunking plan for the line-links frames, the thousands-link frames, and the block-link frames of Fig. 2 are shown more completely.

IIA. *The line-link frames*

Referring now to parts 1 and 2 of Fig. 3, it will be noted that the trunking diagram includes ten thousand lines or ten blocks of 1000 lines. The line-link frames B, C, and D of any one block of 1000 lines are similar to fully illustrated line-link frame A of the first block of 1000 lines.

Referring now to part 1 of Fig. 3, it has been chosen to illustrate the primary and secondary switches 800A1 and 900A1 as being similar to the primary and secondary switches 800 and 900 of our noted prior application. Each line-link frame provides for forty terminating trunks and forty originating trunks the same as in above noted application. However, on all occasions, the terminating trunks and the originating trunks are connected to terminals on the intermediate distributing frame from whence they may be jumpered to the appropriate thousands-link frame or to the outgoing trunks of trunk-coupler frame 252 by three-wire jumpers 204. The slip described in our noted prior application is also included in the line-link frame of this disclosure for the purposes of enhancing matching possibilities over the thousands trunks.

IIB. *The thousands-link frame*

Referring now to Fig. 3, parts 3 and 4, it will be noted that the trunking diagram includes 10 thousands-link frames TH–1 to TH–10. Thte apparatus on any thousands-link frame is similar to the apparatus on illustrated thousands-link frame TH–1 which comprises ten primary switches 300A1 and ten secondary switches 300B1.

Each primary switch is described as a 16 x 20 three-wire switch as it has sixteen vertical locations or cross paths and ten pairs of horizontal locations or longitudinal paths and each secondary switch 300B1 is described as a 20 x 20 three-wire switch as it has 20 vertical locations or cross paths and ten pairs of horizontal locations or longitudinal paths. Each pair of longitudinal paths contain a lower path L and an upper path U, each representing a separate thousands link 260. Each primary switch 300A1 terminates sixteen trunks on its verticals and ten pairs of thousands links 260 on its horizontals and each secondary switch 300B1 terminates twenty trunks on its verticals and ten pairs of thousands links on its horizontals. There are 200 thousands links 260, comprising one hundred pairs, which are connected in standard spread between the thousands-link primary and thousands-link secondary switches 300A1 and 300B1. This is, from any thousands-link primary switch 300A1, the ten pairs of thousands links extend respectively and in order to the secondary switches 300B1. The block links are used in pairs, rather than singly as shown on the line-link frames because of greater traffic across the thousands-link frame than across any one line-link frame.

When fully equipped, each primary switch 300A1 has a group of 16 thousands couplers associated therewith, such as thousands couplers 1000 and 1100. Each such group of couplers will be hereinatfer referred to as a section of thousands couplers or as a thousands-coupler section, there being a separate section for each primary switch 300A1.

The originating trunks from line-links frames A, B, C, and D of any one of the ten 1000-line switching blocks are carried from the line-link frames to the intermediate distributing frame I. D. F. over originating trunk cables such as cables OA1 to OD1. These trunk cables are terminated on terminals 1–203 of the intermediate distributing frame I. D. F. Likewise the trunk cables OA2 to OD2 are terminated on terminals 2–203, and so forth. Four hundred incoming trunks are included in incoming trunk cable I. T. C. extending from trunk coupler 252 to the intermediate distributing frame I. D. F. and are terminated on terminals 3085.

The three-wire trunk sets in connecting cable CC1 to CC10 are terminated on respective terminals 1–303 to 10–303 or the I. D. F. The connecting cables extend from the couplers of any thousands-link frame to respective terminals on the I. D. F. Three-wire jumpers 204 connect the originating trunks and incoming trunks, as required, to the couplers of the thousands-link frames. Originating trunks and incoming trunks may be jumpered to the thousands couplers only as required for the actual handling of the traffic. This enables such trunks to be diversified among the several sections of thousands couplers in any manner which may from time to time prove to be advantageous.

Referring now to Fig. 3, parts 3 to 6, it will be observed that the twenty verticals on the ten secondary switches 300B1 of thousands-link frame TH–1 serve as respective origin points for the 200 thousands trunks extending to the intermediate distributing frame. These 200 thousands trunks from frame TH–1 are terminated on terminals 1–270 while the trunks from other thousands frames are terminated on respective terminals 2–270 to 10–270. The other side of the intermediate distributing frame I. D. F. terminates the connecting cables CC11 to CC20 on respective terminals 1–370 to 10–370. Four hundred outgoing trunks are contained in outgoing trunk cable OTC extending to trunk coupler frame 252 from the I. D. F. and are terminated on terminals 8020. Three-wire jumpers 271 connect the thousands trunks to the block couplers on the block-link frame or to the trunk coupler as required, according to the digit assignment of the block-link frames by the jumpers on the grouping terminal 1700 and according to traffic requirements.

IIC. *The block-link frame*

Referring now to Fig. 3, parts 5 and 6, the crossbar switching apparatus on any block-link frame comprises ten primary switches and ten secondary switches such as 400A1 and 400B1. The trunking diagram discloses ten block-link frames BL–1 to BL–10 with each being similar to block-link frame BL–1. Each primary and secondary switch on any block-link frame is described as a 16 x 20 three-wire switch as it has 16 vertical locations or cross paths and ten pairs of horizontal locations or longitudinal paths. Each pair of horizontal paths contain a lower path L and an upper path U, each representing a separate block link 206. Each switch 400A1 or 400B1 terminates sixteen trunks on its verticals and ten pairs of block links 206 on its horizontals. Thus, there are two hundred block links 206, comprising one hundred pairs, which are spread by pairs between the block-link primary and secondary switches 400A1 and 400B1, as pointed out for the spreading of the thousands links on any thousands-link frame.

Each primary switch 400A1 has a group of sixteen block couplers associated therewith, grouped in sections, there being a separate section for each primary switch.

The block couplers of the block-link frames, one coupler for each vertical on the primary switch are jumpered to the thousands trunks of the thousands-link frame as hereinbefore noted.

The sixteen vertical locations on the ten secondary switches serve as respective origin points for the 160 terminating trunks, forty to each of the line-link frames A1, B1, C1, and D1 of the associated 1000-line switching block. Verticals 1 of the ten secondary switches of any frame serve as origin points for terminating trunks A1 to A10 of the associated line-link frame A, vertical 2 for trunks A11 to A20, verticals 3 for trunk A21 to A30, and verticals 4 serve as origin points for originating trunks A31 to A40. The forty terminating trunks B1 to B40 for line-link frame B extend similarly from verticals 5 to 8 of the associated block-link switches, the forty terminating trunks for line-link frame C extend from verticals 9 to 12 and the forty terminating trunks for line-link frame D extend from verticals 13 to 16 of the associated secondary switches.

Terminating cables such as cables TA1, TB1, TC1, and TD1 extend from terminals on the associated block-link frame BL1 to the terminating trunk terminals on the respective line-link frames A, B, C, and D of the associated 1000-line switching block. Terminating trunk cable TA2, TB2, TC2, and TD2, extend from terminals on block-link frame BL2, to the respective line-links frames A, B, C, and D of the second 1000 lines and terminating trunks TA10 to TD10 extend from terminals on block-link frame BL10 to the respective line-link frames A, B, C, and D of the tenth 1000 lines.

III. COMPLETING CALLS (FIGS. 4 to 9)

The operation of the system in completing calls will now be described with particular reference to Figs. 4 to 9, which show in more circuit detail the apparatus indicated on Fig. 2 of the drawings.

This part of the description covers the operation of the portions of the apparatus directly included in the talking path through a line-link frame, a thousands-link frame, and a block-link frame.

IIIA. *Locally originated calls*

The operations involved in making a locally originated call from station S1 on line 200 will now be described with reference to Figs. 4 to 9.

IIIA1. *Initiation of call*

When the receiver (not shown) is removed at calling station S1 (Fig. 4), the usual direct current bridge is closed across tip and ring conductors T and R of line 200, thereby operating line relay 401 through hold pilot contacts HP of the associated hold magnet HM–403 of line-link primary switch 800A1. Line relay 401 applies ground through contacts of lockout relay 402 to mark conductor M individual to the calling line and to mark the fives conductor F which is common to the five lines constituting the five groups in which the calling line is located.

Grounded fives conductor F applies a ground potential through fives resistor FR–1 to primary conductor P which is common to the 25 lines served by primary switch 800A1. There are ten such wires P on any line-link frame, a separate one for each switch.

As described in our noted prior application, grounding conductor P causes line controller 1200A1 to set line-controller switches 1000A1 and 1100A1 upon the calling primary switch 800A1 and to set them with specific reference to the group of five lines including the calling line. Upon being so set, the line controller switches close the indicated open points therein. Line controller 1200A1 now matches an idle path from calling line 200 to an originating trunk. This path may be assumed to be over line-link 202A to originating trunk 1–203A1. The test circuit for line link 202A from line controller 1200A1 is from link test conductor LT through contacts of one of the line controller switches to link-sleeve wire LS, connected to the sleeve of line link 202A. The test is for an idle-indicating battery potential on the sleeve of the link which is applied through the illustrated resistor LR in the line controller, link-battery wire LB and contacts of the line controller switches. If line-link 202A is busy, holding ground potential thereon masks the resistance supplied battery potential, causing the line-link to test busy. When the line-link is idle, the idle-indicating battery potential is effective and is received by the line controller.

When originating trunk 1–203A1 (being connected to thousands-coupler 1000 through jumper 1–204–1) is idle, line controller 1200A1 receives an idle-indicating battery potential over match-test conductor MT–213A, through the left-hand winding of hold magnet HM–406, over sleeve conductor S of originating trunk 1–203A1 and jumper 1–204–1, through contacts 1 of release relay 1004, through break contacts 4, of cut-off relay 1001 and other contacts not shown, and through current-limiting resistor 1010. On the other hand, when originating trunk 1–203A1 is in use, the idle-indicating battery potential on its sleeve conductor S is replaced by ground potential through make contacts 1 of release relay 1004.

Upon matching a path over line-link 202A to originating trunk 1–203A1, line controller 1200A grounds link-select magnet wire LSM closing a circuit through contacts of the controller switches and over selector magnet wire SM for primary and secondary select magnets SM–404 and SM-405 which are associated with the primary end and with the secondary end, respectively, of line-link 202A. The select magnets thereupon operate to effect the mechanical selection of line-link 202A at primary switch 800A1 and secondary switch 900A1. When both of the select magnets have operated to effect the noted selection, battery potential from resistor CR in line controller 1200A1 is extended through contacts of the select magnets and contacts of the line controller switches to the primary-secondary off-normal wire PS-ON, leading to the line controller.

Upon receiving battery potential over wire PS-ON, line controller 1200A1 operates hold magnet HM-403 and HM-406 to extend the calling line over the selected line-link 202A to the matched originating trunk 1-203A1. Hold magnet HM-403 is operated by the line controller from the application of ground potential to the illustrated sleeve units conductor SU, which extends through contacts of one of the line-controller switches to sleeve conductor S-211A and thence to battery through hold magnet HM-403 and lockout relay 402 in series. Upon operating hold magnet HM-403 closes the illustrated stackup of contacts of primary switch 800A1 to extend calling line 200 to line-link 202A. Additionally, it opens its illustrated hold pilot contacts HP to disconnect the line relay 401 (in the manner of the usual cut-off relay), whereupon line relay 401 restores.

Lockout relay 402, upon operating in series with hold magnet HM-403, prepares for placing the associated line in lockout condition if called upon to do so.

Line controller 1200A operates hold magnet HM-406 by applying ground potential to match-test conductor MT-213A thereby closing a circuit through the left-hand winding of hold magnet HM-406 and thence to battery through resistor 1010 in the thousands coupler 1000 over the previously traced path. Upon operating, hold magnet HM-406 connects conductors T, R, and S of line-link 202A to the corresponding conductors of originating trunk 1-203A, completing the extension of the calling line to an idle originating trunk. At the same time, hold magnet HM-406 locks itself to ground through its right-hand winding to sleeve conductor S of trunk 1-203A1. Line controller 1200A1 maintains the operate circuits of hold magnets HM-403 and HM-406 closed for an interval sufficient to permit the seized thousands coupler 1000 to return holding ground over the sleeve conductors of seized originating trunk 1-203A1. Shortly thereafter, controller 1200A1 clears out and permits the line-controller switches 1000A1 and 1100A1 to clear out, leaving the extended connection held by ground applied to the sleeve conductor thereof by the seized thousands coupler.

IIIA2. *Seizure of thousands coupler 1000*

When the local thousands coupler 1000 is seized by the described extension of a connection thereto from calling line 200 over line link 202A, originating trunk 1-203A1, and jumper 1-204-1, line relay 1002 operates over the calling line through back contacts 1 and 2 of cut-off relay 1001. Line relay 1002, at its front contacts 2, operates release relay 1004 which transfers the sleeve conductor S of originating trunk 1-203A1 from battery through resistor 1010 to holding ground through make contacts 1 of release relay 1004. The established connection from the calling line to the thousands coupler is thereby maintained after the line controller apparatus of Fig. 4 has cleared out.

As will be described hereinafter with reference to Fig. 10, thousands coupler 1000 returns dial tone to the calling line and the usual calling device is operated to transmit series of circuit interruption impulses corresponding in number to the value of the digits of the directory number. On each such circuit-interruption impulse in a series, comprising one to ten impulses, line relay 1002 is momentarily restored and delivers one ground impulse through break contacts 6 of cutoff relay 1001 to wire 1028 extending to the digit registers (not shown in Fig. 5). The recording of the dialed digits and the operation of the coupler in extending the connection will be described in detail hereinafter.

On the dialing of any initial digit 2 to 0 (the initial digit 1 being absorbed) the initial digit register makes connection with the corresponding one of the nine initial digit leads in cable 1-281 extending to the digit relays 1500 of Fig. 6. One of these leads (in the illustrated embodiment, lead ID6), corresponds to the initial digit assigned to thousands trunks extending to the 1000-line switching blocks of exchange B, and is rendered ineffective at the digit relays 1500, as shown in Fig. 15. The remaining initial digit leads may correspond to respective groups of trunks outgoing to exchange C.

When the initial digit dialed is one assigned to a group of trunks outgoing to another exchange such as trunks outgoing to exchange C, the thousands controller 1400 is immediately called-in pursuant to extending the connection across the thousands-link frame to the desired trunk outgoing to exchange C.

Where the initial digit 6 is dialed, no switching operation takes place as the initial digit lead ID6 stands open in the digit relays 1500 as noted. The dialing of the initial-digit 6 is followed by the dialing of a thousands digit to select the 1000-line switching block containing the called line. Immediately thereafter, the thousands controller 1400 is called-in pursuant to extending the connection across the thousands-link frame to an idle thousands trunk extending to the selected switching block.

The digit information recorded on the digit registers in the thousands controller is transmitted to the thousands controller over conductors in cable 1-281. The common control equipment on the thousands-link frame is individualized with the concerned coupler over conductors in cable 1-283 by the operation of the section apparatus 1200 and 1300 from control received over conductors in cable 1-284. The section apparatus 1200 and 1300 associate the primary switch serving the concerned coupler with the thousands controller 1400 over conductors in cable 279.

IIIB. *Terminating call*

If the call is to a line in exchange B, the thousands digit causes the common control apparatus on the thousands-link frame to match a path from the concerned coupler to an idle thousands trunk assigned to a block coupler and to extend the connection thereover.

IIB1. *Thousands-link frame matching and path selection*

Normally, there is an idle thousands trunk available in the called group extending to the 1000-line switching blocks, such as trunk 1-270-1, in which event an idle path is matched to such trunk over a thousands link such as 260L of the pair illustrated in Fig. 6. The idle condition of trunk 1-270-1 is indicated to the thousands controller 1400 by idle-indicating battery potential normally applied to sleeve conductor S of trunk 1-271-1 by block coupler 1800 and reaching the thousands controller through the left-hand winding of hold magnet HM-510, match-test conductor MT-276 and through conductors in group 287 of the grouping terminal 1700. The battery potential on the sleeve conductor of idle thousands trunk 1-270-1 is supplied from current-limiting resistor 1822 of block coupler 1800 and through break contacts 1 of release relay 1008 over the traced path to match-test conductor MT-277. The busy or idle condition of the thousands link such as 260U and 260L is determined by the thousands controller over respective sleeve conductor 279U and 279L extended thereto through contacts on the section connecting apparatus 1200 and 1300. Sleeve resistors RU and RL (1341 and 1342) are connected respectively to conductors 279U and 279L by the section-connecting apparatus, thereby applying idle-indicating battery potential to each of them subject to being masked by ground potential on any thousands link which is being used.

When the path over thousands link 260L and thousands trunk 1-270-1 have been determined by the matching operation of thousands controller 1400, it closes a circuit through contacts on the section-connecting apparatus 1200 and 1300 and over select magnet wire SM of principal select magnet SM-505 and SM-506 in series. In order to effect the selection of the matched lower thousands link 260L of the illustrated pair, as distinct from the upper link 260U thereof, thousands controller 1400 closes a circuit from ground through the lower auxiliary select magnet SML-503 of primary switch 300A1 over the associated wire SML and contacts of the section-connecting apparatus, conductors and contacts in the thousands controller, wire SML leading to switch 300B1 and thence to battery through the winding of the auxiliary select magnet SML-508. Auxiliary magnets SML-503 and SML-508 thereupon operate to complete the mechanical selection of thousands link 260L.

An off-normal pilot circuit now extends from ground through off-normal contacts controlled in common by auxiliary select magnet SML-503 and SMU-504 of switch 300A1, contacts of any of the ten principal primary select magnets SM-505, primary-off-normal conductor PON, contacts controlled by any one of the ten principal secondary select magnets SM-506, contacts controlled in common by auxiliary select magnets SMU-507 and SML-508, and thence over primary-secondary-off-normal conductor PS-ON to thousands controller 1400.

IIIB2. *Thousands-link frame trunk seizure and switch-through*

Upon receiving ground as noted over the associated conductor PS-ON, thousands controller 1400 closes circuits to effect the extension of the connection through switches 300A1 and 300B1. Closure of the switch 300B1 is responsive to the application of ground potential to match-test conductor MT-276 by the thousands controller thereby closing a circuit through the left-hand winding of hold magnet HM-510 and then over sleeve conductor S of the thousands trunk 1-270-1 to battery in block coupler 1800. Hold magnet HM-510 thereupon locks its right-hand winding to the associated sleeve conductor S, at the same time closing its principal stackups (those vertically aligned with magnet SM-506) which partially extends both thousands links of the illustrated pair, and closing its lower auxiliary stackups L (those aligned with select magnet SML-508 to extend the conductors T, R, and S of thousands link 260L respectively to conductors T, R, and S of the matched thousands trunk 1-270-1.

The circuit closed by thousands controller 1400 for effective closure of the matched connection at primary switch 300A1 is over conductors in group 1-283 and through contacts on relays in the thousands coupler (not shown in Fig. 5), over switching conductor SW and thence to battery through the left-hand winding of hold magnet HM-502. Magnet HM-502 locks its right-hand winding to ground on its associated sleeve conductor S of extension group 1-250-1, and at the same time closes its associated principal and auxiliary stackups selected respectively by magnets SM-505 and SML-503. Conductors T, R, and S in group 1-250-1 are thereby extended respectively to conductors T, R, and S of thousands link 260L and thence through secondary switch 300B1, as stated, to the corresponding conductors in thousands trunk 1-270-1.

Hold magnet HM-502 opens the connection between chain wire CH-1 and chain wire CH-2 to initiate the clearing out of the common apparatus on the thousands-link frame. Thousands controller 1400 maintains the operate circuit of magnets HM-502 and HM-510 closed for an interval sufficient to permit the seized block coupler 1800 to return holding ground over the sleeve conductor S of the seized thousands trunk 1-271-1. Shortly thereafter, the thousands controller 1400 clears out and permits the other apparatus of the common apparatus to clear out, leaving the extended connection held by ground applied to the sleeve conductor thereof by the seized block coupler.

At the same time that the thousands controller matches a path to an idle thousands trunk, the thousands controller in conjunction with the grouping terminals 1700 and digit connecting relays 1600 place ground on one of the number-block wires NB-2 to NB-4 of cable 278 extending to the block-link frame, according to the thousands digit dialed, in order to transmit the thousands-digit information to the seized block coupler for station signaling purposes, as will be described hereinafter.

IIIB3. *Seizure of block coupler* 1800

When block coupler 1800 is seized by the described extension of a connection thereto from calling line 200 over line link 202A, originating trunk 1-203A1, jumper 1-204-1, thousands link 260L, thousands trunk 1-270-1 and jumper 1-271-1, line relay 1806 operates from the direct-current bridge across the calling line. Line relay 1806, at its front contacts 2, operates release relay 1808. At its contacts 1, release relay 1808 transfers the sleeve conductor S of thousands trunk 1-270-1 from battery through resistor 1832 to ground potential. The established connection from the calling line to block coupler 1800 is thereby maintained after the line controller apparatus of Fig. 4 and the thousands controller apparatus of Fig. 6 have cleared out.

After the thousands controller on the thousands link frame has matched a path to an idle thousands trunk 1-270-1, the thousands controller applies ground potential to one of the number-block wires NB-2 to NB-4 associated with the concerned idle thousands trunk if the station being called is not the first station on the line. This path is over conductors in groups 287 and 278. This ground potential is extended through jumpers 1-271-1 to the winding of the thousands registers 1801 to 1803 of block coupler 1800. The concerned one of these thousands register relays operates and locks to a local circuit (not shown in Fig. 7) which maintains them operated after the common control apparatus on the thousands-link frame has cleared out.

IIIB4. *Block coupler action*

The hereinbefore described switching operation on the thousands-link frame takes place in the inter-digit interval between the thousands digit and the hundreds digit and the hundreds, tens, and units digits are therefore recorded on respective registers (not shown in Fig. 7) of block coupler 1800.

Each time a series of impulses are transmitted over the thousands trunk from the calling device on line 200, line relay 1806 restores momentarily for each such interruption in a series. At its front contacts 2, line relay 1806 operates release relay 1808 and its transmits impulses through make contacts 3 of release relay 1808 to record the dialed digits on the respective registers.

On the completion of the dialing of the hundreds, tens, and units digits, ground is extended over the selected ones of the digit wires to block translator 1900 over conductors in cable 1-223. The number-block information recorded on the thousands register is also transmitted to the block translator for station identification purposes. At the same time, block-controller switches 1500′ associate the primary switch serving the concerned block coupler with block controller 1600 responsive to control transmitted over conductors in cable 1-224. Also, at the same time, conductors in cable 1-222 individualize the concerned coupler 1800 with block controller 1600′.

Upon receiving the digit information from the hundreds, tens, units, and number block registers of block coupler 1800, the block translator transmits a suitably translated version of these digits to the line controller on the line-link frame at which the called line terminates, using the number block information for ringing control and station intercept purposes only as will be explained subsequently.

If the illustrated station S2 on line 210 is the one called, it is served by line-link frame B1 which includes apparatus shown in Fig. 9. In this event, the translated digit information is sent to line controller 1200B1, over conductors in cable 1–223B.

On receiving the translated digit information indicating which primary switch (primary switch 800B1, Fig. 9) serves the line being called, and indicating the fives and units location of the called line thereon, line controller 1200B1 identifies itself at block controller 1600′ by a signal transmitted over a conductor in group 1–222B and positions line-controller switches 1000B1 and 1100B1 in accordance with line-link primary switch 800B1 and in accordance with the fives group thereon in which the called line 210 is located.

When switches 1000B1 and 1100B1 have been set, one of them extends the sleeve conductor S–211B of the called line over sleeve units wire SU to line controller 1200B1, whence it is extended over a conductor in cable 1–222B to block controller 1600′ to enable the called line to be tested as to its busy idle condition. At the same time, each of the ten link sleeves associated with the called primary switch 800B1 is connected to the line controller through one of the line-controller switches. For example, the sleeve of the illustrated link 202B is connected through link-sleeve wire LS and link-test wire LT. Link resistor LR is connected to this sleeve conductor over conductor LB and other contacts of the line controller switches to provide an idle-indicating test potential on the sleeve of the links unless the link is in use. The busy or idle condition of the line links serving primary switch 800B1 is separately indicated to block controller 1600′ over respective conductors in cable 222B.

If the called line is idle, and if an idle path can be matched thereto, the block controller matches such a path.

IIIB5. *Block-link frame matching and path selection*

Normally there is an idle trunk available in the group extending to the called line-link frame, such as trunk 1–207B1, in which event an idle path is matched to such trunk over a block-link such as 206U of the pair illustrated in Fig. 8. The idle condition of terminating trunk 1–207B1 is indicated in the block controller by idle-indicating battery potential normally applied to sleeve conductor S of terminating trunk 1–207B1 from battery at hold magnet HM–706 of Fig. 9 and reaching the block controller over match-test conductor MT–226. The busy or idle condition of the block links such as 206U and 206L is determined by the block controller over respective sleeve conductors 225 extended thereto through contacts of the block controller switch 1500′. Sleeve resistors RU and RL are connected respectively to conductors 225U and 225L by the block controller switch, thereby applying idle-indicating battery potential to each of them, subject to being masked by ground potential thereon at any block link which is actually in use.

When the path over block link 206U and terminating trunk 1–207B1 has been determined by the matching operation of block controller 1600′, it closes a circuit through contacts of block controller switch 1500′ and over select magnet wires SM of principal select magnets SM–605 and SM–606 in series. In order to effect selection of matched upper link 206U of the illustrated pair, as distinct from the lower link 206L thereof, block controller 1600′ closes a circuit from ground through the winding of upper auxiliary select magnet SMU–604 of primary switch 400A1, over the associated wire SMU and contacts of the block controller switch, conductors and contacts in the block controller, wire SMU leading to switch 400B1, and thence to battery through the winding of upper auxiliary select magnet SMU–607. Auxiliary magnets SMU–604 and SMU–607 thereupon operate to complete the mechanical selection of block link 206U. An off-normal or pilot circuit now extends from ground through off-normal contacts controlled in common by auxiliary select magnets SML–603 and SMU–604 of switch 400A1, contacts of any one of the ten principal SM–605, primary-off-normal conductor PON, contacts controlled by any one of the ten principal select magnets SM–606, contacts controlled in common by auxiliary select magnet SMU–607 and SML–608, and thence over primary-secondary off-normal conductor PS–ON to block controller 1600′.

IIIB6. *Block-link frame trunk seizure and switch-through*

Upon receiving ground over the associated conductor PS–ON on the block link frame, block controller 1600′ closes circuits to effect the extension of the connection through switches 400A1 and 400B1. Closure of switch 400B1 is responsive to the application of ground potential to the match-test conductor MT–226 by the block controller 1600′, thereby closing a circuit through the winding of hold magnet HM–610 and thence over battery conductor B of terminating trunk 1–207B1 to battery at hold magnet HM–706 of Fig. 9. Hold magnet HM–610 thereupon operates and closes its associated stackups of contacts (those vertically aligned with select magnet SM–606) which partially extends both block links of the illustrated pair and closing its upper auxiliary stackups U (aligned with select magnet SMU–607) to extend the conductors T, R, and S respectively to matched terminating trunk 1–207B1.

The circuit closed by block controller 1600′ for effecting closure of the matched connection at primary switch 400A1 is over controller switching conductor SW (not shown in Fig. 7) and thence through contacts (not shown) on relays of block coupler 1800, over coupler switching conductor SW and thence to battery through the left-hand winding of hold magnet HM–602. Magnet HM–602 locks its right-hand winding to ground on the associated sleeve conductor S of extension group 205 and at the same time closes its associated principal and auxiliary stackups selected respectively by magnets SM–605 and SMU–604. Conductors T, R, and S in group 205 are thereby extended respectively to conductors T, R, and S of block link 206U, and thence through secondary switch 400B1, as stated, to the corresponding conductors in terminating trunk 1–207B1.

At the same time that the switch conductor SW was grounded to effect the operation of hold magnet HM–602, the chain circuit in the block coupler was opened, thereby permitting all common equipment on the block-link frame to be restored. The established connection is held from ground on sleeve conductor S from contacts 1 of release relay 1808 of block coupler 1800.

After block link 206U is selected mechanically at switches 400A1 and 400B1 by the operation of select magnets SMU–604, SM–605, SM–606, and SMU–607 as described, they cooperate to ground conductor PS–ON as described to signal block controller 1600′. At the same time that the block controller closed an operating circuit for the select magnets of switches 400A1 and 400B1, line link 202B is selected mechanically by the operation of select magnet SM–705 and SM–704. Their operating circuit is closed at block controller 1600′ over a conductor in cable 1–222B, through line controller 1200B1, wire LSM, a contact of one of the line controller switches, the associated select magnet wire SM, and thence to battery through magnets SM–704 and SM–705 connected in series. With magnets SM–704 and SM–705 operated, a signal is transmitted to block controller 1600′ over a circuit path from battery at control resistor CR of the line controller 1200B1, series contacts of magnets SM–705 and SM–704, contacts of the line controller switch, associated wire PS–ON, and thence to block controller 1600′ over a wire in cable 1–222B.

Upon receiving the noted signal that the select magnets have operated on the block-link and line-link frames, block controller 1600′ grounds the sleeve of the called line 210 (Fig. 9) over the noted test extension thereof, thereby operating hold magnet HM–703 in series with lock-out relay 702. Magnet HM–703 disconnects line relay 701 and connects the called line to the selected line-link 202B. Block controller 1600′ also grounds the sleeve wire of the matched terminating trunk 1–207B1 by way of match test wire MT–226, thereby operating magnet HM–610 on the block-link frame and secondary hold magnet HM–706 on the line-link frame. Block 206U is thereby extended over conductor T, R, and S of terminating trunk 1–207B1 to line link 202B.

After completion of the extension of a connection from the calling line 200 to the called line 210, block coupler 1800 places ringing current on the called line according to the setting of the thousands registers 1801 to 1803, according to control exercised thereover by the block translator, as will be described hereinafter.

When the call is answered at the called station S2 on line 210, the closure of the usual talking bridge across the called line causes direct current to flow thereover to stop the ringing. Back-bridge relay 1805 operates over the called line. It interchanges the incoming tip and ring conductors to reverse the current over the calling line to serve any required supervisory function. The called and calling parties may now converse.

IIIB7. *Terminating call clearout*

If the called subscriber at called station S2 on called line 210 (at station S2 Fig. 9) is the first to replace his receiver at the end of the conversation, back-bridge relay 1805 is thereupon restored, reversing current flow over the calling line back to normal direction.

When receiver is replaced on the caling line, line relay 1806 restores and open-circuits release relay 1808, which restores a moment later, removing ground potential from the sleeve conductor S of the established connection. The established connection is thereby cleared out releasing the primary and secondary hold magnets HM–403 and HM–406 on the calling line-link frame, magnets HM–502 and HM–510 on the thousands-link frame, magnets HM–602 and HM–610 on the block-link frame, and magnets HM–706 and HM–703 on the called line-link frame. The operated relays of thousands coupler 1000 and block coupler 1800 restore responsive to the opening of the loop across the tip and ring conductors and the removal of ground from sleeve conductor S, completes the clearing out of the equipment used in the extension of the connection.

IIIC. *Outgoing call*

If the call is to a line in exchange C, the initial digit dialed causes the common control apparatus on the thousands-link frame to match a path from the concerned coupler to a thousands trunk assigned by jumper 1–271 to an idle outgoing trunk 3020 extending to trunk-coupler frame 252.

As hereinbefore noted, the dialing of any initial digit 2 to 0 (other than the initial digit 6 which is assigned to lines of exchange B), causes the initial-digit register (not shown in Fig. 5) to make connection with the corresponding one of the initial digit leads in cable 1–281 extending to the digit relays 1500 of Fig. 15. The thousands controller is immediately called-in pursuant to extending the connection across the thousands-link frame to trunks outgoing to exchange C.

The thousands controller is called-in and rendered individual to the calling coupler in the manner described for terminating calls. However, the digit relays 1500 and digit-connect relays 1600, together with the grouping terminals 1700, call-in match-test conductors MT–277 of the trunks in the outgoing called group rather than the match-test conductors of the thousands trunks extending to the block-link frame.

IIIC1. *Outgoing trunk matching and path selection*

Normally there is an idle outgoing trunk available in the called group extending to the trunk coupler frame, such as thousands trunk 1–270, associated with outgoing trunk 3020 by jumpers 1–271. In this event, an idle path is matched to such trunk over a thousands link such as 260L of the pair illustrated in Fig. 6. The idle condition of trunk 1–270 extending to trunk coupler frame 252 is indicated in the thousands controller 1400 by idle-indicating battery potential normally applied to sleeve conductor S of trunk 1–270 by trunk coupler 2001. Trunk coupler 3001 is assumed to be similar to the trunk coupler of our noted prior application. This idle-indicating battery potential reaches the thousands controller through the left-hand winding of hold magnet HM–509, match-test conductor MT–277 and through conductors in group 287. The busy or idle condition of the thousands link such as 260U and 260L is determined by the thousands controller over respective sleeve conductors 279U and 279L, as previously described.

When the path over thousands link 260L and thousands trunk 1–270 extending to outgoing trunk 3020 has been determined by the matching operation of thousands controller 1400, select magnets SML–503, SM–505, SM–506, and SML–508 are operated, as hereinbefore noted, and they cooperate to signal the thousands controller over the off-normal or pilot circuit extending therethrough.

IIIC2. *Outgoing trunk seizure and switch-through*

Upon receiving the noted off-normal or pilot signal, thousands controller 1400 closes circuits to effect the extension of the connection through switches 300A1 and 300B1. Hold magnet HM–502 is operated as described for a terminating call and hold magnet HM–509 is operated responsive to the application of ground potential to match-test conductor MT–277, thereby closing a circuit through the left-hand winding of hold magnet HM–509 and then over sleeve conductor S of thousands trunk 1–270, jumper 1–271, and outgoing trunk 3020 to battery in the trunk coupler 3001. Hold magnet HM–509 thereupon locks to battery on the sleeve conductor S through its right-hand winding and at the same time closes its principal stackup (those vertically aligned with select magnet SM–506) which partially extend both thousands links of the illustrated pair, and closing its lower auxiliary stackups L (those aligned with select magnet SML–508) to extend the conductors T, R, and S of thousands link 260L respectively to conductors T, R, and S of outgoing trunk 3020.

As described for terminating call operation, hold magnet HM–502 clears out the common equipment on the thousands-link frame thereby leaving the connection held between calling line 200 and trunk coupler 3001 by ground potential on sleeve conductor S from the relays (not shown) in trunk coupler 3001.

The described switching operation on the thousands link frame in extending a connection from calling coupler 1000 to the trunk coupler 3001 takes place in the inter-digit interval and the remaining digits of the directory number of the called line in exchange C is dialed in trunk coupler 3001 and transmitted to the switchboard apparatus at exchange C.

Since there are no thousands digits dialed in coupler 1000, none of the number-block wires NB–2 to NB–4 are energized.

IIIC3. *Outgoing call clearout*

When trunk coupler 3001 on the seized outgoing trunk clears out responsive to the receiver being replaced on the calling line, it removes ground potential from the sleeve conductor S of the established connection thereby breaking down the connection by releasing the hold magnets HM–403, HM–406 on the line-link frame and hold magnets HM–502, HM–509 on the thousands-link frame. The trunk coupler 3001 and the local thousands coupler 1000 are thereby released completing the clearing out of the extended connection.

IIID. *Incoming calls*

When exchange B is called from exchange A, the call from exchange A reaches exchange B over an incoming trunk such as incoming trunk 3083 (Fig. 4). This trunk is extended through a part of the trunk coupler frame 252, over extension conductors 3085 and jumpers I–204 to incoming thousands coupler 1100 (shown in detail in Fig. 11).

Thousands coupler 1100 is thereby seized and the call may be extended to any desired called line of exchange B by dialing the appropriate thousands digit, followed by the hundreds, tens, and units digits of the directory number of the called line and station thereon. The connection may be extended from thousands coupler 1100 to line 210 over conductor groups I–250 and its associated vertical locations on thousands-link primary switch 300A1, and thence as hereinbefore described for a call originated at local station S1 on line 200.

Since the initial digit is dialed in calling exchange A the remaining digits of the directory number comprise thousands, hundreds, tens, and units digits thereby preventing any incoming call from being extended to another exchange. As will be noted in Fig. 1, calls from exchange A to exchange C are made directly, rather than going through exchange B.

IV. LOCAL THOUSANDS COUPLER 1000 (FIG. 10)

As shown in Fig. 10, parts 1 and 2, local thousands coupler 1000 includes a test jack TJ, relays 1001 to 1008, condenser 1009, and magnetic impulse counters IDR and THR.

IVA. *Circuit functions of thousands coupler 1000*

Local thousands coupler 1000 handles only locally originated calls which are received over its assigned originating trunk 1–203A1, incoming from a line-link frame. According to its destination, any such call is handled as (1) an outgoing call, or (2) a locally terminated call. Thousands coupler 1000 performs the following principal circuit functions:

IVA1. *On all calls*

1. Normally, it supplies idle-indicating battery potential to the sleeve conductor of its attached originating trunk.

2. Upon seizure it (1) applies dial tone to the calling line until the first digit is dialed, and (2) removes the idle-indicating battery potential from the sleeve conductor of the attached originating trunk and substitutes a holding ground potential.

3. If the start of dialing is delayed for the normal time-out period (about two to four minutes), it "times out" by removing holding ground from the sleeve of the attached originating trunk to permit release and lock-out to occur on the line-link frame.

4. It absorbs the initial digit "1" as many times as dialed or otherwise produced.

IV2. *On outgoing calls*

1. It receives and stores a single digit for transfer to the digit relays of the common control apparatus.

2. It temporarily seizes the chain of the block coupler section, subject to such chain to be idle, and thereafter guards the seized chain against seizure by another coupler in the same section.

3. It transfers the single stored digit to the thousands controller incident to the seizure of the noted chain.

4. Upon a signal from the thousands controller that no idle path can be matched to an outgoing trunk in called group (1) it applies a trunk-busy tone to the calling line and (2) frees the seized chain.

5. On a signal from the thousands controller that a connection has been extended over a matched path to an idle outgoing trunk in the called group, it frees the seized chain.

6. It is thereafter held by ground received over the sleeve wire of the extended connection and clears out when such ground is removed.

IVA3. *On terminating calls*

1. It receives and stores two digits (an initial digit ID and a thousands digit TH) for transfer to the digit relays of the common equipment.

2. If the next digit to be dialed is delayed for the normal time-out period, it times-out as previously noted.

3. After the second digit has been dialed, it temporarily seizes the chain fo the thousands-section subject to such a chain being idle, and guards the seized chain against seizure by other couplers.

4. It transfers the two digits of stored digit information to the digit relays of the common equipment while it has the chain seized.

5. When a signal from the thousands controller indicates that the called line is busy, or that no idle path can be matched, thereto it applies a trunk-busy tone to the calling line and frees the seized chain.

6. Upon receipt of a signal from the thousands controller indicative that the connection has been extended over matched path to an idle thousands trunk in the called group it frees the seized chain.

7. It is thereafter held by ground received over the sleeve wire of the extended connection and clears out when such ground is removed from the sleeve conductor.

IVB. *Relay functions at thousands coupler 1000*

The eight relays (1001 to 1008) of thousands coupler 1000 have principal functions assigned thereto as follows:

1. Relay 1001 (cut-off) operates responsive to the operation of the chain relay to cut off the line relay from the calling line.

2. Relay 1002 (line) operates when the coupler is seized and restores thereafter, under control of the calling device or hookswitch, whenever the calling line is opened.

3. Relay 1003 (series relays) is operated by the line relay; it restores at the beginning of each series of dial pulses and reoperates only after the line relay has again come to rest operated, as it is slow-operating because of its heavy spring adjustment; it closes the chain circuit of the thousands coupler section, and starts the permanent timing operation.

4. Relay 1004 (release) is slow-releasing by virtue of a copper sleeve under its winding; it is operated by the line relay; it remains operated during pulsing, but releases when the line relay remains restored for a substantial fraction of a second.

5. Relay 1005 (busy) is operated from the thousands controller to apply appropriate trunk-busy tone signals to the called line when a busy condition is encountered.

6. Relay 1006 (chain relay) is operated on all calls, when the last digit to be recorded is dialed, to sieze the chain of the local thousands coupler section.

7. Relay 1007 (time-pickup) is operated as required to start the final portion of the normal time-out period to render the connection subject to release by the common timing apparatus.

8. Relay 1008 (sequence) operates at the end of the dialing of the first digit series to distribute the second series of digit impulses to register THR.

IVC. *Impulse counter functions at coupler 1000*

The two impulse counters IDR and THR of thousands coupler 1000 have principal functions assigned thereto as follows:

Impulse counter IDR (initial-digit register) registers the number of impulses in the first digit dialed, the initial digit.

Impulse counter THR (thousands register) registers the number of impulses in the thousands digit dialed.

The following additional functions are assigned to impulse counter IDR, which actuates its contact set 1 on receipt of its first operating pulse to disconnect dial tone and to control the absorption of the initial digit 1. Thousands register THR opens the circuit of the initial-digit leads ID2 to ID10 to open-circuit the digit relays of Fig. 15.

IVD. *Thousands coupler 1000 operation*

The operations involved in making locally originated calls and outgoing calls will now be described with reference to Fig. 10, parts 1 and 2.

IVD1. *Seizure of thousands coupler 1000*

When thousands coupler 1000 is seized by the described extension of a connection thereto from calling line 200, over line-link 202A, originating trunk 1–203A1, and jumper 1–204–1, line relay 1002 operates over the calling line through break contacts 1 and 2 of cut-off relay 1001. Line relay 1002, at its front contacts 1, operates series relay 1003 and at its front contacts 2 operates release relay 1004. Series relay 1003 at its contacts 1 places dial tone on the calling line from the common dial tone lead DT, through break contacts of the initial digit register IDR, break contacts 1 of busy relay 1005, and through the small-capacity condenser 1009. At its contacts 2, series relay 1003 connects time-pickup relay 1007 to the common time-pulse lead TP to start the normal time-out period; its contacts 5 ground the common tone-start lead TS to start the tone apparatus if it is not already operating; and its contacts 4 close the chain circuit of the thousands coupler selection, preparatory for seizure of the common equipment.

At its contacts 1, release relay 1004 transfers the sleeve conductor of outgoing trunk 1–203A1 from battery through resistor 1010, to holding ground through closed contacts 1 of time-pickup relay 1007. This ground on the sleeve maintains the established connection after the line controller apparatus of Fig. 4 has been cleared out as noted. At its contacts 2, release relay 1004 grounds the local ground conductor 1025, and at its make contacts 3 prepares the local impulse circuit for the digit registers IDR and THR, through break contacts 5 of busy relay 1005 and make-break contacts of sequence relay 1013.

IVD2. *Receipt of digit pulses*

On hearing the noted dial tone signal, the calling subscriber dials the digits in the directory number of the called line.

Each time the calling device is operated to transmit a series of circuit-interruption impulses, line relay 1002 is restored momentarily for each such interruption impulse in a series, comprising from 1 to 10 impulses, depending on the digit dialed.

Release relay 1004 remains operated throughout any series of impulse restorations of line relay 1002, being slow-restoring because of its indicated copper sleeve.

Series relay 1003 promptly, upon the first restoration of line relay 503, restores. Being slow-operating because of the comparatively inductive winding and a comparatively heavy biasing spring adjustment, relay 1003 remains restored throughout the digit series of momentary restorations of the line relay.

With release relay 1004 maintained continuously operated, each restoration of relay 1002 delivers an impulse in its break contacts 2, through break contacts 6 of cut-off relay 1001, through make contacts 3 of release relay 1004, and through break contacts 5 of busy relay 1005 to wire 1020. The contacts on sequence relay 1008 transmit the first series of impulses over wire 1021 extending to the lower or operating winding of the initial digit register IDR.

When line relay 1002 comes to rest, operated, at the end of any digit series impulses, series relay 1003 shortly reoperates, responsive to the continued closure of its operating circuit.

The first stepping impulse which is delivered to register IDR, causes both its make and break contacts to shift to their alternate positions. Make contacts 1 close an operating circuit for sequence relay 1013 and break contacts 1 open the noted dial-tone circuit.

An operate circuit is closed for sequence relay 1013 immediately following the dialing of the first impulse of the initial digit series. This circuit is from ground at break contacts 5 of cut-off relay 1001 through make contacts 1 of initial digit register IDR to battery through the winding of sequence relay 1008 and associated resistor 1013. However, at this time, with series relay 1003 restored during dialing, ground on common locking wire 1025 is extended through break contacts 3 of series relay 1003 and break contacts 2 of sequence relay 1008 to resistor 1013, thereby shunting sequence relay 1008, preventing its operation.

When the impulses of the initial digit are delivered over wires 1020 and 1021 to the operate winding of the initial-digit register IDR as described, the contact sets (1 to 10) of this register are actuated successively, respectively, to the impulses of the digit.

When line relay 1002 comes to rest, operated at the end of any digit series of impulses, series relay 1003 shortly reoperates, responsive to the continued closure of the operating circuit, and opens the shunting circuit of sequence relay 1013. Sequence relay 1013 therefore operates from the ground at contacts 5 of cut-off relay 1001.

With the operation of sequence relay 1008, its contacts 1 disconnect current-limiting resistor 1010 to prevent any reapplication of idle-indicating battery to the sleeve conductor of the attached originating trunk subject to the restoration of release relay 1014; its contacts 2 open to prevent the ground on the common locking ground wire 1025 from being placed to the winding of sequence relay 1008 shunting it and causing its restoration; its contacts 3 operate to transfer the pulsing wire 1020 from the pulsing wire of the initial digit register IDR to wire 1022 extending to the operating winding of register THR; and its contacts 4 operate to close the release circuit for the restoration of the operated counters, following the abandoning of the connection or a hereinafter described switch-through.

IVD3. *Absorbing the initial digit 1*

Thousands coupler 1000 is arranged to absorb the initial digit 1 as many times as dialed are otherwise produced, as by improper switch-hook operation or by line trouble. Accordingly, the digit 1 is unassignable as an initial digit.

When the initial digit received contains only a single impulse, the first contact set is the only one actuated. Then, when sequence relay 1008 operates from ground through break contact 5 of cut-off relay 1001 as described, its contacts 4 extend ground from break contacts 2 of initial-digit register IDR through current-limiting resistor 1011 to wire 1026 extending to battery through the upper winding of the initial-digit register and the thousands register. This circuit being closed through the upper (release) windings of the two impulse counters, release all operated counters by neutralizing the holding flux in each. With the restoration of the initial-digit register IDR, its make contacts 1 open to restore sequence relay 1013 thereby transferring the impulse wire 1020 again to pulse wire 1021 extending to the winding of the initial-digit register IDR. The release of counter IDR also reapplies dial tone to the calling line as a signal that the calling subscriber should start dialing from the beginning.

Should the calling subscriber disconnect during the dialing of the series of impulses, thereby preventing the operation of sequence relay 1008 upon failure of series relay 1003 to operate, release relay 1004 restores and removes the shunting ground from resistor 1013, thereby operating sequence relay 1008 from ground through make contacts 1 of the operated initial-digit register. Ground from break contacts of the restored line relay 1002 is extended through break contacts 6 of unoperated cut-off relay 1001 to wire 1028, through break contacts 3 of release relay 1004 (now restored), and through make contacts 4 of operated sequence relay 1008 to the release winding of the counters as previously described. The operated counters thereby restore and release sequence relay 1008, thereby clearing out the seized coupler and reapplying the idle-indicating battery potential to the sleeve conductor of the attached trunk.

IVE. *Outgoing calls*

On the dialing of any digit 2 to 0, register IDR makes connection with the corresponding one of the nine initial digit leads ID2 to ID10, which extends to the digit relays 1500. One of these leads (ID6 in the illustrated embodiment) corresponds to the initial digit assigned to the 1000-line switching block of the local nine numbers and is rendered ineffective at the digit relays 1500 as shown in Fig. 15. The remaining ID leads correspond to respective groups of outgoing trunks, and extend to the thousands controller through respective initial digit relays 1500.

IVE1. *Call in of thousands controller*

When the initial digit dialed is one assigned to a group of outgoing trunks, such as those outgoing to exchange C, the reoperation of series relay 1003 at the end of the digit, closes the chain circuit to extend marking ground to the digit relays 1500 over the corresponding one of the leads ID2 to ID10. This operation is subject to the chain being idle, in which case a ground potential is present on the chain-in conductor CH–IN of the first coupler in the section containing the calling thousands coupler 1000. This chain-in wire CH–IN originates at one of the section-preference relays of Fig. 12. As indicated in Fig. 10, part 1, this conductor extends through chain contacts of all of the thousands couplers of the section, to the chain-end conductor CH–END, which is multipled to all couplers of this section. Ground potential on conductor CH–END passes through closed contacts 3 of chain relay 1006, the winding of relay 1006, through contacts 6 of relay 1005, and through contacts 4 of relay 1003 to conductor CH–2 extending to the primary switch 300A1. As seen in Fig. 6 of the drawings, chain conductor CH–2 is connected to chain conductor CH–1 through break contacts on the hold magnet. With register IDR set according to an outgoing group (such as exchange C) chain conductor CH–1 is extended through break contacts 1 of unoperated thousands register THR and extended to the selected one of the initial digit leads ID2 to ID10, the one which corresponds to the called group of trunks. The chain circuit is thus extended from ground through a section preference relay, the chain relay, and a digit relay to battery through the current-limiting resistor 1403 of thousands controller 1400. The first and last mentioned relays operate (1) to mark the called group in the thousands controller (2) to inform the thousands controller that an outgoing call has been received. The thousands controller determines the busy or idle condition of each of the outgoing trunks in the called group and proceeds to match a path across the thousands link frame to an idle one of them.

IVE2. *Chain seizure and guarding*

In the section-preference relays 1200 (Fig. 12), associated with the section-connect relays 1300, the concerned section-preference relay operates to open the chain to all other thousands coupler sections, and to position the section-connect relays 1300 to select the thousands-link primary switch which serves the thousands coupler section containing the calling thousands coupler.

In the calling thousands coupler 1000, chain relay 1006 operates in the traced circuit to lock itself to chain-in conductor CH–IN at its make contacts 3, and at its break contacts 2 and 3, isolates the associated chain-end conductors CH–END from the chain to guard it from seizure by another coupler in the same section. The common control apparatus on the thousands-link frame is thereby rendered temporarily individual to thousands coupler 1000.

Chain relay 1006, at its contacts 1, closes an operating circuit for cut-off relay 1001; at its make contacts 2, places resistor 1012 across the windings of line relay 1002 maintaining it operated after cut-off relay 1001 operates; and at its contacts 5 and 6 connects the common busy and switching wires (BU and SW) to the local wires of this coupler.

IVE3. *Busy condition*

If there are no trunks available in the called group of outgoing trunks as when all trunks in called group are busy or when no match is possible to any one of them, or if an unassigned initial digit has been dialed, the thousands controller grounds the common wire BU operating busy relay 1005 in the thousands coupler through contacts 6 of chain relay 1006. Relay 1005 locks to the ground on common locking wire 1025; it opens the chain at its break contacts 5, freeing the chain and the common control apparatus on the thousands-link frame, it opens impulse wire 1020 at its contacts 5 to prevent further registration if further digits are dialed; its contacts 3 shunt the contacts of series relay 1003, thereby avoiding release of time-pickup relay 1007 (if operated) to start a new time-out period in the event of further dialing; its contacts 2 restore cut-off relay 1001; and its contacts 1 apply a trunk-busy-tone signal to the calling line from common trunk-busy-tone wire TBT, through tone coupling condenser 1009 and make contacts 1 of series relay 1003.

The calling subscriber is expected to replace his receiver upon hearing the distinctive trunk-busy-tone to thereby initiate the normal release of the connection. Otherwise, the connection times out as is later described.

IVE4. *Outgoing matching and path selection*

Normally there is an idle trunk available in the called outgoing group, in which event an idle path is matched to such a trunk. As hereinbefore described when the thousands controller matches an idle path to an idle trunk in the called group, the hold magnet of primary switch 300A1 is operated from ground on switching conductor SW which extends to the battery through the winding of hold magnet associated with primary switch 300A1 through make contacts 5 of chain relay 1006. Contacts on the hold magnet open the chain circuit by disassociating chain wire CH–1 from chain wire CH–2.

Cut-off relay 1001 operates to "switch-through" the connection and locks through its make contacts 3 and break contacts 2 of busy relay 1005 to the sleeve conductor of the associated originating trunk. Its contacts 1 and 2 disconnects line relay 1002 from the calling line but line relay 1002 does not restore as it is held operated by resistor 1012 and make contacts 2 of chain relay 1006. Contacts 4 of relay 1002 open the circuit of the idle-indicating battery resistor 1010; its break contacts 6 open the impulsing circuit of wire 1020 to prevent any further restorations of line relay 1002 from delivering extra impulses to the counter to which wire 1020 is associated at the time; and its contacts 5 restore sequence relay 1008.

The connection from calling line 200 has now been extended over the tip, ring and sleeve conductors T, R, and S through the switches on the thousands link frame to an idle trunk coupler on the trunk coupler frame. Ground is returned on the sleeve conductor S from the seized trunk coupler and is extended through break contacts 2 of busy relay 1005, maintaining cut-off relay 1001 operated.

With the opening of the chain at the break contacts of hold magnet HM–502, chain relay 1006 restores and at its contacts 2 removes the bridge across line relay 1002 thereby permitting it to release. The restoration of line relay 1002 restores series relay 1003 and release relay 1004. The common control apparatus is now returned to normal use.

The established connection is now held by ground returned from the trunk coupler over the sleeve conductor S of the seized outgoing trunk. Cut-off relay 1001 and register IDR are held operated in the local thousands coupler until the connection is released.

IVE5. *Thousands coupler clearout*

When trunk coupler 3001 on trunk coupler frame 252 clears out, responsive to the receiver being replaced on the calling line, it removes ground from the sleeve conductor S of the established connection, thereby breaking down the connection by releasing all operated hold magnets on the line-link frame and the thousands-link frame. The removal of ground from the sleeve conductor S of the established connection permits the restoration of cut-off relay 1005 which reoperates sequence relay 1008 through break contacts 5 and make contacts 1 of the operated initial-digit register IDR.

With sequence relay 1008 operated and all other relays restored, ground from back contacts 2 of line relay 1002 is extended through break contacts 6 of relay 1001, through back contacts 3 of release relay 1008, and through current-limiting resistor 1011 to battery through the series release windings of initial digit register IDR and thousands register THR. This energizes the series-connected residual-flux neutralizing windings of the counters thereby releasing the operated counter IDR. The restoration of counter IDR open-circuits sequence relay 1008 which shortly restores, completing the clearing out of the thousands coupler 1000.

IVF. *Terminating calls*

When, following the described seizure of thousands coupler 1000, the initial digit dialed is the digit 6, serving as a initial digit to index the call as one to the lines of exchange B, the corresponding initial digit lead ID6 is selected by initial digit register IDR by being connected to chain conductor CH1 through break contacts 1 of thousands register THR. However, lead ID6 stands open in the digit relays 1500, wherefore chain relay 1006 is not operated and none of the common equipment is taken for use at this time.

IVF1. *Registering the thousands digit*

The dialing of the initial digit is followed by the dialing of the thousands digit of the called number. The thousands digit is registered on register THR, the impulses being transmitted over conductor 1020 and through make contacts 3 of operated sequence relay 1008 to wire 1022 extending to the operating winding of thousands register THR.

IVF2. *Call in of thousands controller*

When line relay 1002 comes to rest, operated at the end of dialing of the thousands digit, series relay 1003 operates and at its contacts 4 close the chain circuit as described. If the terminating chain is closed at the section-preference relays (Fig. 12) and is closed at this thousands coupler section, ground potential through a section-preference relay is extended to the terminating chain-end conductor CH–END and is further extended through the winding of relay 1006 and through break contacts on hold magnet HM–502 to chain conductor CH–1, as hereinbefore described.

IVF3. *Chain seizure and guarding*

Over the above traced circuit, the concerned section-preference relay is operated to set the section apparatus on the thousands-link primary switch serving the thousands coupler to guard the common chain against seizure at any other thousands coupler section. Chain relay 1006 is operated over the traced circuit in this thousands coupler to seize the chain and guard it against seizure by any other coupler in the same section, by locking itself (at its make first contacts 3) to the associated chain-in wire CH–IN and isolating chain-end wire CH–END from the chain at its break contacts 3 and 4.

As hereinbefore described, chain relay 1006 connects up the common switching and busy wires from the thousands controller and operates cut-off relay 1001.

IVF4. *Busy condition*

If there are not any thousands trunks in the called group available, as when all trunks in the called group are busy, or when no match is possible to an idle one of them, the thousands controller grounds the common wire BU, operating busy relay 1005 in the thousands coupler through contacts 6 of the chain relay. Busy relay 1005 locks itself to grounded conductor 1025, and performs its hereinbefore described operations.

The calling subscriber thereupon receives trunk-busy-tone and is expected to replace his receiver to thereby initiate the normal release of the connection. Otherwise as hereinbefore stated, the connection times out.

IVF5. *Terminating matching and path selection*

Normally there is an idle trunk in the called group such as thousands trunk 1–250–1 extending to the block-link frame, in which case, the thousands controller grounds its switching conductor SW. This ground is extended through make contacts 5 of the chain relay 1006 to battery through the winding of hold magnet HM–502, which as previously described, operates to open the chain at its break contacts and to extend the T, R, and S conductors. Chain relay 1006 thereupon restores, and restores the line, series, and release relays.

The connection from the calling line 200 is now extended to an idle block coupler associated with the seized trunk. As will be hereinafter described, the block coupler grounds the sleeve conductor S of the attached thousands trunk thereby maintaining the connection established and maintaining cut-off relay 1001 operated.

The remaining digits of the directory number of the desired line and station thereon are dialed in the seized block coupler and the only equipment held operated in the thousands coupler is the cut-off relay 1001 and the initial digit register IDR and the thousands register THR.

IVF6. *Terminating call clearout*

When the seized block coupler is cleared out, responsive to the receiver being replaced on the calling line, it removes ground potential from the sleeve conductor S of the established connection thereby breaking down the connection by restoring all operated hold magnets. Ground is also removed from the winding of the cut-off relay 1001 which restores as previously described to operate sequence relay 1008, thereby initiating the clearing out of the thousands coupler.

IVG. *Timing out provisions*

The previously referred to timing-out provisions of thousands coupler 1000 comprises permanent timing which releases the connection to free the thousands coupler when seized from a line which is permanent (has a trouble condition simulating a call) or which becomes permanent before the connection is released, such as failure to dial but holding the connection.

The timing-out provisions are controlled by a common time-out timer (not shown) from which common conductor TP, and TH (time pulse, and time hold) are connected. Time-hold conductor TH is normally grounded at the timer, and the conductor TP is normally ungrounded.

The time-out timer is arranged to pass through a cycle of operation, for example, two minutes. During any such cycle it reaches a clear-out position wherein it momentarily ungrounds common lead TH, and almost immediately thereafter reaches a pickup position where it momentarily grounds conductor TP.

Permanent timing starts at thousands coupler 1000 when series relay 1003 is first operated by line relay 1002, upon seizure of the coupler. Contacts 2 of series relay 1003 connects time-pickup relay 1007 to conductor TP through make-before-break contacts 2 of relay 1007.

A variable pre-pickup interval starts with the noted operation of series relay 1003 and lasts until the time-out timer next reaches its pickup (or start position). This time-pickup interval, for a two minute timer, ranges from 0 to 2 minutes, depending on where the timer is within a cycle when the series relay operates. The variable pre-pickup period begins with the operation of relay 1003 and lasts until time-pickup relay 1007 is operated.

If series relay 1003 is still operated when the timer reaches its pickup position, the consequent grounding of lead TP (by the timer) operates time-pickup relay 1007 (through make contacts 2 of series relay 1003 and break contacts 2 of relay 1006). At its make contacts 2, time-pickup relay 1007 locks to ground locally, disconnects its winding from the temporarily grounded lead TP, and at its contacts 1, transfers the incoming sleeve conductor S from its local source of holding ground to the normally-grounded time-hold conductor TH.

If series relay 1003 remains operated continuously (from lack of dialing), time-pickup relay 1007 is still held operated when the timer next reaches its time-out position. Then the noted temporary ungrounding of conductor TH by the timer removes holding ground from the sleeve conductor S of thousands coupler 1000. The connection is thereby cleared out, the calling line is locked out of normal service and the thousands coupler is released and returned to common use.

If series relay 1003 is restored, as by dialing of a digit, before the common equipment timer reaches its time-out position, time-pickup relay 1006 is thereby released and a new normal time out period starts on the next reoperation of series relay 1003, such as at the end of the dialed digit.

When a busy condition is encountered, busy relay 1005 shunts the time-pickup contacts 2 of series relay 1003 whereby the connection is released thereafter at the end of the current normal time-out period even though the calling subscriber should restore series relay 1003 by dialing while the busy tone signal is being applied.

IVH. *Test jack TJ*

Test jack TJ is adapted to receive a three-conductor test plug (not shown) when a test connection is desired to the incoming tip, ring, and sleeve conductors of thousands coupler 1000. When such a plug is inserted, the break contacts thereof open the connection through which the idle-indicating battery is applied to the sleeve conductor S of the connected originating trunk 1–203A1, thereby causing the thousands coupler to test busy to the line controller apparatus for the duration of the test connection. When desired, a dummy plug may be inserted into jack TJ to cause the local thousands coupler 1000 and associated originating trunk 1–203A1 to test busy.

V. INCOMING THOUSANDS COUPLER 1100 (FIG. 11)

As shown in Fig. 11, incoming thousands coupler 1100 includes a test jack TJ, relays 1101 to 1106, condenser 1109, and a magnetic impulse counter THR.

VA. *Circuit functions of coupler 1100*

Incoming thousands coupler 1100 handles only incoming calls which are received over incoming trunks 3085 and associated jumper I–204, incoming from the trunk coupler frame 252. Since all calls incoming to exchange B are locally terminated calls, the incoming thousands coupler performs the following principal circuit functions on terminating calls only:

1. Normally, it supplies idle-indicating battery potential to the sleeve conductor of the attached incoming trunk.
2. Upon seizure, it removes the idle-indicating battery potential from the sleeve conductor of the attached incoming trunk and substitutes a holding ground.
3. It has no timing-out features as the permanent timing is controlled by the calling exchange.
4. It does not absorb the initial digit 1.
5. It receives and stores a single digit for transfer to the common control apparatus on the thousands-link frame.
6. It temporarily seizes the chain of its coupler section, subject to such chain being idle and thereafter guards it against seizure by another thousands coupler.
7. It transfers the single stored digit to the common control apparatus on the thousands-link frame while the chain is seized.
8. On a signal from the common control apparatus that no idle path can be matched to an idle thousands trunk in the called group, it returns a trunk-busy-tone signal to the calling line and frees the seized chain.
9. On a signal from the thousands controller that a connection has been extended over a matched path to an idle thousands trunk in the called group, it frees the seized chain.
10. It is subsequently held by ground received over the sleeve wire of the extended connection and clears out when such ground is removed.

VB. *Relay functions at coupler 1100*

Relay 1101 (cut-off) disconnects line relay 1102 from the tip and ring conductors of the attached incoming trunk.

Relay 1102 (line) operates when the coupler is seized and restores thereafter under control of the calling device or hookswitch whenever the calling line is opened.

Relay 1103 (series) is operated by the line relay; it restores at the beginning of dial pulses, and reoperates only after the line relay has come to rest operated, as it is slow-operating because of a heavy spring adjustment.

Relay 1104 (release) is slow-releasing by virtue of the copper sleeve under its winding; it is operated by the line relay; it remains operated during pulsing but releases when the line relay is restored for a substantial fraction of a second.

Relay 1105 (busy) is operated from the thousands controller to apply trunk-busy-tone signals to the calling line or is operated through make contacts of register THR to close a neutralizing circuit for clearing out the impulse counter THR.

Relay 1106 (chain) is operated when the chain of the coupler section is seized.

Impulse counter THR (thousands register) registers the number of impulses in the thousands digit dialed. It actuates its contact sets 1 on receipt of its first operating pulse to disconnect the idle-indicating battery lead from resisor 1110 as a sleeve-guarding measure.

VC. *Thousands coupler 1100 operation*

The operation of the thousands coupler 1100 will now be described generally.

VC1. *Seizure of thousands coupler 1100*

When the incoming thousands coupler 1100 is seized by the hereinbefore described extension of a connection thereto from a calling trunk from exchange C, line relay 1102 operates over the calling trunk line through break contacts 1 and 2 of cut-off relay 1101. Line relay 1102 at its front contacts 1, operates series relay 1103 and at its front contacts 2, operates release relay 1104. At its contacts 1, release relay 1104 transfers the sleeve conductor of the incoming trunk 3020 from battery through resistor 1110 to holding ground.

At its contacts 2, release relay 1104 prepares a locking ground for the busy relay 1105, and at its make-break contacts 3 opens a point in the circuit of the busy and release-pulse relay 1105, and prepares the local impulse circuit for the thousands register THR through break contacts on the busy relay 1105.

Series relay 1103 at its contacts 2, grounds the common tone start lead to start the time apparatus, and at its contacts 2 closes the chain circuit preparatory to seizing the common control apparatus on the thousands-link frame.

VC2. *Receipt of digit pulses*

The dialing of the initial digit in the calling exchange C is immediately followed by the dialing of the thousands digit in exchange B.

Each time the calling device at exchange C is operated to transmit a series of circuit-interruption impulses, line relay 1102 is restored momentarily for each such interruption impulse in a series.

Release relay 1104 remains operated throughout any series of impulse-induced restorations of line relay 1102, it being slow-restoring because of its indicated copper sleeve.

Series relay 1103 restores promptly upon first restoration of line relay 1102, it being slow-operating because of its comparatively inductive winding and because of its heavy biasing spring adjustment. Relay 1103 remains restored throughout the digit series of momentary restorations of the line relay.

With release relay 1104 maintained continuously operated, each restoration of line relay 1102 delivers an impulse at its break contacts 2, through break contacts 5 of relay 1101, through make contacts 3 of release relay 1104, and through break contacts 5 of busy relay 1105 to the operating winding of the thousands register THR.

When line relay 1102 comes to rest, operated at the end of any digit series of impulses, series relay 1103 shortly thereafter operates responsive to the continued closure of its operating circuit and closes the chain circuit at its contacts 2.

As hereinbefore described, responsive to the stepping impulses delivered to the thousands register THR over pulse wire 1121, the contact sets (1 to 10) of this register are actuated successively, responsive respectively to the impulses of the digit.

Upon receipt of the first impulse at IDR, its break contacts 1 disconnect the idle-indicating battery resistor 1110 to prevent the reapplication of an idle-indicating battery to the sleeve of the attached incoming trunk, until the thousands register THR has been restored.

VD. *Coupler operation*

On the dialing of any thousands digit 1 to 0, register THR makes connection with the corresponding one of the 10 thousands-digit leads TH–1 to TH–10, which extend to the digit relays 1500. As hereinbefore described, the reoperation of series relay 1103 at the end of the digit series, closes the chain to extend marking ground to the digit relays over the corresponding one of the leads TH–1 to TH–10. As hereinbefore pointed out, this operation is subject to the chain being idle, in which case a ground potential is present on the chain-in conductor CH–IN of the first coupler in the section containing the thousands coupler. As indicated, this conductor extends through chain contacts of all the thousands couplers of the section to the chain-end conductor CH–END, multiplied to all couplers of the section. Ground potential on conductor CH–END now passes through closed contacts 3 of relay 1106, through the winding of relay 1106, through break contacts 6 of busy relay 1105, and through make contacts 2 of series relay 1103 to chain conductor CH–2 extending to the hold magnet of the primary switch 300A1 associated with the calling incoming thousands coupler. Break contacts of hold magnet HM–501 extend the chain conductor CH–1 to chain conductor CH–2 and is thereby extended to the selected one of the thousands digit leads TH–1 and TH–10, the one which corresponds to the called group of trunks. The chain circuit is thus extended through a relay of the digit relays 1500 to battery through the contacts of the start relay of the thousands controller 1400.

The last-mentioned relay operates, to mark the called group and to cause the thousands controller to determine the idle or busy condition of each of the trunks in the called group, pursuant to matching a path across the thousands-link frame to an idle one of the trunks.

In the calling incoming thousands coupler 1100, chain relay 1106 operates in the traced circuit and locks itself to chain-in conductors CH–IN at its make contacts 3, and at its break contacts 3 and 4, isolates the associated chain-end conductor CH–END from the chain to guard it from seizure by any other thousands coupler in the same section. The common control apparatus on the thousands link frame is thereby rendered temporarily individual to calling thousands coupler 1100.

Chain relay 1106, at its contacts 5 and 6, connect up the common busy and switching wires (BU and SW) to the local wires of this coupler.

Contacts 1 of relay 1106 extend an operate ground from make contacts 1 of release relay 1104 through break contacts 4 of busy relay 1105 to the winding of cut-off relay 1101, operating it; its contacts 2 bridge resistor 1112 across the windings of the line relay 1102 to maintain it operated after the cut-off relay operates.

Cut-off relay 1101, at its contacts 1 and 2, disconnects the line relay 1102 from the calling line; at its contacts 3, locks to ground on the sleeve conductor S independent of the chain relay; at its contacts 4, opens the idle-indicating battery-supply lead; and at its contacts 5 opens the pulsing circuit extending to wire 1128.

VD1. *Busy condition*

If no trunk in the called group is available or if an unassigned thousands digit has been dialed, the thousands controller grounds the common busy wire BU, operating busy relay 1105 through its lower winding. Relay 1105 locks itself to the ground at make contacts 2 of release relay 1104; opens the chain at its contacts 6 to release chain relay 1106, thereby freeing the seized chain and the common control apparatus on the thousands-link frame; opens impulse wire 1121 at its contacts 5 to prevent further registration if further digits are dialed; at its contacts 2 restores cut-off relay 1101; at its contacts 3, it prepares for the restoration of the operated register THR; and at its contacts 1, it applies a trunk-busy-tone signal to the calling line from common trunk-busy-tone wire TBT through contacts 1 of series relay 1103 and tone-coupling condenser 1109.

The calling subscriber is expected to replace his receiver upon hearing this distinctive busy tone to thereby initiate the normal release of the connection.

VD2. *Matching and path selection*

Normally, there is an available idle trunk in the called group and the common control apparatus on the thousands-link frame extends the connection from the calling line to the selected trunk.

Thousands controller 1400, upon finding an idle path across the thousands-link frame to an idle trunk in the selected group, grounds the common switch lead SW thereby operating hold magnet HM–501 through make contacts 5 of chain relay 1106. Hold magnet HM–501 in addition to extending the tip, ring, and sleeve conductors of the calling trunk to respective conductors of the idle trunk in the called group, at its break contacts opens the connection between the chain conductors CH–1 and CH–2, thereby opening the chain and restoring chain relay 1106.

With the restoration of chain relay 1106, contacts 2 remove the bridge from across the winding of line relay 1102 thereby permitting it to restore and consequently restore series relay 1103 and release relay 704 at its contacts 1 and 2. The common control apparatus on the thousands-link frame is returned to common use, responsive to the opening of the chain and the connection is now extended from the thousands coupler across the thousands-link frame to an idle trunk extending to an idle block coupler on the selected block-link frame. The only items of equipment maintained operated in the thousands coupler 1100 is the cut-off relay 1101, which is held operated from the ground on the sleeve conductor S of the trunk extending to the seized block coupler, and thousands register THR which is maintained operated by residual magnetism.

VD3. *Clearout*

When the seized block coupler on the block-link frame clears out responsive to the receiver being replaced on the calling line, as will hereinafter be described, it removes ground potential from the sleeve conductor of the established connection thereby breaking down the connection by releasing all operated hold magnets. The removal of ground from the sleeve conductor S releases cut-off relay 1101 of incoming thousands coupler 1100. Ground is now extended from back contacts 2 of line relay 1102 through break contacts 5 of cut-off relay 1101, through back contacts 3 of release relay 1104, and through the make contacts 1 of thousands register THR to the upper winding of busy relay 1105. Busy relay 1105 operates and at its contacts 3 extends its operating ground through resistor 1111 to wire 1126 extending to the knock-down winding of thousands register THR. The thousands register is thereby restored and opens its make contacts 1, restoring busy relay 1105 and completing the clearing out of the incoming coupler 1100.

VI. SECTION-PREFERENCE RELAYS AND SECTION-CONNECT RELAYS (Figs. 12 and 13)

Referring now to Figs. 12 and 13, the section-preference relays 1200 and the section-connect relays 1300 shown thereon will be described.

VIA. *Section-connect relays 1300*

As shown in Figs. 2 and 6, the thousands-link frame has section-connect relays 1300 interposed between the associated thousands controller 1400 and the thousands controller 1400 and the thousands-link primary switches. On any call across the thousands-link frame, section-connect relays 1300 are set under the control of section-preference relays 1200 to connect thousands controller 1400 with the specific one of the ten primary switches 300A1 to 300A10 through which calls from the calling thousands coupler-section are handled.

The fulfillment of the foregoing requires the selective switching of 20 link-sleeve wires and 12 select-magnet wires of each of the ten primary switches, such as primary switch 300A1. The 20 sleeve wires of any thousands primary switch each require two contact sets on each section-connect relay, thereby bringing the number of contact sets per primary switch to 52, for a total of 520 for the ten primary switches. This requirement is met by providing the section-connect relays 1300 with twenty relays 1301A to 1310B, two relays for each primary switch with each relay including 27 make contact sets.

Relays 1301A and 1301B serve the first primary switch 300A1, relays 1302A and 1302B serve the second primary switch, etc. The contact sets on each of the pairs of section-connect relays serve wires of the primary switches 300A1 as follows:

1. Contact sets 1 and 2 of each of the two relays of any pair serve the select-magnet wires SMU and SML for the upper auxiliary and the lower auxiliary magnets, respectively;

2. Contact sets 3 to 7 (contact sets 5 to 7 not shown) of the "B" relay serve the select-magnet wires SM–1 to SM–5 and the contact sets 3 to 7 (contact sets 3 to 6 not shown) of the "A" relay serve the select wires SM–6 to SM–10; and 3. Contact sets 8 through 27 (contact sets 12 to 27 not shown) of the "B" relay serve the link-sleeve wires SU and SL from 1 through 5 while contact sets 8 through 27 (contact sets 8 to 23 not shown) of the "A" relay serve the link-sleeve wires SU and SL from 6 through 10.

Relays 1301A and 1301B are connected in multiple to control wire 1241 extending to section-preference relays 1201; relays 1302A and 1302B are connected in multiple to control wires 1242 extending to section-preference relay 1202; and relays 1310A and 1310B are connected in multiple to control wire 1240 extending to contacts on section-preference relay 1210. The ten control wires 1241 to 1240 associated with relays 1301 to 1310 correspond respectively to the ten associated thousands-link primary switches, as well as to the respectively associated sections 1 to 10 of the thousands couplers, as shown in Fig. 3.

VIB. *Section-preference relays 1200*

The section-preference relays 1200 include ten chain relays 1201 to 1210 which correspond respectively to the 10 thousands-couplers sections to which they are connected by chain-in conductors CH–IN–1 to CH–IN–10.

Normally-closed contacts 1 of relays 1201 to 1210 are serially related to comprise the main chain through which ground is normally extended to chain-end conductor 1225 which is normally extended to each of the thousands-coupler sections through contacts 2 of the associated relays and through the winding thereof over the chain-in conductors.

VIC. *Detailed operation*

With the section-preference relays 1200 and the section-connect relays 1300 in their normal condition, as illustrated in Figs. 12 and 13, their operation proceeds as follows:

VIC1. *Localizing the chain with the seizing coupler section*

Upon the seizure of the chain at any thousands coupler section (by the described closure of an operating circuit for chain relay 1006 of Fig. 10) the corresponding chain-in wire (CH–IN–1 to CH–IN–10) incoming to the seizing thousands coupler section from a section-preference relay, is connected to battery, through the chain relay 1006 of thousands coupler 1000, one of the relays 1501 to 1519 of the digit relays 1500, over chain battery wire CB, and through break contacts 3 of chain control relay 14A3 of thousands controller 1400. A circuit is thereby established over the concerned chain-in wire, through the winding of one of the associated relays 1201 to 1210, break contacts 2 of such relay, and over chain-end wire 1225 to ground through the main chain (break contacts 1 of relays 1201 to 1210). The concerned chain relay (1201 to 1210) operates along with the other noted relays in the series circuit, and at its make-first contacts 1 locks itself to the preceeding portion of the main chain. At its break contacts 1, it opens the main chain and at its contacts 2, it disconnects its own winding from the chain-end conductor 1225. By this operation, the corresponding thousands coupler section is selected along with the associated primary switch, and the closure of a circuit in any other section of the chain is precluded.

In the event that two or more of the relays 1201 to 1210 operate at the same time, only the lowest numbered one of them remains operated, as each of them, at its break contacts 1, opens chain ground from the holding circuit of the succeeding ones. The order of preference is from relay 1201 to relay 1210. The preference, therefore, runs from the first primary switch (and also the first thousands-coupler section) to the tenth.

Operation of any chain relay 1201 to 1210, at its contacts 3 thereof, apply ground to the associated control wire extending to the relays of section-connect relays 1300, operating the chosen pairs of relays.

Assuming that the calling coupler is in the first thousands-coupler section and associated with the first primary switch 300A1, section-preference relay 1201 operates as it has the preference. At its contacts 3, ground is extended to the winding of the relays 1301A and 1301B through break contacts 28 thereof. The windings of these relays are of such low resistance value that a large amount of current passes through their windings, operating them in a very short interval of time. When these relays operate they open their break contacts 28 and insert their respective current-limiting resistors 1311 and 1312 in series with their windings as a current-saving feature.

Contact sets 8 through 27 of relays 1301A and 1301B connect the twenty sleeve wires (SU1 to SL10) of the thousands controller to the corresponding wires of the thousands primary switch 300A serving the calling coupler, and apply idle-indicating battery potential to the sleeve wires through respective resistors 1341 to 1340. Contacts 3 through 7 of each of these relays, connect select magnet wires SM1 to SM10 from the thousands controller to the corresponding select magnet wires of the selected primary switch 300A1. Contact sets 1 and 2 connect auxiliary select-magnet wires SMU and SML from the thousands controller 1400 to the corresponding wires of the selected primary switch 300A1.

At the same time that the section-preference relay 1201 operated, the digit relay (1501 through 1519) corresponding to the selected initial digit lead ID2 to ID10 or thousands digit lead TH1 to TH10 is operated. Contacts 1 of the concerned digit relay place ground on start wire ST extending to thousands controller 1400 and contacts 2 of the operated one of relays 1501 to 1509 or contacts 2 and 3 of the operated one of relays 1510 to 1519 place ground on the selected wires extending to grouping terminals 1700 to call in the test wires of the trunk group selected so that the thousands controller 1400 can match a path to the idle trunk in the called group. This operation includes testing the 20 (ten pairs) links 260 extending from the connected thousands-link primary switch to the thousands-link secondary switches. This testing is carried out by the thousands controller over the twenty sleeve wires SU-1 to SL-10, which are connected through contacts on the section-connect relays 1300 to the corresponding sleeve wires of the connected thousands-primary switch. Idle-indicating battery, through the associated resistor (1341 to 1340) appears on the sleeve of each thousands-link unless the link is busy, in which case it is masked by the holding ground on the sleeve wire of the link.

When a path has been matched, as described generally in connection with Figs. 4 to 9, thousands controller 1400 closes the necessary select magnet circuits to cause the mechanical selection of the matched thousands links to occur at the concerned thousands-link primary switch 300A1 and associated secondary switch. One part of this operation comprises grounding the concerned one of the ten select magnet wires SM-1 to SM-10 incoming to the section-connect relays 1300 from the thousands controller, thereby grounding the corresponding wire of the connected thousands-link primary switch. This operates the corresponding principal select magnet SM-1 to SM-10 of the primary switch 300A1 in series with the principal secondary select magnet serving the pair of thousands-links which includes the matched one.

The second part of this operation comprises connecting the required one of the two battery-connected auxiliary select magnets SMU-507 and SML-508 of the concerned secondary switch 300A1 to the corresponding one of the wires SMU and SML (extending between the thousands controller 1400 and section-connect relays 1300), thereby operating such auxiliary secondary select-magnet in series with the corresponding ground-connected auxiliary select-magnet (SMU-504 or SML-503) of the connected primary switch 300A1.

Upon the completion of the mechanical selection of the matched path at the thousands primary and secondary switches, circuits are closed in the thousands controller for operating the required hold magnet on the primary and secondary switches to extend the connection across the thousands-link frame over the matched thousands link 260, to the selected thousands trunk 1-270-1.

Upon the connection being closed over the matched path, the hold magnets of the concerned primary switch in use opens the chain at its break contacts (break contacts on hold magnet HM-501 or HM-502), thereby restoring all the relays being held operated thereover, including the operated one of the section-preference relays 1201 to 1210 of section-preference relay 1200. The restoration of this relay restores the main chain to its normal condition, and opens the operating circuit of the operated select magnets (by opening wires SM-1 to SM-10 and wires SMU and SML) by restoring the operated relays 1301A and 1301B of the section-connect relays 1300.

The section-preference relays 1200 and the section-connect relays 1300 are thus completely cleared out and stand again in their illustrated condition.

VII. DIGIT-CONNECTING APPARATUS (FIGS. 15 AND 16)

Referring now to Figs. 15 and 16, the digit-connecting apparatus, comprising digit relays 1500 and digit-connect relays 1600, will be described.

As shown in Figs. 2 and 6, the thousands-link frame has digit-connecting apparatus 1500 and 1600 interposed between the digit wires of the thousands couplers and the associated thousands controller. On all calls across any thousands-link frame, the digit-connecting apparatus is set according to the digits dialed (either the initial digit or the thousands digit) in the calling coupler to cause the thousands controller to test the thousands trunks associated with the thousands-link secondary switches through which calls to the trunk coupler (outgoing calls) or calls to the 1000-link switching blocks (terminating calls) are handled and to close a path for transmitting digit information to the concerned block coupler when required.

The fulfillment of the foregoing requires the selective switching of the match-test and the number block wires of the thousands trunks of each of the ten secondary switches. Accordingly, the digit connecting apparatus is provided with digit relays 1500 for recording in the common control apparatus, the digit dialed in the thousands coupler and is also provided with digit-connecting relays 1600, which respond to the setting of the digit relays 1500, to call in the match-test and number block wires of the thousands trunks of the called group.

VIIA. *Digit-connect relays 1600*

Relays 1601 to 1648 (of which the first two and last one is shown) comprise the digit-connect relays 1600. Relays 1601 to 1624 are match-test connect relays and are assigned the function of connecting the match-test wires of the thousands trunks to the thousands controller while relays 1625 to 1648 are number-block connect relays and are assigned the function of connecting the number-block wires (associated with the thousands trunks extending to the 1000-line switching blocks), with the thousands controller.

Digit-connect relays 1600 are operated over their respective conductors R extending to the grouping terminals 1700 (over conductors in cable 288) from whence they are jumpered (as will be hereinafter described) to contacts on the associated digit relays 1500. Therefore, operation of any one of the digit relays 1500 to record the digit dialed in the calling thousands coupler operates the assigned digit-connect relay.

The match-test wires, one for each thousands trunk, are assigned predetermined connect relays by jumpers on grouping terminal 1700 and are called in for test by the thousands controller when the connect relay to which they are assigned is operated.

It has been chosen to provide the digit-connecting apparatus with 24 digit-connect relays for calling in the groups of match-test wires. These match-test wires are assigned digit-connect relays as desired and any one relay may connect up to thirty match-test wires to the thousands controller. The thousands controller is arranged to test a maximum of thirty match-test wires on any one call in, thereby limiting the trunks tested, at any one time, to 30. However, it is possible for a trunk group to contain more than 30 trunks as an arrangement is provided wherein the match-test wires are connected to more than one connect relay as the controller tests the match-test leads associated with the relays in succession upon successive call ins.

Digit-connect relays 1600 are also provided with 24 number-block relays (1625 to 1648) to provide for the selective switching of 24 number-block groups for transmitting thousands digit information to the selected one of the 1000-line switching blocks. Accordingly, the operate wires of the relays assigned the number block groups are energized only when a thousands digit is dialed, as on calls outgoing to other exchanges, there is no thousands digit dialed in the local exchange B.

VIIB. *Digit relays 1500*

Relays 1501 through 1519 comprise functional relay groups of the digit relays 1500 as follows:

1. Relays 1501 to 1509 are the digit relays for temporarily recording in the common control apparatus, the initial digit dialed; and 2. Relays 1510 to 1519 are the digit relays for temporarily recording in the common control apparatus, the thousands digit dialed.

Relays 1501 to 1509 are operated over their respective digit leads ID2 to ID10 in cable group 1–281 while relays 1510 through 1519 are operated over their respective thousands leads TH1 to TH10 (cable group 1–281). Contacts 1 on each of the digit relays 1501 through 1519, when operated, place ground on start wire ST extending to thousands controller 1400, to call it in for operation. Make contacts 2 on each of the relays 1501 to 1509 and make contacts 2 and 3 of relays 1510 to 1519, when operated, place ground on respective conductors in cable groups RG–1, RG–2 and RG–3 extending to the grouping terminal 1700 over conductors in cable 288 to operate the assigned one of digit-connect relays 1600 of Fig. 16 according to the jumpering on the grouping terminals, as will be described hereinafter.

VIIB1. *Seizure of the digit-connecting apparatus*

In the specific form of digit relays 1500 illustrated in Fig. 15, initial digit 6 is employed to index one of the local 1000-line switching blocks; initial digits 2 to 5 are unassigned and initial digits 7 to 0 are assigned to respective groups of outgoing trunks. Two of the four outgoing groups may be those from exchange B to respective exchanges A and C while the remaining two outgoing trunks may extend to operator switchboards (not shown).

When the initial digit dialed and registered in any thousands coupler 1000, as hereinbefore described, has any value from 7 to 0, the operation of the thousands coupler at the end of the dialing of such an initial digit closes a circuit over the associated section of the chain which includes the hereinbefore noted three relays (one of the section-preference relays 1201 to 1210, chain relay 1006, and a digit relay 1501 through 1509) in series.

When the initial digit dialed and registered in any thousands coupler has a value of 6, the operation of the block coupler at the end of dialing of such initial digit transfers the pulsing wire from the initial digit register to the thousands register, as hereinbefore described. At the end of dialing of the thousands digit 1 to 0, the thousands coupler closes a circuit over the associated section of the chain which includes three relays in series as follows:

1. From ground over one of the section-preference relays 1201 to 1210;

2. Chain relay 1006 in the calling thousands coupler, one of the thousands digit wires TH1 to TH10 which corresponds to the thousands digit dialed; and 3. The corresponding digit relays 1510 to 1519 of digit relays 1500, and over chain battery wire CB to battery. As hereinbefore described, the operation of chain relay 1006 in the calling thousands coupler acts to guard the associated section branch of the chain from seizure by another thousands coupler therein, and connects the seizing thousands coupler with the associated wires extending to the block controller. Operation of any one of the section-preference relays, guards the chain from seizure at any other thousands coupler section and acts to position the section-connect relays 1300 according to the thousands-link primary switch serving the thousands coupler section in which the call originated. The operation of one of the digit relays 1301 to 1319 acts to set the digit-connect relays 1600 in accordance with the called group of trunks.

VIIB2. *Setting digit-connect relays 1600*

If, for example, the dialed initial digit is a 7, relay 1506 of digit relays 1500 operates over initial digit wire ID7. Relay 1506 thereupon grounds the start wire ST extending to thousands controller 1400 and grounds conductor 6 in cable group RG–1 extending to grouping terminals 1700.

As will be described hereinafter, this ground is extended through jumpers on the grouping terminals 1700 to operate one of the digit connect relays 1600. On outgoing calls, the jumpering on the grouping terminals 1700 is such that none of the relays 1625 to 1648 are operated, as these relays are only operated on a terminating call (a call to a block-link frame). These relays serve to extend a connection over the number-block wires extending to the 1000-line switching blocks.

Assuming that the ground on conductor 6 in cable RG–1 is extended to conductor RM of digit-connect relays 1601 through jumpering on grouping terminals 1700, relay 1601 promptly operates and at its contacts 31, places current-limiting resistor 1650 in series with its winding to limit the current flow therethrough.

With the operation of relay 1601, each of the 30 make contact sets 1–30 are closed and extend the match-test wires MT–1 to MT–30 of the trunks associated with the called group to the thousands controller 1400 over respective match-test extension wires MTE–1 to MTE–30.

The match-test wires MT–1 to MT–30 are extended through jumpers on the grouping terminals 1700 of Fig. 17 to the sleeve conductors of the thousands trunk associated with the called group as will be described in detail hereinafter. If the trunk associated with any match test conductor is idle when the concerned digit-connect relay 1600 is operated, battery on the sleeve wire S of the thousands trunk is extended to the trunk-test relays in the thousands controller 1400. If the trunk associated with any match-test wire in the called group is busy, the battery potential thereon is masked by a ground potential on the conductor of the trunk actually in use.

If, for example, the initial digit is a 6, relay 1505 of digit relays 1500 does not operate as it is not connected to the chain battery lead CB. Assuming that the thousands digit dialed, following the dialing of the initial digit 6, is the digit 3, relay 1512 of digit relays 1500 operates over thousands wire TH–3. Relay 1512 thereupon grounds start wire ST extending to the thousands controller and at its contacts 2 and 3, ground conductors 3 of respective cable groups RG–2 and RG–3 extending to the grouping terminal 1700. Assuming that the conductor 3 of cable group RG–2 is jumpered on grouping terminals 1700 to the RM conductor of relays 1612 (not shown) and the conductor 3 of cable group RG–3 is jumpered to the RN conductor of relay 1634 (not shown), relays 1612 and 1634 operate, and as described for relay 1601, insert the associated current-limiting resistors in series with their windings.

Upon the noted operation of match-test connect relay 1612, the match-test wire of each thousands trunk which is jumper-connected with respective contact sets thereof, extend idle-indicating battery (if the concerned trunk is idle) over the match-test conductors MT–1 to MT–30 of digit-connect relay 1612 to respective match-test extension conductors MTE–1 to MTE–30, which extend to the trunk test relays in the thousands controller. If certain the trunks are busy, the idle-indicating battery normally on their sleeve wire S is replaced by holding ground. This holding ground is thereupon extended over the associated conductors and through contact sets on relay 1624 to the corresponding match-test relay.

Upon the noted operation of digit-connect relay 1634, the jumper-connected number-block wires associated with the selected thousands trunks extending to the 1000-line switching block, are extended to the thousands controller. For example, if the thousands digit 3 is dialed and it has been predetermined that the "63" trunk group (initial-digit 6 and thousands digit 3) corresponds numerically to the portion of the directory number of the second station on lines in the 1000-line switching block reached by trunk group "63," number-block wires NB–2, of each of the trunks extending to the block couplers on the selected block-line frame is jumper-connected to the contact sets of relay 1634 in the same order as their associated match-test wires are connected to contact sets on relay 1612. The number-block extension leads NBE–1 to NBE–30 are thereupon extended through the 30 contact sets on relay 1634 to the number block common leads NBC–1 to NBC–30 respectively and are extended to make contacts on the trunk test relay. These leads serve to transmit the registered thousands-digit information from the calling thousands coupler to the called block coupler to set the thousands-digit register thereof according to the station location of the called station on the called line.

After the thousands controller has completed its hereinafter described testing operations, the chain is opened (as hereinbefore noted) to restore all operated digit relays, which removes ground from the windings of the digit-connect relays, permitting all operated ones to restore, thereby clearing out the digit-connecting apparatus 1500 and 1600.

VIII. GROUPING TERMINALS 1700 (FIG. 17)

Referring now to Fig. 17, parts 1 to 4, the grouping terminals associated with any thousands link-frame will be described.

The grouping terminals of Fig. 17 are shown as small individual circles. They preferably comprise terminal pins passing through blocks or a panel-like insulating member mounted on the rear face of the equipment on which the relay apparatus of Figs. 14 to 16 are mounted. These pins provide terminals through which the noted trunk assignment and station assignment is controlled, as desired, by jumpers extended between the terminals. Each pin preferably extends directly through the rear face of the equipment to provide an exposed inner end to which a local cable conductor or strap is attached, and an end exposed on the rear face of the equipment to receive a jumper.

There are 3360 grouping terminal pins represented in Fig. 17. They comprise seven sections (1701 to 1707) of 480 terminal pins each. In any sections 1701 to 1707, the pins are arranged in ten columns, with 48 pins in a column and 48 levels with 10 pins in each level. For ready identification the 48 levels of pins in a section are divided into 12 four-level groups 1 to 12. The 480 terminal pins of a section thus comprise 12 smaller groups of 40 terminals each.

In each section, the four-level groups 3 to 9 are shown by a dotted rectangle and are assumed to be similar to the other four-level groups of their section.

The seven sections 1701 to 1707 are divided primarily into 2 separate fields as follows:

(1) Sections 1701 to 1703 comprise the match-test field; and (2) Sections 1704 through 1707 comprise the number-block field.

VIIIA. *Match-test field*

The 12 four-level groups of the first two sections 1701 and 1702 identified by designations (R1) to (R24) are assigned respectively to the 24 match-test connect relays 1601 to 1624 of Fig. 16. Each such four-level terminal-pin group of 40 terminals provides terminal points for the 30 match-test extension wires connected to the contacts of the associated digit-connect relay and provide one terminal point for wire RM connected to the winding of the concerned relay. The remainder of the terminal pins of each four-level group (the terminal pins in columns 2 to 10 of the first level of each of the four-level groups) are unassigned. The equipped or assigned terminal pins of any one four-level group are connected to the associated connect relay contacts over the conductors in cable group MTG extending to digit-connect relays 1600.

The first 10 four-level terminal pin groups 1 to 10 of section 1703 identified by designations (SS–1) to (SS–10) correspond respectively to the ten secondary switches and each group terminates the match-test wires of the associated switch. Of each four-level group, only the first two levels (20 terminal pins) are used to accommodate these match-test wires. The terminal pins of the first level of any one of the first 10 groups serve as attachment points for match-test wires MT–1 to MT–10 of the associated switch and the terminal pins in the second level of the same group serve as attachment points for the match-test wires MT–11 to MT–20 of the same switch. The third and fourth level of each of the 10 four-level groups and the entire four levels of groups 11 and 12 are unequipped. The equipped terminals of each of the 10 four-level groups are connected to the match-test wires (one wire for each vertical) of the secondary switches over conductors in cable 278 extending to the secondary switches.

VIIIB. *Number-block field*

Portions of sections 1704 and 1705 and all of sections 1706 and 1707 are assigned to the number-block field. The 12 four-level groups of sections 1706 and 1707, identified by designations (R1) to (R24) are assigned respectively to the 24 number-block connect relays 1625 to 1648 of Fig. 16. Each such four-level terminal pin group of 40 terminals provides terminal points for the 30 number-block extension wires, NBE–1 to NBE–30 connected to the contacts of the associated number-block relay and provide one terminal pin for wire RN extending to the battery-connected winding of the associated connect relay. As noted for sections 1701 and 1702, the remainder of the terminal pins are unequipped. The equipped or assigned terminal pins are connected to the respective number-block extension wires over conductors in cable group NBG extending to digit-connect relays 1600.

The first 10 four-level groups 1 to 10 of sections 1704 and 1705 identified by designations (SS–1) to (SS–10) correspond respectively to the 10 secondary switches. The first four-level group of sections 1706 to 1707 is assigned to the first secondary switch, the second four-level group of both sections is assigned to the second secondary switch and so on. The first 10 terminal pins in the first level of any four-level group of sections 1704 and 1705 terminate the number-block wires NB–2 associated with the thousands trunks of the secondary switch corresponding to the concerned groups. The second level of terminal pins of any of the first ten four-level groups terminate the number-block wires NB–3 and the third level terminates the number block wires NB–4. The fourth level of each of the first 10 four-group levels of sections 1704 to 1705 are unequipped. The equipped terminals are connected to the respective number block wires of the thousands trunks over conductors in cable 276.

VIIIC. *Digit field and large-group field*

The last two four-level groups (groups 11 and 12) of sections 1704 and 1705 comprise the digit field and the allotter field. Terminal pins of group 11 of section 1704 serves as attachment points for the nine initial-digit leads 1 to 9 extending from the initial-digit relays (1501 through 1509 of Fig. 15) over conductors in cable group RG–1. In group 11, only the first nine terminals of the first level are equipped.

Group 12 of section 1704 terminates the thousands digit wires of the digit relays 1510 to 1519 of Fig. 15. The first level of terminals are assigned to the ten wires in cable group RG–2 while the second level of terminal pins in group 12 are assigned the wires in cable group RG–3. The third and fourth levels of group 12 are unequipped.

The last two four-level groups (groups 11 and 12) of section 1705 are assigned as attachment points for the wires of the subgroup allotters for large-trunk groups. Group 11 of section 1705 is assigned to the wires pertaining to the match-test relay control circuits while the terminals of group 12 of section 1705 are assigned to the wires pertaining to the number-block relay control circuits. The first two columns of terminals in groups 11 and 12 of section 1705 are assigned to the wires of the first allotter relay 14D10 over conductors in cable groups MTA1 and NBA1 while the last two columns are assigned to the wires of the fifth allotting relay 14D15 over conductors in cable group MTA5 to NBA5. Cable groups MTA1 to NBA5, of cable 287, connect the wires of the concerned allotter relays to their corresponding terminal pins.

VIIID. *Grouping terminals jumpering*

The ends of the terminal pins exposed on the rear face of the equipment, as noted, may be jumpered between the various fields as follows:

(1) From the terminal pins terminating the match-test extension wires (those wires extending to the associated MT connect relays) to the pins terminating the match-test wires (those wires extending to the secondary switches) to provide a trunk-test connection to the thousands controller when the associated connect relay is operated. Several of such jumpers are shown in cables 1711 to 1718.

(2) From the terminal pins (RM) terminating the connect relay windings of the match-test connect relays (1601 to 1624) to the pins terminating the initial digit wires of cable group RG–1 or the pins terminating the thousands digit wires of cable group RG–2 to provide an operate circuit for the concerned relay when the trunk group to which it is assigned is dialed. Several of such jumpers are shown at 1721 to 1724.

(3) From the terminal pins terminating the number-block extension wires (those wires extending to the associated NB connect relay) to the pins terminating the number-block wires NB–2 to NB–4 (those wires extending to the secondary switches) to provide a path for transmitting thousands digit information to the concerned block coupler when the number-block connect relay associated therewith is operated. Several of such jumpers are shown in cables 1731 to 1739.

(4) From the terminal pins (RN) terminating the connect relay winding of the number-block connect relays (1675 to 1648) to the pins terminating the thousands digit wires of cable group RG–3 to provide an operate circuit for the concerned relay when the terminating trunk group to which it is assigned is dialed. Several of such jumpers are shown as jumpers 1741 to 1743.

(5) From the terminal pins (RM) terminating the connect relay winding of the match-test connect relays to the pins terminating the operate wires (1 to 3) of the match-test allotter group to provide an operate path for the concerned allotter relays when the trunk group dialed contains more than thirty trunks. Several of such jumpers are shown at 1751, 1752, 1756 and 1757.

(6) From the terminal pins terminating the initial-digit wires of cable RG–1 to the pins terminating the relay wires R of the match-test allotter groups to extend the operate ground from the digit relay operated (one of the initial digit relays 1501 to 1509) to the winding of the match-test connect relay currently assigned, by action of the large-group allotter, the trunk group dialed. Such a jumper is shown at 1750.

(7) From the terminal pins (RN) terminating the connect relay winding of the number-block relays to the pins terminating the operating wires (1 to 3) of the number-block allotter group to provide an operate path for the concerned relays when the terminating trunk group dialed contains more than thirty trunks. Several of such jumpers (1771 to 1776) are shown in cables 1777 to 1779.

(8) From the terminal pins terminating the thousands digit wires of cable RG–2 to the pins terminating the relay wires R of the match-test allotter group to extend the operate ground from the digit relay operated (one of the thousands digit relays 1510 to 1519) to the winding of the match-test connect relay currently assigned, by action of the large group allotter, the trunk group dialed. Such a jumper is shown as 1780.

(9) From the terminal pins terminating the thousands digit wires of cable RG–3 to the pins terminating the relay wires R of the number-block allotter group to extend ground from the digit relay operated (one of relays 1510 to 1519) to the winding of the number-block connect relay currently assigned, by action of the large-group allotter, to the trunk group dialed. Several of such jumpers are shown at 1790 to 1792.

It has been chosen to illustrate the grouping terminals 1600 jumper assignments of the trunks of any thousands-link frame as ones pertaining to a system which includes four 1000-line switching blocks such as those shown in Fig. 4 of the drawings. The assignment of the trunks on any thousands-link frame associated with these switching blocks are shown in the following table:

THOUSANDS-LINK FRAME TRUNK ASSIGNMENT TABLE

| Trunk Size | Group No. | Trunk Nos. | Sec. Sw. Nos. | Vertical No. |
|---|---|---|---|---|
| 20 | 61 | 1 to 10 | 1 to 10 | 1 |
| | | 11 to 20 | 1 to 10 | 2 |
| 25 | 62–63 | 1 5o 10 | 1 to 10 | 4 |
| | | 11 to 20 | 1 to 10 | 5 |
| | | 21 to 25 | 1 to 5 | 6 |
| 30 | 64–66 | 1 to 10 | 1 to 10 | 7 |
| | | 11 to 20 | 1 to 10 | 8 |
| | | 21 to 30 | 1 to 10 | 9 |
| 35 | 67–60 | 1 to 10 | 1 to 10 | 11 |
| | | 11 to 20 | 1 to 10 | 12 |
| | | 21 to 30 | 1 to 10 | 13 |
| | | 31 to 35 | 6 to 10 | 14 |
| 40 | 7 | 1 to 10 | 1 to 10 | 15 |
| | | 11 to 20 | 1 to 10 | 16 |
| | | 21 to 30 | 1 to 10 | 17 |
| | | 31 to 40 | 1 to 10 | 18 |
| 10 | 0 | 1 to 10 | 1 to 10 | 20 |

For example, referring to trunk group 61, it will be noted that it includes 20 trunks, the first ten being assigned vertical 1 of each of the ten secondary switches and the last 10 trunks being assigned verticals 2 of switches 1 to 10.

VIIID1. *Trunk group 61 jumper assignment*

Assuming the trunk group dialed is trunk group 61, digit relay 1510 is operated from the ground on thousands wire TH–1 from the calling thousands coupler as hereinbefore pointed out. Contacts 1 of relay 1510 place ground on the start lead ST starting the thousands controller into its hereinafter described sequence of operation; and its contacts 2 and 3 ground conductor 1 of cable groups RG–2 and RG–3, extending to the grouping terminals 1700. The ground on these conductors appear on the associated terminals (terminals 1 of levels 1 and 2 of the four-level group 12 of section 1704) and is thereupon extended by jumpers as desired. Jumper 1722 extends the ground from terminal 1 of the first level of group 12 the operate winding of digit connect relay 1612 (not shown) over conductor RM of cable group MTG. Relay 1624 closes its 30 make contact sets and connects the thousands controller match-test relay wires MTR–1 to MTR–30 (common to relays 1601 to 1624) to the associated match-test extension wires MTE–1 to MTE–30 which are attached to the terminal pins in group R12 of section 1701, as noted.

The first 20 match-test extension wires (MTE–1 to MTE–20) are further connected by jumpers 1 to 20 of cable 1714 to the terminals of the MT wire groups corresponding to verticals 1 and 2 of each of the secondary switches. These terminals are connected to the match-test wires of the 20 trunks in group 61 as noted in the trunk assignment table. Therefore, following the dialing of the trunk group 61 and the seizure of the common control apparatus, digit relay 1510 effects operation of the jumper-assigned digit connect relay 1612 which calls in, to the thousands controller, the match-test wires of trunk group 61. The thousands controller thereupon tests the trunks of the called group in order to extend the connection to an idle one. Upon completion of the testing operation and the consequent clearing out of the common control apparatus, the operated digit relay and assigned digit-connect relay are restored thereby disconnecting the match-test wires of the trunks in the called group from the thousands controller.

VIIID2. *Trunk group 62 and 63 jumper assignment*

Trunk group 62 and 63 includes 25 trunks extending from the verticals of the secondary switches to the equipped 1000-line switching blocks and can be reached by dialing either of the initial digit and thousands digit combinations 62 or 63. These 25 trunks are assigned verticals 4 and 5 of each of the ten secondary switches and verticals 6 of secondary switches 1 to 5. If trunk group 62 is dialed, the control apparatus in the block coupler and the block translator of the 1000-line switching block to which the matched idle trunk is extended notifies the ringing apparatus that the called line is a single party line or that the called party is the first station on the two or four party line as no information to the contrary is transmitted thereto. The dialing of trunk group 63 causes information to be transmitted to the noted control apparatus on the block-link frame to cause it to determine the station location of the called party. This information is transmitted to the concerned block-link frame over the number-block wires NB–2 to NB–4 associated with the seized trunk. The operation of the control apparatus on the block-link frame in determining the noted station location will be described in detail hereinafter.

Responsive to the dialing of trunk group 62, digit relay 1511 is operated and its contacts 2 and 3 ground conductor 2 of cable groups RG–2 and RG–3 extending to the grouping terminals. This ground appearing on the associated terminals (terminals 2) of the first two levels of the four-level group 12 of section 1704. If the trunk group dialed is 63, relay 1512 operates and grounds conductor 3 of cable groups RG–2 and RG–3 thereby extending ground to the associated terminals (terminal 3) of the first two levels of group 12.

It will be noted that the terminal pins of the first level of group 12, those associated with conductors 2 and 3 of cable group RG–2, are connected together by jumper 1719 and are associated with jumper 1723 extending to the RM conductor of MT connect-relay group R13 of section 1702. Therefore, responsive to the dialing of trunk group 62 or 63, ground appears on the conductor RM extending to relay 1613 (not shown) of Fig. 16. Relay 1613, similar to relays 1601 and 1602, operates and closes its 30 contact sets. At the same time, if trunk group 63 is dialed, the ground on conductor 3 of cable group RG–3 and appearing on terminal 3 of the second level of group 12, is extended by jumper 1741 to the terminal pin RN in NB connect-relay group R10 of section 1706 and is extended over the RN conductor in cable group NBC to operate the associated number block digit-connect relay 1624 (not shown) which closes its 30 contact sets.

With the dialing of the trunk group 62 or 63, the match-test relay wires MTR–1 to MTR–30, common to relays 1601 to 1624 and extending to the thousands controller 1400, are connected to the associated match-test extension wires MTE–1 to MTE–30 which are attached to the corresponding terminal pins in group 13 of section 1702. The first 25 match-test extension wires MTE–1 to MTE–25 are further extended by jumpers 1 to 25 of cable group 1715 to the terminals of the match-test wire group corresponding to verticals 4 and 5 of each of the secondary switches and vertical 6 of switches 1 to 5.

At the same time, the match-test relay wires are extended to the associated trunks, the number-block control wires NBC–1 to NBC–30, common to relays 1625 to 1648 extending to the thousands controller 1400 are connected through the 30 make contact sets on digit-connect relay 1634 to the corresponding terminal pin in relay group R10 of section 1706, provided trunk group 63 is dialed. The first 25 number block extension wires (NBE–1 to NBE–25) are further connected by jumpers 1 to 25 of cable 1731 to the terminals of the NB wire group corresponding to the number-block wires NB–2 associated with the secondary switches 1 to 10.

As will be described hereinafter, upon the completion of a successful matching operation by the thousands controller, ground potential is placed on the thousands controller match-test wire and the thousands controller number-block wire which corresponds to the thousands trunk selected in the extension of the connection and these grounds are extended over the hereinbefore described jumpers to the match-test wires and to the number-block wire NB–2 associated with the matched trunk.

As hereinbefore pointed out, the dialing of the trunk group 62 does not energize any number-block connect relay as the terminal associated with conductor 2 of cable group RG–3 is not jumper-connected. Therefore, following the dialing of trunk group 62 and the seizure of the common control apparatus on the thousands-link frame, the match-test wires of the trunks in the called group are tested in order to determine which trunks are idle and which ones are busy; and following the dialing of trunk group 63 and the calling in of the common control apparatus, the same match-test wires are brought in to the thousands controller for test and the number-block wires NB–2 associated with the trunks of the called group is energized by the thousands controller in order that station-location information may be transmitted to the concerned coupler.

The noted chain circuit opens responsive to the successful matching of a path across the thousands-link frame and the operated digit relays are restored, thereby restoring all operated digit-connect relays, completing the clearing out of the common control apparatus.

VIIID3. *Trunk group 64, 65, and 66 jumper assignment*

As illustrated in the trunk assignment table, there are 30 trunks extending to the equipped 1000-line switching blocks which may be reached by dialing trunk group 64, 65, and 66. These 30 trunks are assigned verticals 7, 8, and 9 of each of the ten secondary switches.

If the dialing of the initial digit 6 is followed by a thousands digit 4, digit relay 1513 is operated; if trunk group 65 is dialed, relay 1514 is operated and if trunk group 66 is dialed, relay 1515 is operated.

With the dialing of an initial digit 6 followed by the dialing of a thousands digit 4, 5, or 6, the corresponding ones of the conductors 4, 5, and 6 of cable groups RG–2 and RG–3 are grounded and this ground appears on the corresponding terminals in the four-level group 12 of section 1704 of the grouping terminals 1700. As will be noted in Fig. 17, part 3, the terminals associated with the conductors 4, 5, and 6 of cable group RG–2 are connected together by jumpers 1728 and 1729 and are attached to jumper 1624. Therefore ground being placed on any one of these three conductors responsive to the operation of any one of relays 1513 to 1515 appears on jumper 1724 extending to the terminal RM of relay group 14 of section 1702 which serves as an attachment point for conductor RM of cable group MTG extending to the operate winding of match-test digit-connect relay 1614 (not shown). Relay 1614 is operated and closes its 30 make contact sets.

The ground appearing on terminal 5 and 6 (those associated with the conductors 5 and 6 of cable group RG–3) of the second level of group 12 of section 1704 from the ground at make contacts 3 of the conerned relay is extended by respective jumpers 1742 and 1743 of cable 1740 to the terminal pins RN of respective relay groups 11 and 12 of section 1706. This ground is extended over the concerned conductor RN in cable group NBG of cable 288 to the battery-connected windings of the number-block digit-connect relays 1635 and 1636 (not shown). Therefore when relay 1514 operates, (responsive to the dialing of trunk group 65) relay 1635 is operated and closes its 30 make contact sets and when relay 1515 operates (responsive to the dialing of trunk group 66) number-block digit-connect relay 1636 is operated and closes its 30 make contact sets.

With the operation of match-test digit-connect relay 1614 from the ground on any one of the three conductors 4, 5, and 6 of cable group RG–2, as noted, the match-test relay wires MTR–1 to MTR–30, extending to the thousands controller 1400 and the trunk-test relays thereof, are connected through the make contacts of this relay to the match-test extension wires terminated on terminals in relay group 14 of section 1702. Each of these match-test extension wires (MTE–1 to MTE–30) are jumper-connected by jumpers 1 to 30 of cable 1716 to the terminals of the MT wire groups corresponding to verticals 7, 8, and 9 of each of the ten secondary switches.

With the operation of digit relay 1614 responsive to the dialing of trunk group 65, number-block digit-connect relay 1635 is operated, as noted, and connects the 30 number-block control wires NBC–1 to NBC–30 to the corresponding number-block extension wires NBE–1 to NBE–30 (associated with relay 1635) which are connected to the terminals of relay group 11 of the NB connect-relay groups. These 30 number-block extension wires are further extended by jumpers 1 to 30 of cable 1732 to the terminals serving as attachment points for the number-block wires NB–2 of the trunks in the called group.

With the dialing of trunk group 66, relay 1636 is operated and the number-block common wires NBC–1 to NBC–30 are extended to the number-block wires NB–3 of the trunks in the called group, over jumpers 1 to 30 of cable 1733 to the terminals serving as attachment points for the number-block wire NB–3 of the trunks in the called group.

Therefore, if the trunk group 64 is dialed, only the match-test wires of the trunks of the called group are brought in for test by the thousands controller while if the trunk group 65 or 66 is dialed, the number-block wires (NB–2 for the trunk group 65 and NB–3 for the trunk group 66) are brought in for test at the same time that the match-test wires are called-in.

The thousands controller tests the match-test wires and energizes the number block wires of the thousands trunks of the called group as will hereinafter be described, and thereafter clears out with the restoration of the apparatus. The operated digit relay and the digit-connect relay are then restored.

VIIID4. *Trunk group 67, 68, 69, and 60 jumper assignment*

As illustrated in the trunk assignment table disclosed hereinbefore, in trunk group 67, 68, 69, and 60, there are 35 trunks extending from the calling thousands-link frame to the equipped 1000-line switching blocks. These 35 trunks are assigned in regular order to verticals 11 to 13 of each of the ten secondary switches 1 to 10 and vertical 14 of switches 6 to 10.

Since there are 35 trunks in this trunk group and since the thousands controller is arranged to test a maximum of 30 trunks at any one time, in order to evenly distribute the calls among the 35 trunks, an arrangement is provided where upon successive call-ins of the match-test wires of the trunk in trunk group 67, 68, 69, and 60, the first 30 trunks of the trunk group are tested on the first call-in and the last 30 trunks of the group are tested upon the second call-in.

Also, since the number-block relays are arranged to transmit thousands digit information over the number block wires of a maximum of 30 trunks at any one time, an arrangement is provided whereupon the number-block wires associated with the first 30 trunks of the trunk group are connected to the thousands controller on the first call in and the number-block wires associated with the last 30 trunks of the group are connected on the second call in. Additionally, the calling-in of the first 30 trunks on the first call-in of the match-test wires must occur at the same time the number-block wires of the first 30 trunks are connected, so that the number-block wires of a trunk other than the matched one is not connected to the thousands controller and thereby give a false indication to the block-link frame as to the station location of the called party. This control arrangement is handled by the subgroup allotters of Fig. 14, part 4, which will be described hereinafter.

With the dialing of the trunk group 67, 68, 69, and 60, the associated one of the digit relays 1516, 1517, 1518 and 1519 operate over its respective digit wire and at its contacts 2 and 3 place ground on the conductors extending to the grouping terminals 1700 in cable groups RG–2 and RG–3. This ground on the conductors appear on the corresponding terminals (terminals 7 to 10 of the first two levels) of the thousands digit group, four-level group 12) of section 1704.

The ground appearing on any one of the conductors 7 to 0 of cable group RG–2 is placed on jumper 1780, as the associated terminals are connected together by jumpers 1737 to 1739 and connected to jumper 1780, which extends to the match-test allotter group (four-level group 11) of section 1705. The match allotter group comprises five divisions, the first division including the terminals in columns 1 and 2 of each of the four levels, the second division including the terminals in columns 3 and 4 in all four levels and so forth. The terminals in the first of the two columns in any division serve as attachment points for the two-trunk group allotter control wires while the other column of terminals serves the control wires of three-trunk group allotter. The wires attached to the terminals of the various divisions extend to respective allotter relays in Fig. 14, part 4, as hereinbefore noted.

Jumper 1780 is connected to the R terminal of the two-trunk group allotter of division 5 and is connected to the terminal R of the two-trunk group allotters of divisions 3 and 4 by respective jumpers 1758 and 1759. Any ground appearing on jumper 1780 is therefore extended to the R wire of the two-group subgroup allotters 3 to 5 of thousands controller 1400 over conductors in cable group MTA–3 to MTA–5. As will be described in detail hereinafter, if the current call-in is the one testing the first 30 trunks of the 35 trunks in the called group, ground is returned over conductor 1 of the cable group MTA–3 to MTA–5 and appears on the terminal 1 of the two-group subdivision in each of the divisions 3 to 5. If the trunks being tested are the last 30 trunks of the group, the ground on terminals R appears on terminals 2 of each of the two-group subdivisions of division 3 to 5.

If the current call-in is the one testing the first 30 trunks, the ground on terminal 1 is extended to the operate winding of relay 1623 (not shown) over conductor RM of relay group R23 of section 1702 and jumper 1756. Relay 1623 operates and closes its 30 make contact sets.

If the call-in is one placing ground from conductor R to the associated terminal 2, jumper 1757 extends this ground to the operate winding of relay 1624 (not shown) over conductor RM in cable group MTG–24. Relay 1624 operates and closes its 30 make contact sets.

If the trunk group 68 is dialed, and it is the first call-in of that group (the first 30 trunks being tested), ground on conductor 8 of cable group RG–3 is extended to its associated terminal pin and is further extended over jumper 1792 to the R terminal of the number-block allotter two-group subdivision of division 3 from whence it is extended over conductors R in cable NBA–3, through contacts on the associated subgroup allotter and reappears on terminals 1 of the associated two-group section. This ground is extended over jumper 1771 of cable 1779 to the operate winding of relay 1647 (not shown) over conductor RN of relay group R23 of section 1707. Relay 1647 thereupon operates and closes its 30 make contact sets.

If the current call-in is the one testing the last thirty trunks of the called group, the ground on jumper 1792 appears on terminal 2 of the two-group section of the number-block allotter division 3. This ground is further extended over jumper 1772 to the operate winding of the digit-connect relay assigned relay group R12 of section 1706, thereby operating it.

If trunk group 69 or 60 is dialed and the match-test wires of the first 30 trunks of the group are called-in the ground appearing on conductor 9 and 10 of cable group RG–3 is extended over respective jumpers 1773 and 1775 of cables 1778 and 1777 to the operate winding of relays associated with relay group R13 and R1 of sections 1707 and 1706 respectively in a manner similar to that described when the trunk group 68 was dialed. If the last 30 trunks are being tested the relays associated with relay groups R2 and R14 of sections 1706 and 1707 are operated over jumpers 1791 and associated extension jumper 1774 for trunk group 69 and jumper 1790 and associated jumper 1776 for trunk group 60.

With the operation of relay 1623 or 1624 as noted, the match-test relays wires MTR–1 to MTR–30 are connected to the match-test extension wires MTE–1 to MTE–30 of respective relay groups R23 and R24 of the MT connect relay groups. The extension wires associated with relay 1623 are further connected by jumpers 1 to 30 of cable 1717 to the terminals of the MT wire groups corresponding to the verticals 11 to 13 of each of the ten secondary switches. These terminals are connected to the match-test wires of the first 30 trunks in the called group.

When relay 1624 operated, on the odd-numbered call-in of trunk group 67, 68, 69, and 60, the match-test extension wires associated with relay 1624 are connected by jumpers 1 to 30 of cable 1718 to the terminals corresponding to verticals 11 and 14 of each of the last five secondary switches 6 to 10 and vertical 12 and 13 of each of the ten secondary switches 1 to 10. These terminals are connected to the match-test wires of the last thirty trunks (trunk numbers 6 to 35) of the 35 trunks in the called group.

Coincidental with the operation of relay 1623, relay 1647 (associated with relay group R23 of section 1707) operates if the trunk group 68 is dialed; relay 1637 operates if trunk group 69 is dialed and relay 1625 operates if trunk group 20 is dialed. The contacts on these relays, when operated, connect the number-block common wires NBC–1 to NBC–30 to the number-block extension wires NBE–1 to NBE–30 of the associated relay. When relay 1647 operates, the number-block common wires are extended over conductors 1 to 30 of cable 1735 to the NB–2 terminals serving as attachment points for the number-block wires NB–2 of first 30 trunks in the called group 68.

When relay 1637 operates, jumpers 1 to 30 of cable 1737 extend the number-block common wires to the NB–3 terminals serving the first 30 trunks and when relay 1625 operates, jumpers 1 to 30 of cable 1738 extend the number-block common wires to the NB–4 terminals serving the first 30 trunks of the called group of 35 trunks. On the even-numbered call-in of trunk group 67, 68, 69, and 60, the match-test wires of the last thirty trunks (trunk numbers 6 to 35 of the called trunk group) are connected by jumpers 1 to 30 of cable 1718 and contacts on relay 1624 to the match-test relay wire MTR–1 to MTR–30.

Coincidental with the operation of relay 1624 by the dialing of trunk group 68, the NB–2 wires of the last 30 trunks of the called group are connected to the number-block common wires by jumper 1 to 30 of cable 1734 and the make contact sets on relay 1648; coincidental with the operation of relay 1624 by the dialing of trunk group 69, the NB–3 wires of the last 30 trunks of the called group are connected to the number block common wires by jumpers 1 to 30 of cable 1737 and the 30 make contact sets on relay 1638; and coincidental with the operation of relay 1624 by the dialing of trunk group 60, the contact sets on relay 1626 and jumpers 1 to 30 of cable 1739 connect the 30 number-block common wires to NB–4 wires of the last 30 trunks of the 35 trunks in the called group.

As hereinbefore pointed out, with the completion of the matching by the thousands controller, the common control apparatus is restored to normal and all operated digit and digit-connect relays are restored.

VIIID5. *Trunk group 0 jumper assignment*

As seen in the illustrated trunk assignment table, trunk group 0 includes 10 trunks outgoing to exchange C. These trunks are assigned vertical 20 of each of the ten secondary switches in regular order.

Assuming that the digit dialed is a "0," digit relay 1509 of Fig. 15 is operated over initial-digit wire ID–10 and at its contacts 2 place ground on conductor 9 of cable group RG–1 extending to the grouping terminals 1700 over cable 288. This ground appears on the associated terminal pin (the terminal in the first level and the ninth column of the four-level group 11 of section 1704) and is extended by jumper 1721 to the terminal pin RM of relay group R12, section 1701. This ground is thereupon extended over conductor RM of cable group MTG of cable 288 to the operate winding of digit-connect relay 1610 (not shown). Relay 1610 operates and at its contacts 1 to 30 connect the match-test relay wires MTR–1 to MTR–30 of the thousands controller to the match-test extension wires MTE–1 to MTE–30 which are terminated on associated terminal pins 1 to 30 of the relay group R10 of section 1701. These terminal pins are jumper-connected by jumpers 1 to 10 of cable 1711 to extend the first ten match-test extension wires (MTE–1 to MTE–10) to the terminals of the MT wire groups corresponding to vertical 20 of each of the ten secondary switches. These terminal pins are connected to the match-test wires of the ten trunks in trunk group 0.

Therefore, responsive to the dialing of the outgoing trunk group "0," connect-relay 1610 is operated and connects the match-test wires of the ten trunks in the called group to the associated match-test relay wires extending to the trunk-test relays of the thousands controller.

Responsive to the clearing out of the common control apparatus thereafter, relays 1509 and 1610 restore.

VIIID6. *Trunk group 7 jumper assignment*

Trunk group 7, as illustrated in the trunk assignment table includes 40 trunks outgoing from exchange B to exchange C. These trunks are assigned verticals 15 to 18 of each of the ten secondary switches on the thousands-link frame.

With the dialing of the initial digit 7, digit relay 1506 operates over the hereinbefore described series circuit and at its contacts 2 places ground on conductor 6 of cable RG–1 extending to the grouping terminals 1700. This ground appears on the associated terminal pin (the terminal pin in the first level and the sixth column of the four-level group 11 of section 1704) and is extended over jumper 1760 to the R terminal of the two-group section of match-test allotter division 1.

Since there are 40 trunks in called group 7, and as hereinbefore noted, since the thousands controller is arranged to test a maximum of 30 trunks at any one time, the 40 trunks are divided into two groups. The first group includes the first 30 trunks (trunk numbers 1 to 30) of trunk group 7 and the second group includes the last 30 trunks (trunk numbers 11 to 40). As hereinbefore noted, the subgroup allotter for large trunk groups is arranged so that upon successive call-ins of trunk group 7, the 30 trunks of the first group are tested on one call-in and the last 30 trunks (the second group of trunks of trunk group 7) are tested on the next call-in.

Assuming the current call-in of trunk group 7 is for the first 30 trunks of the group, the ground on jumper 1760 appears on associated terminal 1 of the match-test allotter division 1 by subgroup allotter. On the next call-in, this ground on jumper 1760 appears on the associated terminal 2 of the same division.

Therefore, with the dialing of the initial digit 7, for the first call-in ground on terminal 1 of the MT allotter group is extended over jumper 1751 of cable 1750 to the operate winding of relay 1601 over the RM conductor of cable group. Digit-connect relay 1601 operates and connects the match-test wires of the thousands controller to the associated match-test extension wires extending to the terminals in relay group R1 of section 1701. These match-test extension wires are further connected, by jumpers 1 to 30 of cable 1712, to the terminals in the MT wire group corresponding to the verticals assigned the first 30 trunks of the called group.

On the next call-in of the same trunk group, the ground on jumper 1760 appears on terminal 2 of the two-group match-test allotter division 1 and energizes jumper 1752 of cable 1750 extending to the RM terminal of relay group R2 of section 1701. Relay 1602 being associated with this RM terminal over conductors in cable group MTG thereupon operates and at its contacts 1 to 30 connects the match-test relay wires extending to the thousands controller to the associated terminals in the relay group R2 of section 1701 over the respectively corresponding match-test extension wires. Jumpers 1 to 30 of cable group 1713 further extend the match-test relay wires to the terminals in the MT wire groups corresponding to the vertical locations of the last thirty trunks in the 40 trunk trunk-group 7. These terminals are connected to the match-test wires of the last 30 trunks of trunk-group 7.

IX. THOUSANDS CONTROLLER 1400 (FIG. 14)

Referring now to Fig. 14, parts 1 to 4, the thousands controller on any thousands-link frame, will be described.

IXA. *Functional relay groups*

The relays 14A1 to 14D20 of thousands controller 1400 comprise functional relay groups 1 to 4 as follows:

1. Relays 14A1 through 14A5 comprise the control group of the thousands controller for controlling the common wires which extend to the other relay groups of the thousands controller;
2. Relays 14B1 through 14B11 comprise a choice allotter arranged to allot matching preference to the secondary switches associated with the trunks of the called group;
3. Relays 14C1 through 14D60 comprise the match-test groups, these relays being divided into ten groups, one group for each of the ten secondary switches on any thousands-link frame. Each of these groups include two link-test relays and three trunk-test relays for determining the idle or busy condition of the respective links and trunks, and include a match-detect relay which operates in accordance to its preference provided there is a match possible over the concerned links and the thousands trunks; and
4. Relays 14D1 through 14D20 comprise five subgroup allotters arranged so that one trunk group may include more than the thirty trunks that can be called in at any one time.

IXB. *Controller operation*

As hereinbefore pointed out, thousands controller 1400 treats all calls the same, regardless if they are outgoing calls or calls terminating in the local exchange. However, the distinction is made in the digit-connect relays which call in the match-test wires of the thousands trunks assigned (by jumpers) outgoing trunks or trunks terminating in the local exchange B. Therefore, the thousands controller operation covers the operations involved in guiding any call connection across the thousands link frame to an idle thousands trunk in the called group.

As previously noted, an outgoing call is made by dialing an initial digit assigned to the desired outgoing group, and a terminating call is made by dialing the initial digit (6) indexing the local exchange followed by the dialing of the thousands digit assigned to the various 1000-line switching blocks.

With the noted grounding of the start wire ST by an operated one of the digit relays 1501 to 1519, start relay 14A1 promptly operates as it has a low-resistance winding for fast operation and upon operating, its contacts 7 places current-limiting resistor 1401 in series with its winding to reduce the current flow therethrough.

Contacts 1 of start relay 14A1 ground the number-block common wire NBC; contacts 2 and 3 connect the switching wires SW and the match-test common wire MTC, to the primary-secondary off-normal wire PS–ON; contacts 4 ground locking ground wire LG; contacts 5 remove ground from pulse wire P extending to the choice allotter and ground wire 1404 extending to windings of slow-operate busy relay 14A5; contacts 6 prepare a locking ground for the chain control relays 14A2 and 14A3; and contacts 8 close an operate circuit for chain control relay 14A2.

For the purpose of correlation, start relay 14A1 operates coincidentally with the hereinbefore described operation of the digit-connect relays so that the match-test and number-block extension wires (MTE–1 to MTE–30 and NBE–1 to NBE–30) are extended to the thousands controller at the same time that thousands controller 1400 energizes the common control conductors extending to the other relay groups of the controller.

IXB1. *Control group operation*

Start relay 14A1 operates, as hereinbefore described, to close the above noted circuits. Chain-control relay 14A2 operates from the ground potential through break contacts 2 of the busy relay 14A5 and make contacts 8 of start relay 14A1. Contacts 1 of relay 14A2 extend ground from make contacts 6 of start relay 14A1 to the winding of chain-control relay 14A3, operating it and at its make contacts 2, in conjunction with break contacts 3 of relay 14A3, relay 14A2 inserts current-limiting resistor 1403 in series with the windings of the three relays operated in series over the hereinbefore traced chain circuit.

Chain control relay 14A3 upon operating, at its contacts 1, locks itself to the ground at make contacts 6 of start relay 14A1 independent of the contacts 1 of relay 14A2, and at its contacts 2, locks relay 14A2 operated to the ground on wire 1407 independent of make contacts 8 of start relay 14A1.

IXB2. *Controller timing*

The time in which the thousands controller can be taken for use and held individual to the calling thousands coupler is controlled by two timing intervals determined by the relays of the control group.

The first timing interval is the period of time in which the thousands controller may attempt to match a path between an idle thousands-link and an idle thousands trunk and mechanically selects such a path while the second timing interval is the period of time that the thousands controller may consume in effecting the operation of the apparatus involved in the extension of the connection after a path has been matched and the matched path mechanically selected.

The first timing interval is determined by the slow-operate characteristics of the lower winding of busy relay 14A5 and the second interval is determined by the slow-operate characteristics of the upper winding of the busy relay. As will hereinafter be described, test relay 14A4 operates responsive to a match being established and the select magnets associated with the matched path being operated. Responsive to the operation of the test relay, the lower winding of the busy relay is deenergized ending the first timing interval and the upper winding is energized starting the second timing interval.

If no match is possible or a circuit failure exists, busy relay 14A5 operates from current flow through either its lower or upper winding over respective conductors 1405 and 1406 depending on whether relay 14A4 is operated or not. Its make contacts 1 ground the common busy wire BU extending to the thousands controller and its contacts 2 remove ground from wire 1407 extending to the windings of the chain-control relays. The grounding of busy wire BU causes the busy relay in the concerned calling thousands coupler to operate and open the chain circuit, thereby initiating the clearing out of the common control apparatus by restoring the noted three relays operated in series. At the same time, the removal of ground from wire 1407 open-circuits the winding of chain-control relay 14A2 which restores a short time later, it being slow-restoring responsive to resistor 1402 shunting its windings. Relay 14A2 is made slow-restoring by resistor 1402 to furnish time for the busy relay in the thousands coupler to operate and open the chain circuit normally before the chain battery circuit (wire CB) is opened by the restoration of relay 14A2 with relay 14A3 operated.

If for any reason, operation of the busy relay in the thousands coupler fails to open the chain circuit as described, chain-control relay 14A2 restores after a slight interval. At its contacts 2, relay 14A2 removes battery from the chain battery lead CB (relay 14A3 being held operated) thereby forcibly clearing out the common control apparatus.

Responsive to the restoration of relay 14A2, the operated digit relay restores thereby removing ground from start wire ST restoring start relay 14A1. With the restoration of start relay 14A1, the winding of relay 14A3 is open-circuited and thereby restores, reconnecting battery to the chain battery lead CB in preparation for the next call-in of the common control apparatus. With start relay 14A1 restored, its contacts 5 open-circuit busy relay 14A5 which thereupon restores; its make contacts 1, 2, 3, and 4 disconnect the common control leads extending to the other control apparatus on the thousands controller, thereby completing the clearing out of the thousands controller.

If a match has been determined and the matched path has been mechanically selected before busy relay 14A5 operates over its upper winding the chain circuit is opened in the thousands coupler by the operation of the switching relay, as hereinbefore described. This initiates the clearing out of the common control apparatus by restoring the noted three relays operated in series over the hereinbefore traced chain circuit.

With the opening of the chain and consequent restoration of the operated digit relay, ground is removed from the start wire ST and start relay 14A1 restores. The restoration of start relay 14A1 restores chain-control relay 14A3 which upon restoring open-circuits chain-control relay 14A2, restoring it.

It will be noted that the restoration cycle of the chain-control relays is alternated depending upon the two conditions under which the chain is cleared out. On normal clear-out, start relay 14A1 restores first followed by the restoration of relay 14A3 and then relay 14A2, while on a forced clearout, relay 14A2 restores first followed by the restoration of relays 14A1 and 14A3. In the first case, the chain battery wire CB is never opened in the thousands controller while in the second case, the opening of the wire CB clears out the control apparatus. This arrangement whereby relay 14A3 always operates on each call-in exercises break contacts 3 of relay 14A3 thereby reducing the possibilities of an open-circuit through an idle break contact.

IXB3. *Choice allotter*

The choice allotter (Fig. 14, part 2) comprising the eleven relays 14B1 through 14B11, is a specialized counting chain arranged to assume allotting positions 1 to 10 successively in a cycle. Its purpose is to shift first choice successively among the ten match-test groups shown in Fig. 14, part 3.

The choice allotter is shown in the first of its ten allotting positions, the position which it assumed automatically when current was first applied to the thousands controller. At this time, odd wire 1411 is grounded through break contacts of driver relay 14B1 and normally grounded pulse wire P.

The normally-connected allotting relay 14A2 is operated and held operated from this ground as its winding is connected to battery through current-limiting resistor 1410 and break contacts 3 of relays 14B4 through 14B10. At its make contacts 4, relay 14B2 grounds wire 1413 which is connected to one side of the lower winding of driver relay 14B1 short-circuiting it as the other side of its winding is connected to grounded odd wire 1411; its make contacts 2, prepare an operate circuit for operating the second allotting relay 14B3 over the even wire 1412; and at its make contacts 5 and 6 give group 1 of the match-test groups first preference on match-test groups first preference on match-detect operation as will be described hereinafter. The choice allotter is thus in position 1.

When start relay 14A1 operates when the thousands controller is taken for use, as noted, it removes ground from pulse wire P removing the short-circuit from the winding of relay 14B1, and relay 14B1 operates in series with operated relay 14B2. Its operating circuit is from ground through make contacts 4 of relay 14B2, the lower winding of relay 14B1, wire 1411, and through the winding of relay 14B2 to battery through resistor 1410 through break contacts 3 of relays 14B3 to 14B10. The operation of relay 14B1 transfers the pulse wire P from odd wire 1411 to even wire 1412 in preparation for the operation of the second allotting relay 14B3 on the next grounding of the pulse wire P. The choice allotter still is giving preference to group 1 and the allotter is now in position 1.5 with relays 14B1 and 14B2 operated.

When start relay 14A1 restores (during or following the current matching attempt) its contacts 5 again ground pulse wire P to operate the second allotting relay 14B3. The operate path is from ground on pulse wire through make contacts on driver relay 14B1, over even wire 1412, make contacts 2 of operated relay 14B2, and through the winding of the second allotting relay 14B3, to battery through the series break contacts 3 of allotting relays 14B4 to 14B10. At its make contacts 1, relay 14B3 prepares an operate circuit for the third allotting relay 14B4; locks itself operated to its operate ground at its make contacts 2; at its contacts 3, open-circuits the series-connected relays 14B1 and 14B2; and at its make contacts 5 and 6 shift the preference to the second match-test group. With the opening of the circuit of the series-operated relays 14B1 and 14B2, relay 14B2 restores as it is open-circuited, but driver relay 14B1 is held operated from the ground on pulse wire P through its make contacts. Relays 14B1 and 14B3 are operated and the choice allotter is in position 2.

When start relay 14A1 operates on the next call in of the common control apparatus, pulse wire P is ungrounded, thereby restoring driver relay 14B1. The restoration of the driver relay transfers the pulse wire P from the even wire 1412 to the odd wire 1411 in preparation for the operation of the third allotting relay responsive to the restoration of the start relay 14A1. Relay 14B3 is still operated and the allotter is now in position 2.5 with the choice still on second match-test group.

When relay 14A1 again restores, it places ground on pulse wire P to operate allotting relay 14B4 over odd wire 1411, make contacts 1 of relay 14B3, and through the winding of the third allotting relay 14B4, to battery. Relay 14B4 locks operated to its operating ground through its make contacts 1; at its make contacts 2, it prepares an operate circuit for allotting relay 14B5; at its break contacts 3, it open-circuits allotting relay 14B3 permitting it to restore; at its contacts 4 places ground on wire 1413 and at its make contacts 5 and 6 shifts the preference to match-test group 3. With pulse wire P grounded, the ground on odd wire 1411 and the ground on wire 1413 short-circuit relay 14B1 preventing its operation. Relay 14B4 is operated and the choice allotter is now in position 3.

Subsequent operations and restorations of start relay 14A1 of thousands controller 1400 causes the allotting relays to operate in succession and to restore the preceding one to shift the choice successively among the match-test groups in the manner just described.

When the ninth allotting relay 14B10 is energized from ground on pulse wire P, odd wire 1411, through make contacts 1 of relay 14B9, through the winding of relay 14B10, through break contacts 3 of relay 14B11 and current-limiting resistor 1410 to battery, relay 14B9 is restored at break contacts 3 of relay 14B10 and the driver relay 14B1 is short-circuited. At this point, the choice allotter is in position 9.

When start relay 14A1 operates, on the next call-in, ground is removed from the pulse wire P and relay 14B1 is operated in series with relay 14B10 and it connects the ungrounded pulse wire P to even wire 1412 through its make contacts. The allotter is then in position 9.5.

The last or tenth allotting relay 14B11 operates responsive to the grounding of pulse wire P by the restoration of the start relay with relays 14B1 and 14B10 operated. The operate circuit is from ground over even wire 1412, make contacts 2 allotting relay 14B10, and through the winding of relay 14B11, to battery through current-limiting resistor 1410. When relay 14B11 operates, it locks operated, at its make contacts 2, to ground at contacts 3 of the first allotting relay 14B2. The driver relay 14B1 is also held operated from the ground on the pulse wire P through its make contacts. Make contacts 5 and 6 of the tenth allotting relay 14B11 shifts the choice to the tenth match-test group. The allotter is now in position 10.

When relay 14A1 operates to remove ground from pulse wire P on the next succeeding call-in, ground is removed from pulse wire P, thereby restoring driver relay 14B1. The pulse wire P is thereupon transferred to wire 1411 extending to the first allotting relay 14B2. Relay 14B11 does restore at this time as it is maintained operated by ground at break contacts 3 of the first allotting relay 14B2. At this time, the allotter is in position 10.5 and relay 14B11 is held operated.

When the start relay restores on completion of the current call in, it places ground on pulse wire P thereby operating the first allotting relay 14B2. As hereinbefore described, this path is over wire 1411, the winding of relay 14B2, and series contacts 3 of relays 14B4 to 14B10 to battery. Contacts 5 and 6 of relay 14B2 shift the preference from the match-test group 10 to match-test group 1, and at its break contacts 3, open-circuits the last allotting relay 14B11, permitting it to restore. The choice allotter is in position 11 or position 1 as illustrated in Fig. 14, part 2. The cyclic operation of the relays of the choice allotter continues as the start relay operates and restores, thereby continuously shifting the choice among the ten match-test groups in succession.

In summary, it may be noted that, when relay 14A1 restores to end a current call in, the choice allotter advances to the next step. This advancement shifts the choice among the match-test groups in succession during the time when there is no call in progress. During the call (at the time relay 14A1 is operated) the operate circuit of the next succeeding relay is prepared such that upon clear out of the common control apparatus, the allotter will shift the preference.

The overall result of the operation of the choice allotter, as controlled by the start relay, is that if the ten groups of match-test groups are considered as arranged in a continous chain or circle, the match-test group corresponding to the allotter relay operated has preference on its operation and it is the group following the last group having preference on the preceding operation on the thousands controller. The effect is to offer an equal number of calls to the ten match-test groups of the thousands trunk. As a result, each match-test group should contain substantially the same number of equipped thousands trunks as any other, keeping in mind that the full number (30) of thousands trunks in one group will not always be equipped. Therefore, the total number of equipped thousands trunks should be proportioned approximately evenly among the ten secondary switches on the thousands-link frames.

IXB3*a*. *Effect of choice allotter action*

From the foregoing, it will be noted that ground on wire 1414 is applied directly in succession to the ten chain-in wires CH–IN leading to the ten corresponding match-test groups, thereby shifting first choice progressively from groups 1 to group 10 or from the first to the tenth of the thousands-link secondary switches, which these groups respectively represent. This ground on wire 1414 extending to the corresponding match-test groups over the associated chain-in wire is extended through break contacts 8 of the concerned match-detect relay and over the chain-out conductor CH–OUT of the concerned group through the break contacts 5 of the allotting relay following the operated one, to the chain-in wire of the next match-test group. This ground being extended through break contacts 8 of all the match-detect relays of the ten groups is extended over the last chain-out conductor CH–OUT–10 and through the make contacts 5 of the operated allotting relay to the chain-end conductor CH–END. Chain-end conductor CH–END is connected to the windings of al the match-detect relays of the ten match-test groups through the associated current-limiting resistor 1461 to 1460 in preparation for the operation of the detect relays.

In the illustrated embodiment, with the first allotting relay 14B2 operated, ground on wire 1414 is extended through make contacts 6 of relay 14B2 and through the break contacts 8 of the match-detect relays of the match-test groups, in series with the break contacts 5 of the succeeding relays, to chain-end conductor CH–END, from whence it is extended to the winding of all the match-detect relays, as noted. It will be observed that operation of any one of the match-detect relays of the ten groups will open (at its contacts 8) the operate circuit of the others. As will hereinafter be described, the simultaneous operation of several of the match-test relays of the various match-test groups results in the operation of the match-detect relay having the preference.

The shifting of the preference among the secondary switches insure that all the trunks will eventually be used in the extension of a connection, irrespective of circuit conditions and matching conditions relating to the other primary switches. Giving first choice to the trunks of the secondary switches in regular order, randomize the thousands trunks almost completely, provided care is taken as previously indicated with respect to the trunks that are equipped and those unequipped in any call-in group, to the end that the thousands controller has uniform traffic loads, and any tendency toward unbalanced load distribution which might result in match failures, is greatly minimized.

IXB4. *Match-test groups*

Referring now to Fig. 14, part 3, it will be observed that the match-test groups shown thereon comprise ten groups, 1 to 10.

Included in each match-test group are two link-test relays, three trunk-test relays and one match-detect relay. Referring to group 1, the match-detect relay is relay 14C1, the two link-test relays are relays 14C2 and 14C3, and the three trunk-test relays are relays 14C4 to 14C6.

As hereinbefore pointed out, the ten match-test groups correspond respectively to the ten secondary switches, and accordingly, the line-test relays 14C2 and 14C3 are used to determine the idle or busy condition of the thousands-link pair extending between any calling primary switch and the secondary switch (switch #1) with which they are associated. The first link-test relay corresponds to the upper link of the thousands-link pair and the second link-test relay (14C3) corresponds to the lower link thereof. The three trunk-test relays are associated with the three (normal maximum number of trunks per trunk group per switch) trunks of the called group which are assigned the corresponding secondary switch. The first trunk-test relay is normally assigned the trunk associated with the lowest numbered vertical of its associated switch; the second relay is normally assigned the next lowest numbered trunk of the same switch and the third relay is normally assigned the highest numbered trunk of the same switch.

If there is an idle path from the concerned calling primary switch to one of the trunks of the called group of the first secondary switch, one of link-test relays (14C2 or 14C3) will be operated and if there is an idle trunk in the called group associated with the first primary switch, one of the trunk test relays (14C4 to 14C6) will be operated. Contacts on the concerned operated link-test and the concerned trunk-test relays complete a series operate circuit for the associated match-detect relay from the ground appearing on the chain-end conductors CH–END, as hereinbefore described.

Each of the three trunk-test relays has contacts associated therewith, operable responsive to the operation of the associated match-detect relays for causing the matched path to be mechanically selected and for energizing the concerned one of the number-block control wires NBC–1 to NBC–30 to transmit number-block information to the seized block coupler, as previously noted. The energization of the match-test and number-block wires is controlled primarily by contacts on the match-detect relay which operates as a result of a match having been found.

Since the match-test groups correspond to each of the ten secondary switches on any thousands link frame, associated with each match-detect relay of any such group is the select magnet wire extending to the associated select magnet. Additionally, since there are two link-test relays associated with the matched thousands-link pair, one relay for the upper link and one relay for the lower link, the link-test relays are provided with contacts 4 for completing an operate circuit for the upper or the lower auxiliary select magnet to select the proper matched path.

The two link-test relays of any group have an operate order of preference starting with the lower numbered one. For example, referring to match-test group 1, link-test relay 14C2 has operating preference over relay 14C3 as the effective operate circuit for the second link-test relay (the locking ground lead LG) is controlled by break contacts 2 of the first relay as upon the operation of the first relay the effective operate circuit of the second relay is opened. However, if the first relay fails to operate, (if the upper link is busy), and the second link-test relay operates, its break contacts 2 open the operate circuit of the first link-test relay to prevent its operation in the event that its associated link should become idle thereafter.

Similarly, the trunk-test relays have an operate order of preference starting from the lowest numbered one. The operate circuit for the last trunk-test relay is controlled by break contacts 2 of the two preceding ones, the operate circuit of the second trunk-test relay is controlled by break contacts on the first relay and break contacts on the last relay, while the operate path of the first trunk-test relay is controlled by the match-detect relay of the associated group. This order is such that once a match has been completed, a busy link becoming idle, does not change the matched path.

Each of the link-test and the trunk-test relays have make-first contacts associated therewith as indicated by the "*x*" contacts. The windings of these relays are so arranged that upon operating from the idle-indicating battery on the respective sleeve wires and match-test wires of the associated links and trunks, the current flow therethrough is so limited that the "*x*" contacts are the only ones closed. Upon being closed, the "*x*" contacts extend the ground on locking ground conductor LG to the battery-connected upper winding of the concerned relay, thereby operating it fully. This arrangement is such that the current flow over the match-test wire is not sufficient to cause the matched path to be closed (by operation of the hold magnets) from the current flow therethrough.

IXB4*a*. *Match-test group operation*

With the hereinbefore noted operation of the start relay of the thousands controller 1400 and the coincidental operation of the section-connect relays to call in the link-test wires of the thousands links extending from the concerned calling switch and the operation of the digit-connect relays to call in the match-test wires of the trunks in the called group, the operation of the match-test groups is as follows:

Subject to the operation of start relay 14A1, the operation of the concerned section-connect relay 1300 and the operation of the concerned digit-connect relay 1600, the thousands controller starts the matching operation by testing the match-test wires in combination with the link-sleeve wires for an idle path. The matching of an idle path requires that the thousands-link and the thousands trunks of such path both test idle. If two or more paths test idle at the same time, the line controller exercises an order of preference to select one as the matched path. Upon the selection of matched path, the thousands controller closes a series primary and secondary select magnet circuit, as noted, for causing the matched thousands link to be selected mechanically at the primary and secondary switches on the thousands-link frame.

Upon a signal over wire PS—ON that the matched thousands link has been selected mechanically at the primary and at the secondary switches, the thousands controller simultaneously closes an operate circuit for the hold magnet associated with the matched thousands trunk and for the hold magnet associated with the calling primary switch. These hold magnets operate to extend the calling line over the matched path to an idle thousands trunk by connecting the thousands trunk with the secondary end of the matched thousands link and by connecting the calling coupler with the primary end of such thousands-link.

IXC. *Detailed operation*

On all calls, whether outgoing or terminating, the detailed operation of thousands controller 1400 is as follows:

IXC1. *Setting the link-test relays*

The link-test relays 14C2 and 14C3 of group 1 are connected to the sleeve wires of the upper and the lower links of the calling primary switch over conductors SU–1 and SL–1, which as described with reference to the section-connecting apparatus extend to the sleeve wires of the pair of thousands-link extending to the first secondary switch. The link-test relays of the other match-test groups are associated with the respective sleeve wires of the thousands links extending to the corresponding secondary switch. That is, the sleeve wires of the tenth pair of thousands link extending to the tenth primary switch are connected to the link-test relays 14C56 and 14C57 of group 10.

The section-connect relays 1300, as hereinbefore described, close test circuits over wires SU–1 to SL–10 for the link-test relays of each of the ten match-test groups. Each such link-test relay thereupon closes its make first contact "*x*" subject to the corresponding thousands-link being idle.

If all of the 20 thousands-links are idle, all the link-test relays of the ten match-test groups close their "*x*" contacts which extend their battery-connected winding to ground on locking ground conductor LG extending to make contacts 4 of start relay 14A1 of the control group. If all links are idle, the first link-test relay of each group, link-test relay 14C2 of group 1, operates fully (in accordance with the hereinbefore noted preference) and locks operated through its "*x*" contacts to the ground on conductor LG and at its break contacts 2 open the operate circuit of the upper winding of the second link-test relay (relay 14C3 of group 1). Contacts 3 of the first operated link-test relay partially closes the series-operate circuit of the match-detect relay 14C1.

IXC2. *Setting the trunk-test relays*

The three trunk-test relays 14C4 to 14C6 of group 1 are connected to the match-test relay wires through their respective resistors 1431, 1441, and 1451. As hereinbefore pointed out, the match-test relay wires MTE–1 to MTR–30 are evenly distributed among the ten secondary switches for uniform traffic balance. Therefore, if only twenty trunks are equipped, each match-test group tests two of the twenty trunks or one-tenth of the equipped trunks.

Digit relays 1600, as hereinbefore described, extends the match-test wires of the trunks in the called group to the corresponding three trunk-test relays in each of the ten match-test groups. Each such trunk-test relay thereupon operates (from the battery on the sleeve conductor S) subject to the corresponding thousands trunks being idle.

Assuming all the thousands trunks in the called group are idle and assuming that the called trunk group is a trunk group which includes 30 trunks, each of the thirty trunk-test relays of Fig. 14, part 3, operate sufficiently to close their make-first contacts "*x*." Ground from locking conductor LG is extended through the "*x*" contacts of the first trunk-test relay of each to their battery-connected operate winding. In group 1, relay 14C4 operates and at its break contacts 2 open the operate circuit of the suceeding relays 14C5 and 14C6. Therefore, out of the 30 idle trunks in the called group, the first ten trunks, those associated with the first trunk-test relays of each of the ten groups or one trunk from each secondary switch are the only ones that can be taken for use in the call extension. Contacts 5 of each of the operated trunk-test relays complete the operate circuit of the associated match-detect relay from the ground on the chain-end conductor, through make contacts 3 of the associated operated link-test relay and the noted make contacts 5 of the concerned operated trunk-test relay.

IXC3. *Match-test relay operation*

When battery is first applied to the thousands controller, the ground on chain-end conductor CH–END is extended through break contacts 7 of the associated match-detect relay and through the current-limiting resistor associated therewith (such as 1461 for group 1) to partially energize the concerned match-detect relay such that when the operate circuit is completed through make contacts on one of the link-test relays and one of the trunk-test relays, the match-detect relay will promptly operate.

The match-detect relay, such as 14C1, of any match-test group has a low-resistance winding for prompt operation, and upon operating, inserts its associated current-limiting resistor (1421) in series with its operate winding as a current-saving feature.

With the first trunk of the first secondary switch being idle and with the upper thousands link of the pair of thousands link extending between the calling primary switch and the first secondary switch being idle, the call may be extended over such a path to such a trunk. However, since the upper links of each of the ten pairs extending to the secondary switches from the calling primary switch also test idle and since the first trunk associated with each of the ten secondary switches are idle, the call may be extended over any one of the ten paths to any of the associated ones of the first ten idle thousands trunks. However, with the choice allotter giving preference to group 1 as illustrated, when the match-detect relay 14C1 operates, its break contacts 8 remove ground from the chain-out conductor CH–OUT–1 which is eventually connected to the chain-end conductors as noted, thereby removing ground from the operate winding of each of the succeeding match-detect relays. Therefore, match-detect relay 14C1 is the only one operated.

Contacts 4 of relay 14C1 extend ground through resistor 1430 to the match-test common wire MTC to partially energize the hold magnets associated with the verticals of the primary and secondary switches used in the extension of the call.

IXC4. *Select magnet operation*

With the match-detect relay 14C1 operating from the ground on chain-end conductor CH–END through contacts on link-test relay (14C2) corresponding to the upper link of the pair extending between the concerned calling primary switch and the first secondary switch, and contacts on the trunk-test relay (14C4) associated with the first trunk in the called numerical group (the trunk associated with lowest number vertical on the first primary switch of the called group), an operate circuit is closed for select magnet wire SM–1 from ground through the winding of test relay 14A4, over the select magnet common wire SMC, and through make contacts 1 of the operated match-detect relay to wire SM–1, which as hereinbefore described, is extended through the contacts on the operated section-connect relay to the winding of the series-connected select magnets of the primary and secondary switches corresponding to the thousands link that was found idle.

At the same time, contacts 4 of operated link-test relay (relay 14C2) extends the ground-connected winding of the upper auxiliary select magnet of the calling primary switch through make contacts 10 of the operated match-detect relay and through the make contacts on the operated section-connect relay pair to the battery-connected winding of the upper auxiliary select magnet of the first secondary switch. The selected select magnets on the primary and secondary switches are operated from current flow over the select magnet common wire SMC while the selected upper auxiliary select magnets on the associated switches are operated in series over the connection established through contacts on the match-test group 1, as above noted.

The operating current for the select magnets flowing through the winding of test relay 14A4 causes it to operate and transfer the ground on wire 1404 from the lower winding of the busy relay to its upper winding, thereby starting the second timing interval, as hereinbefore noted. The thousands controller maintains the principal select magnets and the auxiliary select magnet circuits closed until such a time that the hold magnets are operated and the common control apparatus is restored to common use.

As seen in Fig. 6 of the drawings, when the select magnets SM–505 and SM–506 operate, together with the operation of auxiliary select magnets SMU–504 and SMU–507, the call is extended from the concerned coupler over thousands link 206U to thousands trunk 1–270–1.

Also referring to Fig. 6 of the drawings it will be noted that responsive to the operation of auxiliary select magnet SMU–504, ground is extended through its contacts and through make contacts on the principal select magnet SM–505, to primary off-normal wire PON and through make contacts on the principal select magnet SM–506 of the secondary switch. This ground is further extended through contacts of the auxiliary select magnet SMU–507 of the secondary switch to the primary-secondary off-normal wire PS–ON, extending to thousands controller 1400.

Referring now to Fig. 14, part 1, this ground on wire PS-ON is extended through make contacts 2 and 3 of start relay 14A1 to switching conductors SW extending to the thousands controller and to match-test control wire MTC extending to contacts on the match-test detect relays.

As hereinbefore described in regards to block coupler 1800, switching wire SW of the thousands controller is extended through make contacts 5 of the chain relay to the battery-connected winding of the switching relay which causes the operation of hold magnet HM–502 (Fig. 6).

The ground appearing on the select magnet common wire SMC is extended through make contacts 3 of the operated match-detect relay to the match-test control wire 1–MTC–1. This ground is further extended through make contacts 4 of the operated trunk-test relay to the associated match-test relay wire MTR–1, which as hereinbefore described, is extended by jumpers to battery through the winding of the hold magnet associated with the matched trunk.

Responsive to the operation of a match-detect relay such as relay 14C1 to indicate that a match has been determined between an idle thousands link and an idle thousands trunk of the called group, ground from contacts 1 of start relay 14A1 appearing on number-block common wire NBC is extended through contacts 2 of relay 14C1 to number block control wire 1–NBC–1 and is further extended to the associated one of the number-block wires NBC–1 to NBC–30 corresponding to the operated trunk-test relay. As hereinbefore noted, this ground is extended through jumpers (if installed) on the grouping terminal 1700 to the concerned one of the number block wires NB–2 to NB–4 associated with the selected thousands trunk and extending to the seized block coupler on a block-link frame provided the thousands digit dialed is one which requires number-block wire energization.

With the hold magnets associated with the match path being operated, the hold magnet of the concerned primary switch such as HM–502 opens the chain circuit thereby causing the common control apparatus to clear out.

IXC5. *Common control apparatus clearout*

With the opening of the chain conductor CH–1 and CH–2 by operation of hold magnet HM–502, the series circuit of the three noted relays (a section-preference relay, chain relay, and a digit relay) is opened thereby opening the operate circuit of start relay 14A1. Relay 14A1 restores to remove ground from the control wires SMC, NBC, MTC, and LG and to place ground on the pulse wire P extending to the choice allotter.

With the removal of ground from the locking conductor LG and with the coincidental restoration of the operated digit-connect and section-connect relays, the link-sleeve test wires and the match-test wires are thereupon opened and all operated link-test and trunk-test relays are restored. The test relay 14A4 restores and reconnects the lower winding of busy relay 14A5 to wire 14A4 in preparation for the first timing interval of the next call.

IXC6. *Order of preference*

The match-detect relays of the ten match-test groups are arranged in an order of preference as determined by the choice allotter. In the event that a match exists between the trunks and the links of each of the ten secondary switches, the ten match-detect relays will all attempt to operate. However, as noted, the lowest numbered match-detect relay has preference if the first allotter relay is operated as illustrated.

Assuming that the preference is on match-test group 10, the ground on wire 1414 of the choice allotter is extended through break contacts 8 of each of the match-detect relays and break contacts 5 of the choice allotter relays to the chain-end conductor CH–END, as hereinbefore described.

Assuming that there is an idle path in the first and the tenth match-test group, both match-detect relay 14C1 and match-detect relay 14C55 attempt to operate. With the preference on match-detect relay 14C55 (assuming allotter relay 14B11 is operated) if relay 14C1 fully operates at the same time that relay 14C55 operates, its break contacts 8 open the operate circuit of the succeeding relays up to but not including the match-test relay (14C55) having preference as the ground on wire 1414 is directly connected to wire CH–IN–10. Operation of match-detect relay 14C55, causes its contacts 8 to open the operate path of match-detect relay 14C1, thereby restoring it. Match-detect relay 14C55 is maintained operated from the ground on wire 1414 and no other relays can operate.

The locking or holding circuit of match-detect relay 14C55 with the choice allotter in position 11 is as follows: Ground on wire 1414, make contacts 6 of relay 14B11, chain-in wires CH–IN–10, its make contacts 7, make contacts on the operated one of the link-test and trunk-test relays, and the battery-connected winding of relay 14C55 through resistor 1420. With relay 14C55 operated directly from the ground on wire 1414, it is apparent that the operate circuit of all other match-detect relays is opened at break contacts 8 of relay 14C55. Also it can be seen that the match-detect groups are thought of as arranged in a circle or in a continuous chain, and going from left to right, the lowest numbered relay has the preference. For example, if the preference is on the fifth match-test group, and the match-test groups 4 and 10 have a match possible, the match-test group 10 has the preference as it is the lower numbered one in the continuous chain starting at the relay having preference and going from left to right.

IXC7. *Subgroup allotters for large trunk groups*

Referring now to Fig. 14, part 4, the allotters 1 to 5 shown thereon will be described in detail.

As hereinbefore pointed out, when the called trunk group contains more than 30 trunks, an arrangement is provided wherein the trunk group is broken into two or three subgroups and the trunks of these subgroups are tested on successive dialings of their assigned trunk group.

Allotter 1 of Fig. 14, part 4, is shown to include four relays, and two separate divisions of wires, the match-test division MTA–1 and the number-block division NBA–1. Each of these main number-block and match-test divisions are broken into two sparate subdivisions of control wires, a two-trunk subdivision and a three-trunk subdivision.

If the trunk group dialed includes more than 30 trunks and less than 60, with the thousands controller arranged to test a maximum of 30 trunks, all of the trunk in the called group may be tested upon two successive call-ins thereby requiring the use of the two-trunk subdivision of control wires. If the called group contains more than 60 trunks and less than 90, the trunks of the called group are divided into three subgroups and are tested upon three successive call ins. In this event, the three-trunk subdivision of control wires are used.

IXC7*a*. *Match-test control wires*

Assuming that the initial digit 7 is dialed, corresponding to outgoing trunk group 7 which includes 40 trunks. As hereinbefore described, ground appears on the R conductor of the two-trunk subdivision of control wires of match-test division MTA–1 over jumper 1760 of Fig. 17. On the first call in, the ground is to be extended to jumper 1751 (connected to conductor 1) to operate the match-test connect-relay associated with the first 30 trunks of the 40 trunks in the called group and on the second call in, this ground is to be extended to jumper 1752 (connected to conductor 2) which extends to the match-test connect-relay associated with the last 30 trunks of the called group. Since there is to be no delay in the calling in of the match-test wires, it is necessary that the ground appearing on R conductor (from jumper 1760) is extended to the winding of the concerned connect-relay immediately. It is therefore necessary that the subgroup allotters be arranged to shift the R conductor from conductor 1 or conductor 2 during the time that no call is in progress. Accordingly, the allotters are so arranged that immediately upon grounding of the R conductor of the two-trunk of the three-trunk subdivisions of control wires, ground is immediately extended to operate the concerned digit-connect relay.

Assuming that the allotters are in their illustrated position, as seen in Fig. 14, part 4, ground appearing on jumper 1760 of the grouping terminals is extended over the associated conductor R in the match-test division MTA–1 to conductor R of the match-test two-trunk subdivision. This ground is extended through break contacts 4 of relay 14D4 to conductor 1 extending to jumper 1751 to thereby operate the concerned match-test connect relay immediately and it is also extended through break contacts 3 of relay 14D4 to the battery-connected winding of relay 14D3.

Relay 14D3 operates and at its contacts 2 extends the ground at break contacts 1 of relay 14D1 through break contacts of relay 14D2 to one side of the winding of relay 14D4, the other side being connected to the ground on wire R. Relay 14D3 is held operated and relay 14D4 is maintained unoperated as it is short-circuited. Allotter 1 is held in this position as long as ground remains on conductor R from jumper 1760 and the ground on conductor R is connected to the operate winding of the match-test connect-relay associated therewith.

On the completion of the hereinbefore noted testing operation and the restoration of the common control apparatus, ground is removed from jumper 1760 and conductor R by the restoration of the concerned digit relay. With the removal of ground from conductor R, relay 14D4 operates in series with relay 14D3, the circuit being from battery through the winding of relay 14D3, the lower winding of relay 14D4 to ground through make contacts 2 of relay 14D3 and the contacts of relay 14D2. Contacts 4 of relay 14D4 transfer conductor R from conductor 1 to conductor 2 and at contacts 3 transfer conductor R from the winding of relay 14D3 to the winding of relay 14D1 in preparation for the next call in.

With the dialing of trunk group 7 on the next call and with the relays 14D3 and 14D4 held operated in series, ground on conductor R is extended through make contacts 4 of relay 14D4 to conductor 2 of the two-trunk subdivision of the match-test allotter division MTA–1 to jumper 1752 extending to the operate winding of the match-test connect relay associated with the last 30 trunks of the called trunk group 7. At the same time, this ground is extended to the battery-connected winding of relay 14D1, operating it.

With the operation of relay 14D1, ground is transferred from the series-connected windings of relays 14D3 and 14D4 to the upper winding of relay 14D4 through make contacts 1 of relay 14D4. Relay 14D3 restores to open (at its contacts 2) the series-connected circuit of the two relays to prevent their operation when relay 14D1 restores. With relay 14D4 being held operated, the ground on conductor R is maintained on jumper 1752 for the duration of the call, as is required.

With the clearing out of the common control apparatus on the completion of the testing operation, ground is removed from jumper 1760 thereby removing the ground from the upper winding of relay 14D4 and from the battery-connected winding of relay 14D1, permitting them both to restore. The conductor R is again connected to conductor 1 through break contacts 4 of relay 14D4. Allotter 1 is now in its illustrated position in preparation for the next call.

On the first call in of the trunks of a trunk group including more than 30 trunks, conductor 1 was grounded to call in the first 30 match-test wires of the group and upon the second call in of the same trunk group, conductor 2 was grounded to call in the last 30 match-test wires.

Assuming that the called trunk group includes more than 60 trunks and less than 90, ground will appear on conductor R of the three-trunk subdivision of control wires of the match-test allotter division MTA–1. Since the trunk assignment table of the thousands-link frame illustrated hereinbefore does not show any trunk groups over 60 trunks, there is no jumper illustrated as being connected to the R terminal of any three-trunk subdivisions of control wires.

Assuming ground appears on conductor R of the three-trunk match-test subdivision of control wires of the first allotter, it is extended through break contacts 2 of relay 14D4 and through break contacts 3 of relay 14D3 to conductor 1 of the three-trunk subdivision to operate the associated digit-connect relay. This ground is also extended directly to the battery-connected winding of relay 14D1, which operates and at its contacts extend ground through break contacts 1 of relays 14D4 and 14D3 to the battery-connected winding of relay 14D2. Relay 14D2 operates and at its make contacts prepares a series operate circuit for relay 14D2 and 14D3. Relay 14D3 is short-circuited by ground on both sides of its winding and does not operate. Ground is maintained on conductor R (by a jumper not shown) for the duration of the time the common control apparatus is held in use. Upon the clearing out of the control apparatus, ground is removed from conductor R and relay 14D1 restores. Ground is now extended through the make contacts of relay 14D2 and the winding of relays 14D2 and 14D3 in series to battery and relay 14D3 is operated. The conductor R is transferred from conductor 1 to conductor 2 in preparation for the next call to the same trunk group.

On the second call to the trunk group containing more than 60 trunks, the conductor R is again grounded and this ground is extended to the winding of the relay 14D1 as hereinbefore noted and is also extended through the break contacts 2 of relay 14D4 and the make contacts of relay 14D3 to conductor 2 of the three-trunk subdivision thereby immediately operating a different one of the match-test digit-connect relays which is associated with the second 30 trunks of the called trunk group. Relay 14D1 thereupon operates and extends ground through break contacts 1 of relay 14D4 and make contacts 1 of relay 14D3 to the upper battery-connected winding of relay 14D3. At the same time, the break contacts of relay 14D1 open-circuits the series-connected windings of relays 14D2 and 14D3 permitting relay 14D2 to restore as it is not held operated through another winding, as is relay 14D3. The ground on conductor R is thereby maintained on the conductor 2 of the two-trunk subdivision for the duration of the controller testing operation and upon the completion of the testing, ground is removed therefrom and relay 14D1 restores. At this time, the ground on the upper winding of relay 14D3 is removed and relays 14D3 and 14D4 operate in series from the ground at back contacts of 14D1 through break contacts of relay 14D2 and the make contacts of relay 14D3. With the operation of relay 14D4 in series relay 14D3, conductor R is transferred from conductor 2 at contacts 2 of relay 14D4 to conductor 3 in preparation for the next call to the same trunk group.

On the third sucessive call to the same trunk group containing more than 60 trunks and less than 90, ground appearing on conductor R is extended through make contacts 2 of relay 14D4 to conductor 3 extending to the match-test digit-connect relay associated with the last 30 trunks of the called group. This ground is also extended to the windings of relay 14D1 which operates and at its break contacts open the series-connected winding of relays 14D3 and 14D4 and at its make contacts and the make contacts 1 of relay 14D4, maintain relay 14D4 operated. Contacts 2 on relay 14D4 maintain the ground from conductor R on conductor 3 thereby holding the concerned match-test digit-connect relay operated.

On completion of the third successive call to the same trunk group containing more than 60 trunks, ground is removed from conductor R, thereby restoring relay 14D1 and removing ground from conductor 3 permitting the operated digit-connect relay to restore. With the restoration of relay 14D1, relay 14D4 is open-circuited and all the relays of allotter 1 are now restored in preparation for another cycle of three successive calls to a trunk group containing more than 60 trunks. The conductor R is again connected to conductor 1 of its three-trunk subdivision of control wires.

IXC7*b*. *Number block control wires*

As hereinbefore pointed out with reference to dialing the trunk groups 67, 68, 69, and 60, it will be recalled that in addition to grounding the R wire of the match-test division, the R wire of the number-block division was also grounded. For example, when ground appeared on jumpers 1790 through 1792, ground appeared on the R conductor of the match-test division groups of control wires of allotters 3, 4, and 5, over jumpers 1758 and 1759 which are connected to jumper 1780. Under these circumstances, the ground on the R conductor of the number-block allotter division of control wires was switched between conductors 1 and 2 of the two-trunk subdivision on successive calls in step with the match-test conductor R switching between conductors 1 and 2. In this way, the number-block leads being called in are the ones associated with the trunks being tested thereby insuring that a number-block lead associated with trunks other than those currently being tested is not energized.

X. BLOCK COUPLER 1800 (Fig. 18, parts 1 and 2)

As shown in Fig. 18, parts 1 and 2, local block coupler 1800 includes a test jack TJ, relays 1801 through 1815, condensers 1816 through 1818, and magnetic impulse counters HR, TR, and UR.

XA. *Circuit functions of block coupler 1800*

Local block coupler 1800 handles only locally-terminating calls which are received from the assigned thousands trunk 1–270–1 over jumper 1–271–1, incoming from a thousands link-frame, as illustrated. Block coupler 1800 performs the following principal circuit functions:

1. It normally supplies idle-indicating battery potential to the sleeve conductor of its attached thousands trunk;
2. Upon seizure, it removes idle-indicating battery potential from the sleeve conductor of the attached thousands trunk and substitutes a holding ground potential;
3. If the start of the dialing of the hundreds, tens, and units digits is delayed for the normal time-out period (about two to four minutes), it times out by removing holding ground from the sleeve of the attached originating trunk to permit release and lock-out to occur on the calling line-link frame;
4. It receives and stores three digits (a hundreds digit H, a tens digit T, and a units digit U) for transfer to the block translator;
5. It temporarily seizes the chain of its local block coupler section, subject to such chain being idle, and guards the seized chain against seizure by other block coupler in the same section;
6. It transfers the three digits of stored digit information to the block translator while it has the chain seized;
7. Upon a signal from the block controller that the called line is busy, or that no idle path can be matched thereto, it applies a busy tone to the calling line and frees the seized chain;
8. It registers on thousands register relays 1801 through 1803, the thousands-digit information received from the thousands-link frame over one of number-block wires NB–2 to NB–4;
9. It transfers the stored number-block information to the block translator while it has the chain seized and responds to resetting control therefrom according to translated number-block digit information;
10. When the connection has been extended over a matched path to a called line, it applies ringing current to the called line, applies ringing tone to the calling line, and frees the seized chain;
11. If the call is not answered during the normal time-out period, it times out as previously noted;
12. When the call is answered, it trips the ringing circuit, completes the talking connection, and reverses the current flow over the tip and ring conductors of the attached thousands trunk subject to hookswitch control from the called line;
13. It supplies transmitter current to both lines;
14. If the connection is still held by the calling line after the called line is opened, it times out in the normal time-out period;
15. Upon a reverting call (wherein a calling subscriber dials the directory number of the called subscriber on the same line), it receives a signal from the block controller that the call is a reverting call and applies a reverting call tone to the calling line and frees the seized chain;
16. When the receiver is replaced on the calling line in obedience to the reverting call signal, it locks itself to hold the connection, sends ringing current back to its associated thousands trunk and originating trunk to the calling line; and 17. When a reverting call is answered, it clears out by removing holding ground from the sleeve of its associated thousands trunk to permit release and lock-out to occur on the line-link frame containing the calling line.

XB. *Relay functions at block coupler 1800*

The fifteen relays (1801 to 1815) of block coupler 1800 have principal functions assigned thereto as follows:

Relays 1801 through 1803 (thousands registers) registers the number-block information and transmits it to the block translator and thereafter responds to control from the block translator to position itself according to the location of the called station on the called line.

Relay 1804 (switch-through) switches the incoming thousands trunk conductors through metallically to the out-going ones on terminating calls and reverting calls.

Relay 1805 (back bridge) operates over the called line when a call is answered, to reverse the incoming tip and ring conductors under control of the hookswitch on the called line.

Relay 1806 (line) operates when the coupler is seized and restores thereafter, under control of the calling device or hookswitch, whenever the calling line is opened.

Relay 1807 (series) is operated by the line relay, it restores at the beginning of a series of dial pulses to control the operation of transfer relays 1814 and 1815, and it reoperates only when the line relay has again come to rest operated, as it is slow-operating because of a heavy spring adjustment.

Relay 1808 (release) is slow-releasing by virtue of a copper sleeve under its winding; it is operated by the line relay; and it remains operated during pulsing but releases when the line relay remains restored for a substantial fraction of a second.

Relay 1809 (ring cut-off) is slow-operating by virtue of a copper collar surrounding the armature end of its core and is operated by direct current flow in the ringing circuit when the call is answered, to open the ringing circuit and to close the talking circuit.

Relay 1810 (switching) operates on a reverting call or a terminating call when the block controller has matched a path to the called line; it frees the seized chain; and it closes the ringing circuit.

Relay 1811 (busy) is operated from the block controller to apply a busy tone signal to the calling line when the called line is busy or when an idle path to it cannot be found; operates on a reverting call (with the switching relay operated) to apply reverting-call tone to the calling line.

Relay 1812 (chain) is operated on all calls after the dialing of a units digit, and it seizes the chain of the local block coupler section for the exclusive use of this block coupler.

Relay 1813 (time-pickup) is operated as required, to start the final portion of the normal time-out period to render the connection subject to release by the common timing apparatus.

Relay 1814 (hundreds-transfer) operates at the end of the first digit series of pulses to distribute the second series of impulses to the tens register.

Relay 1815 (tens-transfer) operates at the end of the dialing of second digit series to distribute the third series of impulses to the units register UR.

XC. *Impulse counter functions at coupler 1800*

The three impulse counters (HR, TR, and UR) at block coupler 1800 have principal functions assigned thereto as follows:

Impulse counter HR (hundreds registers) registers the number of impulses in the first digit dialed in the block coupler 1800.

Impulse counter TR (tens register) registers the number of impulses in the tens digit.

Impulse counter UR (units register) registers the number of impulses in the units digit.

The following additional functions are assigned to impulse counters HR to UR:

Hundreds register HR, which actuates its contact sets 1 on receipt of its first operating pulse, disconnects idle-indicating battery resistor 1822 from the sleeve of the attached trunk as a sleeve-guarding measure, and controls the operation of hundreds transfer relay 1814.

Tens register TR at its make contact sets 1 assures the positive restoration of the all operated registers upon the abandoning of a connection.

Units register UR at its make contacts 1, closes the chain circuit following the completion of the dialing of the units digit.

XD. *Block coupler 1800 operation*

As hereinbefore described, upon the seizure of the block coupler by the switching-through operation on the thousands-link frame, ground is transmitted to the concerned coupler over one of the number-block wires NB–2 to NB–4 if the directory number dialed is a number created by the assignment of additional thousands digits to the same 1000-line switching block.

If the concerned 1000-line switching block has 2000 directory numbers assigned thereto, ground is transmitted to the seized coupler over number-block wire NB–2 if the directory number dialed is one of the second one-thousand numbers; if there are 3000 numbers assigned the switching block, ground appears on wire NB–2 if the number dialed is in the second one-thousand numbers and appears on wire NB–3 if the number dialed is in the third one-thousand numbers of the 3000 numbers assigned the concerned block; and if there are 4000 numbers assigned the same switching block, the dialing of a number in the second 1000 numbers causes wire NB–2 to be grounded, the dialing of a number in the third 1000 numbers causes wire NB–3 to be grounded, and the dialing of a number in the fourth 1000 numbers causes wire NB–4 to be grounded.

Block coupler 1800 is so arranged that it can be used to register the number-block information transmitted thereto regardless if one, two, three, or four thousand numbers are assigned the same block. If it is used in a switching block having 1000 numbers assigned, none of the jumpers 1–271–1, associated with wires NB–2 to NB–4 are connected; if used in a switching block assigned 2000 numbers the concerned one of the noted jumpers, the one associated with wire NB–2 is connected; if used when 3000 numbers are assigned one switching block, the associated coupler has the jumpers associated with wires NB–2 and NB–3 connected; and if used in a switching block having 4000 directory numbers assigned to it, the jumpers 1–271–1, associated with all three wires NB–2 to NB–4, are connected, as illustrated.

When the above noted jumpers are installed, the number block wires NB–2 to NB–4 are connected to the battery-connected windings of register relays 1801 to 1803, respectively. Ground appearing on any of the wires NB–2 to NB–4 accordingly operates the concerned one of the register relays.

Assuming that conductor NB–2 is grounded in the thousands controller, this ground is extended over jumper 1–271–1 to the battery connected winding of relay 1801. Relay 1801 operates and at its make contacts 1 locks to ground on the sleeve conductor S of the attached thousands trunk through break contacts 2 of chain relay 1812, rectifier 1823, and break contacts 3 of ring cut-off relay 1809. Contacts 2 of relay 1801 close the interrupter generator lead INT–GEN–2 through break contacts 2 of the thousands register relays 1802 and 1803 to wire 1805 which is open at make contacts 9 of switching relay 1810.

The other relays 1802 and 1803 operate when their associated number-block wire is grounded and place the proper ringing frequency on wire 1850 extending to switching relay 1810.

XD1. *Seizure of block coupler 1800*

When block coupler 1800 is seized by the described extension of a connection thereto from calling line 200, over line-link 202A, originating trunk 1–203A1, thousands link 260, thousands trunk 1–270–1 and jumpers 1–271–1, line relay 1806 operates over the calling line through contacts 1 and 2 of relays 1804 and 1805. Line relay 1806 at its make contacts 1 operates series relay 1807 and at its front contacts 2 operates release relay 1808.

At its contacts 1, release relay 1808 transfers the sleeve conductor S of thousands trunk 1–270–1 from the idle-indicating battery from current-limiting resistor 1822, to ground at break contacts 1 of relay 1813. The established connection from the calling line to block coupler 1800 is thereby maintained after the common-control apparatus of Fig. 4 and the common control apparatus of Fig. 6 has cleared out. At its make contacts 2, release relay 1808 grounds the local locking conductor 1848, and at its make contacts 3 opens a point in the release circuit of the counters and prepares the local impulse circuit for the digit registers HR to UR, through contacts of the transfer relays 1814 and 1815.

Contacts 1 of series relay 1807 connects time-pickup relay 1813 to the common time-pulse lead TP to start the normal time-out period; its contacts 3 open the operate circuit of the switch-through relay until the proper time for its operation; and at its contacts 4 closes the chain circuit of the block coupler pursuant to seizing the common control apparatus for individualizing this coupler with the common control apparatus.

XD2. *Receipt of digit impulses*

The above noted seizure of the block coupler and the clearing out of the thousands controller apparatus on the thousands-link frame is accomplished during the inter-digit interval between the dialing of the thousands digit and the hundreds digit of the directory number. Therefore, immediately following the dialing of the thousands digit, the calling subscriber may dial the hundreds, tens, and units digit of the directory number of the desired line.

Each time the calling device is operated to transmit series of circuit-interruption impulses, line relay 1806 is restored momentarily for each such interruption impulse in series.

Relay 1808 remains operated throughout any series of impulse-induced restorations of line relay 1806, being slow-restoring because of its indicated copper sleeve.

Series relay 1807 restores promptly upon the first restoration of line relay 1806. Being slow-operating because of a comparatively inductive winding and a comparatively heavy biasing spring adjustment relay 1807 remains restored throughout any digit series of momentary restorations of the line relay.

With release relay 1808 maintained continuously operated, each restoration of line relay 1806 delivers an impulse at its break contacts 2, through make contacts 3 of relay 1808, and through break contacts 7 and 6 of relays 1810 and 1811 to wire 1830. The transfer relays 1814 and 1815 are so interconnected that the first series of impulses over wire 1830 is transmitted to the lower or operating winding of the electromagnet of the hundreds register HR over wire 1831; the second series to register TR; and the third and last series of impulses to register UR.

When line relay 1806 comes to rest operated at the end of any digit series of impulses, series relay 1807 shortly thereafter reoperates responsive to the continued closure of its operating circuit, and at its contacts 2 permits hundreds transfer relay 1814 to operate. The operating circuit of hundreds transfer relay 1814 is from ground at break contacts 4 of switching relay 1810, through make contacts 1 of hundreds register HR, and through the winding of hundreds transfer relay 1814 and associated resistor 1819 in series to battery. This ground was immediately placed to the winding of the transfer relay 1814 upon the receipt of the first pulse of the hundreds digit but ground from make contacts 2 of release relay 1808, through break contacts 2 of series relay 1807 and through break contacts 1 of hundreds transfer relay 1814 short-circuited the winding of the hundreds transfer relay preventing its operation until series relay 1807 operated to remove this shunting ground.

With the operation of hundreds transfer relay 1814, at the end of the receipt and registration of the hundreds digit, its contacts 2 transfer pulsing wire 1830 from wire 1831 to wire 1832 extending to the operate winding of tens register TR through back contacts 2 of tens register relay 1815. Contacts 1 of relay 1814 transfer wire 1837 into association with resistor 1820 to prevent the operation of tens transfer relay 1815 until the end of the dialing of the second digit.

On subsequent operations of series relay 1807 on the completion of the dialing of each of the remaining digits of the directory number, contacts 2 thereof open to permit the operation of tens register 1815 through make contacts 1 of the operated tens register TR in a manner similar to the operation of the hundreds transfer relay 1814, just described. Contacts 2 of tens transfer relay 1815 transfer pulse wire 1830 to wire 1833 extending to the operating winding of units register UR, preparing it to receive the impulses constituting the units digit of the directory number. Contacts 1 of relay 1815 remove the short-circuit from the winding of the tens register transfer relay 1815 to prevent it from being restored during the dialing of the units digit.

Upon the restoration of the series relay on completion of the dialing of the units digit, its contacts 4 close the chain circuit to call in the common equipment on the block-link frame, as will hereinafter be described.

XD2*a*. *Hundreds digit registration*

When the impulses of the hundreds digit are delivered over wires 1830 to 1831 to the operating winding of the hundreds register HR as described, the contact sets (1 to 10) of this register are actuated successively responsive respectively to the impulses of the digit.

On receipt of the first impulse at hundreds register HR, its break contacts 1 disconnect the idle-indicating battery lead from resistor 822 to prevent reapplication of idle-indicating battery upon any subsequent restoration of release relay 1808 before the connection is cleared out, Make contacts 1 of hundreds register HR operate to close the operating circuit for the hundreds transfer relay 1814 as hereinbefore described.

XD2*b*. *Tens digit restoration*

When the impulses of the tens digit are delivered over wire 1830, through make contacts 2 of hundreds transfer relay 1814 and through break contacts 2 of transfer relay 1815 to wire 1830 to the operating winding of tens register TR, the contact sets of this register are actuated successively responsive respectively to the impulses of the tens digit.

On receipt of the first impulse at tens register TR, its make contacts 1 close an operating circuit for tens transfer relay 1805 as hereinbefore described.

XD2*c*. *Units digit registration*

As hereinbefore noted, following the dialing of the tens digit, tens transfer relay 1815 operates and extends the pulse wire 1830 to wire 1833 extending to the operating winding of units register UR. When the impulses of the units digit are delivered over wire 1833, register UR actuates its contact sets according to the impulses of the units digit.

On receipt of the first impulse at units register UR, its make contacts 1 close the chain circuit from start wire ST extending to the block controller to the open contacts 4 of series relay 1807.

XD3. *Chain seizure and guarding*

On completion of the dialing of the units digit, line relay 1806 reoperates, and series relay 1807 operates shortly thereafter. Make contacts 4 of series relay 1807 extends the start wire ST extending to wire 1846, through make contacts 1 of units register UR, through break contacts 10 and 8 of relays 1810 and 1811, through the winding of chain relay 1812, through break contacts 4 of the chain relay to chain-end conductor CH–END. As hereinbefore pointed out, if the common control apparatus is available for use at this time, ground potential from the section preference relays is present on chain-in conductors CH–IN and is extended through break contacts 5 of chain relay 1812 to the chain-in conductor extending through other couplers of the same section. This operation is subject to the chain being idle, in which case a ground potential is present on the chain-in conductor CH–IN of the first coupler in the section containing the calling block coupler 1800. This conductor extends through chain contacts of all the block couplers of the section to the chain-end conductor CH–END multipled to all couplers of the section. The chain circuit is thus extended from ground through a relay in the section-preference relays, the winding of chain relay 1812, to battery through the winding of the start relay in block controller 1600′.

The last-mentioned relays operate in series to mark the calling coupler and section and to inform the block controller that a call has been received. As is described in our noted prior application, the block controller thereupon determines the busy or idle condition of each of the called trunks in the called group and proceeds to match a path across the block-link frame to an idle one of them.

As described in our noted prior application, the concerned section-preference relay operates to open the chain to all other block coupler sections and to position the block-controller switch 1500′ to select the block-link primary switch which serves the block coupler section containing the calling block coupler.

In the calling block coupler 1800, chain relay 1812 operates in the hereinbefore traced circuit to lock itself to chain-in conductor CH–IN at its make contacts 4, and at its break contacts 4 and 5 isolates the associated chain-end conductors CH–END from the chain to guard it from seizure by any other coupler in the same section, whereby the common control apparatus on the block-link frame is rendered temporarily individual to calling block coupler 1800.

Chain relay 1812, at its contacts 1, transfers the holding ground on the sleeve conductor S of the attached trunk from the ground at break contacts 1 of time-pickup relay 1813 to ground on sleeve ground conductor SG extending to block controller 1600′ pursuant to a revertive call test; its contacts 2 transfer the holding ground maintaining the concerned thousands register relay operated, to ground on conductor LG extending to block translator 1900; its contacts 3 and 6 connect up the common switching and busy wires (SW and BU) to the local wires of this coupler; its contacts 7, 8, and 9 place ground on conductors 1840, 1841 and 1842 extending to the contact sets of the respective register HR, TR, UR; and its contacts 10, 11, and 12, extend the wires 1843, 1844, and 1845 associated with the thousands register relays 1801 to 1803, to the station wires ST–2 to ST–4, respectively, extending to the block translator.

XD4. *Digit setting of the block translator*

Chain relay 1812 further effects the setting of the block translator in accordance with the registered hundreds, tens, and units digits by grounding the common leads 1840 to 1842 of the registers HR, TR, and UR, thereby grounding the previously selected ones of the leads in each of the digit groups H, T, and U, extending to the block translator. Additionally, chain relay 1812 extends the locking ground of the operated one (if any one is operated) of the relays 1801 to 1803 over respective wires 1845 to 1843 to transmit the registered number-block information to the block translator.

XD5. *Testing the called line*

Upon receiving the digit information, the block translator transmits a suitably translated version of the hundreds, tens, and units digit to the line controller on the line-link frame of which the called line terminates as described in our noted prior application. The number-block information is used only for ringing control purposes and station-intercept purposes as will be explained subsequently.

As noted in our prior application, the translated digit information sent to the line controller causes it to indicate which primary switch serves the line being called and causes it to indicate the fives and units location of the called line thereon. The concerned line controller identifies itself at the block controller and positions the controller switches. After the line controller switches in the line-link frame are set, the sleeve conductor of the called line is extended over the sleeve units wire SU to the line controller from whence it is extended to the block controller to enable the called line to be tested as to its busy or idle condition. At the same time each of the sleeves of the line links associated with the primary switch is connected to the line controller so that the busy or idle condition of the line link serving the primary switch is indicated to the block controller.

XD5*a*. *Busy condition*

On testing the called line, if block controller 1600′ finds it busy or that no idle path can be matched thereto, the block controller grounds its busy lead BU thereby operating busy relay 1811 through make contacts 6 of chain relay 1812. Relay 1811 at its contacts 4 locks itself to ground on wire 1848; opens its contacts 8 to release the chain relay 1812 and to free the seized chain; closes its contacts 3 to shunt the make contacts 1 of series relay 1807, which controls time pickup relay 1813, to avoid starting a new time-out period in the event of subsequent dialing; at its contacts 6 opens the pulsing circuit over wire 1830, and at its contacts 1 applies busy-tone BT through break contacts 1 of switching relay 1810 and the small-capacity tone condenser 1816.

If the calling subscriber does not replace his receiver responsive to the returned busy-tone signal to thereby cause the connection to be cleared out normally, the connection is cleared out under control of the common timing apparatus at the end of a normal time-out period, measured from the dialing of the units digit, as will hereinafter be described.

XD5*b*. *Called line seizure*

As described in our noted prior application, if the called line is idle and a path can be matched thereto over an idle block-link and terminating trunk the block controller matches such a path, and thereafter grounds its switching wire SW, thereby operating switching relay 1810 through make contacts 3 of chain relay 1812.

Upon operating, switching relay 1810 at its contacts 3 ground the switch wire SW extending to the hold magnet on the block-link primary switch associated with the calling coupler 1800 thereby operating it and extending the tip, ring and sleeve conductors of the coupler 1800 to the respective conductors of the terminating trunk extending to the called line. Contacts 10 of switching relay 1810 restores chain relay 1812 and frees the chain circuit; its contacts 4 open the operating and locking circuit of the hundreds and tens transfer relays 1814 and 1815; it locks operated at its contacts 5 to grounded conductor 1848; its contacts 2 and 9 close the ringing circuit to signal the called line; and its contacts 1 apply ringing tone to the calling line from common lead RT, through the tone-coupling condenser 1816 to inform the calling subscriber that the ringing operation has begun.

XD6. *Ringing the called station*

The ringing circuit for the called line is from the selected one of the generator leads INT–GEN–1 to INT–GEN–4 through the associated contacts of the operated thousands register relay to wire 1850 from whence it is extended through make contacts 9 of switching relay 1810, the line winding of ring cut-off relay 1809, make-break contacts 2 of the ring cut-off relay 1809 to the ring conductor R of the called line, through the ringer on the subset of the called station, and over a return path on tip conductor T, through break contacts 1 of ring cut-off relay 1809 and through make contacts 2 of the switching relay 1810, to generator ground GEN–GRD.

Ring cut-off relay 1809, whose line winding is included in the ringing circuit does not operate before the call is answered, for each ringer (not shown) on the called line has a usual condenser in series therewith to block direct-current flow and because the shading collar surrounding the armature end of the core of the relay 1809 keeps it from responding to the alternating current.

In order to permit ring cut-off relay 1809 to be operated by direct-current flow during the application of ringing current (if the call is then answered), any applied frequency of ringing current is in series with (superimposed on) the free pole of the usual grounded exchange battery. Preferably, during the silent period, the battery alone is applied to each of the generator leads INT–GEN–1 to INT–GEN–4 rather than generator current in series with the exchange battery.

XD6*a*. *Ringing frequency selection*

The operated one of the thousands register relays (1801 through 1803) extends its locking ground from conductor 1849 through its make contacts 1 to its associated conductor (1843 to 1845) extending to the block translator through contacts 10 through 12 of chain relay 1812. As will rereinafter be described, block translator 1900 translates this received number-block information from the thousands register and resets them according to the station location of the called party. Upon receiving the number-block information, the locking ground lead LG is opened momentarily to restore the operated thousands register relay. The translator thereafter grounds one of the leads 1843 to 1845 depending upon the translated number-block information, to operate the concerned thousands register relay to apply the correct ringing frequency to the called line. The concerned one of the thousands register relays is again held operated by ground over conductor LG extending to the block translator and at its contacts 2 connect wire 1850 to the interrupter generator lead 1 to 4, corresponding to the ringing frequency of the desired station on the called line.

When the chain relay restores responsive to the operation of the switching relay, the make-before-break contacts 2 of the chain relay transfers the holding ground on wire 1849 from locking conductor LG to the sleeve conductor S of the attached thousands trunk through resistor 1823 and break contacts 3 of relay 1809.

XD6*b*. *Ring cut-off operation*

When the call is answered at the called station on the called line, the closure of the usual talking bridge across the called line causes direct current to flow thereover from the generator in use, operating ring cut-off relay 1809 through its line windings sufficiently to close its self-locking contacts 4, these contacts closing a local circuit for operating relay 1809 fully. At its contacts 1 and 2, ring cut-off relay 1809 opens the ringing circuit and completes the talking circuit; and its contacts 3 open the locking circuit of the operated thousands register relay permitting it to restore.

XD7. *Answered supervision*

Back-bridge relay 1805 operates over the called line. It interchanges the incoming tip and ring conductors to reverse the current flow over the calling line to serve any required supervisory function. The calling party may converse with the called party over the tip and ring conductors through coupling condensers 1817 and 1818.

During conversation, the following relays of block coupler are energized.

1. Back bridge relay 1805,
2. Line relay 1806,
3. Series relay 1807,
4. Release relay 1808,
5. Ring cut-off relay 1809,
6. Switching relay 1810.

XD8. *Clearout*

If the called subscriber is the first to replace his receiver at the end of the conversation, back-bridge relay 1805 thereupon restores, reversing current flow over the calling line back to normal direction and reconnecting relay 1813 to start a new normal time-out period.

When the receiver is replaced on the calling line, line relay 1806 restores and at its make contacts 1 open-circuits series relay 1807 and at its make contacts 2 open-circuits release relay 1808. Series relay 1807 and release relay 1808 restore and remove ground potential from the sleeve conductor S of the attached thousands trunk. The established connection is thereby cleared out by the release of the hold magnets on the calling line-link frames, the thousands-link frame, and the block-link frame.

Release relay 1808 removes ground from wire 1848 thereby restoring switching relay 1810 and ring cut-off relay 1809.

With the restoration of switching relay 1810, its contacts 4 extend ground on wire 1836, through make contacts 1 of operated hundreds register HR and tens register TH to the winding of transfer relays 1814 and 1815.

At this time there is no shunting ground on wire 1837 and the hundreds and tens transfer relays 1814 and 1815 operate as previously described. At the same time, ground from back contacts 2 of line relay 1806 is extended through back contacts 3 of release relay 1808 to wire 1838 extending to resistor 1821 through make contacts 3 of the transfer relays 1814 and 1815. This ground is extended through resistor 1821 and through the release windings of the hundreds register, the tens register, and the units register in series to battery. This ground energizes the series-connected residual flux neutralizing windings of registers HR to UR, releasing them. The release of counters HR and TR open-circuits relays 1814 and 1815, thereby completing the clearing out of block coupler 1800.

XD9. *Reverting call*

To make a reverting call (call another station on the same line with the calling station), the calling subscriber removes his receiver; responds to dial tone by dialing the directory number of the called station; replaces his receiver upon hearing the distinct reverting call tone prompting him so to do; waits a reasonable time for ringing current to be applied to the line to signal the called station; and then again removes his receiver for conversation. It may be assumed, for the purpose of this description that the subscriber at the calling station has become connected to block coupler 1800 as described and has dialed the number of another station on the calling line.

When block coupled 1800 is used for a reverting call, its operation is as described up to the point where the common apparatus on the block-link frame has been called in after the complete number has been dialed and registered on registers HR to UR. This includes the operation of chain relay 1812, which among other things, makes the described substitution at its contacts 1 of the sleeve ground conductor SG of block controller for the local source of ground normally applied to the sleeve conductors S incoming to block coupler 1800.

In the present example, since the number dialed is the line served by the same line-link frame containing the calling line, the translator sends a translated equivalent of the hundreds, tens, and units digit of the called number to the line controller apparatus containing the calling line which responds as described in our noted prior application to close a test extension of the sleeve conductor S of the called line to the block controller. The holding ground maintained on the sleeve of the calling line by the block coupler 1800 causes the line to test busy when the block controller 1600′ tests it over the described extended sleeve conductor connection. Before treating the called line as normally busy when a test busy condition is encountered, the block controller begins a reverting-call test to determine if the line is busy from another call or from a reverting call. If the block controller discovers that the call is a reverting call, it grounds its switching conductor SW and reverting call conductor RC extending to the block controller.

Reverting call ringing is a ringing-back process not requiring a connection forward from the block coupler therefore the control apparatus does not perform any matching operation but forthwith grounds switching conductor SW and reverting call conductor RC, thereby operating the switching relay 1810 and the busy relay 1811.

Switching relay 1810 operates to ground the switching wire SW extending to the hold magnet on the block-link frame, operating it. Since no matching operation has occurred on the block-link frame and no select magnets have operated, this operation serves no purpose at the present time. Switching relay 1810 at its contacts 10 frees the chain and restores chain relay 1812; closes the ringing circuit to the called line to the unextended tip and ring conductors T and R of the coupler; and performs its other previously noted functions.

Busy relay 1811 operates and locks operated to ground on conductor 1848 the same as the switching relay and at its make contacts 2 places a reverting call tone from the common lead RCT through make contacts 1 switching relay 1810 and through tone-coupling condenser 1816 to the calling line to serve as an indication that the call is a reverting call and the subscriber should replace the receiver for a short period of time.

Contacts 3 of busy relay 1801 maintains the time-pickup relay 1813 connected to control the timing of the connection; its contacts 5 extend ground potential through make contacts 56 of switch relay 1810 to the winding of release relay 1808 through break contacts 5 of ring cut-off relay 1809; its contacts 6 open the circuit of pulse wire 1830; and its contacts 7 extend ground through make contacts 8 of the switching relay and through break contacts 3 of the series relay to the winding of the switch-through relay 1804. However, at this time, if the calling line has not replaced his receiver upon receiving the noted reverting-call tone, line relay 1806 is held operated and maintains series relay 1807 operated thereby preventing the operation of the switch-through relay.

XD9*a*. *Inverting the block coupler*

When the receiver is replaced on the calling line responsive to the receipt of reverting-call ringing tone, line relay 1806 restores and restores series relay 1807. Release relay 1808 does not restore at this time as it is held operated from ground at make contacts 5 of busy relay 1811. Series relay 1807, at its contacts 3 now extend the ground from make contacts 7 of the busy relay to the winding of switch-through relay 1804, operating it.

Relay 1804, at its contacts 1 and 2, inverts the block coupler for operation as a ring-back source by disconnecting the incoming tip and ring conductors from their normal input connection and transferring them to the unextended outgoing tip and ring conductors. The ringing current applied to such unextended ringing conductors as previously described (through make contacts 9 and 2 of the operated switching relay 1810) is now extended back to the calling line to signal the called station thereon according to the setting of the thousands register relays as controlled by block translator 1900.

The relays operated in block coupler 1800 during reverting-call ringing are relays 1804, 1808, 1810, 1811, and 1813. The digit registers are still held operated by residual magnetism as their release circuit has not been closed. The operated one of the thousands register relays is also maintained operated.

XD9*b*. *Answering clearout*

When the receiver is removed at the calling station on the calling line after sufficient time for reverting call ringing to occur has elapsed, ring cut-off relay 1809 is operated over the subscriber line and locks itself to ground on conductor 1848; its contacts 3 restore the thousands register relay operated; its contacts 5 restore relay 1808; and at its contacts 1 and 2 disconnect the ringing circuit and substitutes back-bridge relay 1805, which operates, but only momentarily, as will appear.

The release of release relay 1808 opens the holding circuit to remove holding ground from the associated sleeve conductor. This operation clears out the connection by opening the holding circuits of the operated hold magnets on the line-link frame and on the thousands-link frame. At its make contacts 2, release relay 1808 removes ground from locking wire 1848 thereby restoring the switching relay 1810 and busy relay 1811. When either of these relays restores, the operate circuit of the switch-through relay 1804 is opened thereby permitting it to restore. With the restoration of the switch-through relay, the operate circuit of back-bridge relay 1805 is opened and back-bridge relay 1805 restores.

With the restoration of switching relay 1810, and with the digit registers being operated, ground from break contacts 4 is extended through the make contacts of the digit registers to operate the tens transfer relays 1814 and 1815 which, as previously described, deliver the neutralizing impulse to release the counters and are then consequently restored by the opening of their operating circuit by the restoration of the digit registers.

Block coupler 1800 is again in its normal idle condition.

XD9*c*. *Reverting call lockout*

As described in our noted prior application, when the ground is removed from the sleeve conductor S of the established connection, lockout relay 402 is still operated and reconnects line relay 401. Ordinarily, this operation occurs with the associated line not bridged wherefore the line relay does not respond, and the lockout relay 402 restores after its momentarily delay interval. But the calling line is now bridged, at one or both the calling and called stations thereon, wherefore the line relay immediately reoperates on being reconnected and holds relay 402 operated. The ground passing through the winding of the hold magnet to the associated sleeve conductor S marks the line busy during the reverting-call operation.

When the reverting call conversation is terminated, and receivers have been replaced at both stations, the line relay and the lockout relay restore in succession, terminating the lockout condition of the calling line.

XD10. *Timing out provisions*

The previously referred to timing-out provisions of block coupler 1800 comprises permanent timing which releases the connection to free the block coupler when seized from a line which is permanent or which has become permanent before the connection is released.

A line may become permanent because of a substation or line trouble, or because the receiver is not replaced after use, or that it is accidentally dislodged. A line is treated permanent whenever the next operation to be performed is delayed for a period longer than the assigned normal time-out period.

As described with reference to the thousands couplers, the timing provisions are controlled by the common timer conductors TP and TH are connected.

XD10*a*. *Permanent timing*

Permanent timing starts at block coupler 1800 when series relay 1807 is first operated by line relay 1806, upon seizure of the coupler. Contacts 1 of series relay 1807 connect time-pickup relay 1813 to conductor TP through break contacts 3 of back-bridge relay 1805 and through break contacts 2 of time-pickup relay 1813.

If relay 1807 is still operated when the timer reaches its pickup position, the consequent grounding of lead TP operates time-pickup relay 1813. At its make contacts 2, relay 1813 locks to ground locally and disconnects its winding from the temporarily grounded lead TP, and at its contacts 1 transfers the incoming sleeve conductor S from local source of holding ground to the normally grounded time conductor TH.

If series relay 1807 remains operated continuously (for lack of dialing) time-pickup relay 1813 is still held locked operated when the timer next reaches its time-out position. Then the temporarily ungrounding of conductor TH by the timer removes holding ground from the sleeve conductor S of block coupler 1800. The connection is thereby cleared out and the calling line is locked out of normal service until cleared, but the block coupler is released and returned to common use.

If relay 1807 is restored, as previously described, by the dialing of the next digit, before the common timer reaches its time-out position, time-pickup relay 1813 is thereby released and the new normal time-out period starts upon the next operation of the series relay, at the end of the dialed digit.

When a busy condition is encountered, busy relay 1811, at its contacts 3, shunts contacts 1 of series relay 1807 whereby the connection is released at the end of current normal time-out period even though the calling subscriber should temporarily restore series relay 1807 by dialing while the busy tone signal is being applied.

When back-bridge relay 1805 operates responsive to answer by the called line, its contacts 3 open the operate circuit of relay 1813 to prevent the connection from being cleared out responsive to the completion of the permanent timing. However, when the calling subscriber replaces his receiver ahead of the calling subscriber, the back-bridge relay restores and closes its contacts 3 and starts a new normal time-out period, provided the connection is still held by the called line.

XD11. *Test jack TJ*

Test jack TJ is adapted to receive a three conductor test plug when a test connection is desired to the incoming tip, ring and sleeve conductors of block coupler 1800. When such a plug is inserted, the break contacts thereof open the connection through which the battery supply resistor 1822 normally applies idle-indicating battery potential to the sleeve conductor S of the connected thousands trunk 1–271–1, thereby causing the block coupler and its trunk to test busy to the thousands controller for the duration of the test connection. When desired, a dummy plug may be inserted into jack TJ to cause the block coupler 1800 and trunk 1–270–1 to test busy.

XI. 2000-NUMBER BLOCK TRANSLATOR 1900 (Fig. 19)

The block translator 1900, shown as a rectangular in Figs. 2 and 3, is shown in full in Fig. 19, parts 1 to 5. As described in our noted prior application, associated with the block translator is a pin-terminal section (not shown in this application) whereat jumpers may be installed, as desired, to cause the translation as determined by the illustrated apparatus in Fig. 19, to be replaced by overriding translation. The portion of the translator used for overriding translation is shown as a rectangle 1990.

XIA. *Purpose and function*

The block translator 1900 has two general purposes and functions. It directs calls to respective called lines and stations thereon by normal line number, modified line number, and station translations and it provides standard services by setting up "special" translation, as above indicated.

XIA1. *Normal, modified line number and station translation*

Since the one thousands lines of any 1000-switching block served by the disclosed apparatus on the associated line-link frames (fully described in our noted prior application) are grouped nondecimally on the line-link frames instead of a decimal grouping by hundreds and tens, translation is required to indicate the physical location of the called line on the concerned line-link frame to direct a call thereto. Additionally, the information transmitted to the block coupler and thereafter to the block translator over the hereinbefore noted number-block wires NB–2 to NB–4, requires that the translator indicate to the thousands register relays in the block coupler, the location of the called station, as determined from the thousands digit dialed in the thousands-link frame.

It has been chosen to illustrate block translator 1900 as one serving the 1000 lines on any 1000-line switching block. These lines are divided into 500 individual lines, 250 2-party lines, and 250 4-party lines therefore requiring 2000 different directory numbers. A preferred grouping and station numbering plan of these one thousand lines, is shown in Fig. 20, parts 1 to 8, which show the 2000 directory numbers (1000 to 2999) together with the translated equivalent of each line number and its station location thereon. The main function of the block translator 1900 is to effect this translation as shown in Fig. 20.

As hereinbefore noted, the thousands digits "1" and "2" of the four digit numbers shown in Fig. 20 refer to the first and second thousands digits which may be assigned to the 1000-line switching block. For example, if the thousands digits, dialed in the thousands coupler to seize trunks extending to the concerned switching block which is assigned 2000 directory numbers, are a "6" and a "7," they correspond respectively to the thousands digits "1" and "2" shown in Fig. 20.

On the receipt of the hundreds, tens, and units digits of the called number, the block translator selects the concerned line-link frame and sends to it a translated equivalent number containing translated primary, fives, and units digits respectively identifying the involved primary switch on the called line-link frame, the fives group of lines on the primary switch, and the units location of the called line within such group of five. Additionally, the translator receives the stored number-block information from the thousands register of the concerned coupler and sends back to translated station information identifying the station location of the desired party on a called line.

In Fig. 20, parts 1 to 8 refer to the line-link frames A, B, C, and D associated with the concerned 1000-line switching block. Parts 1 and 2 refer to the line-link frame A, parts 3 and 4 refer to line-link frame B, parts 5 and 6 refer to line-link frame C, and parts 7 and 8 refer to line-link frame D. Each number assigned each frame has an equivalent number 111 to 055 which is prefixed by the frame designation A to D.

In each part of the drawing of Fig. 20, there are five horizontal rows of numbers. Each horizontal row includes five levels of numbers. These five rows refer to the five line-link primary switches on the concerned line-link frame. For example, the rows 1 to 5 of part 1 of Fig. 20, refer respectively to the line-link primary switches 1 to 5 of line-link frame A; the five rows on the Fig. 20 part 2 refer respectively to the five line-link primary switches 6 to 10 of line-link frame A; the five rows on Fig. 20, part 3 refer respectively to the five primary switches 1 to 5 on line-link frame B; and so forth. In any horizontal row, the 25 numbers in the first level associated with verticals V1 to V25 are the translated equivalent numbers and frame designations of the line and stations assigned corresponding verticals. For example, directory numbers 1777, 2777, 2752, and 2762 are assigned as stations 1 to 4, respectively, on the third vertical of the second switch of line-link frame D. From the translated equivalent number D–213, the above location is determined as the letter D identifies the line as being in line-link frame D, the digit 2 is the number of the primary switch, the digit 1 is the first group of five lines and the digit 3 is the third line in that group. The second level of numbers in any horizontal row comprises the 25 directory numbers assigned respectively to the first stations on the lines connected to the verticals V1 to V25 on the associated primary switch, the third level comprises the directory numbers assigned respectively to the second station on the lines connected to the verticals of the switch, the fourth level of numbers refer to the directory numbers assigned the third station, while the fifth level comprises the directory numbers assigned the fourth station on the lines. It will be observed that the second level of each row contains 25 numbers while the levels 3 to 5 include fewer numbers, the reason being that there are 1000 station-1 numbers, 500 station-2 numbers, 250 station-3 numbers and 250 station-4 numbers making up the noted 500 individual lines, 250 two-party lines, and 250 four-party lines.

It will be observed that the numbers 1000 to 1999 are all either individual line numbers or station-1 numbers on two-party and four-party lines. They are assigned to primary switch verticals in accordance with normal fixed translation as described in our noted prior application using station-1 ringing. This translation for the directory numbers 1000 to 1999 will be termed normal line number translation.

Numbers 2000 to 2999 include 500 station-2 numbers, 250 station-3 numbers, and 250 station-4 numbers as noted. The pattern of individual and party line distribution among the primary verticals (V1 to V25) repeats for every 100 station numbers or every 100 verticals. The 500 numbers which end in digits 07–09, 17–33, 40–43, 56–59, 66–83, and 90–93 are station-2 numbers assigned to either two-party or four-party lines, the assignments being in accordance with the standard translation plan used in our noted prior application, but with station-2 ringing instead. This translation will hereinafter be termed normal line number and station-2 translation.

The 250 numbers ending in digits 00–06, 44–55, and 94–99 are station-3 numbers assigned to the four-party lines and are assigned in accordance with a hereinafter described double translation plan consisting of the normal line number translation plus an added special station-3 translation scheme. The verticals assigned the above noted four-party lines correspond numerically to the individual line verticals on the opposite switch of the same switch pair to which station-3 numbers would be assigned in accordance with normal line number translation. This double translation will hereinafter be termed modified line number and station-3 translation.

The 250 numbers ending in 10–16, 34–39, 60–65, and 84–89 are station-4 numbers assigned to the four-party lines and are assigned in accordance with a triple translation scheme hereinafter described. The first translation is the normal line number translation, the second is the assignments to the same vertical on the opposite switch pair and the third is the assignments ten vertical higher or lower. This triple translation will hereinafter be termed modified line number and station-4 translation.

XIA2. *Standard services by overriding translation*

The second purpose and function of the block translator 1900 is to direct the performance of standard services as described in our noted prior application.

The overriding translation apparatus is shown in Fig. 19, part 1 as rectangle 1990. This overriding translation is similar to the overriding translation disclosed in our noted prior application and only a general description will be given in this application.

XIB. *Functional relay groups*

The relays of block translator 1900 comprise separate function groups as follows:

1. Overriding translating section 1990 together with contacts on the hundreds, tens, and units register relays and on the station reset relays comprise the overriding translation portion of translator 1900.
2. Register relays 1901 through 1910 comprise the hundreds group. One or another of the relays 1901 to 1910 operate, depending upon the hundreds digit dialed.
3. Register relays 1911 through 1920 comprise the tens group. One or another of the relays 1911 to 1920 operate, depending upon the tens digit dialed.
4. Register relays 1921 to 1930 comprise the units group. One or another of the relays 1921 through 1930 operate, depending upon the units digit dialed.
5. Translating relays 1931 and 1932 comprise the fives group. They correspond respectively to the first five lines (0 to 4) in a group of ten, and to the last five lines (5 to 9) therein.
6. Translating relays 1933 through 1936 comprise the stations group. Relay 1933 corresponds to the second station on the called line, relay 1934, when operated alone, corresponds to the third station on the called line, relays 1934 and 1935 when operated together, comprise the first station–4 relay if the station–4 number has a tens digit 1 or 6, and relays 1934 and 1936, when operated together, comprise the second station–4 relay if the station–4 number has a tens digit 3 or 8.
7. Translating relays 1937 and 1938 comprise the station–2 reset group. These relays operate in succession to restore the operated thousands register relay of the block coupler and to reset it according to the translated number-block information.
8. Translator relays 1939 through 1942 comprise the 25's group. They correspond respectively to the first, second, third and fourth 25-line groups (00 to 24, 25 to 49, 50 to 74, 75 to 99) in any hundreds group. They are controlled by the tens register relays 1911 through 1920 and the station-3 relay 1934, assisted by 5's relay 1931 when the tens register relay operated is 1921 to 1925 and by 5's relay 1932 when the tens register relay operated is 1926 through 1930.
9. Translating relays 1943 to 1946 are the 250's relays corresponding respectively to the line-link frames A, B, C, and D which in turn (see Fig. 20) correspond to the first, second, third, and fourth 250 line groups (000 to 249, 250 to 499, 500 to 749, 750 to 999) in any 1000-line switching block. These relays are controlled by the hundreds register relays 1901 through 1910 assisted by the 25's relays 1939 to 1942.

XIC. *Operation for normal line number translation*

The operation of the 2000-number block translator of Fig. 19 in handling a call requiring only the normal line number translation will now be described.

The upper terminal of each of the hundreds, tens, and units register relays 1901 through 1930 are normally connected to battery. The lower winding terminal of each of these relays serve as a terminating point for the digit wires incoming from the block couplers 1800. These digit wires comprise hundreds wires H1 to H10, tens wires T1 to T10, and units wires U1 to U10. Additionally, the station wires ST–2 to ST–4 together with the associated locking wire LG is brought from the block coupler 1800 to the stations relays 1937 and 1938. Any one of the above noted relays accordingly stand ready to be operated by a marking ground potential on its connected hundreds, tens, units or stations ST–2 wire.

As hereinbefore noted, wire LG, the conductor to which the winding of the operated register relay (1801 to 1803) is transferred responsive to the operation of the chain relay, is normally grounded in translator 1900. This ground originates at contacts 3 of relay 1937 and contacts 6 of relay 1938 and is removed, when required, to restore the operated register relay preparatory to resetting it according to station translation information.

XIC1. *Setting up the dialed number in the translator*

As described, the hundreds, tens, and units digit information together with the number-block information stored in any block coupler 1800 is transmitted to the block translator 1900 when chain relay 1812 of the block coupler in use is operated. This information appears as ground on the selected wire in each of the digits groups H, T, and U, and appears on wire ST–2 if the thousands register relay 1801 is operated. The wires thus grounded correspond to the registered hundreds, tens, and units digit and the number-block information transmitted to the block coupler from the calling thousands-link frame.

At the same time the associated relay of section-preference relays 1550 and the terminating-start relay 16A6 operate in series with the chain relay of the seizing block coupler. The block controller switch is thereby operated to associate the block controller with the primary switch serving the seized block coupler section and the block controller is started into its matching operation, as described in our noted prior application.

In the block translator, the noted placing of marking ground on the register-selected digit wires operates the corresponding relay in the hundreds group, the tens group, and the units group of Fig. 19, and if the station–2 wire ST–2 is grounded, relay 1937 is operated.

XIC2. *Preliminary translation*

The ten wires in each of the three sets of digit wires H, T, and U extending from the block couplers 1800 to the block translator are considered in order from 1 to 10. This is according to the numbering (1 to 9, and 0) of the finger holds on the dial of the usual calling device and is according to the order in which impulses are received and registered. But, on the main distributing frame MDF (Figs. 2, 4, and 9) and on the line-link frames A, B, C, and D associated with any one of the 1000-line switching block, the line numbers are grouped for digit values in the order of 0, 1, 2, and so forth, to 9. Within a hundreds group, the directory number tens and units digits are from 00 to 99, and in the thousands groups the directory number hundreds, tens, and units digits are from 000 to 999.

The noted variation between the order of the digits as dialed and the order of digits in the numbering plan of the lines is taken care of in translator 1900 by preliminary internal translation within, and local to, each of the three digit groups of wires brought into the translator. For any digit group of wires H, T, or U this preliminary translation is a mere rearrangement of the concerned ten wire groups within the translator. The digit-0 wire 10 extends to the first associated digit register relay (relay 1901 for the hundreds digit) and the digit-1 to digit-9 wires extend respectively to the second to tenth ones of the associated register relays (1902 to 1910 for the hundreds digits). In view of the preliminary translation, the first five register relays in any group of ten correspond respectively to the dialed digits 0 to 4, while the last five register relays in any group correspond respectively to the dialed digit 5 to 9.

XIC3. *Operation of the translator relays*

Five sets of translator relays are employed to assist the digit register relays 1901 to 1930 in setting up the translated equivalent of the hundreds, tens, and units digits of the line number registered and in setting up the translated station number of the registered directory number. These sets of translator relays are:

1. The two fives relays 1931 and 1932;
2. The four 25's relays 1939 to 1942;
3. The four 250's relays 1943 to 1946;
4. The four stations relays 1933 to 1936; and
5. The two station reset relays 1937 and 1938.

XIC3*a*. *Fives translator relays*

The two fives translator relays 1931 and 1932 are controlled by the units register relays 1921 to 1930. These relays may be delayed in their operation by control excerised over their operate wire by the reset relays 1937 and 1938, as will hereinafter be described. If the units digit dialed has any value from 0 to 4, the corresponding one of these units register relays 1921 through 1925, through its contacts 14, operates the first fives relay 1931. If the units digit dialed has any value from 5 to 9, the corresponding register relay 1926 through 1930, through its contacts 14, operates the second fives relay 1932. Relay 1931 accordingly represents the first five lines (0 to 4) in a decimal group of ten while relay 1932 represents the second five lines (5 to 0) in the decimal group of ten.

The five translator relays 1931 and 1932 enable a decimal group of ten consecutive lines to be split into two groups of fives to facilitate division of the lines of the hundreds groups into four groups of 25 and the division of the group of 25 lines into five groups of 5, as shown in Fig. 20.

XIC3*b*. *The 25's translator relays*

The four 25's relays 1939 through 1942 respectively represent the four 25-line groups of consecutive numbers in any one of the 10 hundreds groups of Fig. 20. The 25's relays are controlled by the tens register relays 1911 through 1920 jointly with the five translator relays 1931 and 1932 and the stations relays 1933 through 1936.

If the tens digit dialed is a 0 or a 1, and the desired party is on the first station on the called line, the called line is in the first 20 lines of the hundreds and is therefore within the first 25's group. Accordingly, the operation of either of the tens register relays 1911 or 1912, at its contacts 6, directly operates the first 25's relay 1939 through break contacts 1 of the unoperated station-3 relay 1934 over wire 1 in group 1969 to indicate that the called line lies in the first group of 25 lines in the called hundreds group to which the call is directed.

When the tens digit dialed is a 2, contacts 6 of the third tens register relay 1913 grounds wire 2 in group 1969 as an indication that the called line is in the third ten-line group within the hundred, provided that the station information indicates that the call is to the first station on the line. Half of this ten line group lies in the first group of 25 and the other half lies in the second such group. If the first fives relay 1931 is operated, its contacts 6 connect the grounded wire 2 of group 1969 to the first 25's relay 1939, operating it as an indication that the line is in the first group of 25 within the hundreds. But, if the second fives relay 1932 is operated, its contacts 6 connect the noted grounded wire 2 to the second 25's relay 1940, operating it as an indication that the called line in the second group of 25 lines within the hundred, rather than in the first. The second 25's relay 1940 is also operated (over wire 3 in group 1969) by contacts 6 of either tens register relay 1914 or 1915 if the tens digit dialed is a 3 or a 4.

XIC3*c*. *250's translator relays*

Translator relays 1943 through 1946 correspond respectively to the four 250-line groups which the numbers within the 1000-line switching block are divided as shown in parts 1 to 8 of Fig. 20. Consequently, relays 1943 through 1946 correspond respectively to the four line-link frames A, B, C, and D to which the 250-line groups are respectively assigned. Relays 1943 through 1946 are controlled by contacts 7 of the hundreds register relays 1901 through 1910 over the wires in group 1951, jointly with contacts 11 and 12 of the 25's relays 1939 to 1942.

If the hundreds digit dialed is a 0 or a 1, the corresponding hundreds register relay 1901 or 1902 grounds conductor 1 in group 1951 to operate the first 250's relay 1943 as an indication that the called line is within the first 250-line group in the 1000-line switching block. Similarly, if the hundreds digit dialed is a 3 or a 4, register relay 1904 or 1905 is operated to ground conductor 3 in group 1951 to operate the second 250 relay 1944 as an indication that the called line is in the second 250-line group of numbers in the 1000-line switching block.

If, however, the hundreds digit dialed is a 2, relay 1903 grounds the associated wire 2 to index the call as one to the third hundreds group, which is split between the first and second 250-line groups. If the call is to one of the first 250 lines in the third hundreds group, the ground on conductor 2 of group 1951 passes through contacts of 25's relay 1939 or 1940 to operate the first 250 relay 1943, but if the line called is within the second 250-line group in the called third hundreds group, the ground on the last noted conductor 2 passes through contacts 11 of 25's relay 1941 or 1942 to the second 250's relay 1944.

Similarly, the hundreds register relays 1906 through 1910, representing the hundreds digits 5 to 9, control the 250's relays 1945 and 1946; directly for relays 1906, 1907, 1909, and 1910, and through contacts 12 of the 25's relays 1939 and 1940 to operate relay 1946 in the case of relay 1908 which represents the seventh hundreds group, which is split between the third and fourth groups of 250 lines.

XIC4. *Translated line numbers*

As hereinbefore noted, in Fig. 20 each directory number 1000 to 2999 has an equivalent number 111 to 005. The same 250 translated numbers 111 to 055 appear in the same order for any one of the four line-link frames. Each translated number contains 1. A primary digit 1 to 0;
2. A fives digit from 1 to 5; and
3. A units digit from 1 to 5.

As described in our prior application, the block translator secures the effect of prefixing the line-link frame designation A, B, C, and D to each of the 250 translated equivalent line numbers 111 to 055. This prefixing effect is secured by transmitting such line number over one of the four groups of digit wires 1983 through 1986 (part 5 of Fig. 19) which lead to the concerned frame A, B, C, and D associated with the 1000-line switching block selected by the thousands digit. Each such group contains ten primary wires P, five fives wires F, and five units wires U.

XIC4*a*. *The translated primary digit (1 to 0)*

For any line-link frame A to D of the concerned 1000-line switching block, the ten values 1 to 0 of the translated primary digit are represented respectively by the ten noted primary wires P1 to P10 extending to that frame.

At their respective contacts 5, the hundreds register relays 1901 through 1910 respectively ground the associated hundreds wire 0 to 9 in group 1950 leading to the contacts 1 to 10 of 25's relay's 1939 through 1942. For each hundreds wires 0 to 9, contacts 1 to 10 of relay 1939 to 1942 provide four branch extensions, one for each of the four groups of 25 lines within the concerned group of a hundred. These 40 branch extensions comprise the 40 P wires (PA1 to PD10) over one or another of which the translated primary digit for any call is sent to the required line-link frame. The first ten of these P wires are the wires PA1 to PA10 in group 1983 while the second, third and fourth group of these P wires are wires PB, PC, and PD in groups 1984, to 1986 leading to line-link frames B, C, and D, respectively. The translated primary digit for any translated number 111 to 055 for the line-link frame is thus determined jointly by the hundreds register relays 1901 through 1910 in cooperation with the four 25's relays 1939 to 1942.

XIC4*b*. *The translated fives digit (1 to 5)*

As noted, each line-link frame has a separate group of fives wires F1 to F5 extending thereto. The five values (1 to 5) of the translated fives digit are transmitted to any line-link frame over the wires which are respective extensions of the wires contained in group 1983 to 1986. Five common fives wires originate at the contacts of the tens register relays 1911 through 1920; are extended over conductors in cable 1968; and are connected to the fives wires of the line-link frames A, B, C, or D, depending upon which one of the fives relays (1931 or 1932) are operated, and depending on which one of the 250's relays (1939 to 1940) are operated, and depending on the transposition of the fives wires by the operation of either of the relays 1935 or 1936 as will be described hereinafter.

As described in our prior application, the variations in the value of the translated fives digits are based on the division of any one hundred line group of numbers (100 to 99) into four groups of 25 and a further division of each group of 25 into five groups of five.

XIC4*c*. *The translated units digit (1 to 5)*

As noted, each line-link frame A to D has a separate group of units wires U1 to U5 extending thereto. The operation of the units relay together with the operation of the 250's relay to ground the correct unit wire is as described in our noted prior application for the corresponding units and 250's relays.

XIC5. *The called number is 1025*

If, for example, the number called is 1025, the hundreds, tens, and units digits dialed are 0, 2, and 5. If so, the operated hundreds, tens, and units register relays are the first hundreds register relay 1901, the third tens register relay 1913, and the sixth units relay 1926. The first 250's relay 1943 is operated by contacts 7 of relay 1901, and the second 25's relay 1940 is operated by contacts 6 of tens register relay 1913 from ground at break contacts 5 of station-2 reset relay 1938.

XIC5*a*. *Translated primary digit 2 for frame A*

Contacts 5 on the first hundreds relay 1901 ground hundreds wire 0 in group 1950. Ground on this wire is extended through contacts 1 of the operated second 25's relay 1940 to the second primary wire PA2 in group 1983 extending to line-link frame A.

XIC5. *Translated fives digit 1 for frame A*

With the third tens relay 1913 operated with the second fives relay 1932 operated and with neither one of the station relays 1935 and 1936 operated, ground through contacts 5 of relay 1913 is extended over wire 2 of cable group 1968, and thence through closed contacts 1 of fives relay 1932, to the first common fives wire 1978. With the first 250's relays 1943 operated, this ground is extended through its contacts 1 to fives wire FA1 in group 1983 extending to line-link frame A.

XIC5*c*. *Translated units digit 1 for frame A*

With the sixth units relay 1926 operated, contacts 14 thereon ground the first common units wire U1 thereby grounding the units wire U2 of line-link frame A through contacts 6 of the operated 250's relay 1943.

By the foregoing operation, the assumed registration of number 1025 in the block translator results in the transmission of translated number 211 to line-link frame A. Since the thousands digit dialed was assumed to be a 1, and since no stations wire ST–2 and ST–4 was grounded, the call is directed to the first station on the called line. This corresponds with Fig. 20, part 1 where the translated directory number information appearing for number 1025 is A–211.

XIC6. *Line controller response*

The line controller responds, as described in our noted prior application, to the primary, the fives, and the units digits to operate the associated line-controller switch to select the indicated primary switch, the indicated fives group thereon and the indicated called line in the group of fives. The line-controller transmits information to the block controller, which operates to direct the call to the particular called line and causes the block coupler to signal the called station thereon, accordingly.

XIC7. *Clearing out*

When the operations necessary to extend the connections to the called line (if idle) have been completed, the block controller initiates the hereinbefore described clearing-out operation which includes the restoration of chain relay in the connected block coupler 1800 to remove ground from the marked hundreds, tens, and units wires extending to the block translator. When this occurs the operated digit register relays of Fig. 19 responsively restore. The block translator 1900 is thereby cleared out and marking ground is removed from the concerned ones of the translated digit wires P1 to U5 extending to the called line-link frame A.

XID. *Operation for modified line number and station translation*

The setting up of the dialed number in the translator and the preliminary translation hereinbefore described for normal line number translation is the same for modified line number and station translation.

XID1. *Operation of the modified line number and station translating relays*

The operation of the hereinbefore noted station relays 1933 to 1936 and the operation of the reset relays 1937 and 1938 will now be described.

XID1*a*. *Stations and station reset translator relays*

The four station translator relays 1933 through 1936 are controlled by contacts on the tens and units register relays 1911 through 1930 from ground originating at contacts 2 of reset relay 1938.

Relay 1933 is the station-2 relay and operates if the directory number dialed is assigned to the second station on the called line. Its operation will effect the noted normal line number and station-2 translation by not altering the P, F, and U wires and by extending the normally-grounded conductor 1953 to the station-2 wire ST–2.

Relay 1934 is primarily the station-3 relay, but operates if the directory number dialed is assigned to the third or fourth station on the called line. Its operation will effect the hereinbefore noted modified line number and station-3 translation as its contacts 1 through 4 change the translated line number equivalent as determined by the tens register relays, and its contacts 6 control the energization of the station-3 wire ST–3.

Relays 1935 and 1936 are the first and second station-4 relays, respectively. Each of these relays when energized operates in series with station-3 relay 1934 to effect the noted modified line number and station-4 translation. This translation is a triple translation as the translated equivalent as determined by the register relays is changed by the operation of station-3 relay 1934 as noted and is further altered by contacts 1 and 2 of either one of the station-4 relays 1935 and 1936.

As hereinbefore pointed out with reference to the grounding of a number-block wire NB–2 to NB–4 if the directory number is one assigned to station 1 on the called line (whether it be an individual, two-party, or a four-party line) no number-block wire extending to the thousands coupler 1800 is energized. Therefore, the operation of chain relay 1812 in the block coupler does not affect the station-2 wires ST–2 to ST–4 extending to the block translator Fig. 19 part 4. Accordingly, neither of the reset relay 1937 or 1938 operate and wire 1967 remains ungrounded and none of the four station relays operate. However, if the directory number is one assigned to the second, the third, or the fourth station on the called line (a directory number determined by the assignment of a second thousands digit to the concerned 1000-line switching block), ground will be present on the station-2 wire ST–2 through contacts 1 of the operated thousands register relay 1801 of the block coupler. This ground is extended through the break contacts 4 of relay 1938 to the lower winding of relay 1937.

Relay 1937 operates and its contacts 1 operate relay 1938 which locks through its contacts 3 to wire 1952 which is grounded through contacts 6 of any operated hundreds register relay 1901 through 1910. At its break contacts 4, relay 1938 open-circuits the lower winding of relay 1937 and at its contacts 6 removes the ground from the locking ground conductor LG thereby causing the ground-connected winding of relay 1937 to be held in series with the winding of the operated register relay through make contacts 3 of relay 1937, wire LG, contacts on the operated chain relay, and through the make contacts 1 of the operated register relay 1801 to its battery-connected winding.

The resistance of the upper winding of relay 1937 is such that the current flow through the series circuit of the two noted relays is so limited that the operated thousands register relay restores. Responsive to its restoration, its make contacts 1 open the series-operate circuit of relay 1937 and relay 1937 restores thereby replacing ground on locking conductor LG.

With the operation of relay 1937, the ground on normally grounded conductor 7 of group 1969 is removed at contacts 2 of relay 1937, thereby delaying the operation of the fives relays and the 25's relays until the selected one of the stations relays 1933 to 1936 is operated. This delay in the grounding of conductor 7 is introduced so that the F and U wires extending to the associated line-link frame are not energized until the hereinbefore noted alterations of the translated line number equivalents is effected as determined by the dialing of a directory number assigned to the second, third, or fourth station on the called line.

With relay 1937 restored and relay 1938 operated, ground on conductor 1953, originated at the contacts of the overriding translating translation relay (not shown) of the overriding translation section 1900, is extended through break contacts 4 of relay 1937 and make contacts 7 of relay 1938 to the make-break spring combination on relay 1933.

At the same time, ground from contacts 2 of relay 1938 is placed on conductor 1967 from whence it is extended through the contact network on the tens and units register relays (1911 through 1930) to one of the four wires 1957 through 1960 which extend to the battery-connected windings of the associated relays 1933 through 1936 over conductors in cable 1956. Therefore, depending upon the tens and units dialed, one or more of the station relays 1933 to 1936 will operate on each call which caused ground to be placed on stations wire ST–2.

XID1*b*. *Translator control of station wires ST–2 to ST–4*

When the station-2 relay 1933 operates, the normally grounded wire 1953 is extended through make contacts 2 of relay 1933 to the station-2 wire ST–2 extending to the first of the three register relays in block coupler 1800. This ground will operate the concerned one of the register relays which locks through its make contacts 1 to the ground on locking conductor LG which is now grounded at break contacts 3 of restored relay 1937. As hereinbefore noted, contacts 2 on thousands register relay 1801 connects interrupter-generator lead INT–GEN–2 to wire 1850 to cause station-2 on the called line to be signaled.

When relay 1934 operates, the normally-grounded wire 1953 is extended through break contacts 2 of the unoperated first stations relay 1933, through make contacts 6 of 1934 and through break contacts 3 of relays 1935 and 1936 to the station-3 wire ST–3 extending to the winding of the second thousands relay 1802 in the block coupler. Relay 1802 operates and locks to the grounded locking conductor LG.

When relay 1935 operates from the ground on conductor 1967, its operating circuit is in series with relay 1934 which also operates. The ground on wire 1953 is thereby extended to the station-4 wire ST–4 through make contacts 6 of relay 1934 and make contacts 3 of relay 1935. When relay 1936 operates, its operating circuit also includes the winding of relay 1934 which operates in series with it. The grounded conductor 1953 is then connected to wire ST–4 through break contacts 2 of relay 1933, make contacts 6 of relay 1934, and contacts 3 of relays 1935 and 1936. The corresponding register relay 1803 operates and locks to grounded conductor LG. As hereinbefore pointed out, the operation of any one of the register relays will connect the proper ringing frequency to wire 1850 extending to the ring cut-off relay in preparation to signal the called station on the called line.

XID1*c. Normal line number and station-2 translation*

As noted, the station relays 1933 through 1936 operate only if the station-2 wire is energized, as the operating circuit for these relays originates at make contacts 2 of relay 1938, which operates only if the station-2 wire ST–2 is energized.

If the last two digits of the directory number ends in 07–09, 17–33, 40–43, 56–59, 66–83, or 90–93, the ground on wire 1967 from make contacts 2 of relay 1938 is extended, as hereinbefore noted, through the contact network on the tens and units register relays to wire 1960 extending to the overriding translation section 1990 from whence it is extended (provided no overriding translation is in effect on this call) over conductor 1 in cable 1956 to the battery-connected winding of the station-2 relay 1933.

If the tens digit dialed in the directory number is a 0, 1, 5, or a 6, the battery-connected winding of relay 1933 is extended over wire 1960, and through make contacts 4 of one of the operated tens register relays 1911, 1912, 1916 or 1917 to wire 1965 extending to wire 1967 through make contacts 11 of one of the operated units register relays 1928 to 1930. If the tens digit 5 or 6 is dialed followed by the dialing of a units digit 6, wire 1960 is connected to wire 1964 through contacts 3 of the operated tens relay and then to wire 1967 through contacts 13 of relay 1927. If the tens digit dialed is a 2 or a 4, wire 1960 is extended through make contacts 4 of the corresponding tens relay 1913 or 1918 directly to wire 1967. If the tens digit dialed is a 3, 4, 8, or 9, followed by the dialing of a units digit 0, 1, 2, or 3, wire 1960 is extended to wire 1966 through contacts 4 of the operated one of the relays 1914, 1915, 1919 and 1920 and thence through contacts 12 of the operated one of the relays 1921 through 1924, to grounded wire 1967.

Responsive to the operation of relay 1933, its contacts control the grounding of station-2, wire ST–2 but its contacts do not affect the P, F, and U wires. Therefore, the operation of relay 1933 effects the hereinbefore noted normal line number and station-2 translation.

XID1*d. Modified line number and station-3 translation*

Relay 1934 operates when the directory number dialed ends in the digit 00–06, 44–55 and 94–99. If the tens digit dialed is a 0 or 5 followed by the dialing of the units digit 0 or 1 through 5, the battery-connected winding of relay 1934 extending to wire 1959 from the overriding translation section 1990, is extended through make contacts 2 of one of the operated relays 1911 or 1916 to wire 1961 from whence it is extended to grounded wire 1967 through make contacts 11 of one of the operated units register relays 1921 through 1926; if the tens digit 4 or 9 is dialed followed by the dialing of any units digit 4 to 9, conductor 1959 is extended through contacts 2 of one of the operated relays 1915 and 1920 to conductor 1963 from whence it is extended to grounded conductor 1967 through make contacts 12 of one of the operated units register relays 1925 through 1930; and if the tens digit 0 is dialed, followed by the dialing of the units digit 6, conductor 1959 is extended through contacts 3 of relay 1911 to conductor 1962 extending to conductor 1967 through contacts 11 of relay 1927.

On the dialing of any of the above noted digits, relay 1934 operates from the ground at make contacts 2 of relay 1938 and at its contacts 5 place ground on conductor 7 extending to conductor 1970 over cable 1969 to supply an operating ground for the 25's relay and one of the fives relays 1931 and 1932. Contacts 1 and 2 of relay 1934 transposes the operating leads (1974 and 1975) of the first two 25's relays 1939 and 1940 while its contacts 3 and 4 transpose the operating leads (1976 and 1977) of the last two 25's relays 1941 and 1942. The reason for the transposition of the operate leads of the 25's relay is that the station–3 numbers are only assigned to four-party lines and since all four-party lines have been assigned (see Fig. 20) to the last six verticals V20 to V25 on all primary switches selected by the operation of the 25's translator relays 1939 or 1941; to the first seven verticals V1 to V7 on all switches selected by 25's relay 1940; and to the first six verticals V1 to V6 on all switches selected by 25's relay 1942, to cause reassignment of station–3 numbers to the corresponding vertical on the opposite switch of the same switch pair.

For example, a call to station 2052 which by normal translation would be assigned to vertical A–313, by the transposition of the operate wires of the 25's relays would be reassigned to vertical A–413, thus serving as station 3 on a line whose first and second stations are numbered 1077 and 2077, respectively. As hereinbefore noted, make contacts 6 of relay 1934 extend the ground on conductor 1953 to the stations–3 wire ST–3 extending to the second thousands register relay to select the proper ringing frequency to signal station 3 on the called line. This translation effected by transposing the operating leads of the 25's relays and the translator control over the station wire ST–3 is termed modified line number and station–3 translation, as noted.

XID1*e. Modified line number and station-4 translation*

As hereinbefore noted, the operation of relay 1935 or 1936 in series with relay 1934 causes the ground on conductor 1953 to be placed on the station-4 lead ST–4 extending to thousands register relay 1803 of the thousands coupler to cause the proper ringing frequency to be supplied to the called line. However, as will be observed in Fig. 20, the station-4 numbers are either ten verticals higher or ten verticals lower than the corresponding station-3 numbers and, as pointed out previously, are assigned certain verticals requiring transposition of the 25's operating leads. However, since they are 10 verticals higher or lower, in addition to the transposition of the noted operating leads, an additional translation is necessary to switch the five wires.

Relay 1934 and 1935 will operate in series provided conductor 1958 is grounded through the contact network of the tens and units register relays. If the tens digit dialed is a 1 or a 6, followed by the dialing of the units digits 0 or 1 to 5, conductor 1958 is extended through contacts 2 of one of the operated relays 1912 or 1917 to wire 1961 from whence it is extended to grounded conductor 1967 through contacts 11 of one of the operated units register relays 1921 to 1926. If the tens digit 1 is dialed, followed by the dialing of the units digit 6, conductor 1958 is extended through contacts 3 of tens register relay 1912 to wire 1962 from whence it is extended to grounded conductor 1967 through contacts 11 of units register relay 1927.

The operation of relays 1934 and 1935 in series causes the transposition of the operate leads of the 25's relay and cause the proper station wire to be grounded. Contacts 1 and 2 of station-4 relay 1935 transpose the third and fourth fives lead to the first and second leads respectively to transfer the called line ten verticals lower.

A station-4 number ending in the above noted tens and units digit combinations will thus be assigned in accordance with the normal translation, will be transfered to the opposite switch pair by the operation of the stations relay 1934 and will be reassigned ten verticals lower by the operation of relay 1935, and station-4 ringing will be used. For example, a call to station 2062 will be assigned by normal translation of vertical A–333, then reassigned to vertical A–433 and finally (since it has the tens digit 3) it will be moved down ten verticals to vertical A–413 where it serves as station 4 on the four-party line whose first three stations are numbered 1077, 2077 and 2052 respectively.

The station-4 relay 1936 will be operated in series with the station-3 relay 1934 upon the dialing of the tens and units digits which extend grounded conductor 1967 to conductor 1957 extending to the battery-connected series winding of relays 1936 and 1934. If tens digit 3 or 8 is dialed, followed by the dialing of the units digit 4 or 9, conductor 1957 is extended through contacts 2 of one of the operated relays 1914 and 1919 to conductor 1963 from whence it is extended to conductor 1967 through contacts 12 of the operated one of the relays 1925 through 1930, thereby operating relays 1934 and 1936 in series.

When relay 1936 operated in series with relay 1934 from the ground on conductor 1967, as described, contacts 1 to 4 of relay 1934 transpose the operating leads of the 25's relay as hereinbefore noted and contacts 1 and 2 on relay 1936 switch the second and third five wires to the fourth and fifth leads respectively, the reason for this switching being that the station-4 numbers ending in the digits 34 to 39 and 84 and 89 are ten verticals higher than the corresponding station-3 numbers ending in the digits 44 to 49 and 94 to 99. For example, a call to station 2034 will be assigned by normal translation to vertical A-225 (1034) and reassigned to vertical A–125 (the opposite switch of the same switch pair) and finally (since it has the tens digit 3) moved up ten verticals to vertical A–145 where it serves as station 4 on the four-party line whose first three stations are numbered 1019, 2019, and 2044, respectively.

XID2. *The called number is 2025*

If, for example, the called directory number is 2025 the hundreds, tens, and units digit dialed are 0, 2, and 5. If so, the operated hundreds, tens, and units register relays are relays 1901, 1913, and 1926 as described for dialing the directory number 1025.

Since the only difference between the dialing of the number 1025 and the dialing of the number 2025 is in the thousands digit, the P, F, and U wires grounded are respectively 2, 1, and 1 extending to line-link frame A.

Since number 2025 is a station other than station 1 in a 1000-line switching block which has 2000 numbers assigned to its lines, the thousands controller grounds the number-block wire NB–2 which operates thousands register relay 1801. As hereinbefore described, relay 1937 is operated over station-2 wire ST–2 extending to the block translator 1900. Its operation causes the restoration of the thousands register relay 1801 and the operation of relay 1938.

With the dialing of the tens digit 2 followed by the dialing of the units digit 5, the station-2 relay 1933 is operated and at its contacts 2 ground station-2 wire ST–2, extending to the concerned block coupler, to cause the correct ringing frequency to be applied to the calling line.

Other than the station-2 translation difference noted above, the operation of block translator 1900 in transmitting the translated number 211 to the line-link frame A is the same as when the directory number dialed is 1025.

The line controller responds to the digit information as hereinbefore noted and the block translation 1900 thereafter clears out.

XID3. *The called number is number 2000*

If, for example, the called number is 2000, the first relay of each of the hundreds register relays, the tens register relays and the units register relays are operated and contacts thereon place ground on the corresponding primary wire, fives wire, and units wires of the respective cable groups 1950, 1968 and 1971.

Assuming that none of the station relays 1933 to 1936 operates, the translation would be the normal fixed translation A–111 as the primary wire 1, the fives wire 1 and the units wire 1 extending to line-link frame A over conductors in cable group 1983 are grounded. However, since the directory number is one assigned to station-3 on the called line the thousands controller grounds the number-block wire NB–2 to operate thousands register relay 1801. As hereinbefore noted, the locking ground from the register relay 1801 is extended over stations wire ST–2 to operate the reset relays 1937 and 1938 in succession.

Since the tens digit dialed is a 0 followed by the dialing of the units digit 0, the station-3 relay 1934 operates, as hereinbefore noted, and at its contacts 1 to 4 transpose the operate wires of the 25's relays 1939, 1940, 1941 and 1942, to transfer the translated number to the corresponding vertical of the opposite switch of the same switch pair. With the transposition of the operate wires of the first two 25's relay and the grounding of wire 1 in cable 1969, the second 25's relay 1940 operates through contacts 1 of relay 1934 instead of the first 25's relay 1939 as would operate on normal fixed translation. Therefore, instead of the primary wire P1 being grounded, contacts 1 of the second 25's relay 1940 grounds the second primary wire P2 thereby changing the translated equivalent of the dialed directory number 2025 from A–111 to A–211. As hereinbefore noted, at the same time, the ground on conductor 1953 is extended through make contacts 6 of the operated relay 1934 to cause the concerned block coupler to apply station-3 ringing frequency to the called line.

The line controller responds to the translated number and the translator thereafter clears out, as hereinbefore noted.

XID4. *The called line number is 2010*

If, for example, the called number is 2010, the station-2 wire ST–2 is grounded by the operation of relay 1801 and the station-4 relay 1935 is operated in series with station-3 relay as 1934 hereinbefore described so the tens digit 1 and the hundredths digit 0, was dialed and the first fives relay 1931 is operated.

Assuming for the moment that reset relays 1937 and 1938 did not operate, then the normal fixed translation for the hundreds, tens, and units digits 0, 1, and 0 would be A–131 as the primary wire 1, the fives wire 3, and the units wire 1 would be grounded responsive to the operation of register relays 1901, 1912, and 1921 fives relay 1931, 25's relay 1939, and 250's relay 1943.

However, since station-3 relay 1934 and station-4 relay 1935 operated as the tens and units digits dialed are 1 and 0 respectively, the ground on the fives wire from the tens register relay 1912 which would normally appear on the third fives wire is transferred to the first fives wire by contacts 1 of relay 1935. Additionally instead of the first 25's relay 1939 being operated, contacts 1 of relay 1934 cause the second 25's relay to be operated. Therefore the translated equivalent is changed from A–131 to A–211.

With the operation of relay 1935, the ground on conductor 1953 is extended to station-4 wire ST–4 extending to the register relays of the concerned block coupler, thereby causing the station-4 ringing frequency to be applied to the called line.

As hereinbefore noted, the line controller responds to the translated P, F, and U numbers and the translator 1900 thereafter clears out.

XID5. *The called number is 2039*

If, for example, the called number is 2039, normal fixed translation would cause ground to appear on the primary wire 2, the fives wire 3, and the units wire 5 thereby giving a translated equivalent number A–235. However, with the operation of the station-3 relay 1934 in series with the station-4 relay 1936 as the tens and units digits dialed are 3 and 9 respectively, the operate wires of the 25's relay are transposed and the second and third fives wires are switched, as hereinbefore described. Therefore, the normal line number translated equivalent T–235 is changed by the switching of the 25's relay operate wires to A–135 and by the switching of the fives wires, changed again to A–155 (ten verticals higher) corresponding to the translation plan of Fig. 20, part 1.

The line controller responds to the translated digit information on the wires in cable group 1983 and the 2000-number block translator 1900 is cleared out as hereinbefore noted.

XIE. *2000-number translation and numbering plan summary*

The 2000-number translation and station-numbering plan for 500 individual, 250 two-party and 250 four-party lines may be summarized as follows:

Numbers 1000 to 1999 are all individual line directory numbers or station-1 directory numbers on the two-party or four-party lines. They are assigned to primary switch verticals in accordance with normal fixed translation as described in our noted prior application, using station-1 ringing.

Numbers 2000 to 2999 include 500 station-2 numbers, 250 station-3 members and 250 station-4 members. The pattern of individual party lines distribution for the 2000-number plan among the primary verticals repeats for each 100 station numbers or 100 verticals.

The 500 numbers which end in digits 70–79, 17–33, 40–43, 66–83, 90–93 are station-2 numbers assigned to either two-party or four-party lines, the assignments being in accordance with the normal fixed translation of the noted prior application but with station-2 ringing.

The 250 numbers ending in digits 00–06, 44–55 and 94–99 are station-3 numbers assigned to four-party lines; they are assigned in accordance with a double translation plan consisting of the normal fixed translation plus an added station-3 translation scheme. The four-party lines have been assigned to verticals V20 to V25 on all primary switches selected by the operation of translator 25's relays 1939 or 1941; to verticals V1 to V6 on switches selected by 25's relay 1940; and to verticals V1 to V6 on switches selected by 25's relay 1942. These verticals correspond numerically to individual line verticals on the opposite switch of the same switch pair to which station-3 numbers would be assigned in accordance with normal translation. Since these station-3 numbers are not required for use on individual line verticals, the added station-3 translation consists simply in transposing the first and second 25's relays operating leads and the third and fourth 25's relays operating leads to cause reassignment of station-3 number to the corresponding four-party vertical on the opposite switch of the same switch pair and to apply station-3 ringing on such calls. Thus (according to the given example) a call to station 2000 is assigned by normal translation to vertical A–111, by the additional station-3 translation is assigned to vertical A-211 with station-3 ringing, thus serving as station-3 on the line whose first and second stations are numbered 1025 and 2025 respectively.

The 250 numbers which end in digits 10–16, 24–39, 60–65, and 84–89 are station-4 numbers on the four-party lines and are assigned in accordance with a triple translation plan. The first two translations are similar to those used for station-3 numbers. For example, the number is translated in accordance with normal fixed translation and is then transferred to the corresponding vertical on the opposite switch of the same switch pair by the transposition of the 25's relay operating leads, as explained above. Note, however, that station-4 numbers which end in digits 10–16 and 60–65 are ten verticals higher in every case than the corresponding station-3 numbers (which end in digits 00–06 and 50–55), while the station-4 numbers ending in digits 34–39 and 84–89 are ten verticals lower in every case than the corresponding station-3 numbers (which end in digits 44–49 and 94–99). Therefore, the additional station-4 translation consists of a switching of a fives wires. If the station-4 number has a tens digit 1 or 6, the third and fourth wires are switched over unto the first and second wires respectively; if the station-4 member has a tens digit 3 or 8, the second and third wires are switched over to the fourth and fifth wires, respectively. The station-4 number thus is assigned in accordance with normal translation, transferred to the opposite switch of the same switch pair and is reassigned ten verticals lower or higher, as required, to the corresponding four-party vertical and station-4 ringing is used. Thus (in the given example) a call to station 2010 is assigned by normal translation to vertical A–131, then reassigned to vertical A–231 (the opposite vertical of the same switch pair) and finally (since it has the tens digit 1) moved down ten verticals to verticals A-211 where it serves as station-4 on the four-party line whose first three stations are numbered 1025, 2025, and 2000 respectively. In the other station-4 example, a call to station number 2039 is assigned by normal translation to vertical A–235, then reassigned to vertical A–135 (the opposite vertical of the same switch pair) and finally (since it has a tens digit 3) moved up ten verticals to vertical A–155 where it serves as station-4 on the four-party line whose first three stations are numbers 1024, 2024, 249, respectively.

It will be noted that in order to employ a translation plan as simple as this and at the same time obtain equitable traffic distribution, it is not possible to use an assignment pattern which exactly repeats every 25 verticals on each switch. The assignment cycle disclosed herein repeats every 100 verticals or numbers. For example, compare the verticals V7 and V17 station assignment on switch pairs A1 and A2 with the corresponding station assignment on switch pairs A3 and A4 to note the difference between odd and even vertical groups. However, each pair of switches, whether it be an odd or even 50-numbers group, constitutes a self-sufficient line equipment unit, since no station translations involve reassignments outside of the same 50-vertical group. Therefore, on partially equipped line-link frames it will be preferable to equip an even number of switches (2, 4, 6, 8 or all 10) rather than an odd number of switches, to avoid splitting any switch pair.

XIF. *General operation for overriding translation*

As previously noted, block translator 1900 provides special services by substituting overriding translation for the hereinbefore described normal, modified line number and station translation.

Contacts 1 to 4 of hundreds register relays 1901 to 1910, contacts 1 of tens register relays 1911 to 1920, contacts 1 to 10 of units register relays 1921 to 1930 and contacts 1 of reset relay 1938 are provided for the noted overriding translation. These contacts, together with a pin-terminal section such as shown in our noted prior application and the overriding translation section 1990, are so interconnected as to provide directory number detection, as is necessary for the provision of special services.

Each hundreds register relay is shown to include four make contacts 1 to 4, in order that the contact set numbering on the hundreds register relays of the various translators shown in this disclosure is the same on all. In a translator for 1000 directory numbers, only one make contact on each hundreds register relay is required; for a 2000-number translator, two make contact sets are required; for a 3000-number translator, the three sets of contacts are required; and for a 4000-number translator, all four contact sets 1 to 4 are required.

Since block translator 1900 is a 2000-number translator, only contacts 1 and 2 of each hundreds register relay need be wired as follows:

The fixed springs of contacts 1 of each of the hundreds register relays are multipled together and connected to ground through break contacts 1 of relay 1938 so that responsive to the operation of a hundreds register relay, when the thousands digit dialed (thousands digit 1, for example) does not cause relay 1937 to operate, ground will appear on the moving spring of contacts 1 of the hundreds register relay operated. The fixed spring of contacts 2 of each of the hundreds register relays are multipled together and connected to the make contact 1 of relay 1938 so that when any hundreds register relay operates responsive to the dialing of a thousands digit (such as thousands digit 2) which causes the operation of relay 1937, ground appears on the moving spring of contacts 2 of the hundreds register relay operated.

Make contacts 1 of relays 1911 to 1920 and make contacts 1 to 10 of relays 1921 to 1930 are connected together in the manner shown in our noted prior application for the corresponding contacts on the corresponding register relays.

The wires connected to the moving springs of the contact sets used for overriding translation are extended to the pin-terminal section (not shown) from whence they are connected by jumpers to detector relays (not shown) in translator section 1990. These detector relays are assumed to be similar to those shown in our noted prior application.

These overriding translation contacts, when actuated, mark two wires, corresponding to the thosuands and hundreds digits dialed and the tens and units digits dialed, and when jumpered to detect any dialed four-digit number, operate the concerned detector relay.

The operation of a detector relay, removes ground from the P, F, and U wires of the translator and grounds the P, F, and U jumpers of the reset field of a pin-terminal section in the manner described in our noted prior application to cause the translated equivalent line number to be changed as desired. At the same time, the operate wires of the station relays 1933 to 1936 are opened and the station wires ST-2 to ST-4 are controlled, as desired, according to the new station location of the number detected.

The response of the line controller and the block controller involved in the overriding translation call is as hereinbefore described, and the operated relays of overriding translating section 1990 and the operated relays of translator 1900 are restored to complete the clearing out of the common control apparatus on the block-link frame.

XII. *3000-number block translator 2100 (Fig. 21)*

The block translator 2100 shown in Fig. 21, parts 1 to 5, will now be described.

Block translator 2100 is arranged to be used in lieu of the hereinbefore described block translator 1900 when there are three thousands digits assigned to any 1000-line switching block to provide 3000 directory numbers.

XIIA. *Purpose and function*

The block translator 2100 has two general purposes and functions. It provides normal line number, modified line number and station translation in addition to providing overriding translation, when required.

XIIA1. *Normal, modified line number and station translation*

It has been chosen to illustrate block translator 2100 as one serving the 1000 lines of any 1000-line switching block. These lines are divided into 500 2-party and 500 4-party lines and require 3000 different directory numbers. A preferred grouping and station-numbering plan for these directory numbers is shown in Fig. 22, parts 1 to 8, which show the 3000 directory numbers 1000 to 3999 together with the translated equivalent of each line number and the station location thereon. The main function of block translator 2100 is to effect this translation as shown in Fig. 22.

The thousands digits 1, 2, and 3 of the four-digit directory numbers shown in Fig. 22, refer respectively to the first three thousands digits assigned to any 1000-line switching block and are shown as 1, 2, and 3 rather than 4, 5, and 6 as shown in Fig. 24, for the sake of simplicity.

In the manner similar to that described for 2000-number block translator 1900, on receipt of the hundreds, tens, and units digits of a called number, block translator 2100 selects the concerned line-link frame and sends to it a translated equivalent number for directing the call to the called line and from the received number-block information it sends to the block coupler translated station information identifying the station location of the desired party on the called line.

As described for Fig. 20, Fig. 22, parts 1 to 8, refer to the line-link frames A, B, C, and D associated with the concerned 1000-line switching block. Parts 1 and 2 refer to the line-link frame A, parts 3 and 4 refer to line-link frame B, and so forth. Each of the 3000 directory numbers has an equivalent number 111 to 055 which is prefixed by its frame designation A to D.

In each part of the drawing of Fig. 22, there are five horizontal rows of numbers, each of these rows referring to the five line-link primary switches on the concerned line-link frame. In any horizontal row, the 25 numbers in the first level (associated with verticals V1 to V25) are the translated equivalent number and frame designation of the line and stations thereon assigned corresponding verticals. The second to the fifth level of numbers in any horizontal row refer respectively to the stations 1 to 4 on lines connected to the verticals of the associated primary switch.

It will be observed that the numbers 1000 to 1999 are station-1 numbers on all the two-party or four-party lines. They are assigned to primary switch verticals in accordance with normal fixed translation as described in our noted prior application using station-1 ringing. Numbers 2000 to 2999 are station-2 numbers on all two-party and four-party lines. These numbers, also, are assigned to primary switch verticals in accordance with the noted normal fixed translation, however, using station-2 ringing. The translation for the directory numbers 1000 to 1999 and 2000 to 2999 will be termed normal line number translation and normal line number and station-2 translation, respectively.

Numbers 3000 to 3999 serve as directory numbers for the station-3 and the station-4 numbers on the four-party lines. Accordingly, there are 250 station-3 numbers and 250 station-4 numbers.

The pattern of party line distribution among the primary verticals (V1 to V25) repeats for every 50 stations numbers or every fifty verticals. The numbers ending in digits 13–37 and 63–87 are station-3 and are assigned in accordance with the standard translation plan used for the above noted first 2000 numbers but with station-3 ringing. The remaining 500 station-4 numbers (those ending in digits 00–12, 38–62 and 88–99) are assigned in accordance with a double-translation plan hereinafter described. The four-party lines have been assigned to verticals V1 to V13 on all even-numbered primary switches and to verticals V14 to V25 on all odd-numbered switches. Thus the four-party verticals on switches 1 and 2 have the same fives and units designation on their respective switches as do the two-party verticals on switches 2 and 1, respectively. This translation noted above will hereinafter be termed modified line number and station-4 translation.

XIIA2. *Overriding translation*

The second purpose and function of the block translator 2100 is to direct the performance of standard services as described in our noted prior application. The overriding translation apparatus is shown in Fig. 21, part 1, as rectangle 2190. This overriding translation is similar to the overriding translation disclosed in our noted prior application and only a general description will be given herein.

XIIB. *Functional relay groups*

The relays of block translator 2100 comprise separate functional groups as follows:

1. Overriding translation section 2190 together with contacts on the hundreds, tens, and units register relays and the contacts on the station reset relays comprise the overriding translation portion of translator 2100.
2. Register relays 2101 through 2110 comprise the hundreds register group. One or another of the relays 2101 to 2110 operate, depending upon the hundreds digit dialed.
3. Register relays 2111 to 2120 comprise the tens group. One or another of these tens relays 2111 to 2120 operate depending on the tens digit dialed.
4. Register relays 2121 to 2130 comprise the units group. One or another of the units relays 2121 to 2130 operate, depending upon the units digit dialed.
5. Translating relays 2131 and 2132 comprise the fives group. They correspond respectively to the first five lines in a group of ten and to the last five lines therein, respectively.
6. Translating relays 2133 to 2135 comprise the stations group. Relay 2133 corresponds to the second station on the called line, relay 2134 corresponds to the third station on the called line, and relay 2135 corresponds to the fourth station on the called line.
7. Translating relays 2137 and 2138 comprise the station-2 reset group and relays 2147 and 2148 comprise the station-3 reset group. The relays of each pair operate, when required, to restore the operated thousands register relay of the block coupler and to reset it according to the translated number-block information.
8. Translator relays 2139 through 2142 comprise the 25's group. They correspond respectively to the 25-line groups in any hundred group, as noted for the corresponding translator relays of the 2000-number translator. They are controlled by the tens and register relays, station relay 2135, and by fives relay 2131 when one of the tens register relays 2121 to 2125 is operated, and by fives relay 2132 when one of the tens register relays 2126 to 2130 is operated.
9. Translating relays 2143 to 2146 are the 250's relays and they correspond to the line-link frames A to D, as noted for the 2000-number translator. These relays are controlled by the hundreds register relays assisted by the 25's relays.

XIIC. *Operation for normal line number translation*

In block translator 2100, as noted for block translator 1900, the register relays 2101 to 2130 are associated with the corresponding digit wires incoming from the block couplers 1800. The station-2 reset relays 2137 and 2138 together with the station-3 reset relays 2137 and 2138 are associated with the station wires ST–2 and ST–3, respectively. Any one of the above noted relays accordingly stands ready to be operated by a marking ground potential on its connected hundreds, tens, units, or stations wires. Locking ground wire LG extending to the winding of the operated register relays is normally grounded, as hereinbefore noted. This ground in translator 2100 originates at contacts 5 of relay 2138 or contacts 3 of relay 2137 and is removed, when required, to restore the operated register relay preparatory to resetting it according to the called station location.

XIIC1. *Setting up the dialed number in the translator*

As hereinbefore described with reference to block translator 1900, the hundreds, tens and units digit information together with the number-block information stored in any block coupler 1800 is transmitted to block translator 2100 when chain relay 1812 of the block coupler in use is operated. With the transmission of this information to the block translator, the corresponding ones of the register relays 2101 through 2130 are operated; relay 2137 operates if ground appears on station wire ST–2, and if ground appears on station wire ST–3, station-3 relay 2141 operates.

XIIC2. *Preliminary translation*

The tens wires in each of the three sets of digit wires H, T, and U, extending between block coupler 1800 and block translator 2100 are so arranged as to provide the hereinbefore described preliminary translation so that the digit 0 wire extends to the associated first register relay of each of the digit-register relay groups.

XIIC3. *Operation of the translator relays*

Five sets of translator relays are employed to assist the digit register relays 2101 to 2130 in setting up the translated equivalent of the hundreds, tens, and units digits of the line number registered and in setting up the translated station number of the registered directory number. These sets of translator relays are:

1. The two fives-relays 2131 and 2132;
2. The four 25's relays 2139 to 2142;
3. The four 250's relays 2143 to 2146;
4. The three stations relays 2133 to 2135; and
5. The four reset relays 2137 and 2138, and 2147 and 2148.

XIIC3*a*. *Five's translator relays*

The two five's translator relays 2131 and 2132 and controlled by the units register relays 2121 to 2130. These relays may be delayed in their operation by control exercised over their operate wires by reset relays 2137, 2138, 2147, and 2148 to prevent the calling in of the control apparatus on the line-link frame before the special translation hereinafter described is brought into effect. If the units digit has any value from 0 to 4, the first five's relay 2131 is operated and if the units digit has any value from 5 to 9, the second five's relay 2132 is operated.

XIIC3*b*. *25's translator relays*

The four 25's relays 2139 through 2142 perform their function as described for the corresponding relays of block translator 1900. These 25's relays are controlled by the tens register relays jointly with the 5's translator relays and the station–4 relay 2135, as will be described in detail hereinafter.

XIIC3*c*. *250's translator relays*

The translator relays 2143 through 2146 correspond respectively to the four 250-line groups into which the numbers within the 1000-line switching block are divided as shown in parts 1 to 8 of Fig. 22. In block translator 2100, the control exercised over the 250's translator relays by the hundreds register relays is the same as described for the corresponding relays of block translator 1900.

XIIC4. *Translated line numbers*

As pointed out before, each directory number (in this disclosure 1000 to 3999) has an equivalent number 111 to 005. The same 250 translated numbers appear in the same order for any one of the four line-link frames. As previously described, the block translator secures the effect of prefixing the line-link frame designation A to D to each of the 250 translated equivalent line numbers 111 to 055.

The translated primary, fives, and units digits are represented respectively by ground on the associated wires P, F, and U extending to any one of the four line-link frames A to D of the concerned 1000-line switching block. The primary wire is grounded at contacts 5 of the operated hundreds register relay and is controlled by the contacts of the 25's relay; the five's wire is grounded at contacts 3 of the operated one of the tens register relays and is controlled by the contacts on the operated one of the five's relays; and the units wires is grounded at contacts 13 of the concerned units relay and is further controlled by contacts on the 250's relays, all as described in our noted prior application for the corresponding relays.

XIIC5. *The called number is 1025*

If, for example, the number called is 1025, the hundreds, tens, and units register relays operated are relays 2101, 2113, and 2126, these relays corresponding to the associated relays 1901, 1913, and 1926 respectively of block translator 1900. Also, the first 250's relay 2143 is operated from ground at contacts 7 of relay 2101, and the second 25's relay 2140 is operated through contacts 6 of the tens register relay 2113 from ground at break contacts 5 of reset relay 2148.

XIIC5*a*. *Translated P, F, and U digits for frame A*

The second primary wire PA–2, the first five's wire FA–1 and the first units wire UA–1 in group 2183 extending to line-link frame A is grounded in the manner described for the grounding of the corresponding wires in block translator 1900 responsive to the dialing of the number 1025 therein.

Therefore, the assumed registration of the number 1025 in the block translator 2100 results in the transmission of translated number A–211 to line-link frame A. Since the thousands digit dialed is assumed to be a 1 and since neither one of the station wires ST–2 to ST–4 was grounded, the call is directed to the first station on the called line. This corresponds with Fig. 22, part 1 as the translated number of directory number 1025 as A–211.

The line controller responds to the translated primary, five's and unit's digits to direct the call to the called line and when the operations necessary to extend the connection to called line have been completed, the common control apparatus on the block-link frame clears out, restoring all of the operated relays in block translator 2100.

XIID. *Operation for modified line number and station translation*

As hereinbefore noted, the setting up of the dialed number in the translator and the preliminary translation hereinbefore described for normal line number translation is the same for modified line number and station translation.

XIID1. *Operation of the modified line number and station translating relays*

The operation of the stations relays 2133 to 2135 and the operation of the reset relays 2137 and 2138 and 2147 and 2148 will now be described.

XIID1*a*. *Stations translator relays*

The two station translator relays 2134 and 2135 are controlled by contacts on the tens register and units register relays 2111 to 2130, from ground originating at make contacts 2 of reset relay 2148. The operation of station relay 2133 is controlled by contacts 1 and 2 on station reset relays 2137 and 2138, respectively.

Relay 2133 is the station-2 relay and operates only if the directory number dialed is assigned to the second station on the called line. Its operation will affect the normal line number and station-2 translation hereinbefore noted, by not altering the P, F, and U wire, but by extending the normally-grounded conductor 2153 to the station-2 wires ST–2.

Relay 2134 is a station-3 relay and operates if the directory number dialed is assigned to the third station on the called line. Its operation will affect the normal line number and station-3 translation hereinbefore noted, by not altering the P, F, and wires but by extending the normally-grounded conductor 1953 to the station-3 wire ST–3.

Relay 2135 is a station-4 and operates if the directory number dialed is assigned to the fourth station on the called line. Its operation will affect the hereinbefore noted modified line number and station-4 translation as its contacts 1 to 4 change the translated line number determined by the tens register relays, and its contacts 6 control the energization of the station-4 wire ST–4.

XIID1*b*. *Station reset translating relays*

Since this is a 3000-number translator, 3 thousands digits have been assigned to the directory numbers of the lines and stations in this 1000-line switching block. If the directory number has a thousands digit that is assigned station 1 on the called line, none of the number-block wires NB–2 to NB–4 will be energized. However, if the directory number of the called line corresponds to station 2 on the called line, number-block wire NB–2 will be energized at the time that the concerned block coupler is taken for use, and if the thousands digits dialed is a portion of the directory number corresponding to the third or the fourth station on the called line, the number-block wire NB–3 will be energized, thereby energizing the corresponding one of the thousands register relays in block coupler 1800.

For the purpose of illustration, assume that the directory number dialed is one corresponding to the second station on any called line. Number-block wire NB–2 accordingly has been energized to operate the associated thousands register relay 1801 and it extends its locking ground to wire ST–2. When block translator 2100 is taken for use by the hereinbefore described seizure of the chain, contacts on the chain relay will extend the ground on station wire ST–2 through break contacts 4 of relay 2138 to the battery-connected winding of relay 2137.

Relay 2137 operates and at its contacts 1 operate relay 2138 which locks through its contacts 3 to wire 2152 which is grounded through contacts 6 of any operated hundreds register relay. At its break contacts 4, relay 2138 open-circuits the lower winding of relay 2137 and at its contacts 6 removes the ground from the locking ground conductor LG and connects the upper winding of relay 2137 in series with the winding of the operated register relay. This circuit is from the ground-connected high-resistance winding of relay 2137, through make contacts 3 of relay 2137, wire LG, contacts on the operated chain relay, and through the make contacts 1 of the operated register relay 1801 to its battery-connected winding.

As hereinbefore described with reference to block translator 1900, the resistance of the upper winding of the reset relays (2137 and 2147) is such that the current flow through the series circuit of the two noted relays is so limited that the operated thousands register relay restores and open-circuits relay 2137 which restores and replaces at its break contacts 4, ground on locking conductor LG.

With the operation of relay 2137, the ground on normally-grounded conductor 7 of group 2169 is removed at contacts 3 of relay 2137, thereby delaying the operation of the concerned fives relay and the concerned 25's relay until the selected one of the stations relays 2133 to 2135 is operated. As noted hereinbefore, this delay in the grounding of conductor 7 is introduced so that the F and U wires extending to the associated line-link frame are not energized until the hereinbefore noted alterations of the translated line number equivalents is effected, these alterations being determined by the dialing of the directory number assigned as the third or fourth station on the called line.

With relay 2137 restored and relay 2138 operated, ground on conductor 4 of cable group 2156 is extended through normally closed contacts (not shown) of the overriding translation section 2190 to wire 1 extending to the battery-connected winding of stations relay 2133.

At the same time, ground on conductor 2153 is extended through break contacts 5 of relay 2137 and through make contacts 7 of relay 2138 to the make-break contacts of relay 2133.

Relay 2133 operates from the ground on conductor 4 of cable 2156 and at its contacts 1 extends the ground from conductor 2153 to station-2 wire ST–2 extending to the operate winding of the thousands register relay 1801 of block coupler 1800. As hereinbefore noted, relay 1801 operates and connects the interrupter generator lead INT–GEN–2 to wire 1850 to cause station 2 on the called line to be signalled.

When the station-3 wire ST–4 is grounded upon the call-in of the common control equipment, relay 2147 operates from ground on wire ST–3 through contacts 4 of relay 2148. Its contacts 1 operate relay 2148 which locks to wire 2152. Contacts 5 of relay 2148 remove the ground from conductor LG and the ground-connected winding of relay 2147 is energized in series with the battery-connected winding of relay 1803 over wire LG and make contacts 3 of relay 2147. Relay 1803 restores from the reduced current flow through its winding and consequently restores relay 2147.

With relay 2148 operated, and relay 2147 restored, ground is placed on wire 2167 which is extended to the battery-connected windings of relays 2134 or 2135 depending on the tens and units digits dialed. The ground on wire 2153 is extended through contacts on relays 2137, 2138, 2147, 2148, 2133, and relays 2134 and 2135 to station wires ST–3 or ST–4 depending on the digit dialed.

When relay 2134 operates, the normally-grounded wire 1953 is extended through break contacts of the unoperated first station relay 2133, and through break contacst 6 of relay 2135 and make contacts 2 of relay 2134 to the station-3 wire ST–3. The ground on station wires ST–3 is extended to the winding of the second thousands register relay 1802 which operates and locks to the grounded conductor LG.

When relay 2135 operates, the ground on wire 1953 is extended to the station-4 wire ST–4 through make contacts 6 of relay 2135 and the break contacts of relay 2133. The corresponding register relay 1803 operates and locks to grounded conductor LG, and as hereinbefore noted, connects the proper ringing frequency to wire 1850 extending to the ring cut-off relay in preparation to signal the called station on the called line.

XIID1*c. Normal line number and station-2 translation*

As noted, station relay 2133 operates only if the station-2 wire is energized, as the operating circuits for relay 2133 is controlled by contacts on the reset relays 2137 and 2138. With relay 2138 operated and relay 2137 restored, conductor 4 of cable group 2156 is grounded and this ground is extended through normally closed contacts (not shown) on relays in the overriding translation section 2190 to conductor 1 of cable group 2156 extending to the battery-connected winding of relay 2133.

Relay 2133 operates and at its contacts control the grounding of station-2 wire ST–2 as hereinbefore noted. Since the dialing of the directory number assigned the second station on the called line does not affect the translated equivalent number, the operation of relay 1933 effects the hereinbefore noted normal line number and station-2 translation.

XIID1*d. Normal line number and station-3 translation*

Relay 2134 operates when the directory number of the third thousands group dialed ends in the digits 13–37 or 63 to 87. If the tens digit dialed is a 1 or a 6, followed by the dialing of a units digit 3 to 9, the battery-connected winding of relay 2134 extending to conductor 2158 from the overriding translation section 2190, is extended through make contacts 12 of one of the operated units register relays 2124 to 2130 from whence it is extended to grounded wire 2167 through make contacts 2 of one of the operated tens register relays 2112 or 2117; and if the tens digit 3 or 8 is dialed, followed by the dialing of any units digits 0, or 1 to 7, conductor 2158 is extended through make contacts 11 of one of the operated units register relays 2121 through 2128 to wire 2161 from whence it is extended to wire 2167 through make contacts 2 of one of the operated tens register relays 2114 or 2119.

On the dialing of any one of the above noted digit combinations, relays 2134 operates from the ground at make contacts 2 of relay 2138 and at its contacts 1, extends ground over conductor 7 of cable 2169, to conductor 2170 to supply an operating ground for the 25's relays and one of the five's relays 2131 and 2132. Its contacts 2 control the grounding of station-3 wire ST–3 as hereinbefore noted. Since the dialing of the directory number assigned the second station on the called line does not affect the translated equivalent line number but grounds station-3 wire ST–3, the operation of relay 1934 effects the hereinbefore noted normal line number and station-3 translation.

XIID1*e. Modified line number and station-4 translation*

Relay 2135 operates when the directory number dialed ends in the digits 00 to 12, 38 to 62, or 88 to 99. If the tens digit dialed is a 0, 4, 5 or a 9, followed by the dialing of any units digit 0, 1, to 9, the battery-connected winding of relay 2135 is connected to grounded wire 2167 over conductor 2157 extending from the overriding translating section 2190 and through contacts 2 of one of the operated tens relays; if the tens digit dialed is a 1 or a 6 followed by the dialing of a units digit 0, 1 or 2, wire 2157 is connected to grounded wire 2167 through contacts 2 of the operated one of the tens register relays and through contacts 12 of the operated one of the units relays; and if the tens digit dialed is a 3 or an 8, followed by the dialing of a units digit 8 or 9, wire 2157 is connected to wire 2167 through contacts 2 and 12 respectively of the operated ones of the tens and units register relays.

On the dialing of any one of the above noted digit combinations, relay 2135 operates. Contacts 1 and 2 of relay 2135 transpose the operating leads (2174 and 2175) of the first two 25's relays 2139 and 2140 while its contacts 3 and 4 transpose the operating leads (2176 and 2177) of the last two 25's relays 2141 and 2142. As hereinbefore noted, contacts 6 cause the station-4 wire ST–4 to be energized to cause the station 4 on the called line to be signalled.

The reason for the transpositions of the operate leads of the 25's relays is that the station-4 numbers of the 4-party lines have been assigned (see Fig. 22) to verticals V1 to V13 on all even-numbered primary switches and to verticals V14 to V25 on all odd-numbered switches. This transposition causes the reassignment of the station-4 numbers to the corresponding verticals on the other switch of the associated switch pair, where they serve station 4. This is effected by causing the normal primary lead P ground to be transferred to the other primary lead P of whichever pair of primary leads P is involved in the call.

For example, on a call to station 3041 (a station-4 number), ground which would, with normal translation, appear on the PA–2 lead will appear on the PA–1 lead causing station 3041 to be assigned as station 4 on vertical A–142, whose other station numbers are 1016, 2016, and 3016, corresponding to stations 1, 2, and 3, respectively.

This translation effected by transposing the operating leads of the 25's relay and by controlling the station-4 wire ST–4 is termed modified line-number and station-4 translation.

XIIID2. *The called number is 2025*

If, for example, the thousands, hundreds, tens, and units digits of the directory number dialed are 2025, the operated hundreds, tens, and units register relays are relays 2101, 2113, and 2126, as described for the dialing of the number 1025.

Since the only difference between the dialing of the number 1025 and the dialing of the number 2025 is in the thousands digits, the P, F, and U wires grounded are respectively 2, 1, and 1, extending to line-link frame A.

Since number 2025 is a directory number comprising a second thousands digit assigned the 1000-line switching block, the thousands controller grounds number-block wire NB–2 as hereinbefore described to operate thousands register relay 1801. As hereinbefore described, relay 2137 is operated over station-2 wire ST–2 extending to the block translator. Its operation causes the restoration of the thousands register relay 1801 and the operation of relay 2138.

With the operation of relay 2138 and the consequent restoration of relay 2137, the station-2 relay 2133 is operated from ground at make contacts 2 of relay 2138 as hereinbefore noted. Contacts 1 on station-2 relay 2133 ground conductor 7 of cable group 2169 to provide an operate ground for the five's and the 250's relays; contacts 2 ground the station-2 wire ST–2 extending to the concerned block coupler, to reoperate thousands register relay 1801 to cause the correct ringing frequency to be applied to the calling line.

Other than the station-2 translation difference noted above, the operation of block translator 2100 in transmitting the translated number 211 to the line-link frame A is the same as when the directory number dialed is 1025.

The line controller responds to the digit information as hereinbefore described and block translator 2100 thereafter clears out.

XIIID3. *The called number is number 3025*

If, for example, the thousands, hundreds, tens and units digits dialed are 3025, register relays 2101, 2113, and 2126 are operated as hereinbefore described for dialing the directory number 1025 as the hundreds, tens, and units digits dialed are the same.

Again, since the difference between the dialing of the numbers 1025, 2025, and 3025 is in the thousands digits, the P, F, and U wires grounded are respectively 2, 1, and 1, extending to line-link frame A.

Since number 3025 is a directory number determined by the assignment of a third thousands digit to the same 1000 lines, the thousands controller grounds number block wire NB–3 as hereinbefore described to operate the thousands register relay 1802 in the concerned block coupler. Relay 2147 operates from ground on station-3 wire ST–3 and causes the operation of relay 2148 and the restoration of relay 1802.

With the operation of relay 2148 and the consequent restoration of relay 2147, the station-3 relay 2134 is operated from the ground on conductor 2167 through contacts of the tens and units relays as hereinbefore noted. Contacts 1 ground conductor 7 of cable group 2169 to provide an operate ground for the five's and 250's relays. Contacts 2 of relay 2134 extends the ground on conductor 2153 to station wires ST–3 to reoperate the thousands register relay 1802 to cause the correct ringing frequency to be applied to the calling line to signal the third station thereon.

Other than the station-3 translation difference noted above, the operation of block translation 2100 in transmitting the translated number 211 to line-link frame A is the same as when the directory number dialed is 1025 or 2025.

The line controller responds to the digit information as hereinbefore noted and the block translator 2100 thereafter clears out, restoring the common equipment.

XIIID4. *The called number is number 3000*

If, for example, the thousands, hundreds, tens, and units digits dialed are 3000, the first relay of each of the hundreds, the tens, and units register relays are operated and contacts thereon place ground on the corresponding primary wire, fives wire, and units wire of the respective cable groups 2150, 2168, and 2171.

Since the tens digit dialed is a 0, followed by the dialing of a 0, grounded conductor 2167 is extended to conductor 2157 and thence through contact sets on the register relays 2111 and 2121 to the battery-connected winding of the station-4 relay 2135. Contacts 1 to 4 of relay 2135 transpose the operate wires of the 25's relays to transfer the translated number of the corresponding vertical of the opposite switch of the same switch pair. With the transposition of the operate wires of the first two 25's relay and the grounding of wire 1 in cable 2169, the second 25's relay 2140 operates through contacts 1 of relay 2135 instead of the first 25's relay 2139 as would operate on normal line number translation. Therefore, instead of the primary wire P1 being grounded, contacts 1 of the second 25's relay 2140 grounds the second primary wire P2 thereby changing the translated equivalent of the dialed directory number 3000 from A–111 to A–211. At the same time, the ground on conductor 2153 is extended through make contacts 6 of relay 2135 to cause the concerned block coupler to apply station ringing frequency to the called line.

The line controller responds to the translated digit information on the wires in cable group 2183 and the 3000–number block translater 2100 is cleared out.

XIIE. *3000-number translation and numbering plan summary*

The 3000-number translation and station-numbering plan for 500 2-party and 500 4-party lines may be summarized as follows:

Numbers 1000 to 1999 are all station-1 numbers on the 2-party and the 4-party lines. They are assigned to primary switch verticals in accordance with normal fixed translation as described in our noted prior application, using station-1 ringing.

Numbers 2000 to 2999 are all station-2 directory numbers on the 2-party and the 4-party lines. They are assigned to primary switch verticals in accordance with the normal fixed translation above noted, however using station-2 ringing.

Numbers 3000 to 3999 include station-3 numbers and 500 station-4 numbers. The numbers ending in digits 13–37 and 63–87 are station-3 numbers and are assigned in accordance with the standard translation plan used for the first 2000 numbers but with station-3 ringing. The remaining 500 3000-series numbers (those ending in digits 00–12, 38–62 and 88–99 are station-4 numbers) are translated in accordance with the standard translation plan noted above but only as a preliminary to an additional station-4 translation function. The 4-party lines have been assigned to verticals V1 to V13 on all even-numbered primary switches and to verticals V14 to V25 on all odd-numbered switches. For example, the 4-party verticals on switches 1 and 2 has the same fives and units designation on their respective switches as do the 2-party verticals on switches 2 and 1, respectively. The 500 3000-series station-4 numbers correspond, after normal fixed translation but prior to the additional station-4 translation scheme, to the 1000 and 2000 series numbers assigned to the 2-party lines, or verticals. Therefore, these station-4 numbers are, by an additional process of translation, transferred to the corresponding vertical on the other switch of the associated switch pair where they serve as station 4.

This station-4 translation is effected very simply. On a call to any one of the 500 station-4 numbers, station-4 ringing is used. In addition, the operating wires of the first and second 25's relays are transposed as well as the operating wires of the third and fourth 25's relays. This caused the normal primary lead P ground to be transferred to the other P lead of whichever pair of primary leads is involved in the call. Thus (according to the given example), a call to station 3000 will be assigned by normal translation to vertical A–111, and by the additional station-4 translation will be reassigned to vertical A–211 with station-4 ringing, thus serving as station 4 on a line whose first, second and third stations are numbered 1025, 2025, and 3025, respectively.

It will be noted that all station-4 translations are made in such a manner as to cause assignment to the opposite switch of the same switch pair. Thus one pair of line-link primary switches (50 lines) constitute the practical working unit of line equipment on the 3000 number block. Therefore, on partially equipped blocks and partially equipped line-link frames, line equipments should not be specified in smaller than fifty-line groups or switch pairs.

XIIF. *General operation for overriding translation*

As hereinbefore described with reference to block translator 1900, contacts are provided on the hundreds, tens, and units register relays and on the reset relays for interconnection with a pin-terminal section and an overriding translating section such as 2190, to provide special services by substituting overriding translation in lieu of the hereinbefore described normal, modified line number and station translation.

In the 3000-number translator 2100, contacts 1 to 3 of each hundreds register relay is wired as follows:

The fixed springs of contacts 1 are multipled together and connected to the break contacts 1 of relay 2138; the fixed springs of contacts 2 are multipled together and connected to make contacts 1 of relay 2138; and the fixed springs of contacts 5 are multipled together and connected to the make contacts 1 of relay 2148. The overriding translation arrangement is such that responsive to the dialing of any one of a three thousands digits (1 to 3) assigned the switching block using block translator 2300, a separate thousands-hundreds wire extending to the overriding translating section 2190 is grounded and responsive to the dialing of a tens and a units digit, a separate tens-units wire is grounded. These two ground-marked wires provide overriding translation in the manner similar to that described for the overriding translation performed by block translator 1900.

The overriding translating section 2190 includes detector relays (not shown) operable responsive to the grounding of a thousands-hundreds wire and a tens-units wire which may be connected to its windings by jumpers on a pin-terminal section (not shown) in a manner described in our noted prior application.

The operation of any such detector relay removes ground from the translator P, F, and U wires and grounds the P, F, and U wires associated with the overriding translating section and assumes control over the station wires ST–2 to ST–4, to cause the translated directory number to be changed, as desired, to provide the noted special services.

XIII. 4000-NUMBER BLOCK TRANSLATOR 2300 (FIG. 23)

Referring now to Fig. 23, the 4000-number block translator 2300 is shown only as a dotted rectangle and only the portion showing the station and reset relays are illustrated. This translator may be used with any one of the disclosed 1000-line switching blocks in place of the 2000-number or 3000-number block translators when there are 4000 directory numbers assignable to 1000 lines of the concerned block.

The hundreds, tens, and units register relays of the 4000-number block translator 2300, together with the fives relays, the 25's relays, and the 250's relay therein are assumed to be as shown in the 2000-number block translator 1900, but with the contacts on the tens and units register relays for controlling the stations relays being omitted.

The grouping and numbering plan of the 1000 lines having 4000 directory numbers assigned thereto is not shown in this application, as the first 1000 numbers are assigned to station 1 in regular order, the second 2000 numbers to station 2, the third stations are assigned the 3000 series of numbers, and the fourth station on the 4-party lines are assigned the last 1000 numbers of the assigned 4000 numbers.

Therefore, since the thousands digit dialed determines the station location, the 4000 numbers are assigned according to the normal fixed translation of our noted prior application and the P, F, and U wires are unchanged regardless of the thousands digit dialed.

XIIIA. *Detailed operation*

The operation of the 4000-number block translator 2300 for normal line-number translation, for setting up the dialed number in the translator, and for controlling the operation of the translator relays, with the exception of the station relays and the reset relays, is assumed to be similar to the corresponding functions of the hereinbefore described translators.

XIIIA1. *Operation for station translation*

The operation of the station relays 2333 to 2335 and the operation of the reset relay pairs 2336 to 2341 will now be described.

Station-4 translator relay 2333 is controlled by the pair of station-4 reset relays 2336 and 2337 subject to other control by the overriding translation section 2390; station-3 relay 2334 is controlled by the station-3 reset relays 2338 and 2339 subject to control exercised thereover by overriding translation section 2390; and station-2 relay 2335 is controlled by station-2 reset relays 2340 and 2341 subject to overriding translation control by translating section 2390.

As hereinbefore described with reference to the grounding of a number-block wire NB–2 to NB–4, if the directory number is one created by the assignment of additional digits to a 1000-line switching block, one of the corresponding station-wires ST–2 to ST–4 will be grounded when the common control apparatus is taken for use.

XIIIA1*a*. *Station-1 translation*

Since there are 4000 numbers assigned block translator 2300 and since all lines are 4-party lines, if the directory number dialed is one of the first thousands numbers assigned this translator, none of the station wires ST–2 to ST–4 will be energized and the normal P, F, and U translation will direct the call to the called line with station-1 ringing.

XIIIA1*b*. *Station-2 translation*

If the directory number dialed is one of the second 1000 numbers assigned a block-link frame using block-translator 2300, the thousands-link frame causes number-block wire NB-2 to be grounded. Upon the taking of the common control apparatus on the block-link for use, station wire ST-2 consequently is grounded, and this ground is extended through break contacts 4 of station-2 reset relay 2337 to the battery-connected winding of relay 2336.

Relay 2336 operates, and at its contacts 2 operates relay 2337 which locks through its contacts 3 to locking ground wire 2352, which corresponds to wire 1952 of block translator 1900. At its break contacts 4, relay 2337 open-circuits the lower winding of relay 2336 and at its contacts 5 removes the ground from the locking ground conductor LG, thereby causing the high-resistance ground-connected winding of relay 2336 to be energized in series with the winding of the operated thousands register relay (1801) through make contacts 3 of stations relay 2336, break contacts 3 on relays 2338 and 2340, wire LG, contacts on the operated chain relay, and through the make contacts 1 of the operated register relay 1801 to its battery-connected winding.

As hereinbefore described for corresponding relays of translators 1900 and 2100, the resistance of the upper winding of relay 2336 is such that the current flow through the series circuit of the two noted relays is so limited that the operated thousands register relay restores. Responsive to its restoration, make contacts 1 on the concerned register relay open-circuits the winding of station-2 relay 2336. Relay 2336 restores and replaces ground on locking conductor LG.

With relay 2336 restored and relay 2337 operated, ground on contacts 2 of relay 2337 is extended through break contacts 1 of relay 2336 to wire 2359 extending to the battery-connected winding of station-2 relay 2335 through normally-closed contacts (not shown) of the overriding translation section 2390.

Relay 2335 operates and at its contacts ground stations wire ST-2, thereby reoperating the restored thousands register relay (which locks to grounded wire LG) to cause the block coupler to connect the proper interrupter generator lead (INT-GEN-2) to wire 1850 to cause station-2 on the called line to be signalled.

After the operations in extending a connection to the called line have been completed, the common control apparatus on the block-link frame is cleared out, thereby restoring all operated relays. Ground is thereby removed from wire 2352 restoring relay 2337 which in turn restores relay 2335.

XIIIA1*c*. *Station-3 translation*

If the directory number dialed is one in the third 1000 numbers assigned to the same switching block, the control apparatus on the thousands-link frame grounds number-block wire NB-3, thereby operating the thousands register relay 1802 of the seized block coupler 1800. When the block coupler seizes the common control apparatus for its exclusive use, the locking ground on the winding of the thousands register relay 1802 is extended to the winding of the station-3 reset relay 2338, through break contacts 4 of relay 2339, and station wires ST-3.

Relay 2338 operates, and as hereinbefore described for the operation of the station-2 relays 2336 and 2337, operates relay 2339, restores the operated thousands register relay in the block coupler, and then it restores.

With relay 2338 restored and relay 2339 operated, ground at make contacts 2 of relay 2339 is extended to wire 2358 through break contacts 1 of unoperated relay 2338. This ground is further extended through the normally-closed contacts of the control relays (not shown) of block translator section 2390 to the battery-connected winding of station-2 relay 2334.

Relay 2334 operates and at its contacts ground station-3 wire ST-3 to reoperate the thousands register relay 1802 to cause the block translator to signal the third station on the called line.

After the operations have been completed in extending the call to the called line, the common control apparatus is cleared out and all operated relays are restored.

XIIIA1*d*. *Station-4 translation*

If the directory number dialed is one in the fourth 1000 numbers assigned to this 1000-line switching block, number block wire NB-4 is grounded to operate thousands register relays 1803 in block coupler 1800.

When the common control apparatus is taken for use by the concerned block coupler, ground is extended to the battery-connected winding of the station-4 reset relay 2340 through break contacts 4 of relay 2341, over station-4 wire ST-4.

Relay 2340 operates and operates relay 2341; it causes the thousands register relay in the block coupler to be restored and then it restores, in the manner hereinbefore noted for relays 2336 and 2337.

With relay 2341 operated and relay 2340 restored, ground at make contacts 2 of relay 2341 is extended to wire 2367 through break contacts 1 of relay 2340 from whence it is extended to battery-connected winding of relay 2333 through the overriding translation section 2390.

Relay 2333 operates, and at its contacts ground the station-4 wire ST-4 to effect the operation of the thousands register relay 1803 to cause the block coupler to signal the fourth station on the called line. Thereafter, the common controller apparatus of the block-link frame is cleared out and all operated relays are restored.

XIIIB. *General operation for overriding translation*

The 400-number block translator 2300 is arranged to provide overriding translation to provide the special services hereinbefore noted.

The detection of a dialed four-digit number is similar to that described with reference to the 2000-number block translator 1900, as the contacts on the second relay of each of the station reset relay pairs are connected to the contacts on the hundreds register relay over wire 2380 to 2383 in such a manner that any one of the 4000 4-digit numbers dialed marks two wires to operate a predetermined detect relay.

These detector relays (not shown in this application) have contacts thereon to control the operation of the station relays 2333 to 2335 so that responsive to the restoration of concerned operated thousands register relay, one of the station relays 2333 to 2335 is reoperated to cause the concerned one of station wires ST-2 to ST-4 to be grounded according to the special overriding translation desired.

XIV. PARTY-LINE TRUNKING PLAN (FIG. 24)

Referring now to Fig. 24, party-line trunking plan 2400, for a typical 4000 line, 10,000 directory number exchange is shown. This exchange is shown to include four 1000-line switching blocks 2411, 2412, 2414, and 2417, each using a different translator.

In the typical arrangement disclosed in Fig. 24, the initial digit dialed is the digit 6 followed by one or more thousands digits. It will be noted that the 1000-line switching block 2411 has the thousands digit 1 assigned thereto to provide 1000 directory numbers for its 1000 lines to provide 1000 single party lines; 1000-line switching block 2412, using the 2000 number translator 1900 has thousands digits 2 and 3 assigned thereto to provide 2000 directory numbers for its 1000 lines to provide 500 single-party lines, 250 2-party lines, and 250 4-party lines; the 1000-line switching block 2414, using the 3000-number translator 2100, has thousands digits 4, 5, and 6 assigned thereto to provide 3000 directory numbers for its 1000 lines to provide 500 2-party lines and 500 4-party lines; and the 1000-line switching block 2417, using the 4000-number translator 2300, has thousands digits 7, 8, 9, and 0 assigned thereto to provide 4000 directory numbers for its 1000 lines to provide 1000 4-party lines.

Each of the 1000-line switching blocks shown in Fig.

24 is connected to an associated thousands link frame over thousands trunks in cable groups 2401, 2402, 2404, and 2407, and originating trunks in cable groups 2421, 2422, 2423, and 2424.

Responsive to the dialing of the initial digit 6 followed by the dialing of the thousands digit 1, the call, under control of the 1000-number translator disclosed in our noted prior application, is extended to the first station on any of the lines assigned the directory numbers 61000 to 61999.

Responsive to the dialing of the initial digit 6 followed by the dialing of a thousands digit 2, or 3, the call is directed to the 1000-line switching block 2412 which is shown as using a 2000-number translator such as block translator 1900. If the thousands digit dialed is 2, the call is extended to the first station on each of the 1000 lines and if the thousands digit 3, is dialed, the call is directed to the second, the third, or the fourth station on the called line according to the tens and units digits dialed.

When the initial digit and thousands digit dialed in the thousands-link frame is initial digit 6 and thousands digit 4, 5, or 6, the connection is extended over the thousands trunks in groups 2404 to the 1000-line switching block 2414 which includes a 3000-number translator. As described hereinbefore with reference to translator 2300, responsive to the dialing of the thousands digit 4 (in this case the digit assigned the first 1000 numbers), the call is directed to the first party on each of the 1000 lines; responsive to the dialing of the thousands digit 5 (the digit assigned the second 1000 numbers) the call is directed to the second station on each of the 1000 lines; and responsive to the dialing of the thousands digit 6 (assigned the last 1000 numbers), the call is directed to the third or the fourth station on the 4-party lines depending upon the tens and units digits dialed.

Responsive to the dialing of the initial digit 6 followed by the dialing of a thousands digit 7, 8, 9, or 0, the thousands-link frame control apparatus directs the call to the 1000-line switching block 2417 over thousands trunks in group 2407. Responsive to the dialing of the thousands digit 7, which is assumed to be the thousands digit assigned to the first 1000 numbers of this switching block, the call is directed to the first station on each of the 1000 lines; the dialing of the thousands digit 8 (the digit assigned the second 1000 numbers) directs the call to the second station; the dialing of the thousands digit 9 (the third 1000 numbers) directs the call to the third station, and the dialing of the thousands digit 0 directs the call to the fourth station on each of the 1000 4-party lines.

Calls originated by any one of the 10,000 stations are extended to a thousands-link frame over the originating trunks such as those shown in cable groups 2421, 2422, 2423, and 2424. The calls are then extended to the 1000-line switching block containing the called line, provided the called line terminates in this exchange, and is directed to the called line over the thousands trunks as hereinbefore noted.

It will be observed that this is a typical example in which the 10,000 possible directory numbers are assigned to four 1000-line switching blocks, each block using a different one of the translators hereinbefore described. It would be possible to provide trunking plans using a varying number of switching blocks and serving a varying number of stations by so choosing the translators used in the 1000-line switching blocks.

We claim:

1. In a switching stage comprising primary switches and secondary switches interconnected by links spread between them, with calling connection paths incoming to the primary switches and callable connection paths outgoing from the secondary switches, with means responsive to the calling of any group of outgoing connection paths over any incoming connection path for marking the called group, with means controlled thereby for operating the switches to extend a connection from the concerned incoming connection path and primary switch to an idle connection path in the marked called group by way of an idle link and the secondary switch from which the last said connection path extends; a group controller common to all said paths, links, and switches and including separate relay combinations for the respective ones of the links and respective ones of the said outgoing paths which may be included, if idle, in the said connection, the relay combinations including a first group for the links and a second group for the outgoing connection paths, each said relay combination including at least a first contact means, each relay combination in one of said groups thereof including a second contact means, each relay combination including test means rendering effective its said first contact means subject to its respective link or path being idle, each relay combination which includes a said second contact means also including local means responsive to the said rendering effective of its said first contact means for rendering effective its said second contact means, and means controlled jointly by the said contact means of two relay combinations in respective said groups thereof for controlling the said means for extending a connection, such controlling means including the said second contact means of one of the last said relay combinations.

2. In a switching stage according to claim 1, wherein each relay combination includes first and second contact means and includes local means responsive to the rendering effective of its said first means for rendering effective its second contact means; the said controlling means being controlled jointly by the said second contact means of a relay combination associated with a link jointly with the said second contact means of a relay combination associated with a said outgoing path.

3. In a switching stage according to claim 1 wherein each relay combination comprises an electromagnetic relay with the said first and second contact means comprising respective movable contact members thereof; the contact members of a relay including a relatively sensitive first contact member and a relatively insensitive second contact member, the said test means and said local means of a relay respectively comprising a relatively weak and a relatively strong energizing winding.

4. In a switching stage according to claim 1, wherein the said relay combinations in each said group comprise subgroups of relay combinations assigned respectively to the secondary switches, with means for rendering all the said test means effective coincidentally; means including the second contact means of each said subgroup for insuring that the second contact means of only one relay combination thereof can become effective.

5. In a controller for use in a switching system wherein selection is required between possible available matched switching paths, a series of match-detect relays associated with respective ones of said paths, test means for establishing operate circuits contemporaneously for said relays each depending upon the availability of its associated switching path, each relay including contact means operable therewith for closing a self-locking circuit, each relay also including chain contact means operable therewith for opening each said operating circuit to preclude subsequent operation of any unoperated relay, the last said means including preference-chain contact means and associated circuit conductors giving preference to the relays in a predetermineded order for insuring that the self-locking circuits of all operated relays but one are opened by that one, a choice allotter, and means for operating it to shift said circuit conductors successively to thereby shift said predetermined order successively.

6. A controller as set forth in claim 5, wherein the preference-chain contact means and the associated circuit conductors comprise an endless chain which includes a pair of normally-closed contact members on each relay with individual chain-in and chain-out conductors attached thereto, and wherein the allotter includes groups of contact members corresponding respectively to said relays, means for operating said groups successively, chain-source and chain-end conductors, first contact means in each of said groups for disconnecting the chain-in conductor of the associated relay from the chain-out conductor of the immediately preceding relay, second contact means in each of said groups for connecting the last said chain-out conductor to said chain-end conductor, and third contact means in each of said groups for connecting the chain-in conductor of the associated relay to said chain-source conductor.

7. In a selector switching stage having trunks incoming thereto and having trunks outgoing therefrom comprising separately callable groups, switching apparatus for connecting calling incoming trunks with respective idle outgoing trunks in called groups, each outgoing trunk including a test wire, the outgoing trunks in desired ones of said groups each including a number wire, a group of test-connect relays, a group of number-connect relays, means for assigning and connecting a separate one of the test-connect relays to each outgoing group of trunks, means for assigning and connecting a separate one of the number-connect relays to each of selected ones of the outgoing trunk groups, means responsive to the calling of any said trunk group for operating the test-connect relay assigned thereto to connect the said test wires thereof to the said switching apparatus, means responsive thereto for operating said switching apparatus to select an idle trunk in the called group and to connect the calling incoming trunk thereto, further means responsive to the calling of any said selected trunk group for operating the number-connect relay assigned thereto to connect the said number wires thereof to the said switching apparatus, and means responsive to the said selection of an idle trunk for energizing the connected number wire thereof subject to the number-connect relay of the called group being operated.

8. In the switching stage of claim 7, at least one of said selected groups of trunks having two call designations assigned thereto, and means controlled by said assigning and connecting means for operating the assigned test-connect relay responsive to the calling of either call designation, while the operation of the assigned number-connect relay depends upon the calling of a specific one of the call designations.

9. In the switching stage of claim 7, one said selected group having a plurality of call designations assigned thereto, means controlled by the assigning and connecting means for operating the assigned test-connect relay responsive to the calling of any said call designation, means in the assigning and connecting means for assigning and connecting a plurality of number-connect relays to said one selected group, and means controlled by the assigning and connecting means for operating the last said number-connect relays selectively according to the call designation used in calling the trunk group.

10. In the switching stage of claim 9, each trunk in said one selected group including a plurality of number wires, each assigned and connected number-connect relay controlling the energization of a separate one of the number wires of any trunk in the group.

11. In a large-group allotter for use in a switching system, an input wire and means for energizing it responsive to each of a succession of calls, a number of output wires, switching means in said allotter, and means controlled over the input wire for operating the switching means to connect the input wire to the output wires in succession in respective correspondence with the energization of the input wire.

12. In a large-group allotter according to claim 11, the means for operating the switching means comprising a series of counting relays and means for operating them successively in cycles responsive to recurring energizations of the input wire, with each cycle including successive steps wherein the input wire is connected respectively to the output wires, means for causing any relay which is next in the sequence between energizations of the input wire to respond to the next energization of the input wire without effectively actuating the switching means, and means responsive to the next succeeding deenergization of the input wire for causing the switching means to transfer the then deenergized input wire to the next succeeding output wire.

13. In an allotter for use in a switching system, two groups of wires comprising a first input wire and corresponding output wires, together with a second input wire and corresponding output wires, with the number of second output wires exceeding the number of first output wires, associated circuit means for rendering either group of wires effective to the exclusion of the other group, means for energizing the input wire of the effective group responsive to each of a succession of calls, first control and switching means in the allotter, means responsive to successive energizations of the first input wire for operating the first control and switching means in successive steps to connect the first input wire to the first output wires in succession in respective correspondence with the energizations of the first input wire, second control and switching means in the allotter, and means responsive to energizations of the second input wire for operating the second control and switching means sequentially with the first control and switching means in successive steps to connect the second input wire to the second output wires in succession in respective correspondence with the energizations of the second input wire.

14. In combination, a controller for controlling crossbar switches in extending connections from first control apparatus to second control apparatus through said switches, said connections including links and trunks tandem-related, connecting means for connecting said controller to said first control apparatus, testing means in said controller for matching a path over an idle one of said links and an idle one of said trunks pursuant to extending the said connection, actuating means in said controller operable thereafter to cause the said connection to be extended, timing means for rendering the said connecting means ineffective upon the expiration of either of two predetermined timing intervals comprising a first time interval limiting the time that the said testing means is effective and a second time interval limiting the time the said actuating means is effective, the said testing means comprising a relay having two operate windings differentially-connected and control means associated therewith for energizing one or another of said windings depending on which timing interval is the current one.

15. In a controller for extending incoming call connections to respective idle outgoing trunks which are arranged in callable groups with each trunk including a separate test wire and a separate control wire, test relays common to all of said trunk wires, means for temporarily individualizing the trunk wires of the trunks in a called group with the said test relays for selecting an idle trunk therein and for marking the control wire of the selected trunk, the said individualizing means including separate connect relays for respective trunk groups each having contact means thereon operable responsive to the calling of the trunk group corresponding thereto for connecting the trunk wires of the trunks in the called group to the said common test relays, the said trunk wires of any trunk group being individual to the said contact means of their respective connect relay and the said test relays being common to the contact means of all of said relays.

16. In combination, a coupler for use in a switching stage employing control apparatus for the common use of said coupler and similar other ones, trunks incoming to said coupler and trunks outgoing therefrom, control means including a line relay normally connected to an incoming trunk and controllable thereover for taking said coupler for use and for registering digit information indicative of desired outgoing trunks, control wires and means including a chain relay effective responsive to the said digit registration for individualizing said coupler with the said control apparatus and for transferring the said registered digit information to said apparatus, transfer means thereupon operative to disconnect the said line relay from said trunk and to place it under control of said associated chain relay to maintain said coupler seized, crossbar switching apparatus thereupon operable under the control of said control apparatus and digit information registered therein to connect the said incoming trunk without said line relay connected thereto to the said desired outgoing trunk, and means in said switching apparatus operable coincidental with the completion of said connection for terminating the said individualization and for restoring said line relay leaving the said coupler under control of the said extended connection.

17. In a coupler for use in a switching stage employing control apparatus common to said couplers and other similar ones, a first and a second register and means for operating and setting them according to digit impulses to register digits of called numbers, means associated with and controllable by the setting of said registers for individualizing the said coupler with said control apparatus and for temporarily connecting said registers to said control apparatus for transferring thereto an indication of the said digits registered, and means associated with said second register when operated for rendering ineffective the setting of the first said register.

18. In combination, a coupler for use in a crossbar switching system employing control apparatus for the common use of said coupler and similar other ones, trunks incoming to said couplers and trunks outgoing therefrom to called lines having stations thereon, means associated with said incoming trunks for extending a connection to said coupler responsive to the calling of group digits of a telephone number indicating a desired called line and called station thereon and for transmitting to said coupler an indication of the group digits called, digit registers and means for operating them to register the said telephone number, said registers including a group-digit register for registering the said group-digit indication, means thereupon effective for transferring the registered number and registered group-digit indication to said control apparatus, crossbar switching apparatus thereupon operable under control of said control apparatus to extend a connection from the said coupler to the called line over one of said outgoing trunks, a ringing circuit extending over said connection from the block coupler, and means controlled by said control apparatus in accordance with the said registered number for controlling the said group-digit register to condition the said ringing circuit to signal one station or another on the called line.

19. In a combination according to claim 18, the said transferring means including control wires for transferring the said group-digit information to the said control apparatus, and the said means controlled by said control apparatus for controlling the said group-digit register including the said control wires.

20. In combination, a coupler, first switching apparatus for extending incoming connections thereto, second switching apparatus for extending outgoing connections therefrom to called lines in accordance with the calling of numbers thereof, digit registers operable successively to register successive series of impulses corresponding to digits of a called number received over said incoming connection, distributing means including a sequence relay and a series relay, means for operating said series relay at the end of any received series of impulses to operate said sequence relay to distribute the received series of impulses successively to said digit registers, means controlled by said digit registers for thereafter operating the said second switching apparatus to extend a connection from said coupler to a called line, and clearout means effective responsive to said sequence relay being operated for thereafter restoring said digit registers responsive to said incoming connection being opened, the said clearout means including means for operating said sequence relay responsive to a failure of operation of said series relay resulting from said incoming connection being opened during the receipt of said series of impulses thereby rendering itself effective to restore said registers.

21. In a combination according to claim 20, the said clearout means being effective to restore said operated registers without said incoming connection being opened subject to said series of impulses corresponding to a first digit of a called number corresponding to a single impulse.

22. In an automatic switching system, a switchboard unit serving a definite number of lines equal to ten raised to a whole-number power, said line including multi-station lines, the collective station capacity of the lines being so chosen that the average station capacity per line is no more than a given number, with at least some of the lines having a station capacity greater than said given number but offset by other lines having a station capacity less than said given number, said lines terminating at said switchboard at respective locations and having corresponding locational numbers assigned respectively thereto, there being said given number of blocks of consecutive telephone numbers assigned to said lines collectively, with each block containing said definite number of numbers, the assignment being such that each station on a multi-station line has a separate one of the said telephone numbers assigned thereto, a translator and translating means therein responsive to the calling of any said assigned telephone number for transmitting the said locational number assigned to the line serving the called station, and further means in the translator for transmitting a station-marking indication distinguishing the called station on the last said line from any other station thereon, switching means responsive to the transmission of said locational number for extending a connection to the last said line, and selective signalling means responsive to said station-marking indication for signalling the called station over said connection.

23. In an automatic switching system according to claim 22, the numbers in one of said blocks of numbers being assigned to first stations on said lines respectively, the remaining collectively-assigned line numbers being assigned to respective other stations on selected ones of said lines, and means included in said translator responsive to the calling of any said remaining number for transmitting a said locational number and a said station-marking indication according to the block-designating portion of the called number, jointly with the remaining portion thereof.

24. In an automatic switching system according to claim 23, some of said lines being single-station lines and the remainder being divided between two-station and four-station lines, resulting in an average station capacity of no more than two stations a line, and resulting in two blocks of consecutive numbers being assigned to the said lines collectively, the said translating means including normal-translating means for transmitting locational numbers depending respectively on the called telephone number within any block irrespective of the block-designating portion thereof, double-translating means and triple-translating means, means for controlling said double translating means according to the block-designating portion of any called telephone number assigned to the third station on a four-station line for overriding the locational number transmitted by said normal translating means in favor of a double-translated locational number, and means for controlling said triple-translating means according to the block-designating portion of any called telephone number assigned to the fourth station on a four-station line for overriding the locational number transmitted by said normal translating means in favor of a triple-translated locational number.

25. In an automatic switching system according to claim 23, the said lines being divided between two-party and four-party lines resulting in an average capacity of no more than three stations a line, and resulting in three blocks of consecutive numbers being assigned to the said lines collectively, the said translating means including normal-translating means for transmitting locational numbers depending respectively on the called telephone number within any block irrespective of the block-designating portion thereof, and modified-translating means and means for controlling it according to the block-designating portion of any called telephone number assigned to the fourth station on a four-station line for overriding the locational number transmitted by said normal translating means in favor of a modified-translated locational number.

26. In an automatic switching system according to claim 23, the said translating means including normal translating means and overriding translating means, the said overriding translating means being responsive to the calling of certain of said telephone numbers for overriding the locational number transmitted by said normal-translating means in favor of a overriding translated locational number, and delay means in said translator responsive to the calling of said certain telephone numbers for rendering the said normal translating means ineffective until sufficient time has elapsed for said modified translating means to be effective.

27. In an automatic switching system according to claim 23, the said switchboard unit comprising similar frames each serving a similar portion of said lines, each frame mounting similar crossbar switches which are included in said switching means and which terminate said lines, the proportion of the lines of the respective station capacities being such that in view of the number of lines served by any crossbar switch, no assignment to a single switch of lines having station capacities which include each station capacity will provide those lines with said proportion, line-assigning means in said translator including means for assigning respective station capacities to the lines of any said frame as nearly to said proportion as may be, said assigning means including means for overbalancing certain lines of each station capacity in certain switches and under-balancing certain other lines of each station capacity in other switches of the same frame, whereby the lines of the frame have substantially the said proportion.

28. In an automatic switching system serving lines including multi-station lines, there being multi-digit telephone numbers assigned respectively to the stations on the lines, such that each telephone number indexes a line and a definite station thereon, switching apparatus and means rendering it normally responsive to the calling of any said telephone numbers to extend a connection to an indexed line and to signal the said station thereon, similar block couplers through which said conections are extended each including register relays and means for operating them selectively to record station digit information, a block translator common to said couplers, stations wires corresponding respectively to the register relays multipled between the couplers and the translator, means for temporarily individualizing any coupler with the translator, means responsive to the operation of any register relay for energizing the associated stations wire, reset relays in the translator operable responsive to the said stations wire energization for recording the station digit information in the said translator, station-translating means in the translator responsive to the operation of any reset relay for restoring the operated register relay and for thereafter energizing the station wire corresponding to the register relay serving the indexed station thereby operating the associated register relay in said individualized coupler, switching apparatus controlled by said translator for extending a connection from the individualized coupler to an indexed line and for terminating the said individualization, and means for thereupon signalling the station on the indexed line according to the register relay currently operated.

29. In a control arrangement for use in a switching system, a first group of relays, a second group and a third group of relays common to said first group of relays, means for selectively operating any relay of the first group, means for rendering the second and third groups temporarily individual to the last said relay of the first group, the relays in the said second groups and third groups corresponding respectively to the relays in the said first group, means responsive to the operation of any relay of the first group for operating a correponding relay in the second group, means responsive to the operation of any relay on the second group for restoring the operated relay in the first group and for rendering other means effective for selectively operating the relays in the third group, and means responsive to the operation of any relay in the third group for operating a corresponding relay in the first group.

30. In a block translator for translating decimal telephone numbers indexing telephone lines and stations thereon into separate groups of non-decimal numbers each including a group digit indexing a group of telephone lines followed by digits indexing lines of the group, and into station numbers indexing the station on the indexed line, hundreds, tens, and units registers and means for setting them according to respective digits of called telephone numbers, fives relays controlled by the units register, stations relays controlled by the tens and units registers, twenty-fives relays controlled by the tens register, the fives relays and the stations relays, two-hundreds-fifties relays controlled by the hundred register and the twenty fives relays, similar sets of wires, one of said sets of wires normally controlled by the hundreds register jointly with the twenty-fives relays, a second set of wires normally controlled by the tens register, the fives relays, and the two-hundred-fifties relays, a third set of wires normally controlled by said units register and the two-hundred-fifties relays, station wires normally controlled by said station relays, and means for energizing selected wires of the said sets to identify the digits of the translater non-decimal number and for energizing the selected station wire to identify the station on the line corresponding to the translated decimal number.

31. In a block translator according to claim 28, means associated with said stations relays for controlling said twenty fives relays in changing the said selection of the wires in the said first set.

32. In a block translator according to claim 29, further means associated with said stations relays for changing the said selection of the wires in the said second set.

References Cited in the file of this patent

UNITED STATES PATENTS 1,849,694 Saunders -------------- Mar. 15, 1932